(12) United States Patent
Sasada

(10) Patent No.: US 8,906,260 B2
(45) Date of Patent: Dec. 9, 2014

(54) DIFLUOROETHYLENEOXI DERIVATIVES, THE LIQUID CRYSTAL COMPOSITION AND THE LIQUID CRYSTAL DISPLAY DEVICE

(71) Applicant: Yasuyuki Sasada, Ichihara (JP)

(72) Inventor: Yasuyuki Sasada, Ichihara (JP)

(73) Assignees: JNC Corporation, Tokyo (JP); JNC Petrochemical Corporation, Tokyo (JP)

(*) Notice: Subject to any disclaimer, the term of this patent is extended or adjusted under 35 U.S.C. 154(b) by 0 days.

(21) Appl. No.: 13/779,940

(22) Filed: Feb. 28, 2013

(65) Prior Publication Data

US 2013/0230669 A1    Sep. 5, 2013

(30) Foreign Application Priority Data

Feb. 29, 2012    (JP) .................................. 2012-043227

(51) Int. Cl.
| | |
|---|---|
| C09K 19/06 | (2006.01) |
| C09K 19/20 | (2006.01) |
| C09K 19/12 | (2006.01) |
| C09K 19/30 | (2006.01) |
| C09K 19/04 | (2006.01) |

(52) U.S. Cl.
CPC .............. *C09K 19/3003* (2013.01); *C09K 19/20* (2013.01); *C09K 2019/0466* (2013.01); *C09K 19/12* (2013.01); *C09K 19/3066* (2013.01)
USPC .............. 252/299.6; 252/299.62; 252/299.63; 252/299.66; 568/630; 568/631; 568/644; 568/645; 568/661

(58) Field of Classification Search
USPC .............. 428/1.1; 252/299.6, 299.61–299.68; 568/626, 630, 631, 642, 643, 644, 645, 568/647, 655, 663, 661, 669
See application file for complete search history.

(56) References Cited

FOREIGN PATENT DOCUMENTS

| | | | |
|---|---|---|---|
| CN | 102898287 A | * | 1/2013 |
| EP | 387032 A1 | | 9/1990 |
| JP | 1990-233626 A | | 9/1990 |

OTHER PUBLICATIONS

Wu, et al., Synthesis of trifluoroethyl ethers from 2,2,2-trifluoroethyl chloride in high temperature aqueous medium, Journal of Fluorine Chemistry, Jan. 2002, V113, p. 79-83.*
Reiffenrath, V. et al., 1989, New liquid-crystalline compounds with negative dielectric anisotrophy, Liq. Cryst., 5 (1), 159-170.

* cited by examiner

*Primary Examiner* — Gwendolyn Blackwell
*Assistant Examiner* — Ruiyun Zhang
(74) *Attorney, Agent, or Firm* — Hogan Lovells US LLP

(57) ABSTRACT

To provide a liquid crystal compound showing a large absolute value of dielectric anisotropy ($|\Delta\epsilon|$. A compound is represented by formula (1):

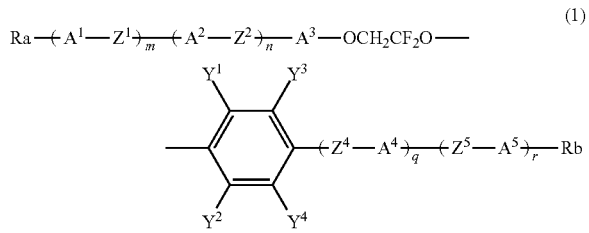

wherein, in formula (1), Ra and Rb are fluorine, alkyl having 1 to 10 carbons or the like, and in the alkyl, at least one of —$CH_2$— may be replaced by —O— or the like, however, Ra and Rb are not identical; $A^1$, $A^2$, $A^3$, $A^4$ and $A^5$ are 1,4-cyclohexylene, 1,4-phenylene or the like, and in the groups, at least one of hydrogen may be replaced by fluorine; $Z^1$, $Z^2$, $Z^4$ and $Z^5$ are a single bond or the like; $Y^1$, $Y^2$, $Y^3$ and $Y^4$ are hydrogen, fluorine or the like; and m, n, q and r are 0, 1 or 2, and a sum of m, n, q and r is 0, 1, 2, 3 or 4.

24 Claims, No Drawings

DIFLUOROETHYLENEOXI DERIVATIVES, THE LIQUID CRYSTAL COMPOSITION AND THE LIQUID CRYSTAL DISPLAY DEVICE

This is a Non-Provisional application, which claims priority to Japanese Patent Application No. 2012-043227, filed on Feb. 29, 2012; the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The present invention relates to a difluoroethyleneoxy derivative, a liquid crystal composition and a liquid crystal display device. More specifically, the invention relates to a difluoroethyleneoxy derivative, a liquid crystal composition containing the composition and having a nematic phase, and a liquid crystal display device including the composition.

BACKGROUND ART

A liquid crystal display device typified by a liquid crystal display panel, a liquid crystal display module and so forth utilizes dielectric anisotropy, optical anisotropy or the like of a liquid crystal compound. As an operating mode of the liquid crystal display device, various kinds of modes are known, such as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode, a multi-domain vertical alignment (MVA) mode and a polymer sustained alignment (PSA) mode. Characteristics as described below are required as common properties for any liquid crystal material, whatever mode the device applies.

The characteristics include:
(1) being stable to external environment factors such as moisture, air, heat and light;
(2) showing a liquid crystal phase in a wide temperature range centering on room temperature;
(3) having a low viscosity;
(4) allowing a decrease in driving voltage when the display device is driven;
(5) having an optimum value of dielectric anisotropy ($\Delta\epsilon$); and
(6) having an optimum value of optical anisotropy ($\Delta n$).

However, no single compound satisfies all of the characteristics at present, and a liquid crystal composition prepared by mixing several compounds to twenty or more liquid crystal compounds is currently used for the liquid crystal display device.

A liquid crystal display device having a higher display performance in contrast, display capacity, response time or the like has been required in recent years. In order to meet the requirement therefor, a demand for a liquid crystal display device according to an active matrix (AM) mode as typified by a thin film transistor (TFT) mode is rising mainly in a field of a television, a viewfinder or the like.

A recent trend of development in the fields is focused on advancement of downsizing or portability of the liquid crystal display device, as seen in a television or a notebook-sized personal computer that is made portable by reducing a size and weight. For a liquid crystal material used in association therewith, a material having a low driving voltage is required, more specifically, a liquid crystal compound allowing a decrease in a threshold voltage, and a liquid crystal composition containing the compound and having a low threshold voltage is required.

As known well, a threshold voltage (Vth) is shown by the following equation (H. J. Deuling et al., Mol. Cryst. Liq. Cryst., 27 (1975) 81):

$$Vth=\pi(K/\epsilon_0\Delta\epsilon)^{1/2}$$

In the equation, K is an elastic constant of a liquid crystal material, and $\epsilon_0$ is a dielectric constant of vacuum.

As understood from the equation, two ways are considered to reduce Vth, namely, increasing $\Delta\epsilon$ or decreasing K. However, actual control of elastic constant K of the liquid crystal material is still difficult according to a current technology, and the requirement is ordinarily met by using a liquid crystal material having a large value of $\Delta\epsilon$. From such a situation, a liquid crystal compound having the large value of $\Delta\epsilon$ has been actively developed.

Representative examples of a liquid crystal material showing a positive value of $\Delta\epsilon$ for low voltage driving to be used for a liquid crystal display device having a TN mode or the like to be driven with TFT include compounds (A) and (B) as described below (see Patent literature No. 1, for example).

Formula 1

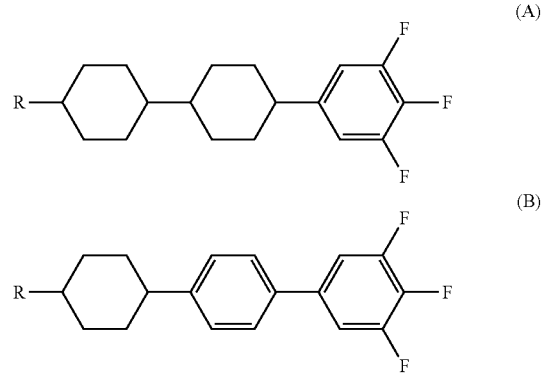

wherein, in the formulas, R is alkyl.

Both compounds (A) and (B) have a 3,4,5-trifluorophenyl group in a terminal position of a molecule, and are expected as a liquid crystal material for low voltage driving. However, a numeric value of $\Delta\epsilon$ (A: 8.3, (B): 12.8) is not sufficient enough, and even if the compounds are used, preparation of a liquid crystal composition that can sufficiently meet the requirement is considered to be difficult.

Moreover, as a mode for overcoming narrowness of viewing angle being a biggest problem of the liquid crystal display device, a new mode such as the IPS mode, the VA mode, the MVA mode and the OCB mode has been disclosed in recent years. Among the modes, in particular, devices according to the VA mode and the MVA mode have a wide viewing angle and also an excellent responsiveness, and further a high contrast, and thus development of such a mode is actively performed in each display manufacturer. Features of the liquid crystal composition used for the liquid crystal display devices according the modes include a liquid crystal composition having a negative value of dielectric anisotropy. As a compound showing a large negative value of dielectric anisotropy, compound (C) as described below is reported, for example (see Non-patent literature No. 1).

Formula 2

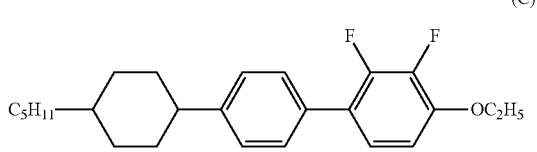

(C)

According to Non-patent literature No. 1, compound (C) shows a negative value of dielectric anisotropy ($\Delta\varepsilon=-4.1$), but an absolute value of $\Delta\varepsilon$ is small. Accordingly, the liquid crystal composition containing the compound is presumed to be difficult to meet the requirement of the VA mode or the MVA mode.

As described above, a liquid crystal compound having a large positive or large negative value of dielectric anisotropy ($\Delta\varepsilon$), more specifically, a compound having a large absolute value of dielectric anisotropy ($|\Delta\varepsilon|$) is eagerly awaited.

CITATION LIST

Patent Literature

Patent literature No. 1: JP H2-233626 A.

Non-Patent Literature

Non-patent literature No. 1: V. Reiffenrath et al., Liq. Cryst., 5(1), 159 (1989).

SUMMARY OF INVENTION

Technical Problem

An object of the invention is to provide a liquid crystal compound that eliminates a disadvantage of the background art and shows a large absolute value of dielectric anisotropy ($|\Delta\varepsilon|$), a liquid crystal composition that contains the compound to allow low voltage driving in various kinds of display modes, and a liquid crystal display device using the liquid crystal composition.

Another object of the invention is to provide a liquid crystal composition containing the compound.

Further, another object of the invention is to provide a liquid crystal display device including the composition.

Solution to Problem

The present inventors have diligently conducted research to achieve the object. As a result, the present inventors have found that the object can be achieved by a difluoroethyleneoxy derivative having a constitution as described below, and have completed the invention.

More specifically, the constitution of the invention is as described below.

Item 1. A compound represented by formula (1):

Formula 3

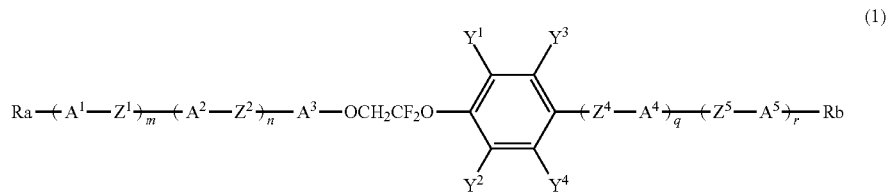

(1)

wherein, in formula (1), Ra and Rb are each independently fluorine, chlorine or alkyl having 1 to 10 carbons, and in the alkyl, at least one of $-CH_2-$ may be replaced by $-O-$, $-S-$, $-CO-$ or $-SiH_2-$, at least one of $-(CH_2)_2-$ may be replaced by $-CH=CH-$ or $-C\equiv C-$, and at least one of hydrogen may be replaced by fluorine, however, Ra and Rb are not identical; $A^1, A^2, A^3, A^4$ and $A^5$ are each independently 1,4-cyclohexylene, 1,4-phenylene, cyclohexene-1,4-diyl, decahydronaphthalene-2,6-diyl, 1,2,3,4-tetrahydronaphthalene-2,6-diyl or naphthalene-2,6-diyl, and in the groups, one of $-CH_2-$ may be replaced by $-O-$, $-S-$, $-CO-$ or $-SiH_2-$, at least one of $-(CH_2)_2-$ may be replaced by $-CH=CH-$, and at least one of hydrogen may be replaced by fluorine, chlorine, $-CF_3$, $-CHF_2$, $-CH_2F$, $-OCF_3$, $-OCHF_2$ or $-OCH_2F$; $Z^1, Z^2, Z^4$ and $Z^5$ are each independently a single bond or alkylene having 1 to 4 carbons, and in the alkylene, at least one of $-CH_2-$ may be replaced by $-O-$, $-S-$, $-CO-$ or $-SiH_2-$, at least one of $-(CH_2)_2-$ may be replaced by $-CH=CH-$ or $-C\equiv C-$, and at least one of hydrogen may be replaced by fluorine; $Y^1, Y^2, Y^3$ and $Y^4$ are each independently hydrogen, fluorine, chlorine, $-CF_3$ or $-CHF_2$; and m, n, q and r are each independently 0, 1 or 2, and a sum of m, n, q and r is 0, 1, 2, 3 or 4.

Item 2. The compound according to item 1, wherein, in formula (1), a sum of m, n, q and r is 0, 1, 2 or 3.

Item 3. The compound according to item 1 or 2, represented by any one of formulas (1-1) to (1-10) as described later.

Item 4. The compound according to item 3, wherein, in formulas (1-1) to (1-10) as described later, Ra and Rb are each independently fluorine, alkyl having 1 to 10 carbons, alkenyl having 2 to 10 carbons, alkoxy having 1 to 9 carbons, alkoxyalkyl having 2 to 9 carbons, alkenyloxy having 3 to 9 carbons, polyfluoroalkyl having 1 to 10 carbons, polyfluoroalkoxy having 1 to 9 carbons or polyfluoroalkenyl having 2 to 10 carbons; $A^1$, $A^2$, $A^3$, $A^4$ and $A^5$ are each independently 1,4-cyclohexylene, 1,4-phenylene, 2-fluoro-1,4-phenylene, 2,3-difluoro-1,4-phenylene, 3,5-difluoro-1,4-phenylene, 2,5-difluoro-1,4-phenylene, cyclohexene-1,4-diyl, decahydronaphthalene-2,6-diyl, 1,2,3,4-tetrahydronaphthalene-2,6-diyl or naphthalene-2,6-diyl; $Z^1$, $Z^2$, $Z^4$ and $Z^5$ are each independently a single bond, —$(CH_2)_2$—, —$(CH_2)_4$—, —COO—, —OCO—, —$CH_2O$—, —$OCH_2$—, —$CF_2O$—, —$OCF_2$—, —CH=CH—, —CF=CF—, —C≡C—, —$CH_2CO$—, —$COCH_2$—, —$CH_2SiH_2$—, —$SiH_2CH_2$—, —$(CH_2)_2COO$—, —$OCO(CH_2)_2$—, —$(CH_2)_2CF_2O$—, —$OCF_2(CH_2)_2$—, —$(CH_2)_3O$— or —$O(CH_2)_3$—.

Item 5. The compound according to item 3, represented by any one of formulas (1-1) to (1-6) as described later, wherein, in the formulas, Ra and Rb are each independently fluorine, alkyl having 1 to 10 carbons, alkenyl having 2 to 10 carbons, alkoxy having 1 to 9 carbons, alkoxyalkyl having 2 to 9 carbons, alkenyloxy having 3 to 9 carbons, polyfluoroalkyl having 1 to 10 carbons, polyfluoroalkoxy having 1 to 9 carbons or polyfluoroalkenyl having 2 to 10 carbons; $A^1$, $A^2$, $A^3$, $A^4$ and $A^5$ are each independently 1,4-cyclohexylene, 1,4-phenylene, 2-fluoro-1,4-phenylene, 2,3-difluoro-1,4-phenylene, 3,5-difluoro-1,4-phenylene or cyclohexene-1,4-diyl; $Z^1$, $Z^2$, $Z^4$ and $Z^5$ are each independently a single bond, —$(CH_2)_2$—, —$(CH_2)_4$—, —$CH_2O$—, —$OCH_2$—, —$CF_2O$—, —$OCF_2$—, —CH=CH—, —CF=CF—, —C≡C—, —$(CH_2)_2CF_2O$—, —$OCF_2(CH_2)_2$—, —$(CH_2)_3O$— or —$O(CH_2)_3$—; and $Y^1$, $Y^2$, $Y^3$ and $Y^4$ are each independently hydrogen or fluorine.

Item 6. The compound according to item 3, represented by any one of formulas (1-1) to (1-6) as described later, wherein, in the formulas, Ra and Rb are each independently fluorine, alkyl having 1 to 10 carbons, alkenyl having 2 to 10 carbons, alkoxy having 1 to 9 carbons, alkoxyalkyl having 2 to 9 carbons, alkenyloxy having 3 to 9 carbons, polyfluoroalkyl having 1 to 10 carbons, polyfluoroalkoxy having 1 to 9 carbons or polyfluoroalkenyl having 2 to 10 carbons; $A^1$, $A^2$, $A^3$, $A^4$ and $A^5$ are each independently 1,4-cyclohexylene, 1,4-phenylene, 2-fluoro-1,4-phenylene, 3,5-difluoro-1,4-phenylene or cyclohexene-1,4-diyl; $Z^1$, $Z^2$, $Z^4$ and $Z^5$ are each independently a single bond, —$(CH_2)_2$—, —$CF_2O$—, —$OCF_2$—, —CH=CH—, —CF=CF— or —C≡C—; and both $Y^1$ and $Y^2$ are hydrogen.

Item 7. The compound according to item 3, represented by any one of formulas (1-1) to (1-6) as described later, wherein, in the formulas, Ra and Rb are each independently fluorine, alkyl having 1 to 10 carbons, alkenyl having 2 to 10 carbons, alkoxy having 1 to 9 carbons, alkoxyalkyl having 2 to 9 carbons, alkenyloxy having 3 to 9 carbons, polyfluoroalkyl having 1 to 10 carbons, polyfluoroalkoxy having 1 to 9 carbons or polyfluoroalkenyl having 2 to 10 carbons; $A^1$, $A^2$, $A^3$, $A^4$ and $A^5$ are each independently 1,4-cyclohexylene, 1,4-phenylene, 2-fluoro-1,4-phenylene, 2,3-difluoro-1,4-phenylene or cyclohexene-1,4-diyl; $Z^1$, $Z^2$, $Z^4$ and $Z^5$ are each independently a single bond, —$(CH_2)_2$—, —$CH_2O$—, —$OCH_2$—, —$CF_2O$—, —$OCF_2$—, —CH=CH—, —CF=CF— or —C≡C—; and both $Y^2$ and $Y^4$ are hydrogen.

Item 8. The compound according to item 3, represented by a formula selected from formulas (1-1-1) to (1-1-2), formulas (1-2-1) to (1-2-3), formulas (1-3-1) to (1-3-4), formulas (1-4-1) to (1-4-4), formulas (1-5-1) to (1-5-6) and formulas (1-6-1) to (1-6-6) as described later, wherein, in formulas (1-1-1) to (1-1-2), formulas (1-2-1) to (1-2-3), formulas (1-3-1) to (1-3-4), formulas (1-4-1) to (1-4-4), formulas (1-5-1) to (1-5-6) and formulas (1-6-1) to (1-6-6) as described later, Ra and Rb are each independently fluorine, alkyl having 1 to 7 carbons, alkenyl having 2 to 7 carbons, alkoxy having 1 to 6 carbons, polyfluoroalkyl having 1 to 7 carbons or polyfluoroalkoxy having 1 to 6 carbons, however, Ra and Rb are not identical; $Z^1$, $Z^2$, $Z^4$ and $Z^5$ are each independently a single bond, —$(CH_2)_2$—, —$CH_2O$—, —$OCH_2$—, —$CF_2O$—, —$OCF_2$— or —CH=CH—; $Y^1$, $Y^2$, $Y^3$ and $Y^4$ are each independently hydrogen or fluorine; and $Y^{11}$ to $Y^{14}$, $Y^{21}$ to $Y^{24}$, $Y^{31}$ to $Y^{34}$, $Y^{41}$ to $Y^{44}$ and $Y^{51}$ to $Y^{54}$ are each independently hydrogen or fluorine.

Item 9. The compound according to item 8, wherein, in formulas (1-1-1) to (1-1-2), formulas (1-2-1) to (1-2-3), formulas (1-3-1) to (1-3-4), formulas (1-4-1) to (1-4-4), formulas (1-5-1) to (1-5-6) and formulas (1-6-1) to (1-6-6) as described later, Ra and Rb are each independently fluorine, alkyl having 1 to 7 carbons, alkenyl having 2 to 7 carbons, —$CF_3$ or —$OCF_3$; $Z^1$, $Z^2$, $Z^4$ and $Z^5$ are each independently a single bond, —$(CH_2)_2$—, —$CF_2O$—, —$OCF_2$— or —CH=CH—; both $Y^1$ and $Y^2$ are hydrogen; and $Y^{11}$, $Y^{12}$, $Y^{21}$, $Y^{22}$, $Y^{31}$, $Y^{32}$, $Y^{41}$, $Y^{42}$, $Y^{51}$ and $Y^{52}$ are hydrogen.

Item 10. The compound according to item 8, represented by any one of formulas (1-1-1) to (1-1-2), formulas (1-2-1) to (1-2-3), formula (1-3-2), formula (1-3-4), formulas (1-4-1) to (1-4-4), formula (1-5-2), formulas (1-5-5) to (1-5-6), formula (1-6-3) or formula (1-6-6) as described later, wherein, in the formulas, Ra is fluorine, alkyl having 1 to 5 carbons or alkenyl having 2 to 5 carbons; Rb is fluorine, —$CF_3$ or —$OCF_3$; $Z^1$, $Z^2$, $Z^4$ and $Z^5$ are each independently a single bond, —$CF_2O$—, —$OCF_2$— or —CH=CH—; both $Y^1$ and $Y^2$ are hydrogen; and $Y^{11}$, $Y^{12}$, $Y^{21}$, $Y^{22}$, $Y^{31}$, $Y^{32}$, $Y^{41}$, $Y^{42}$, $Y^{51}$ and $Y^{52}$ are hydrogen.

Item 11. The compound according to item 8, wherein, in formulas (1-1-1) to (1-1-2), formulas (1-2-1) to (1-2-3), formulas (1-3-1) to (1-3-4), formulas (1-4-1) to (1-4-4), formulas (1-5-1) to (1-5-6) and formulas (1-6-1) to (1-6-6) as described later, Ra and Rb are each independently alkyl having 1 to 7 carbons, alkenyl having 2 to 7 carbons or alkoxy having 1 to 6 carbons; $Z^1$, $Z^2$, $Z^4$, and $Z^5$ are each independently a single bond, —$(CH_2)_2$—, —$CH_2O$—, —$OCH_2$— or —CH=CH—; $Y^2$ and $Y^4$ are each independently hydrogen or fluorine; and $Y^{12}$, $Y^{14}$, $Y^{22}$, $Y^{24}$, $Y^{32}$, $Y^{34}$, $Y^{42}$, $Y^{44}$, $Y^{52}$ and $Y^{54}$ are hydrogen.

Item 12. The compound according to item 8, represented by any one of formula (1-1-2), formula (1-2-2), formula (1-2-3), formulas (1-3-3) to (1-3-4), formulas (1-4-2) to (1-4-4), formulas (1-5-3) to (1-5-6) or formulas (1-6-4) to (1-6-6) as described later, wherein, in the formulas, Ra and Rb are each independently alkyl having 1 to 5 carbons, alkenyl having 2 to 5 carbons or alkoxy having 1 to 4 carbons; $Z^1$, $Z^2$, $Z^4$ and $Z^5$ are each independently a single bond, —$(CH_2)_2$—, —$CH_2O$—, —$OCH_2$— or —CH=CH—; $Y^2$ and $Y^4$ are each independently hydrogen or fluorine; and $Y^{12}$, $Y^{14}$, $Y^{22}$, $Y^{24}$, $Y^{32}$, $Y^{34}$, $Y^{42}$, $Y^{44}$, $Y^{52}$ and $Y^{54}$ are hydrogen.

Item 13. A liquid crystal composition containing the compound according to any one of items 1 to 12.

Item 14. The liquid crystal composition according to item 13, further containing at least one of compounds selected from compounds represented by formula (2), formula (3) and formula (4) as described later.

Item 15. The liquid crystal composition according to item 13 or 14, further containing a compound represented by formula (5) as described later.

Item 16. The liquid crystal composition according to any one of items 13 to 15, further containing at least one of compounds selected from compounds represented by formula (6), formula (7), formula (8), formula (9), formula (10) and formula (11) as described later.

Item 17. The liquid crystal composition according to any one of items 13 to 16, further containing at least one of compounds selected from compounds represented by formula (12), formula (13) and formula (14) as described later.

Item 18. The liquid crystal composition according to any one of items 13 to 17, further containing at least one of compounds selected from an optically active compound and a polymerizable compound.

Item 19. The liquid crystal composition according to any one of items 13 to 18, further containing at least one of compounds selected from an antioxidant and an ultraviolet light absorber.

Item 20. A liquid crystal display device including the liquid crystal composition according to any one of items 13 to 19.

Advantageous Effects of Invention

The invention can provide a liquid crystal compound showing a large absolute value of dielectric anisotropy ($|\Delta\epsilon|$), a liquid crystal composition that contains the compound to allow low voltage driving in various kinds of display modes, and a liquid crystal display device using the liquid crystal composition.

DESCRIPTION OF EMBODIMENTS

Hereinafter, a difluoroethyleneoxy derivative, a liquid crystal composition containing the compound and having a nematic phase, and a liquid crystal display device including the composition according to the invention will be explained.

Usage of terms herein is as described below.

"Liquid crystal compound" is a generic term for a compound having a liquid crystal phase such as a nematic phase or a smectic phase, and a compound having no liquid crystal phase but being useful as a component of the liquid crystal composition.

"Liquid crystal display device" is a generic term for a liquid crystal display panel and a liquid crystal display module.

"Liquid crystal display device" may be occasionally abbreviated as "device."

An upper limit of a temperature range of the nematic phase is a phase transition temperature between the nematic phase and an isotropic phase, and may be occasionally abbreviated simply as "maximum temperature." A lower limit of the temperature range of the nematic phase is a phase transition temperature between the nematic phase and a crystal phase, and may be occasionally abbreviated simply as "minimum temperature."

A compound represented by formula (1) (i shows the formula number) may be occasionally abbreviated as compound (i). In explanation of each formula, symbols such as $B^1$ and $E^1$ correspond to ring $B^1$ and ring $E^1$, respectively.

An expression "A and/or B" means that selection of "A and B" and selection of "A or B" can be arbitrarily performed. For example, "when Ra and/or Rb is alkenyl" generically means "when Ra is alkenyl," "when Rb is alkenyl," and "when Ra and Rb are alkenyl."

In explanation of each formula, "at least one of" in the context of "at least one of something may be replaced by something else" means any of not only positions but also the number. For example, an expression "at least one of A may be replaced by B, C or D" includes a case where arbitrary A is replaced by B, a case where arbitrary A is replaced by C, a case where arbitrary A is replaced by D, and also a case where a plurality of A are replaced by at least two of B to D.

For example, a case where "in the alkyl, at least one of —$CH_2$— may be replaced by —O—, and at least one of —$(CH_2)_2$— may be replaced by —CH=CH—" includes unsubstituted alkyl, and also alkoxy, alkoxyalkyl, alkenyl, alkoxyalkenyl and alkenyloxyalkyl.

When a meaning of phrase "in the alkyl, at least one of —$CH_2$— may be replaced by —O—, —S—, —CO— or —$SiH_2$—, and at least one of —$(CH_2)_2$— may be replaced by —CH=CH— or —C≡C—" is shown in a case of $C_4H_9$—, specific examples include $C_3H_7O$—, $CH_3$—O—$(CH_2)_2$—, $CH_3$—O—$CH_2$—O—, $H_2C$=CH—$(CH_2)_2$—, $CH_3$—CH=CH—$CH_2$— and $CH_2$=CH—$CH_2$—O—.

In the invention, in consideration of stability of the compound, replacement of two successive —$CH_2$— by —O— to form a group such as —O—O— is not preferred ($CH_3$—O—$CH_2$—O— in which oxygen and oxygen are not adjacent is preferred to $CH_3$—O—O—$CH_2$— in which oxygen and oxygen are adjacent, for example). Moreover, replacement of —$CH_2$— at a terminal in alkyl by —O— is not preferred, either ($CH_3$—O—$CH_2$— is preferred to HO—$CH_2$—$CH_2$—, for example).

In explanation of each formula, "fluoroalkyl" means a group in which at least one of hydrogen of alkyl is replaced by fluorine, and "polyfluoroalkyl" means a group in which at least two of hydrogen of alkyl is replaced by fluorine. A similar definition applies to (poly)fluoroalkoxy and (poly)fluoroalkenyl.

Difluoroethyleneoxy Derivative

A difluoroethyleneoxy derivative of the invention is represented by formula (1).

Formula 4

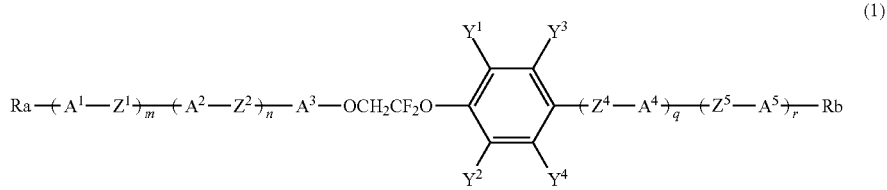

(1)

Compound (1) of the invention includes a bicyclic, tricyclic, tetracyclic, pentacyclic or hexacyclic compound having a difluoroethyleneoxy group (—$OCH_2CF_2O$—) as a linking group. In addition, a condensed ring such as a naphthalene ring is counted as a monocycle. Compound (1) of the invention has -$A^3$-$OCH_2CF_2O$—, and tends to have a larger absolute value of dielectric anisotropy ($|\Delta\epsilon|$), as compared with a compound having -$A^3$-$CH_2CF_2O$— because a —$OCH_2$— group functions as an electron donating group, and therefore is preferred as a liquid crystal compound that achieves low voltage driving.

Compound (1) has general physical properties necessary for the liquid crystal compound, namely, stability to heat, light and so forth, a small viscosity, a suitable dielectric anisotropy, a suitable optical anisotropy and a suitable elastic constant. Herein, "suitable" means that a suitable range of the dielectric anisotropy, the optical anisotropy and the elastic constant, for example, is appropriately determined according to an application (operating mode of the device) of the liquid crystal composition containing compound (1) of the invention. For example, compound (1) of the invention can show a large dielectric anisotropy, and a desired optical anisotropy when a suitable ring structure is selected.

When compound (1) has both a high clearing point and a low crystallization temperature, compound (1) has a wide temperature range of the liquid crystal phase, and is physically and chemically stable under conditions in which the device is ordinarily used, and also has a good compatibility with other liquid crystal compounds. The liquid crystal composition containing compound (1) is stable under conditions in which the device is ordinarily used. Even if the liquid crystal composition is stored at a low temperature, compound (1) does not precipitate as crystals or the smectic phase.

When terminal groups Ra and Rb, $A^1$ to $A^5$, bonding groups $Z^1$ to $Z^2$ and $Z^4$ to $Z^5$, groups $Y^1$ to $Y^4$, and the number of rings of the compound in formula (1) are suitably selected, physical properties such as the dielectric anisotropy and the optical anisotropy of compound (1) can be arbitrarily adjusted. Accordingly, compound (1) is useful as a component of the liquid crystal composition used for devices having modes such as PC, TN, STN, BTN, ECB, OCB, IPS, VA, MVA and PSA.

In formula (1), a meaning of each symbol is as described below.

Terminal Groups Ra and Rb

Ra and Rb are each independently fluorine, chlorine or alkyl having 1 to 10 carbons, and in the alkyl, at least one of —$CH_2$— may be replaced by —O—, —S—, —CO— or —$SiH_2$—, at least one of —$(CH_2)_2$— may be replaced by —CH=CH— or —C≡C—, and at least one of hydrogen may be replaced by fluorine.

However, Ra and Rb are not identical. If Ra and Rb are not identical, compound (1) easily develops the liquid crystal phase, and solubility of compound (1) in the liquid crystal composition tends to be high. If Ra and Rb are identical and symmetry of compound (1) becomes high, compound (1) does not easily develop the liquid crystal phase, and the solubility of compound (1) in the liquid crystal composition tends to be low.

For example, Ra and Rb are each independently fluorine, chlorine (preferably fluorine); alkyl having 1 to 10 carbons (in the alkyl, an upper limit of the number of carbons is preferably 7, further preferably, 5, and a lower limit of the number of carbons is preferably 2); or a substitute of the alkyl, such as alkenyl having 2 to 10 carbons (preferably alkenyl having 2 to 7 carbons, further preferably, alkenyl having 2 to 5 carbons), alkoxy having 1 to 9 carbons (preferably alkoxy having 1 to 6 carbons, further preferably, alkoxy having 1 to 4 carbons), alkoxyalkyl having 2 to 9 carbons (preferably alkoxyalkyl having 2 to 6 carbons, further preferably, alkoxyalkyl having 2 to 4 carbons), alkenyloxy having 2 to 9 carbons (preferably alkenyloxy having 3 to 9 carbons), fluoroalkyl having 1 to 10 carbons (preferably polyfluoroalkyl having 1 to 10 carbons, further preferably, polyfluoroalkyl having 1 to 7 carbons), fluoroalkoxy having 1 to 9 carbons (preferably polyfluoroalkoxy having 1 to 9 carbons, further preferably, polyfluoroalkoxy having 1 to 6 carbons), and fluoroalkenyl having 2 to 10 carbons (preferably polyfluoroalkenyl having 2 to 10 carbons, further preferably, polyfluoroalkenyl having 2 to 7 carbons).

Preferred Ra and Rb are each independently fluorine, alkyl having 1 to 10 carbons, alkenyl having 2 to 10 carbons, alkoxy having 1 to 9 carbons, alkoxyalkyl having 2 to 9 carbons, alkenyloxy having 3 to 9 carbons, polyfluoroalkyl having 1 to 10 carbons, polyfluoroalkoxy having 1 to 9 carbons or polyfluoroalkenyl having 2 to 10 carbons.

In the group of Ra and Rb, a non-branched chain group (examples: non-branched chain alkyl and the substitute thereof) is preferred to a branched group (examples: branched alkyl and the substitute thereof). When Ra and/or Rb is the non-branched chain group, the temperature range of the liquid crystal phase of compound (1) is wide, and the viscosity is small. When Ra and Rb each are the branched group, compound (1) has a good compatibility with other liquid crystal compounds.

Moreover, even if Ra and Rb each are the branched group, a case where Ra and Rb each are an optically active group is preferred. When Ra and Rb each are the optically active group, compound (1) is useful as a chiral dopant. When compound (1) is added to the liquid crystal composition, a reverse twisted domain generated in the device can be prevented. When neither Ra nor Rb is the optically active group, compound (1) is useful as a component of the liquid crystal composition.

When Ra and/or Rb is alkenyl, a preferred configuration depends on a position of a double bond. When compound (1) is an alkenyl compound having a preferred configuration, a composition has a high maximum temperature or a wide temperature range of the liquid crystal phase. A detailed description is found in Mol. Cryst. Liq. Cryst., 1985, 131, 109 and Mol. Cryst. Liq. Cryst., 1985, 131, 327.

A preferred configuration of —CH=CH— in alkenyl depends on a position of a double bond. A trans configuration is preferred in alkenyl such as 1-propenyl, 1-butenyl, 1-pentenyl, 1-hexenyl, 3-pentenyl and 3-hexenyl. A cis configuration is preferred in alkenyl, such as 2-butenyl, 2-pentenyl and 2-hexenyl.

Specific examples of Ra or Rb include alkyl such as methyl, ethyl, propyl, butyl, pentyl, hexyl, heptyl and octyl; alkoxy such as methoxy, ethoxy, propoxy, butoxy, pentyloxy, hexyloxy and heptyloxy; alkoxyalkyl such as methoxymethyl, methoxyethyl, methoxypropyl, ethoxymethyl, ethoxyethyl, ethoxypropyl, propoxymethyl, butoxymethyl and pentoxymethyl; alkenyl such as vinyl, 1-propenyl, 2-propenyl, 1-butenyl, 2-butenyl, 3-butenyl, 1-pentenyl, 2-pentenyl, 3-pentenyl and 4-pentenyl; alkenyloxy such as 2-propenyloxy, 2-butenyloxy and 2-pentenyloxy; fluoroalkyl such as —$CH_2F$, —$CHF_2$, —$CF_3$, —$(CH_2)_2F$, —$CF_2CH_2F$, —$CF_2CHF_2$, —$CH_2CF_3$, —$CF_2CF_3$, —$(CH_2)_3F$, —$(CF_2)_2CF_3$, —$CF_2CHFCF_3$ and —$CHFCF_2CF_3$; fluoroalkoxy such as —$OCF_3$, —$OCHF_2$, —$OCH_2F$, —$OCF_2CF_3$, —$OCF_2CHF_2$, —$OCF_2CH_2F$, —$OCF_2CF_2CF_3$, —$OCF_2CHFCF_3$ and —$OCHFCF_2CF_3$; and fluoroalkenyl such as —CH=CHF, —CH=$CF_2$, —CF=CHF, —CH=$CHCH_2F$, —CH=$CHCF_3$ and —$(CH_2)_2CH$=$CF_2$.

Among types of alkyl, ethyl, propyl, butyl, pentyl, hexyl, heptyl and octyl are preferred; among types of alkoxy, methoxy, ethoxy, propoxy, butoxy, pentyloxy, hexyloxy and heptyloxy are preferred; among types of alkoxyalkyl, methoxymethyl, methoxyethyl, methoxypropyl, ethoxymethyl, ethoxyethyl, ethoxypropyl, propoxymethyl, butoxymethyl and pentoxymethyl are preferred; among types of alkenyl, vinyl, 1-propenyl, 2-propenyl, 1-butenyl, 2-butenyl, 3-butenyl, 1-pentenyl, 2-pentenyl, 3-pentenyl and 4-pentenyl are preferred; and among types of alkenyloxy, 2-propenyloxy, 2-butenyloxy and 2-pentenyloxy are preferred.

$A^1$ to $A^5$ $A^1$, $A^2$, $A^3$, $A^4$ and $A^5$ are each independently 1,4-cyclohexylene, 1,4-phenylene, cyclohexene-1,4-diyl, decahydronaphthalene-2,6-diyl, 1,2,3,4-tetrahydronaphthalene-2,6-diyl or naphthalene-2,6-diyl, and in the groups, one of —$CH_2$— may be replaced by —O—, —S—, —CO— or —$SiH_2$—, at least one of —$(CH_2)_2$— may be replaced by —CH=CH—, and at least one of hydrogen may be replaced by fluorine, chlorine, —$CF_3$, —$CHF_2$, —$CH_2F$, —$OCF_3$, —$OCHF_2$ or —$OCH_2F$. In particular, at least one of hydrogen may be preferably replaced by fluorine or chlorine (preferably fluorine) in at least one of 1,4-phenylene.

Preferred $A^1$, $A^2$, $A^3$, $A^4$ and $A^5$ are each independently 1,4-cyclohexylene, 1,4-phenylene, 2-fluoro-1,4-phenylene, 2,3-difluoro-1,4-phenylene, 3,5-difluoro-1,4-phenylene, 2,5-difluoro-1,4-phenylene, cyclohexene-1,4-diyl, decahydronaphthalene-2,6-diyl, 1,2,3,4-tetrahydronaphthalene-2,6-diyl or naphthalene-2,6-diyl; and further preferably, 1,4-cyclohexylene, 1,4-phenylene, 2-fluoro-1,4-phenylene, 2,3-difluoro-1,4-phenylene, 3,5-difluoro-1,4-phenylene or cyclohexene-1,4-diyl.

In $A^1$ to $A^5$, if the number of aromatic rings is higher, a value of optical anisotropy of compound (1) tends to become larger. In $A^1$ to $A^5$, if the number of alicycles is higher, the value of optical anisotropy of compound (1) tends to become smaller. When $A^1$ to $A^5$ are 1,4-cyclohexylene, cyclohexene-1,4-diyl or 1,3-dioxane-2,5-diyl, the value of optical anisotropy of compound (1) is small. When $A^1$ to $A^5$ are 1,4-phenylene in which at least one of hydrogen may be replaced by halogen, the value of optical anisotropy of compound (1) is large.

When at least two of $A^1$ to $A^5$ is 1,4-cyclohexylene, a maximum temperature of compound (1) is high, and the value of optical anisotropy thereof is small, and the viscosity thereof is small. When at least one of $A^1$ to $A^5$ is 1,4-phenylene, the value of optical anisotropy is relatively large, and an orientational order parameter is large.

When $A^1$ to $A^5$ are 1,4-phenylene in which at least one of hydrogen is replaced by halogen or 1,3-dioxane-2,5-diyl, an absolute value of dielectric anisotropy is large. When $A^1$ to $A^5$ are 2,3-difluoro-1,4-phenylene, a value of dielectric anisotropy is negatively large. When $A^1$ to $A^5$ are 2-(trifluoromethyl)-3-fluoro-1,4-phenylene or 2-(difluoromethyl)-3-fluoro-1,4-phenylene, the value of dielectric anisotropy is further negatively large.

When $A^1$ to $A^5$ are cyclohexene-1,4-diyl, a melting point of compound (1) is low. When compound (1) has both cyclohexene-1,4-diyl and 1,4-phenylene, the value of optical anisotropy is large.

Further preferred $A^1$, $A^2$, $A^3$, $A^4$ and $A^5$ are each independently 1,4-cyclohexylene, 1,4-phenylene, 2-fluoro-1,4-phenylene, 2,3-difluoro-1,4-phenylene, 3,5-difluoro-1,4-phenylene or cyclohexene-1,4-diyl.

For example, in order to obtain a liquid crystal compound having a large positive value of dielectric anisotropy, particularly preferred $A^1$, $A^2$, $A^3$, $A^4$ and $A^5$ are each independently 1,4-cyclohexylene, 1,4-phenylene, 2-fluoro-1,4-phenylene, 3,5-difluoro-1,4-phenylene or cyclohexene-1,4-diyl.

For example, in order to obtain a liquid crystal compound having a large negative value of dielectric anisotropy, particularly preferred $A^1$, $A^2$, $A^3$, $A^4$ and $A^5$ are each independently 1,4-cyclohexylene, 1,4-phenylene, 2-fluoro-1,4-phenylene, 2,3-difluoro-1,4-phenylene or cyclohexene-1,4-diyl.

Bonding Groups $Z^1$, $Z^2$, $Z^4$ and $Z^5$ $Z^1$, $Z^2$, $Z^4$ and $Z^5$ are each independently a single bond or alkylene having 1 to 4 carbons, and in the alkylene, at least one of —$CH_2$— may be replaced by —O—, —S—, —CO— or —$SiH_2$—, at least one of —$(CH_2)_2$— may be replaced by —CH=CH— or —C≡C—, and at least one of hydrogen may be replaced by fluorine. With regard to a configuration of a double bond of a bonding group such as CH=CH—, trans is preferred to cis.

For example, $Z^1$, $Z^2$, $Z^4$ and $Z^5$ are each independently a single bond; alkylene having 1 to 4 carbons such as —$(CH_2)_2$— and —$(CH_2)_4$—; and —COO—, —OCO—, —$CH_2O$—, —$OCH_2$—, —$CF_2O$—, —$OCF_2$—, —CH=CH—, —CF=CF—, —C≡C—, —$CH_2CO$—, —$COCH_2$—, —$CH_2SiH_2$—, —$SiH_2CH_2$—, —$(CH_2)_2COO$—, —$OCO(CH_2)_2$—, —$(CH_2)_2CF_2O$—, —$OCF_2(CH_2)_2$—, —$(CH_2)_3O$— or —$O(CH_2)_3$—.

Further preferred $Z^1$, $Z^2$, $Z^4$ and $Z^5$ are each independently a single bond; alkylene having 1 to 4 carbons such as —$(CH_2)_2$— and —$(CH_2)_4$—; and —COO—, —OCO—, —$CH_2O$—, —$OCH_2$—, —$CF_2O$—, —$OCF_2$—, —CH=CH—, —CF=CF—, —C≡C—, —$(CH_2)_2COO$—, —$OCO(CH_2)_2$—, —$(CH_2)_2CF_2O$—, —$OCF_2(CH_2)_2$—, —$(CH_2)_3O$— or —$O(CH_2)_3$—.

Still further preferred $Z^1$, $Z^2$, $Z^4$ and $Z^5$ are each independently a single bond; alkylene having 1 to 4 carbons such as —$(CH_2)_2$— and —$(CH_2)_4$—; and —$CH_2O$—, —$OCH_2$—, —$CF_2O$—, —$OCF_2$—, —CH=CH—, —CF=CF—, —C≡C—, —$(CH_2)_2CF_2O$—, —$OCF_2(CH_2)_2$—, —$(CH_2)_3O$— or —$O(CH_2)_3$—.

When the bonding group is a single bond, —$(CH_2)_2$—, —$(CH_2)_4$—, —$CH_2O$—, —$OCH_2$—, —$CF_2O$—, —$OCF_2$—, —CH=CH— or —CF=CF—, the viscosity of compound (1) is small. When the bonding group is a single bond, —$(CH_2)_2$—, —CH=CH— or —CF=CF—, the viscosity of compound (1) is further small. When the bonding group is —CH=CH—, the temperature range of the liquid crystal phase of compound (1) is wide, and an elastic constant ratio $K_{33}/K_{11}$ ($K_{33}$: bend elastic constant, $K_{11}$: spray elastic constant) is large. When the bonding group is —C≡C—, the value of optical anisotropy of compound (1) is large.

For example, in order to obtain a liquid crystal compound having a large positive value of dielectric anisotropy, further preferred $Z^1$, $Z^2$, $Z^4$ and $Z^5$ are each independently a single bond, —$(CH_2)_2$—, —$CF_2O$—, —$OCF_2$—, —CH=CH—, —CF=CF— or —C≡C—; still further preferred $Z^1$, $Z^2$, $Z^4$ and $Z^5$ are a single bond, —$(CH_2)_2$—, —$CF_2O$—, —$OCF_2$— or —CH=CH—; and particularly preferred $Z^1$, $Z^2$, $Z^4$ and $Z^5$ are a single bond, —$CF_2O$—, —$OCF_2$— or —CH=CH—.

For example, in order to obtain a liquid crystal compound having a large negative value of dielectric anisotropy, further preferred $Z^1$, $Z^2$, $Z^4$ and $Z^5$ are each independently a single bond, —$(CH_2)_2$—, —$CH_2O$—, —$OCH_2$—, —$CF_2O$—, —$OCF_2$—, —CH=CH—, —CF=CF— or —C≡C—; and still further preferred $Z^1$, $Z^2$, $Z^4$ and $Z^5$ are a single bond, —$(CH_2)_2$—, —$CH_2O$—, —$OCH_2$— or —CH=CH—.

Others $Y^1$, $Y^2$, $Y^3$ and $Y^4$ are each independently hydrogen, fluorine, chlorine, —$CF_3$ or —$CHF_2$, preferably, hydrogen or fluorine.

For example, in order to obtain a liquid crystal compound having a large positive value of dielectric anisotropy, further preferably, both $Y^4$ and $Y^2$ are hydrogen and at least one of $Y^3$ and $Y^4$ is fluorine, still further preferably, both $Y^4$ and $Y^2$ are hydrogen and both $Y^3$ and $Y^4$ are fluorine.

For example, in order to obtain a liquid crystal compound having a large negative value of dielectric anisotropy, further preferably, both $Y^2$ and $Y^4$ are hydrogen and at least one of $Y^4$ and $Y^3$ is fluorine, —$CF_3$ or —$CHF_2$, still further preferably, both $Y^2$ and $Y^4$ are hydrogen, and $Y^4$ and $Y^3$ are each independently fluorine, —$CF_3$ or —$CHF_2$.

When $Y^4$ or $Y^3$ is fluorine, —$CF_3$ or —$CHF_2$, the absolute value of dielectric anisotropy ($|\Delta\epsilon|$) of compound (1) is large. When both $Y^3$ and $Y^4$ are fluorine, the value of dielectric anisotropy of compound (1) is positively large. When $Y^4$ and $Y^3$ are each independently fluorine, —$CF_3$ or —$CHF_2$, the value of dielectric anisotropy of compound (1) is negatively large.

Then, m, n, q and r are each independently 0, 1 or 2, and a sum of m, n, q and r is 0, 1, 2, 3 or 4, preferably, 0, 1, 2 or 3. When m, n, q or r is 2, two of -$A^i$-$Z^i$— (i is 1, 2, 4 or 5) may be identical or different. When compound (1) has a bicycle or a tricycle, the viscosity is small. When compound (1) has a tricycle or a tetracycle, the maximum temperature is high.

In formula (1), from a viewpoint of the maximum temperature of the nematic phase and the minimum temperature thereof, compound (1) preferably satisfies equations: m=n=q=r=0 (compound represented by formula (1-1)), m=0, n=1 and q=r=0 (compound represented by formula (1-2)), m=n=0, q=1 and r=0 (compound represented by formula (1-3)), m=n=1 and q=r=0 (compound represented by formula (1-4)), m=0, n=q=1 and r=0 (compound represented by formula (1-5)), m=n=0 and q=r=1 (compound represented by formula (1-6)), m=2, n=1 and q=r=0 (compound represented by formula (1-7)), m=n=q=1 and r=0 (compound represented by formula (1-8)), m=0 and n=q=r=1 (compound represented by formula (1-9)), and m=n=0, q=1 and r=2 (compound represented by formula (1-10)).

Formula 5

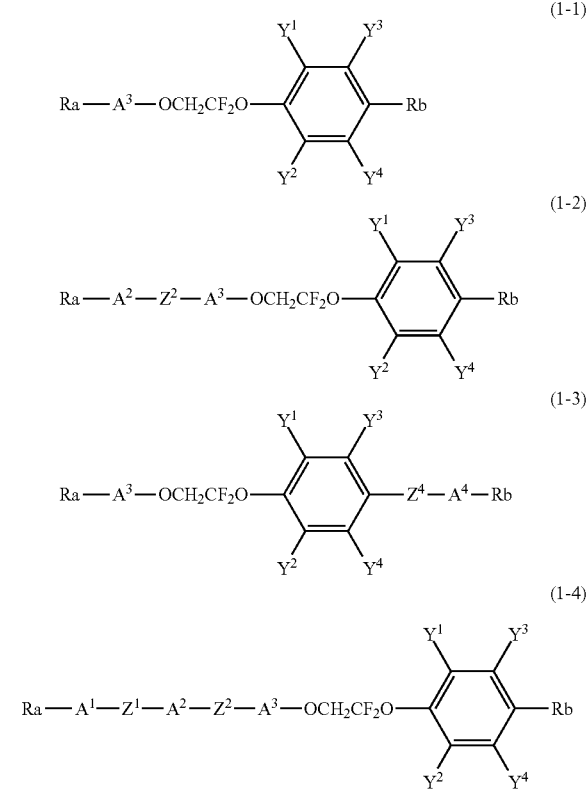

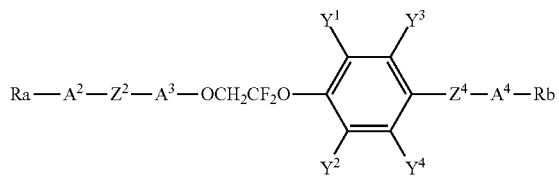

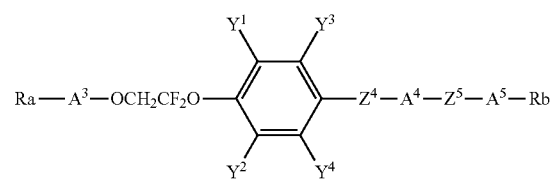

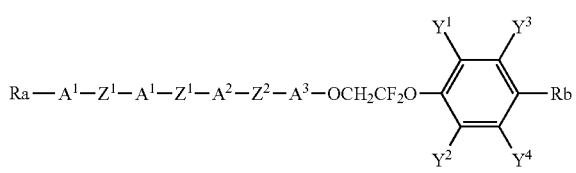

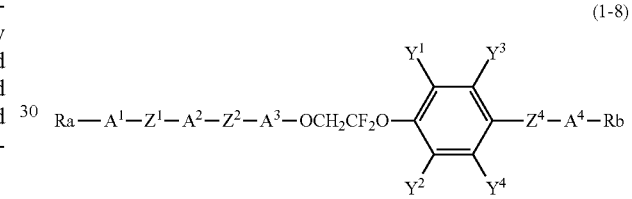

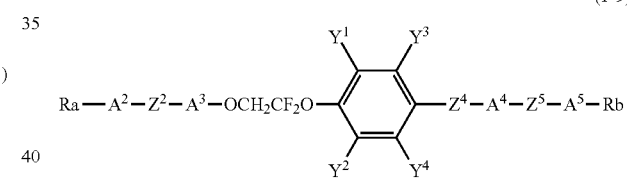

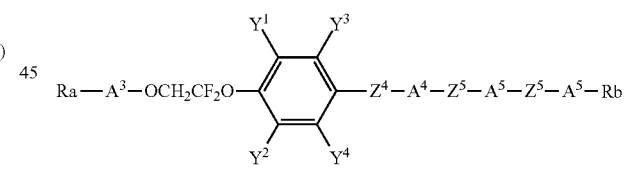

In formulas (1-1) to (1-10), Ra and Rb, $A^1$, $A^2$, $A^3$, $A^4$ and $A^5$, $Z^1$, $Z^2$, $Z^4$ and $Z^5$, and $Y^4$, $Y^2$, $Y^3$ and $Y^4$ have meanings identical with the meanings of symbols in formula (1), respectively.

Among types of compound (1), from a viewpoint of the maximum temperature of the nematic phase and the minimum temperature thereof, a compound represented by a formula selected from formulas (1-1-1) to (1-1-2), formulas (1-2-1) to (1-2-3), formulas (1-3-1) to (1-3-4), formulas (1-4-1) to (1-4-4), formulas (1-5-1) to (1-5-6) and formulas (1-6-1) to (1-6-6) is particularly preferred.

Formula 6
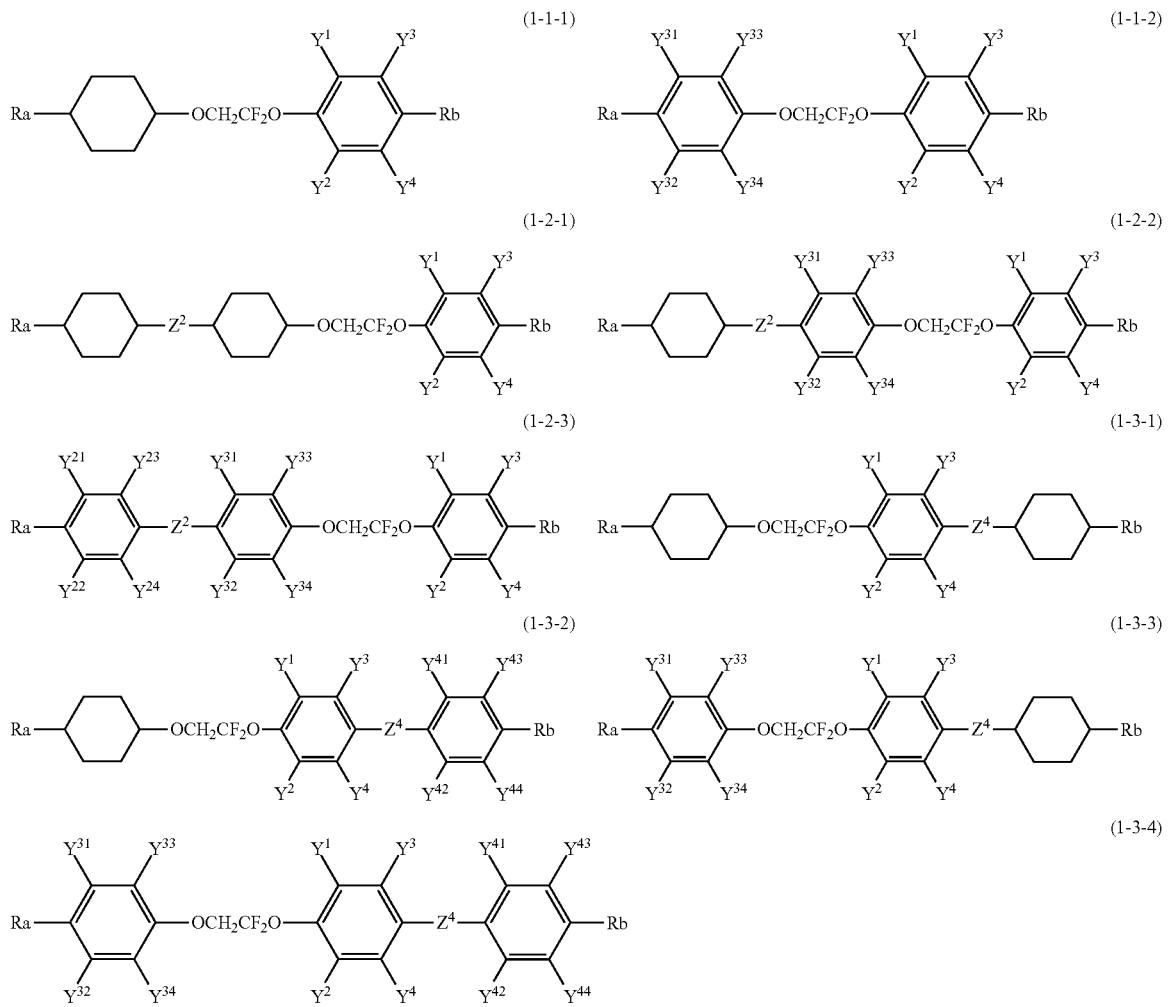
Formula 7
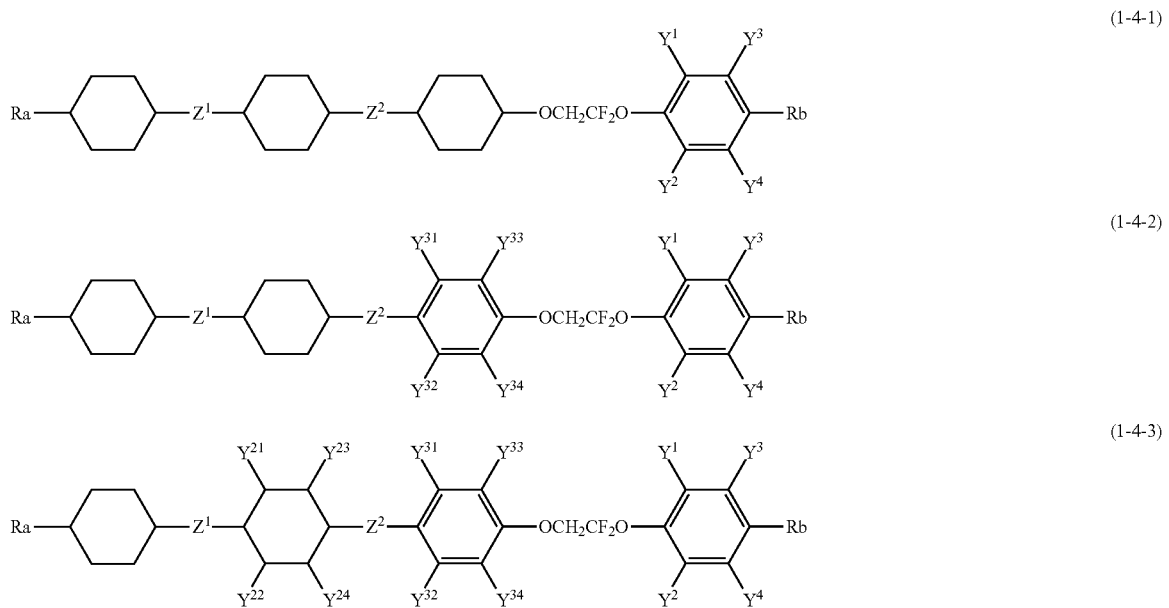

-continued
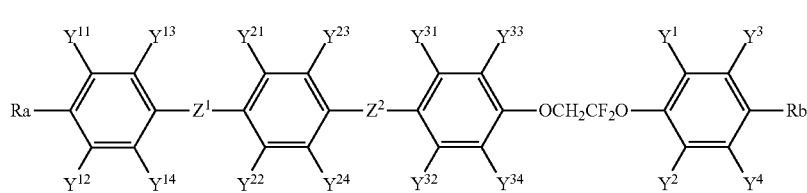
(1-4-4)
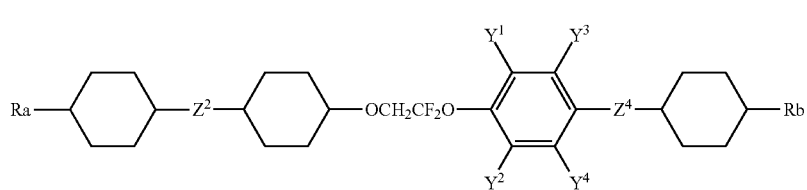
(1-5-1)
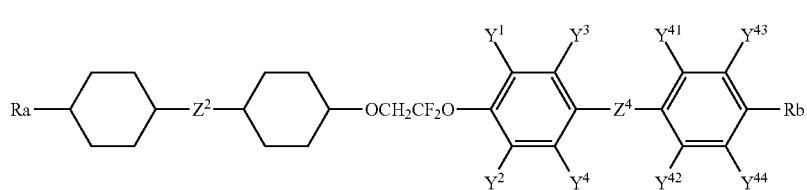
(1-5-2)
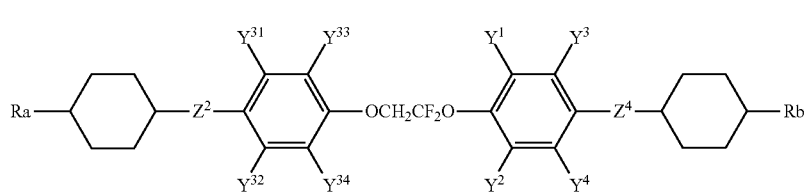
(1-5-3)
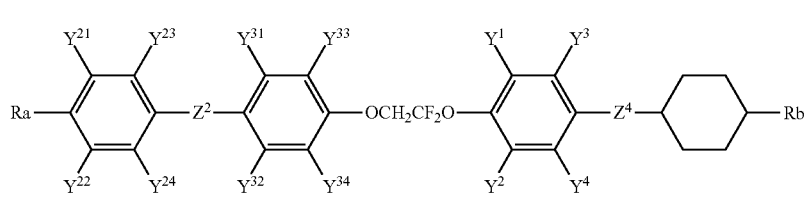
(1-5-4)
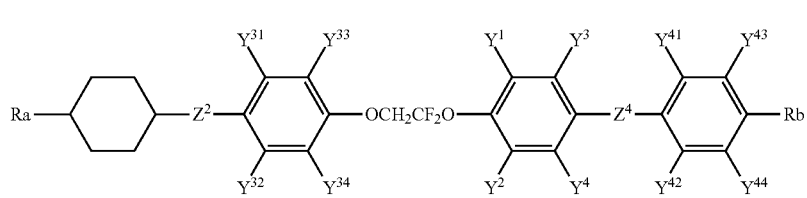
(1-5-5)
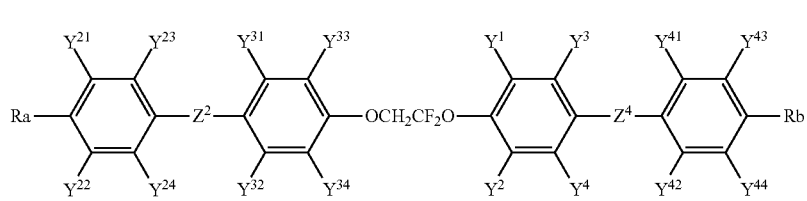
(1-5-6)
Formula 8
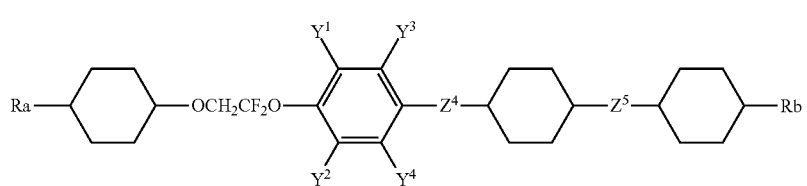
(1-6-1)

-continued

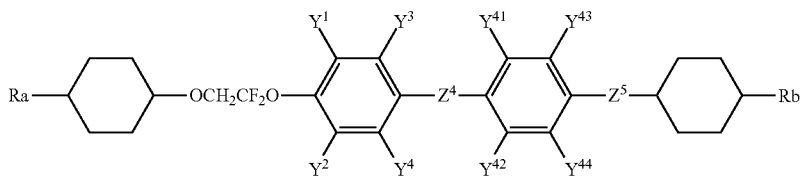
(1-6-2)

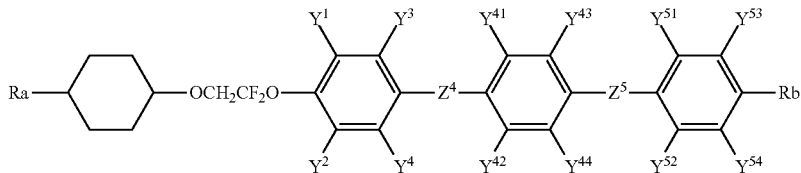
(1-6-3)

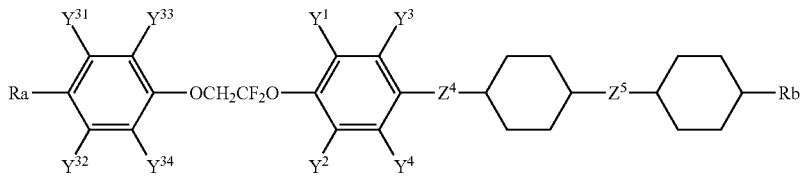
(1-6-4)

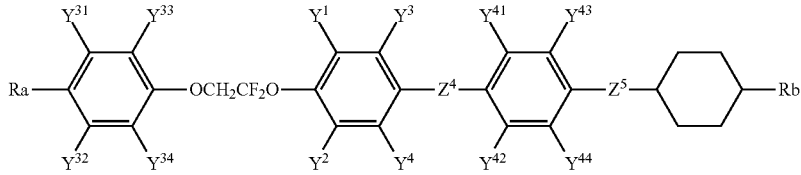
(1-6-5)

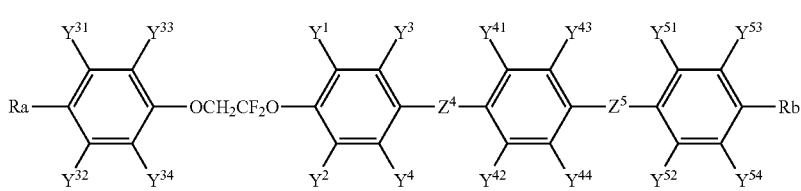
(1-6-6)

Each formula described above corresponds to a case where $A^1$ to $A^5$ are 1,4-cyclohexylene or a group represented by formula (Ph), respectively, in formulas (1-1) to (1-10).

Formula 9

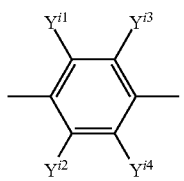
(Ph)

wherein, in the formula, i is an integer from 1 to 5.

In formulas (1-1-1) to (1-1-2), formulas (1-2-1) to (1-2-3), formulas (1-3-1) to (1-3-4), formulas (1-4-1) to (1-4-4), formulas (1-5-1) to (1-5-6) and formulas (1-6-1) to (1-6-6), a meaning of each symbol is as described below.

Ra and Rb are each independently fluorine, alkyl having 1 to 7 carbons, alkenyl having 2 to 7 carbons, alkoxy having 1 to 6 carbons, polyfluoroalkyl having 1 to 7 carbons or polyfluoroalkoxy having 1 to 6 carbons, however, Ra and Rb are not identical; $Z^1$, $Z^2$, $Z^4$ and $Z^5$ are each independently a single bond, —$(CH_2)_2$—, —$CH_2O$—, —$OCH_2$—, —$CF_2O$—, —$OCF_2$— or —CH=CH—; $Y^1$, $Y^2$, $Y^3$ and $Y^4$ are each independently hydrogen or fluorine; $Y^{11}$ to $Y^{14}$, $Y^{21}$ to $Y^{24}$, $Y^{31}$ to $Y^{34}$, $Y^{41}$ to $Y^{44}$ and $Y^{51}$ to $Y^{54}$ are each independently hydrogen or fluorine.

In order to obtain a liquid crystal compound having a large positive value of dielectric anisotropy, preferably, Ra and Rb are each independently fluorine, alkyl having 1 to 7 carbons, alkenyl having 2 to 7 carbons, —$CF_3$ or —$OCF_3$; $Z^1$, $Z^2$, $Z^4$ and $Z^5$ are each independently a single bond, —$(CH_2)_2$—, —$CF_2O$—, —$OCF_2$— or —CH=CH—; both $Y^1$ and $Y^2$ are hydrogen; and $Y^{11}$, $Y^{12}$, $Y^{21}$, $Y^{22}$, $Y^{31}$, $Y^{32}$, $Y^{41}$, $Y^{42}$, $Y^{51}$ and $Y^{52}$ are hydrogen.

In order to obtain a liquid crystal compound having a large positive value of dielectric anisotropy, in formulas (1-1-1) to (1-1-2), formulas (1-2-1) to (1-2-3), formula (1-3-2), formula (1-3-4), formulas (1-4-1) to (1-4-4), formula (1-5-2), formulas (1-5-5) to (1-5-6), formula (1-6-3) and formula (1-6-6), particularly preferably, Ra is fluorine, alkyl having 1 to 5 carbons or alkenyl having 2 to 5 carbons; Rb is fluorine, —$CF_3$ or —$OCF_3$; $Z^1$, $Z^2$, $Z^4$ and $Z^5$ are each independently a single bond, —$CF_2O$—, —$OCF_2$— or —CH=CH—; both $Y^1$ and $Y^2$ are hydrogen; and $Y^{11}$, $Y^{12}$, $Y^{21}$, $Y^{22}$, $Y^{31}$, $Y^{32}$, $Y^{41}$, $Y^{42}$, $Y^{51}$ and $Y^{52}$ are hydrogen.

In order to obtain a liquid crystal compound having a large positive value of dielectric anisotropy, further preferably, at least one of $Y^3$ and $Y^4$ is fluorine; and in a group represented by formula (Ph), $Y^{i3}$ and $Y^{i4}$ are each independently hydrogen or fluorine.

In order to obtain a liquid crystal compound having a large negative value of dielectric anisotropy, preferably, Ra and Rb are each independently alkyl having 1 to 7 carbons, alkenyl having 2 to 7 carbons or alkoxy having 1 to 6 carbon; $Z^1$, $Z^2$, $Z^4$ and $Z^5$ are each independently a single bond, —$(CH_2)_2$—, —$CH_2O$—, —$OCH_2$— or —$CH=CH$—; $Y^2$ and $Y^4$ are each independently hydrogen or fluorine; and $Y^{12}$, $Y^{14}$, $Y^{22}$, $Y^{24}$, $Y^{32}$, $Y^{34}$, $Y^{42}$, $Y^{44}$, $Y^{52}$ and $Y^{54}$ are hydrogen.

In order to obtain a liquid crystal compound having a large negative value of dielectric anisotropy, in formula (1-1-2), formula (1-2-2), formula (1-2-3), formulas (1-3-3) to (1-3-4), formulas (1-4-2) to (1-4-4), formulas (1-5-3) to (1-5-6) and formulas (1-6-4) to (1-6-6), particularly preferably, Ra and Rb are each independently alkyl having 1 to 5 carbons, alkenyl having 2 to 5 carbons or alkoxy having 1 to 4 carbons; $Z^1$, $Z^2$, $Z^4$ and $Z^5$ are each independently a single bond, —$(CH_2)_2$—, —$CH_2O$—, —$OCH_2$— or —$CH=CH$—; $Y^2$ and $Y^4$ are each independently hydrogen or fluorine; and $Y^{12}$, $Y^{14}$, $Y^{22}$, $Y^{24}$, $Y^{32}$, $Y^{34}$, $Y^{42}$, $Y^{44}$, $Y^{52}$ and $Y^{54}$ are hydrogen.

In order to obtain a liquid crystal compound having a large negative value of dielectric anisotropy, further preferably, $Y^1$ and $Y^3$ are each independently hydrogen or fluorine; and in a group represented by formula (Ph), both $Y^{i1}$ and $Y^{i3}$ are fluorine.

Synthesis of Difluoroethyleneoxy Derivative

Compound (1) of the invention can be synthesized by suitably combining techniques in synthetic organic chemistry. Methods for introducing an objective terminal group, ring and bonding group into a starting material are described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co. Ltd.).

With regard to one example of a method for forming a bonding group $Z^1$, $Z^2$, $Z^4$ or $Z^5$ in formula (1), a scheme is first shown, and next each scheme will be explained in sections (I) to (XI). Other bonding groups can also be easily formed according to a method of synthetic organic chemistry.

In the scheme, $MSG^1$ or $MSG^2$ is a monovalent organic group having at least one ring. A plurality of organic groups represented by $MSG^1$ or $MSG^2$ may be identical or different. Compounds (1A) to (1K) correspond to compound (1).

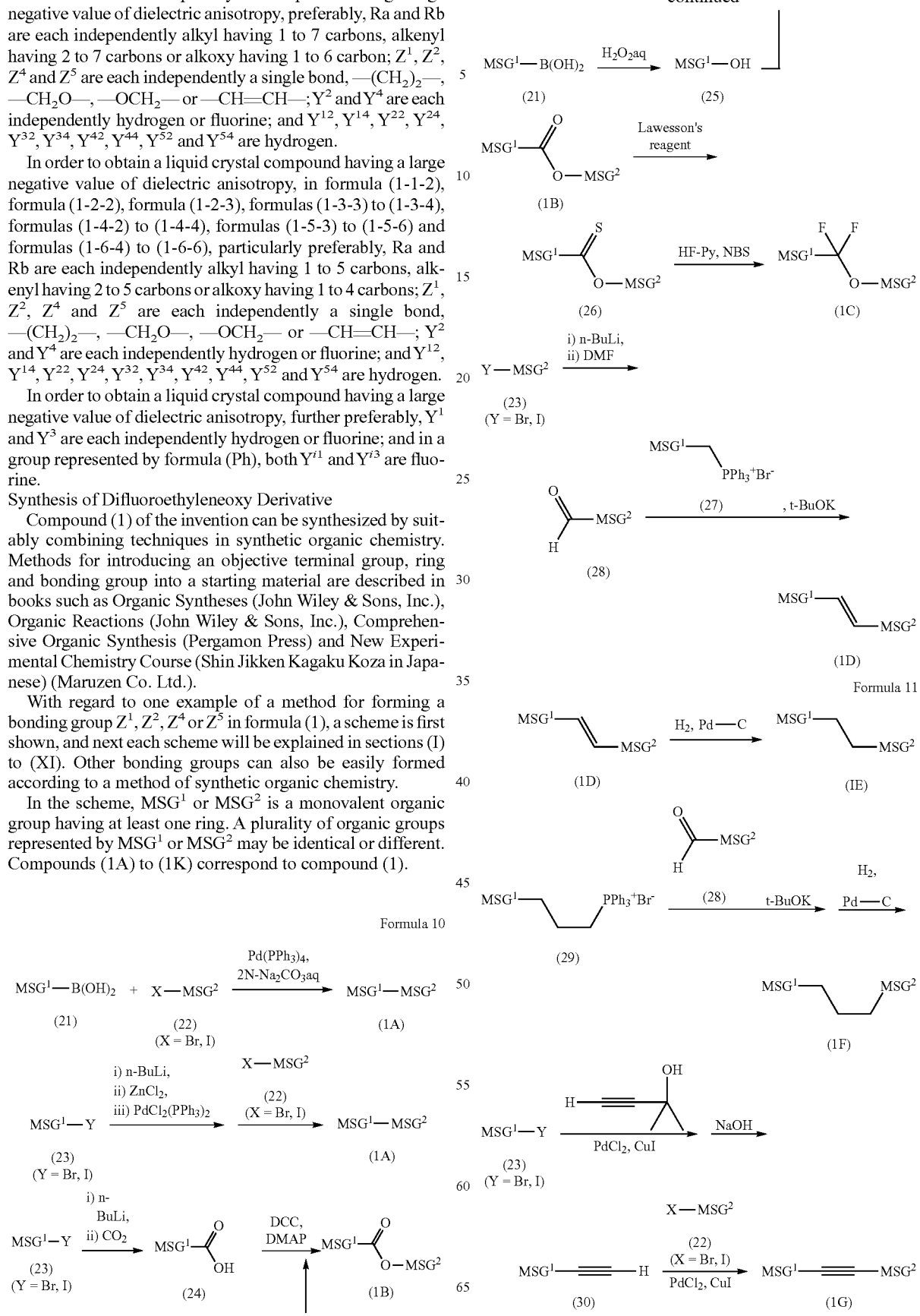

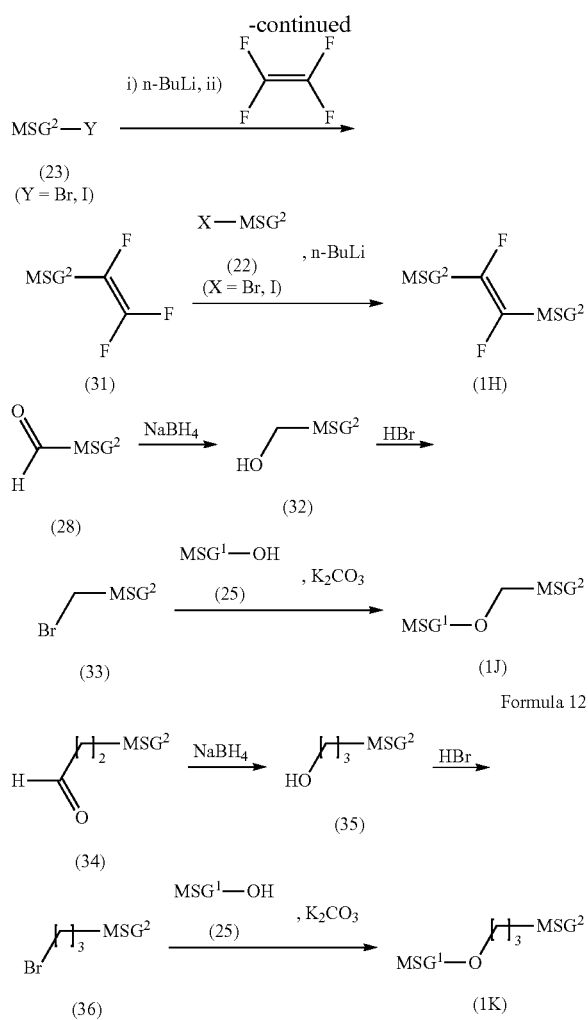

(I) Formation of a Single Bond

Compound (1A) is prepared by allowing arylboronic acid (21) to react, in the presence of an aqueous solution of carbonate and a catalyst such as tetrakis(triphenylphosphine) palladium, with compound (22) to be prepared according to a publicly known method.

Moreover, compound (1A) is prepared also by allowing compound (23) prepared according to a publicly known method to react with n-butyllithium and subsequently with zinc chloride, and further with compound (22) in the presence of a catalyst such as dichlorobis(triphenylphosphine)palladium.

(II) Formation of —COO— and —OCO—

Carboxylic acid (24) is obtained by allowing compound (23) to react with n-butyllithium, and subsequently with carbon dioxide. Compound (1B) having —COO— is prepared by dehydrating compound (24) and phenol (25) prepared according to a publicly known method, in the presence of 1,3-dicyclohexylcarbodiimide (DDC) and 4-dimethylaminopyridine (DMAP). A compound having —OCO— can also be prepared according to the method.

(III) Formation of —CF$_2$O— and —OCF$_2$—

Compound (26) is obtained by treating compound (1B) with a thiation reagent such as Lawesson's reagent. Compound (1C) having —CF$_2$O— is prepared by fluorinating compound (26) with a hydrogen fluoride pyridine complex and N-bromosuccinimide (NBS). See M. Kuroboshi et al., Chem. Lett., 1992, 827. Compound (1C) can be prepared also by fluorinating compound (26) with (diethylamino)sulfur trifluoride (DAST). See W. H. Bunnelle et al., J. Org. Chem. 1990, 55, 768. A compound having —OCF$_2$— can be also prepared according to the method. The bonding groups can also be formed according to the method described in Peer. Kirsch et al., Angew. Chem. Int. Ed. 2001, 40, 1480.

(IV) Formation of —CH═CH—

Aldehyde (28) is obtained by treating compound (23) with n-butyllithium and then allowing the treated compound to react with formamide such as N,N-dimethylformamide (DMF). Compound (1D) is prepared by allowing phosphorus ylide generated by treating phosphonium salt (27) prepared according to a known method with a base such as potassium tert-butoxide to react with aldehyde (28). Because a cis isomer is formed depending on reaction conditions, the cis isomer is isomerized to a trans isomer according to a known method, when necessary.

(V) Formation of —(CH$_2$)$_2$—

Compound (1E) is prepared by hydrogenating compound (1D) in the presence of a catalyst such as palladium on carbon.

(VI) Formation of —(CH$_2$)$_4$—

A compound having —(CH$_2$)$_2$—CH═CH— is obtained by using phosphonium salt (29) in place of phosphonium salt (27) according to the method in section (IV). Compound (1F) is prepared by performing catalytic hydrogenation of the compound obtained.

(VII) Formation of —C≡C—

Compound (30) is obtained by allowing compound (23) to react with 2-methyl-3-butyn-2-ol in the presence of a catalyst including dichloropalladium and copper halide, and then performing deprotection under basic conditions. Compound (1G) is prepared by allowing compound (30) to react with compound (22) in the presence of a catalyst including dichloropalladium and copper halide.

(VIII) Formation of —CF═CF—

Compound (31) is obtained by treating compound (23) with n-butyllithium and then allowing the treated compound to react with tetrafluoroethylene. Compound (1H) is prepared by treating compound (22) with n-butyllithium and then allowing the treated compound to react with compound (31).

(IX) Formation of —CH$_2$O— or —OCH$_2$—

Compound (32) is obtained by reducing compound (28) with a reducing agent such as sodium borohydride. Compound (33) is obtained by halogenating compound (32) with hydrobromic acid or the like. Compound (1J) is prepared by allowing compound (33) to react with compound (25) in the presence of potassium carbonate or the like.

(X) Formation of —(CH$_2$)$_3$O— or —O(CH$_2$)$_3$—

Compound (1K) is prepared by using compound (35) in place of compound (32) in a manner similar to preceding section (IX).

(XI) Formation of —(CF$_2$)$_2$—

A compound having —(CF$_2$)$_2$— is obtained by fluorinating diketone (—COCO—), in the presence of a hydrogen fluoride catalyst, with sulfur tetrafluoride according to the method described in J. Am. Chem. Soc., 2001, 123, 5414.

One example of a method for synthesizing compound (1) having a difluoroethyleneoxy group is shown in a scheme as described below. However, the method for synthesizing compound (1) of the invention is not limited to the scheme as described below.

Formula 13

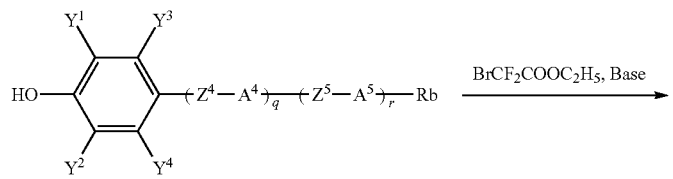

(37)

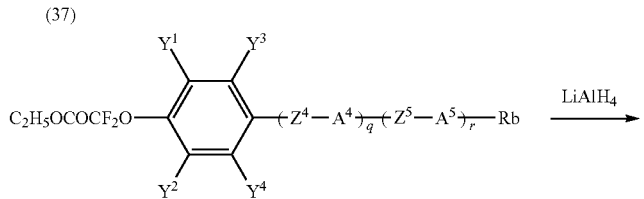

(38)

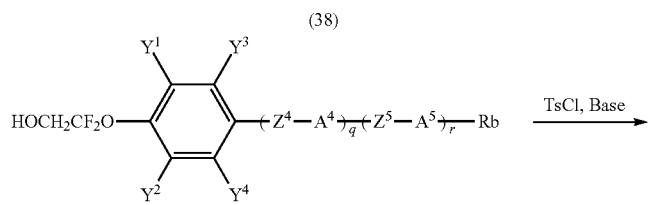

(39)

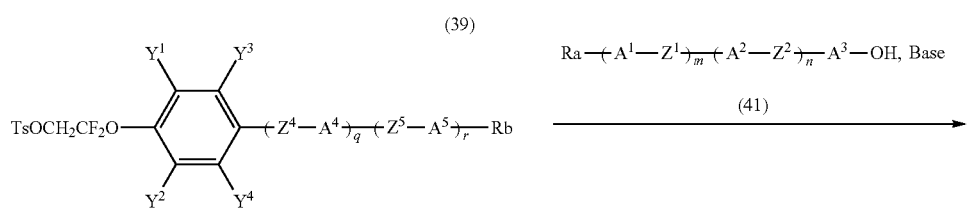

(40)

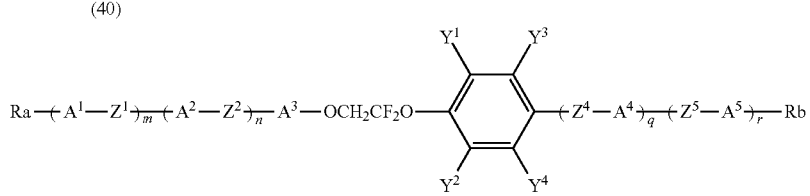

(1)

A definition of each symbol of Ra and Rb, $A^1$ to $A^5$, m, n, q and r, $Y^1$ to $Y^4$, $Z^1$ to $Z^2$, and $Z^4$ to $Z^5$ in compounds (37) to (41) is identical with the definition of each symbol described in formula (1).

For example, the method for synthesizing compound (1) of the invention includes:

(1) a first step for preparing compound (38) by allowing bromodifluoroacetate (example: ethyl bromodifluoroacetate) to react with compound (37) in the present of a base (example: sodium hydride, potassium carbonate) (a reaction in the first step is performed ordinarily at approximately 50 to approximately 180° C., preferably, approximately 60 to approximately 150° C. in an aprotic polar solvent such as DMF under a nitrogen atmosphere, for example);

(2) a second step for preparing compound (39) by allowing a reducing agent for reducing ester to alcohol (example: lithium aluminum hydride) to act on compound (38) (a reaction in the second step is performed ordinarily at approximately 0 to approximately 30° C., preferably, approximately 0 to approximately 25° C. in a solvent such as tetrahydrofuran under a nitrogen atmosphere, for example);

(3) a third step for preparing compound (40) by allowing p-toluenesulfonyl chloride to react with compound (39) in the presence of a base (example: pyridine, diazabicyclo[2.2.2]octane (DABCO)) (a reaction in the third step is performed ordinarily at approximately 0 to approximately 30° C., preferably, approximately 10 to approximately 25° C. in a solvent such as dichloromethane under a nitrogen atmosphere, for example); and (4) a fourth step for preparing compound (1) by allowing compound (40) to react with compound (41) in the presence of a base (example: sodium hydride, potassium carbonate) (a reaction in the fourth step is performed ordinarily at approximately 50 to approximately 180° C., preferably, approximately 60 to approximately 150° C. in an aprotic polar solvent such as DMF under a nitrogen atmosphere, for example)).

Moreover, compound (1) can be prepared in a similar manner even by using a halide that can be derived from compound (39), in place of tosylate such as compound (40). In addition, compound (37) and compound (41) that are starting materials can be easily prepared according to a method of synthetic organic chemistry as explained in sections (I) to (XI).

Liquid Crystal Composition

The liquid crystal composition of the invention contains compound (1) described above as component A. The liquid crystal composition of the invention may contain only one compound (1) or two or more compounds (1).

In order to excellently develop characteristics such as the threshold voltage, the temperature range of the liquid crystal phase, the optical anisotropy, the dielectric anisotropy and the viscosity, the liquid crystal composition preferably contains component A in a ratio of approximately 0.1 to approximately 99% by mass, further preferably, approximately 1 to approximately 99% by mass, still further preferably, approximately 2 to approximately 98% by mass, based on the total mass of the liquid crystal composition.

The liquid crystal composition of the invention may contain only the composition of component A. However, in order to develop various kinds of characteristics, the liquid crystal composition may further contain at least one component selected from component B, component C, component D and component E as explained below.

Component B is at least one of compounds selected from compounds represented by formulas (2) to (4) as described later; component C is a compound represented by formula (5) as described later; component D is at least one of compounds selected from compounds represented by formulas (6) to (11) as described later; and component E is at least one of compounds selected from compounds represented by formulas (12) to (14) as described later.

In addition, at least one of compounds selected from compounds represented by formulas (2) to (4) means at least one of compounds selected from compounds represented by formula (2), compounds represented by formula (3), and compounds represented by formula (4). A similar definition applies to other examples.

The liquid crystal composition of the invention may further contain at least one of compounds selected from an optically active compound and a polymerizable compound, and at least one of compounds selected from an antioxidant and an ultraviolet light absorber, according to an application. Specific examples of the antioxidants include a phenolic antioxidant. Specific examples of the ultraviolet light absorbers include a hindered amine light stabilizer.

Each component constituting the liquid crystal composition of the invention does not have a large difference in chemical and physical properties even when the component is constituted of an analog including an isotopic element of each element.

Component B (Compounds (2) to (4))

The liquid crystal composition of the invention may contain at least one of compounds (component B) selected from the compounds represented by formulas (2) to (4).

Formula 14

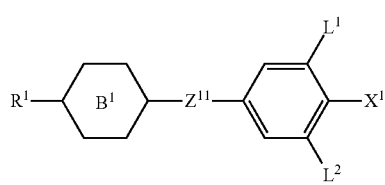
(2)

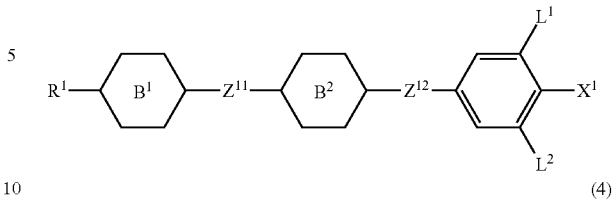

In formulas (2) to (4), a meaning of each symbol is as described below.

$R^1$ is alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—.

$X^1$ is fluorine, chlorine, —$OCF_3$, —$OCHF_2$, —$CF_3$, —$CHF_2$, —$CH_2F$, —$OCF_2CHF_2$ or —$OCF_2CHFCF_3$.

Ring $B^1$, ring $B^2$ and ring $B^3$ are each independently 1,4-cyclohexylene, 1,3-dioxane-2,5-diyl, pyrimidine-2,5-diyl, 1-tetrahydropyran-2,5-diyl, 1,4-phenylene, 2-fluoro-1,4-phenylene, 3-fluoro-1,4-phenylene or 3,5-difluoro-1,4-phenylene.

$Z^{11}$ and $Z^{12}$ are each independently —$(CH_2)_2$—, —$(CH_2)_4$—, —COO—, —$CF_2O$—, —$OCF_2$—, —CH=CH—, —C≡C—, —$CH_2O$— or a single bond.

$L^1$ and $L^2$ are each independently hydrogen or fluorine.

Component B has a positive value of dielectric anisotropy, and is superb in thermal stability and chemical stability, and therefore is suitably used when preparing a liquid crystal composition for TN or IPS to be driven according to TFT.

Content of component B when using component B is ordinarily in the range of approximately 1 to approximately 99% by mass, preferably, in the range of approximately 10 to approximately 97% by mass, still further preferably, in the range of approximately 40 to approximately 95% by mass, based on the total mass of the liquid crystal composition. Moreover, when component E is further introduced into the composition together with component B, the viscosity can be adjusted. Content of component E in the case is ordinarily in the range of approximately 1 to approximately 99% by mass, preferably, in the range of approximately 10 to approximately 97% by mass, still further preferably, in the range of approximately 30 to approximately 95% by mass, based on the total mass of the liquid crystal composition.

Component C (Compound (5))

The liquid crystal composition of the invention may contain a compound (component C) represented by formula (5).

Formula 15

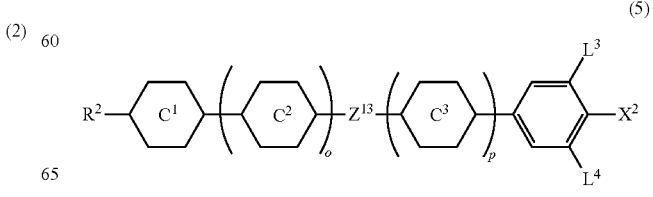

In formula (5), a meaning of each symbol is as described below.

$R^2$ is alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—.

$X^2$ is —C≡N or —C≡C—C≡N.

Ring $C^1$, ring $C^2$ and ring $C^3$ are each independently 1,4-cyclohexylene, 1,4-phenylene, 1,3-dioxane-2,5-diyl, 1-tetrahydropyran-2,5-diyl or pyrimidine-2,5-diyl, and in the 1,4-phenylene, at least one of hydrogen may be replaced by fluorine.

Formula 16

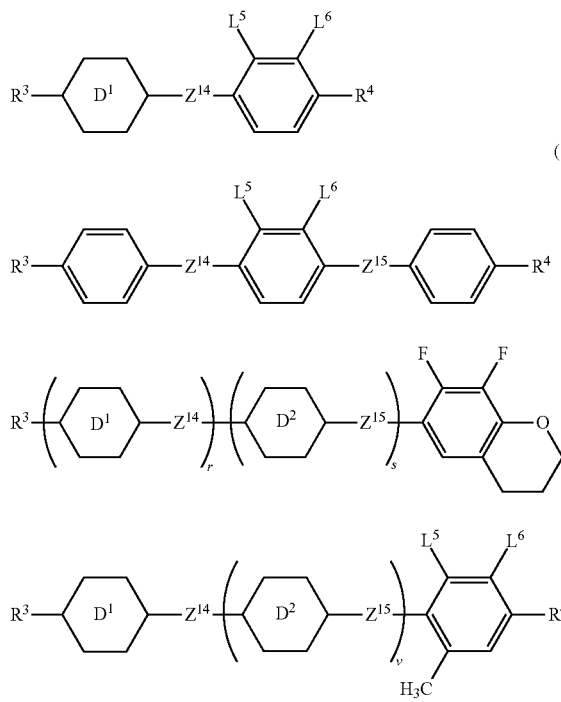

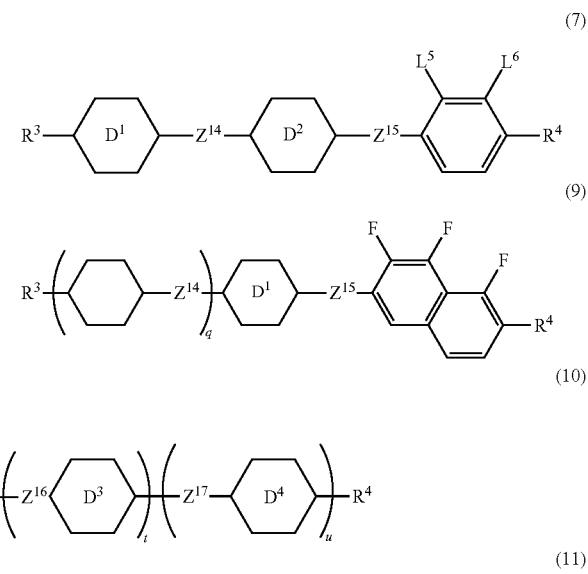

$Z^{13}$ is —$(CH_2)_2$—, —COO—, —$CF_2O$—, —$OCF_2$—, —C≡C—, —$CH_2O$— or a single bond.

$L^3$ and $L^4$ are each independently hydrogen or fluorine.

Then, o is 0, 1 or 2 and p is 0 or 1. Two of ring $C^2$ when o is 2 may be identical or different.

A sum of o and p is 0, 1, 2 or 3.

Component C has a very large positive value of dielectric anisotropy, and therefore is mainly used when preparing a liquid crystal composition for STN, TN or IPS. When component C is introduced into the composition, the threshold voltage of the liquid crystal composition can be decreased, the viscosity can be adjusted, the optical anisotropy can be adjusted, and the temperature range of the liquid crystal phase can be extended. Furthermore, component C can also be utilized for improvement in steepness.

Content of component C when using component C is ordinarily in the range of approximately 0.1 to approximately 99.9% by mass, preferably, in the range of approximately 10 to approximately 97% by mass, further preferably, in the range of approximately 40 to approximately 95% by mass, based on the total mass of the liquid crystal composition. The liquid crystal composition having the content of component C in the range is preferred as a liquid crystal composition for STN, TN or IPS. Moreover, when component E is mixed into the composition, the threshold voltage, the temperature range of the liquid crystal phase, the optical anisotropy, the dielectric anisotropy, the viscosity or the like can be adjusted.

Component D (Compounds (6) to (11))

The liquid crystal composition of the invention may contain at least one of compounds (component D) selected from compounds represented by formulas (6) to (11).

In formulas (6) to (11), a meaning of each symbol is as described below.

$R^3$ and $R^4$ are each independently alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—.

Ring $D^1$, ring $D^2$, ring $D^3$ and ring $D^4$ are each independently 1,4-cyclohexylene, 1,4-cyclohexenylene, 1,4-phenylene, 6-tetrahydropyran-2,5-diyl or decahydro-2,6-naphthalene, and in the 1,4-phenylene, at least one of hydrogen may be replaced by fluorine.

$Z^{14}$, $Z^{15}$, $Z^{16}$ and $Z^{17}$ are each independently —$(CH_2)_2$—, —COO—, —$CH_2O$—, —$OCF_2$—, —$OCF_2(CH_2)_2$— or a single bond.

$L^5$ and $L^6$ are each independently fluorine or chlorine.

Then, q, r, s, t, u and v are each independently 0 or 1.

A sum of r, s, t and u is 1 or 2.

Component D is suitably used when preparing a liquid crystal composition having a negative value of dielectric anisotropy to be used for the VA mode, the PSA mode or the like. Moreover, when component D is mixed into the composition, the elastic constant can be controlled, and a voltage-transmittance curve of the liquid crystal composition can be controlled.

Compound (6) is a bicyclic compound, and therefore effective mainly in adjusting the threshold voltage, the viscosity or the optical anisotropy. Compound (7) and compound (8) each are a tricyclic compound, and therefore effective in increasing the clearing point, extending the temperature range of the nematic phase, decreasing the threshold voltage, increasing the optical anisotropy or the like. Compounds (9) to (11) each are effective in decreasing the threshold voltage or the like.

If the content of component D is increased, the threshold voltage of the liquid crystal composition decreases, but the viscosity increases, and therefore the content is preferably as small as possible, as long as the requirement for the threshold voltage of the liquid crystal composition is met. However, an absolute value of dielectric anisotropy of component D is approximately 5, and in order to perform sufficient voltage driving, the content of component D is preferably in the range of approximately 40% by mass or more based on the total mass of the liquid crystal composition. In the case, content of component A is preferably in the range of approximately 2 to approximately 40% by mass based on the total mass of the liquid crystal composition.

Content of component D when using component D is preferably in the range of approximately 40% by mass or more, further preferably, in the range of approximately 50 to approximately 95% by mass, based on the total mass of the liquid crystal composition. The liquid crystal composition having the content of component D in the range is preferred as a liquid crystal composition for a VA mode and a PSA mode. When component D is mixed with a liquid crystal composition having a positive value of dielectric anisotropy, the content is preferably in the range of approximately 30% by mass or less, further preferably, in the range of approximately 10% by mass or less, based on the total mass of the liquid crystal composition. When component E is further introduced into the composition together with component D, the viscosity can be adjusted. The content of component E in the case is ordinarily in the range of approximately 1 to approximately 99% by mass, preferably, in the range of approximately 2 to approximately 99% by mass, based on the total mass of the liquid crystal composition.

Component E (Compounds (12) to (14))

The liquid crystal composition of the invention may contain at least one of compounds (component E) selected from compounds represented by formulas (12) to (14).

Formula 17

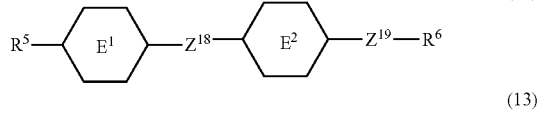

(12)

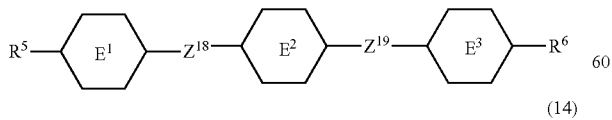

(13)

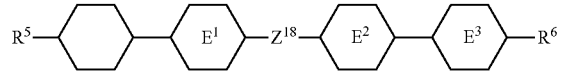

(14)

In formulas (12) to (14), a meaning of each symbol is as described below.

$R^5$ and $R^6$ are each independently alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—.

Ring $E^1$, ring $E^2$ and ring $E^3$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene.

$Z^{18}$ and $Z^{19}$ are each independently —C≡C—, —COO—, —$(CH_2)_2$—, —CH=CH— or a single bond.

Component E has a small absolute value of dielectric anisotropy, and is close to neutrality. When component E is used, the threshold voltage, the temperature range of the liquid crystal phase, the optical anisotropy, the dielectric anisotropy, the viscosity or the like can be adjusted.

Compound (12) is effective mainly in adjusting the viscosity or the optical anisotropy. Compound (13) and compound (14) are effective in extending the temperature range of the nematic phase, such as increasing the clearing point, or effective in adjusting the optical anisotropy.

If the content of component E is increased, the viscosity decreases, but the threshold voltage of the liquid crystal composition increases, and therefore the content is preferably increased, as long as the requirement for the threshold voltage of the liquid crystal composition is met.

When preparing a liquid crystal composition for MVA or PSA, the content of component E is preferably in the range of approximately 30% by mass or more, further preferably, in the range of approximately 50% by mass or more, based on the total mass of the liquid crystal composition. When preparing a liquid crystal composition for TN, STN or IPS, the content of component E is preferably in the range of approximately 30% by mass or more, further preferably, in the range of approximately 40% by mass or more, based on the total mass of the liquid crystal composition. In the cases, the content of component A is preferably in the range of approximately 1 to approximately 40% by mass based on the total mass of the liquid crystal composition.

Hereafter, suitable examples of compounds represented by each of the formulas will be described.

Among types of component B, suitable examples of compounds represented by formula (2) include compounds represented by formulas (2-1) to (2-16), suitable examples of compounds represented by formula (3) include compounds represented by formulas (3-1) to (3-112), and suitable examples of compounds represented by formula (4) include compounds represented by formulas (4-1) to (4-54).

Formula 18

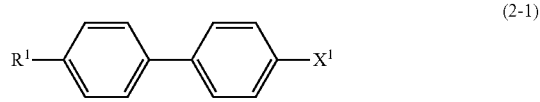

(2-1)

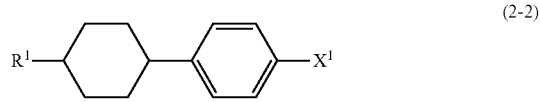

(2-2)

(2-3) 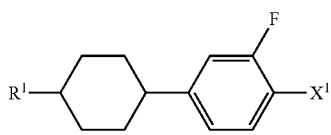
(2-4) 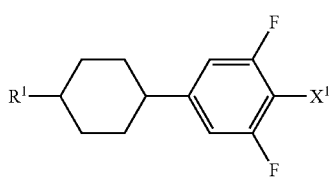
(2-5) 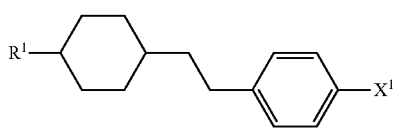
(2-6) 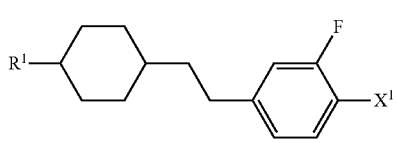
(2-7) 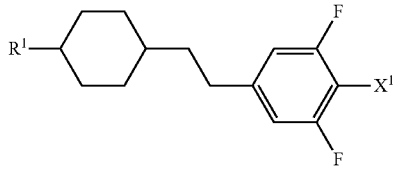
(2-8) 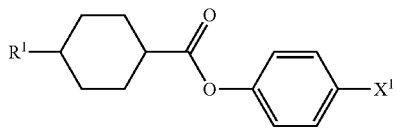
(2-9) 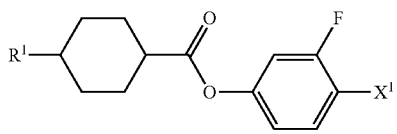
(2-10) 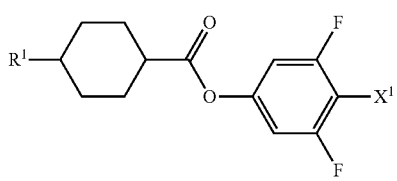
(2-11) 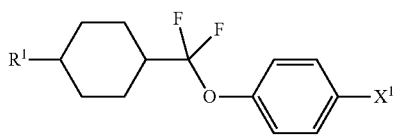
(2-12) 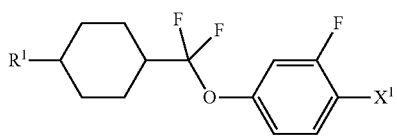
(2-13) 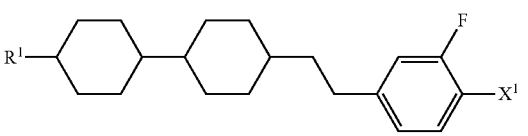
(2-14)
(2-15)
(2-16) 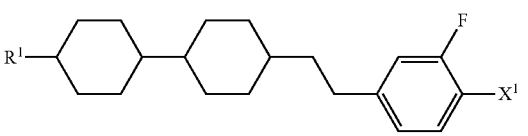
Formula 19
(3-1) 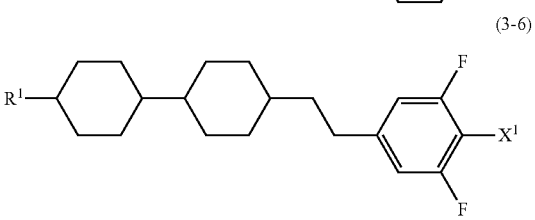
(3-2)
(3-3)
(3-4)
(3-5)
(3-6)

(3-7)
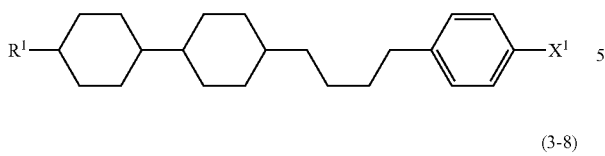
(3-8)
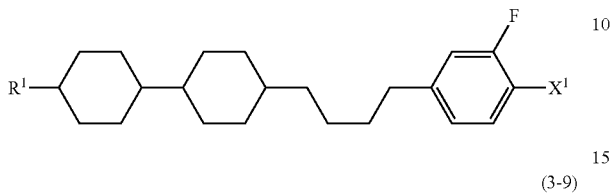
(3-9)
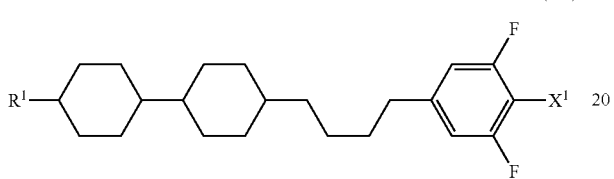
(3-10)
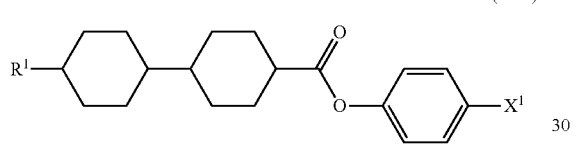
(3-11)
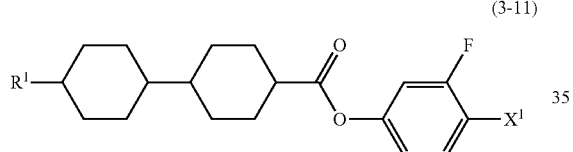
(3-12)
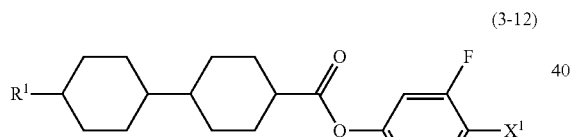
(3-13)
(3-14)
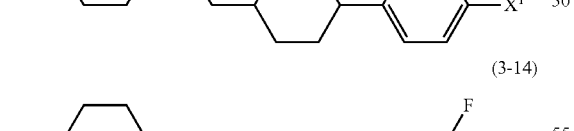
(3-15)
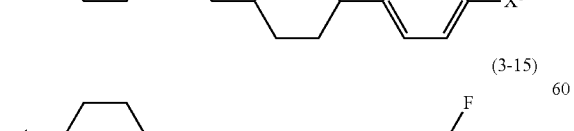
(3-16)
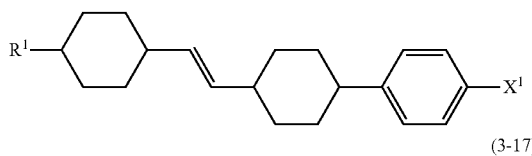
(3-17)
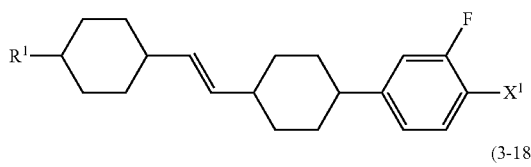
(3-18)
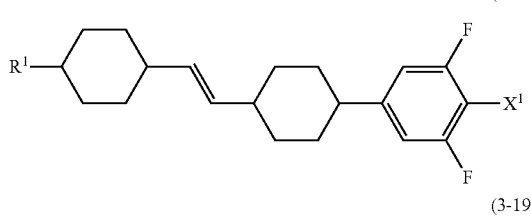
(3-19)
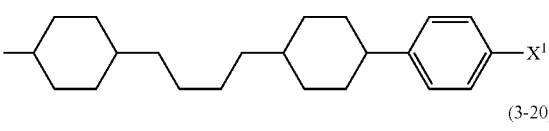
(3-20)
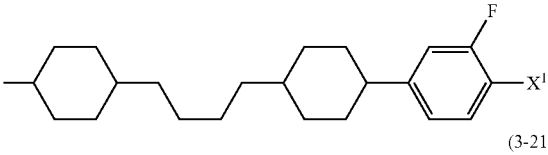
(3-21)
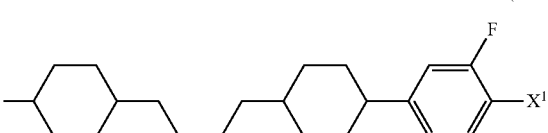
(3-22)
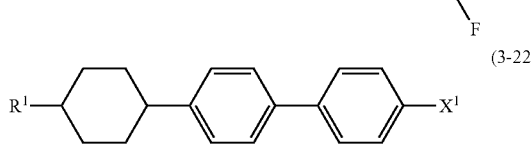
(3-23)
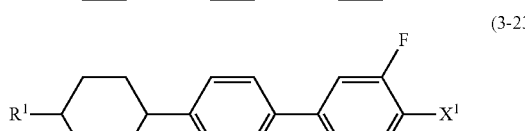
(3-24)
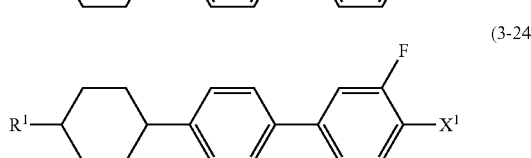
Formula 20
(3-25)
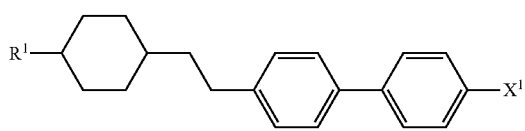

(3-26) 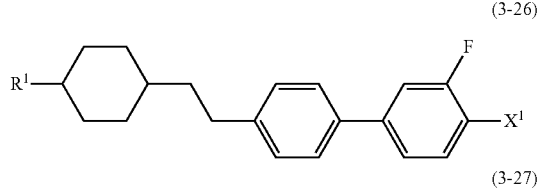
(3-27) 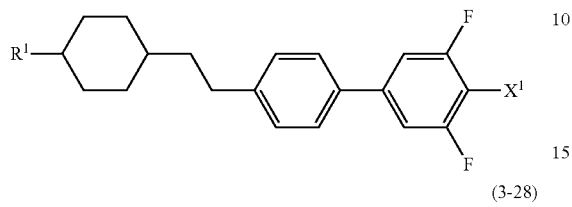
(3-28) 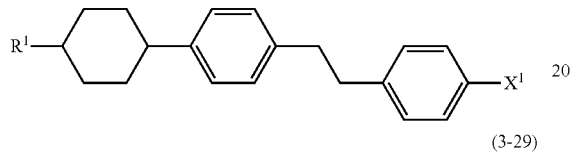
(3-29) 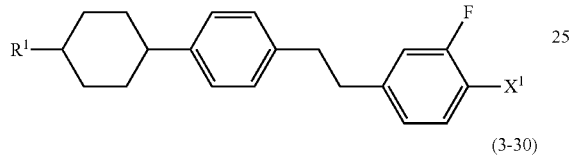
(3-30) 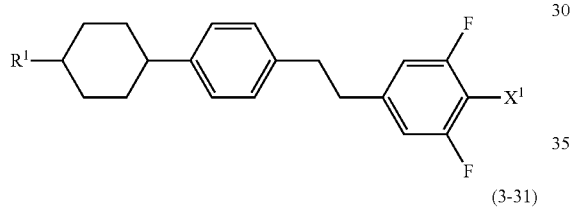
(3-31) 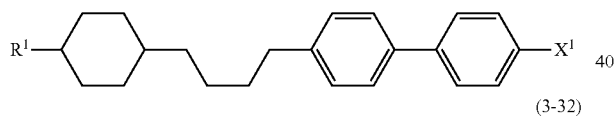
(3-32) 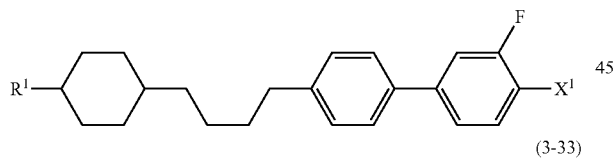
(3-33) 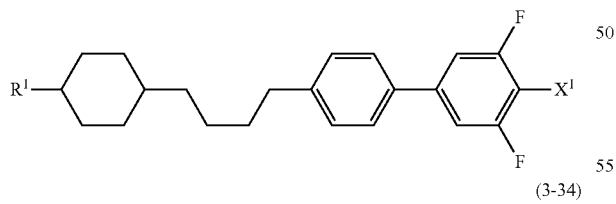
(3-34) 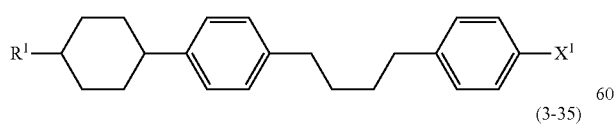
(3-35) 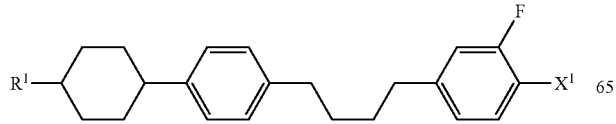
(3-36) 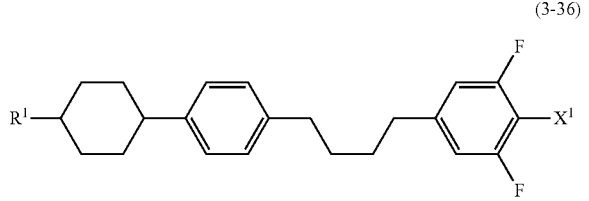
(3-37) 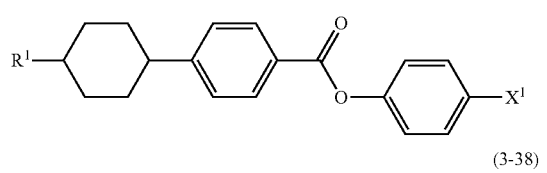
(3-38) 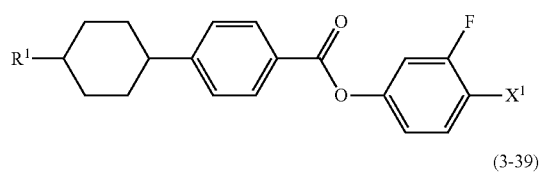
(3-39) 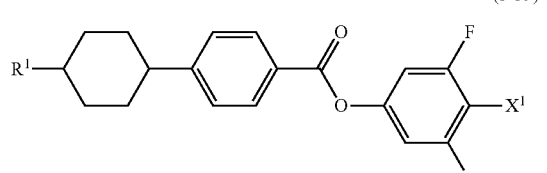
(3-40) 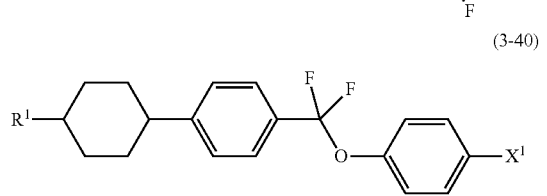
(3-41) 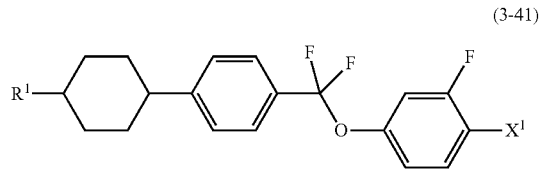
(3-42) 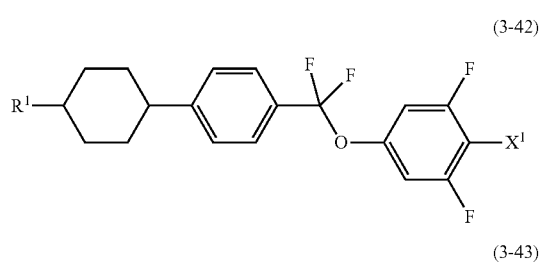
(3-43) 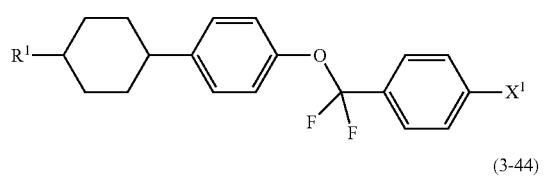
(3-44) 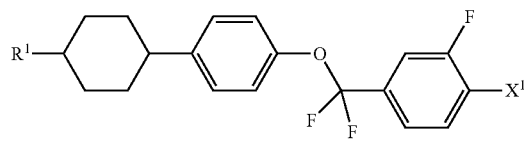

(3-45)
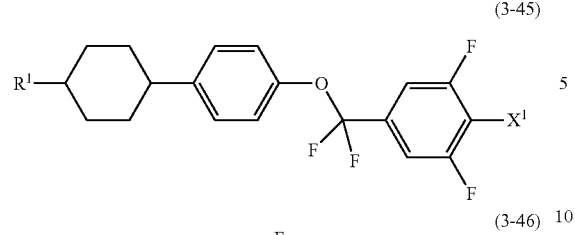
(3-46)
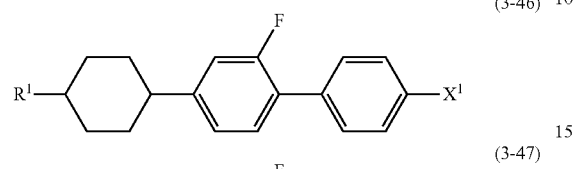
(3-47)
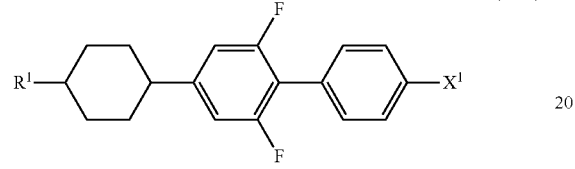
(3-48)
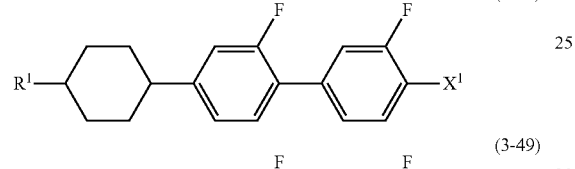
(3-49)
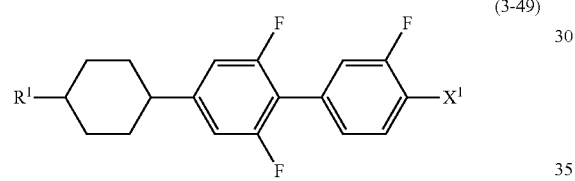
(3-50)
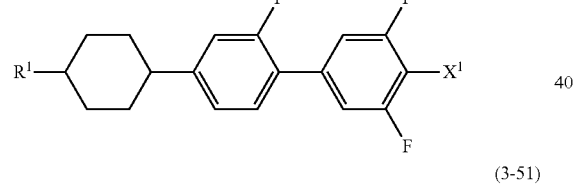
(3-51)
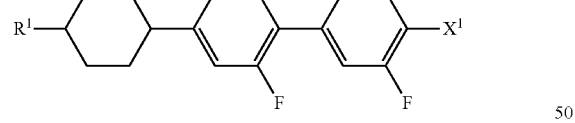
Formula 21
(3-52)
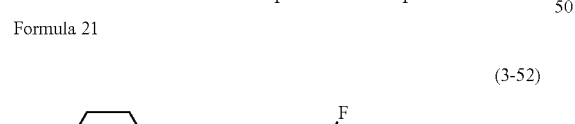
(3-53)
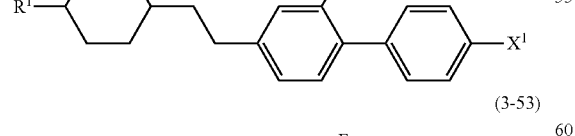
(3-54)
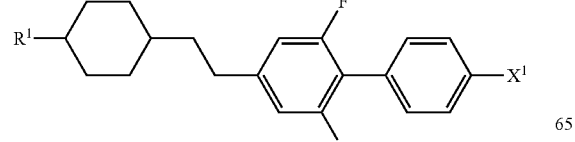
(3-55)
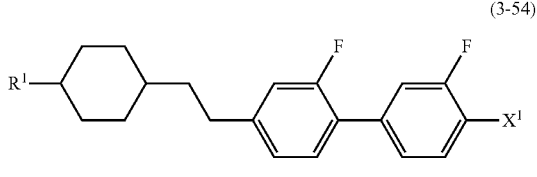
(3-56)
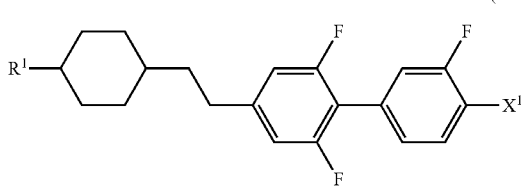
(3-57)
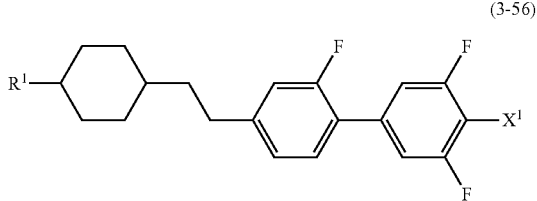
(3-58)
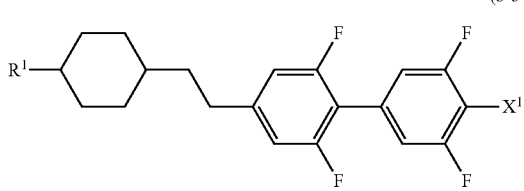
(3-59)
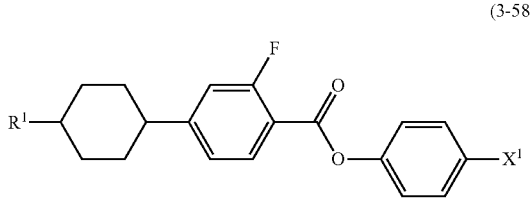
(3-60)
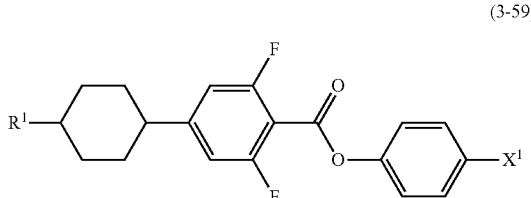
(3-61)
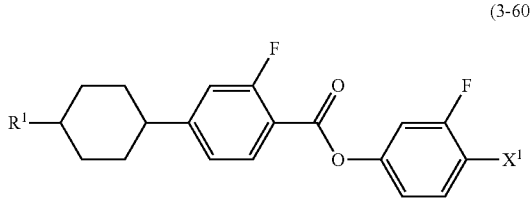

(3-62)
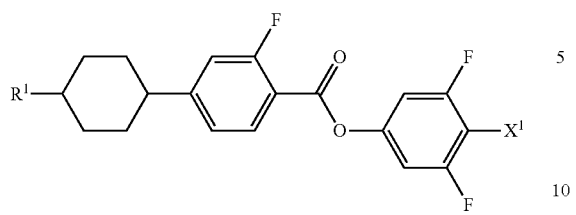
(3-63)
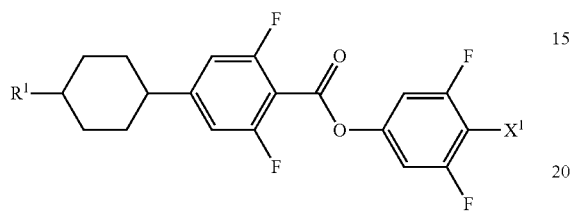
(3-64)
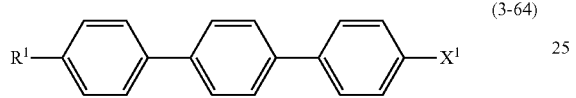
(3-65)
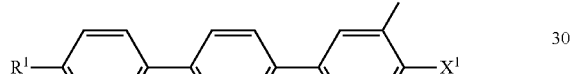
(3-66)
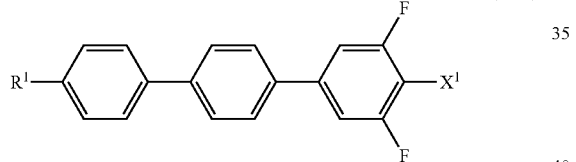
(3-67)
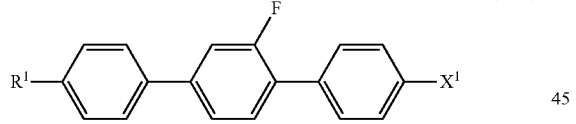
(3-68)
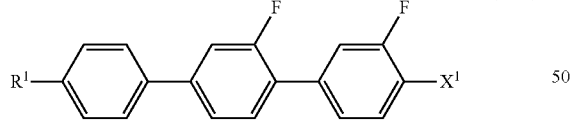
(3-69)
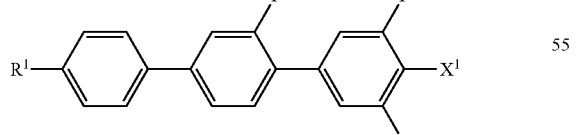
(3-70)
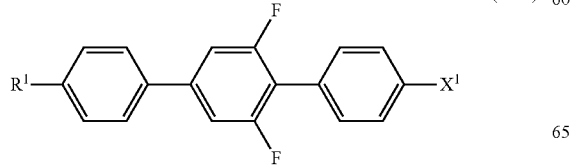
(3-71)
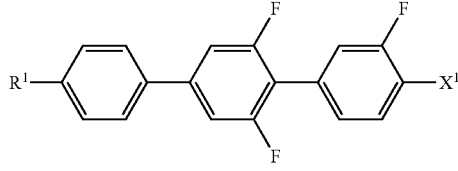
(3-72)
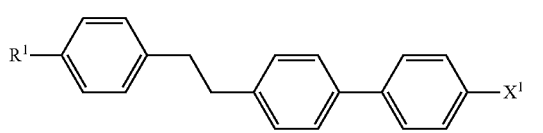
(3-73)
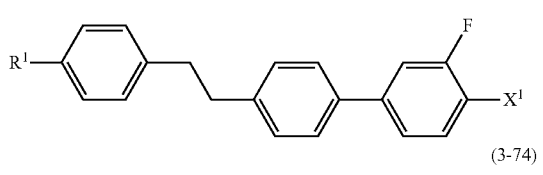
(3-74)
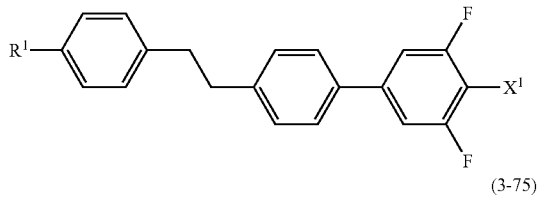
(3-75)
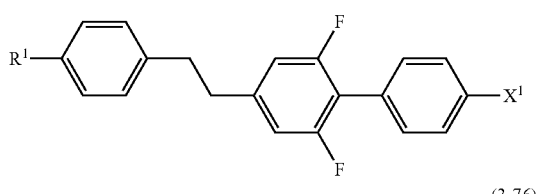
(3-76)
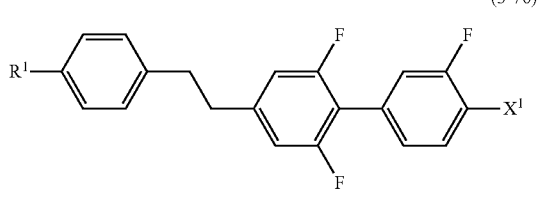
Formula 22
(3-77)
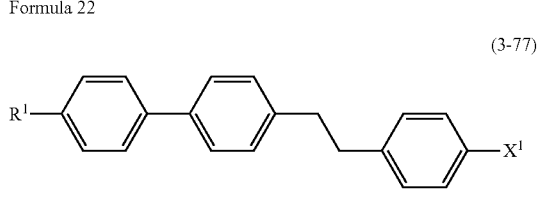
(3-78)
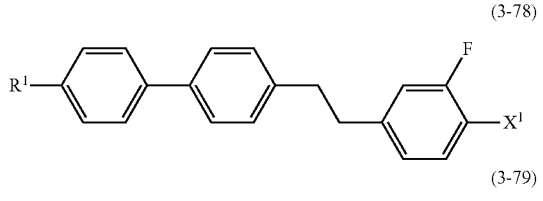
(3-79)
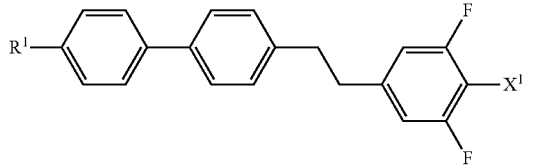

(3-80) 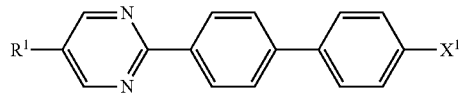
(3-81) 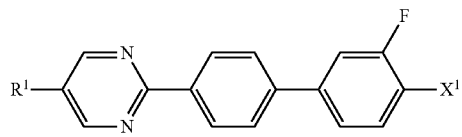
(3-82) 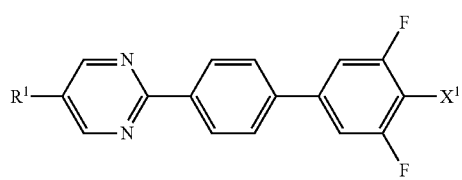
(3-83) 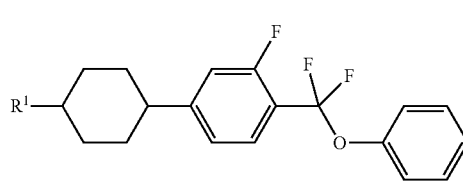
(3-84) 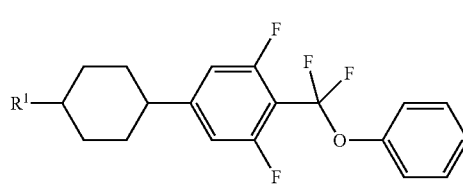
(3-85) 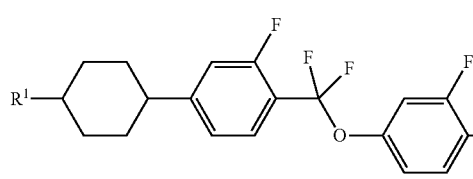
(3-86) 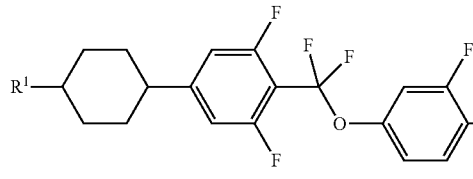
(3-87) 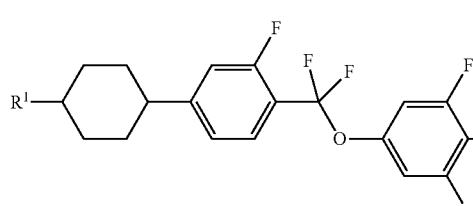
(3-88) 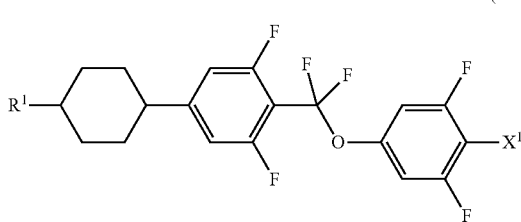
(3-89) 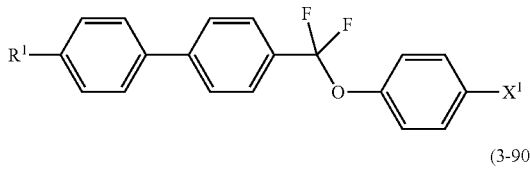
(3-90) 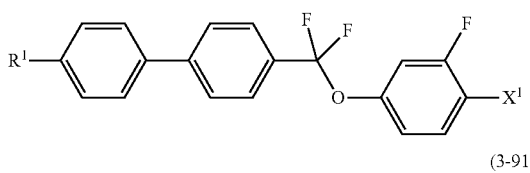
(3-91) 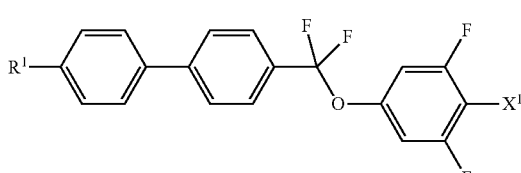
(3-92) 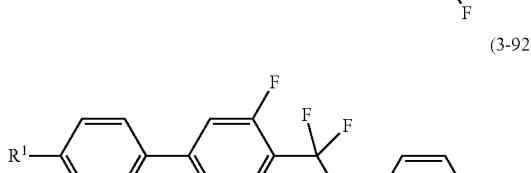
(3-93) 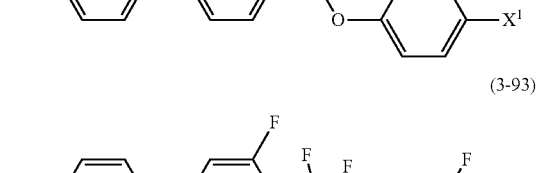
(3-94) 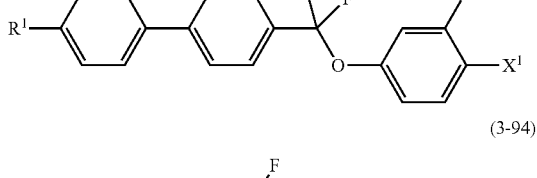
(3-95) 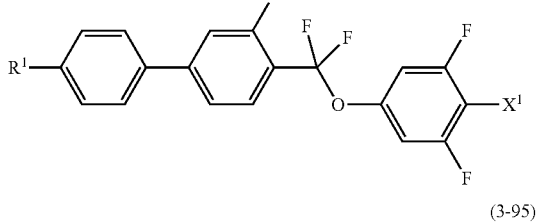

Formula 23
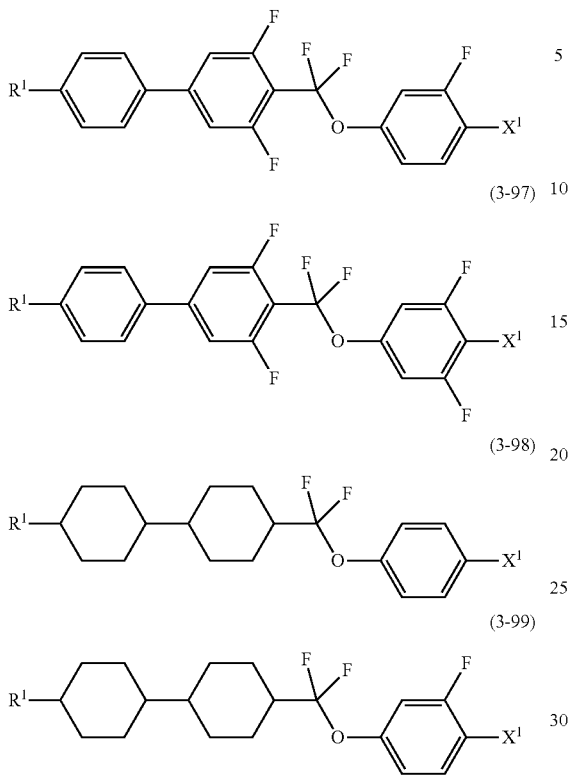
(3-96)
(3-97)
(3-98)
(3-99)
(3-100)
(3-101)
(3-102)
(3-103)
(3-104)
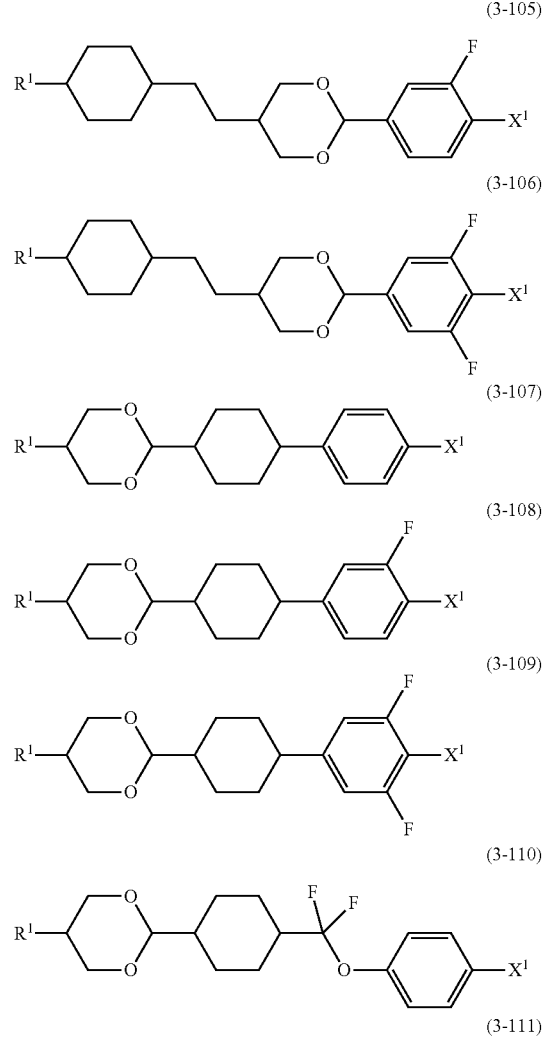
(3-105)
(3-106)
(3-107)
(3-108)
(3-109)
(3-110)
(3-111)
(3-112)
Formula 24
(4-1)
(4-2)

(4-3) 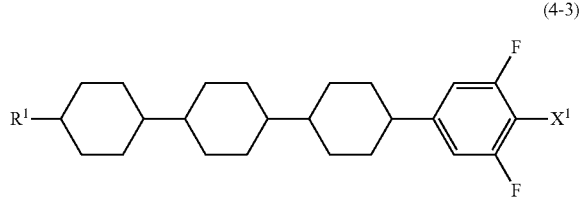
(4-4) 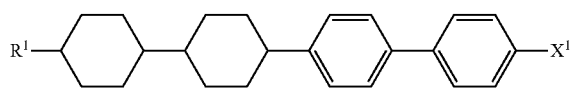
(4-5) 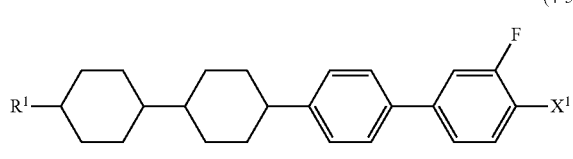
(4-6) 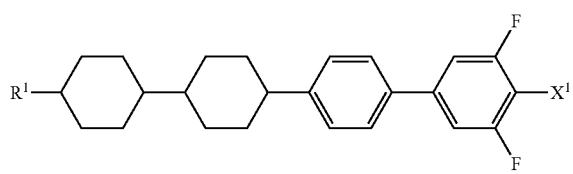
(4-7) 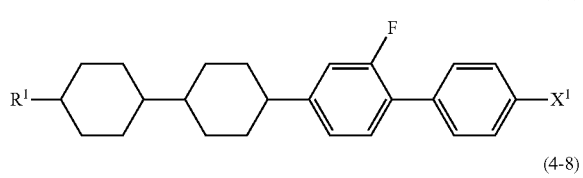
(4-8) 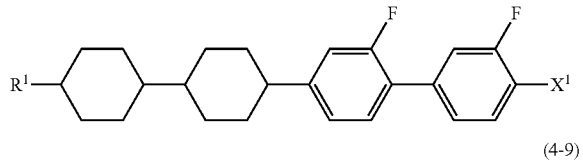
(4-9) 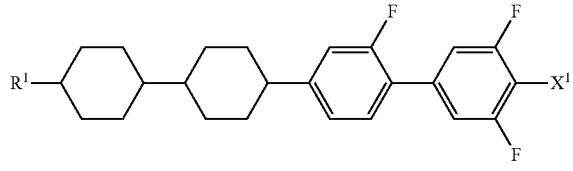
(4-10) 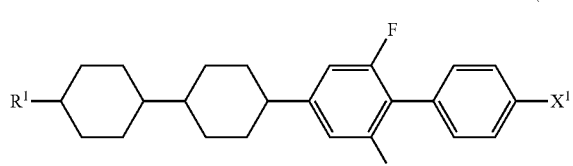
(4-11) 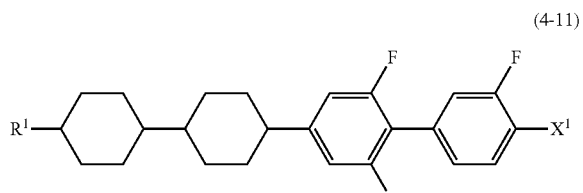
(4-12) 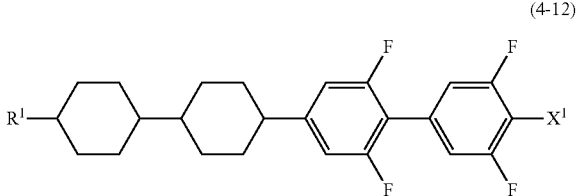
(4-13) 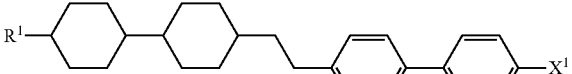
(4-14) 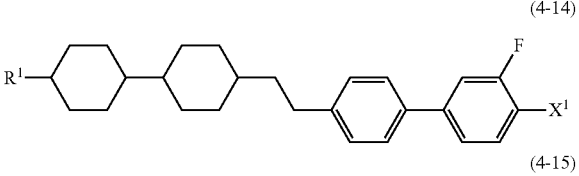
(4-15) 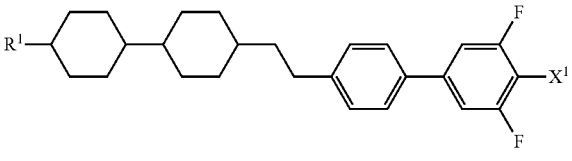
(4-16) 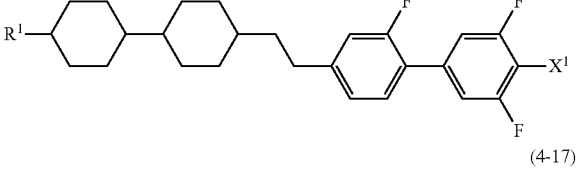
(4-17) 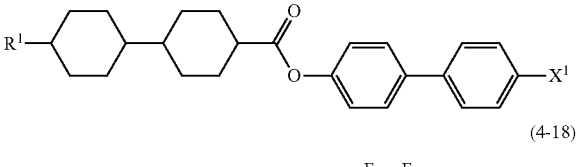
(4-18) 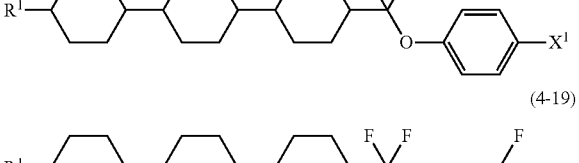
(4-19) 
(4-20) 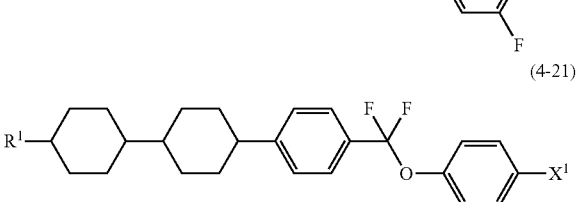
(4-21)

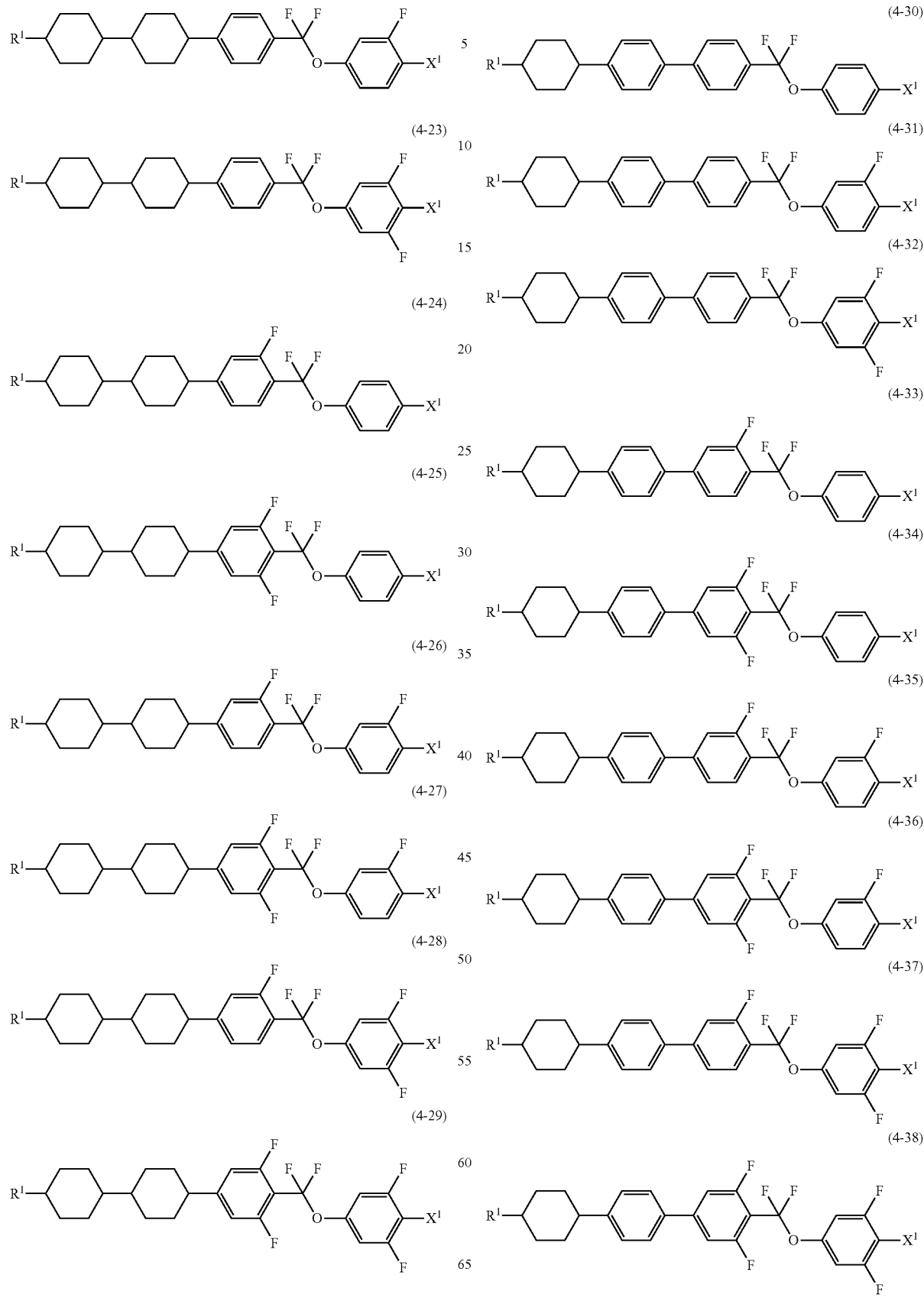

(4-39)
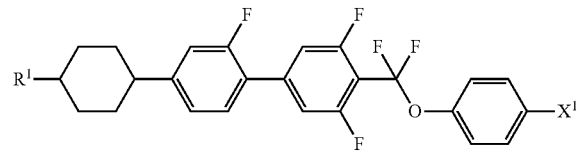
(4-40)
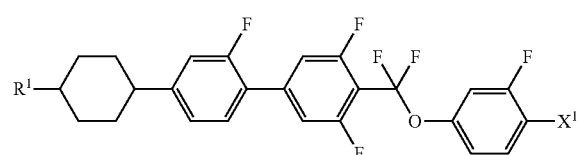
(4-41)
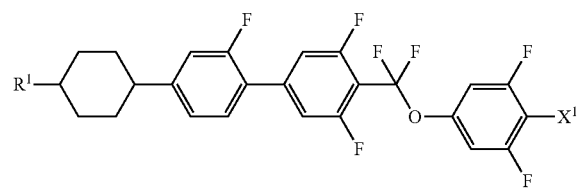
(4-42)
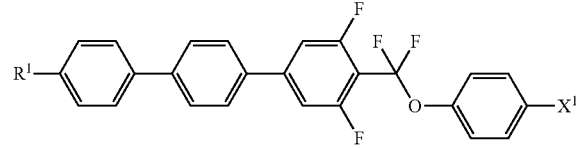
(4-43)
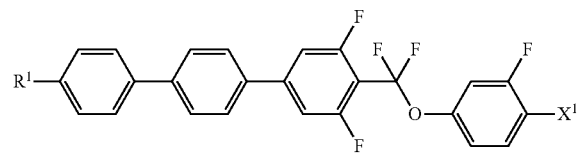
(4-44)
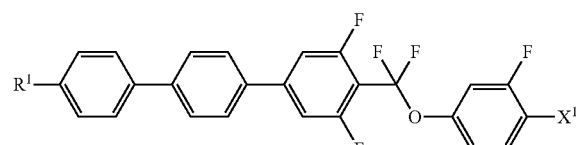
(4-45)
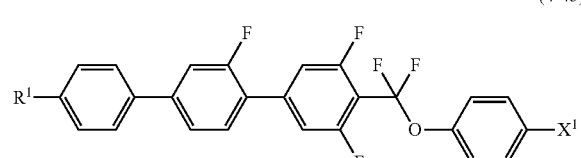
(4-46)
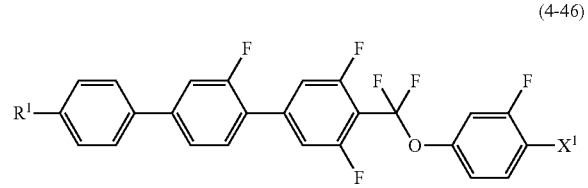
(4-47)
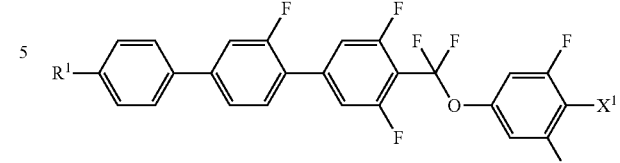
(4-48)
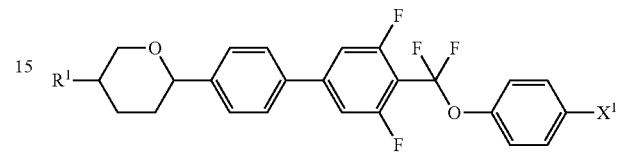
(4-49)
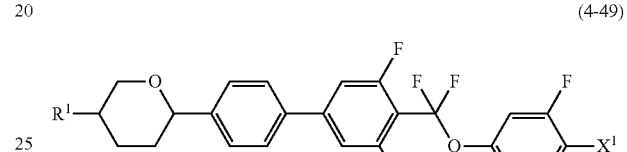
(4-50)
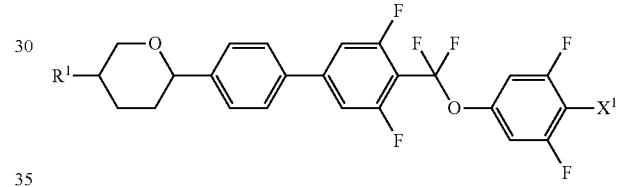
(4-51)
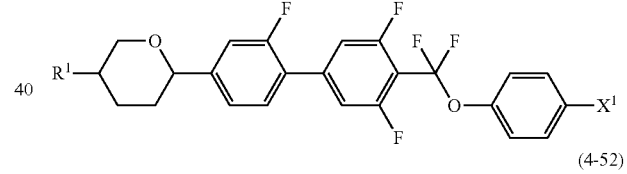
(4-52)
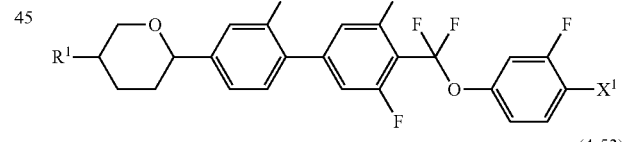
(4-53)
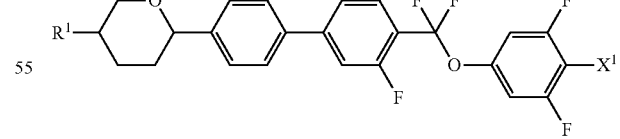
(4-54)
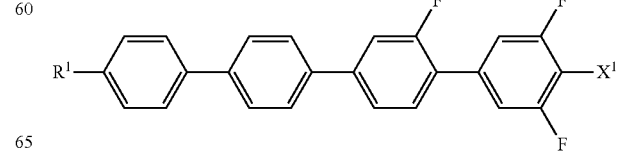

wherein, in the formulas, $R^1$ and $X^1$ are defined in a manner identical with the definitions of $R^1$ and $X^1$ in formulas (2) to (4).
Among types of component C, suitable examples of compounds represented by formula (5) include compounds represented by formulas (5-1) to (5-64).
Formula 26
(5-1)
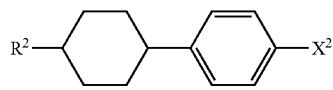
(5-2)
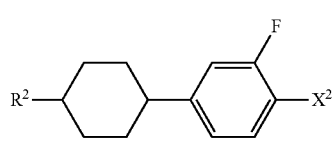
(5-3)
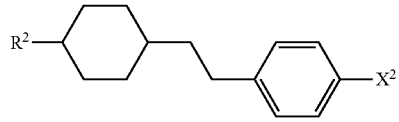
(5-4)
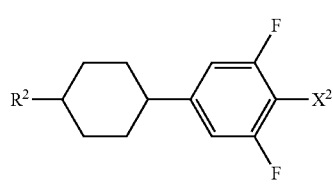
(5-5)
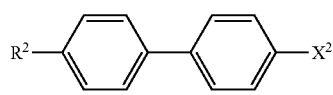
(5-6)
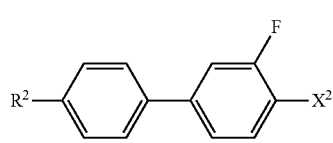
(5-7)
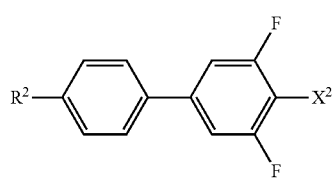
(5-8)
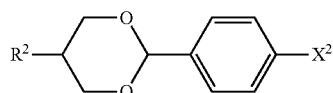
(5-9)
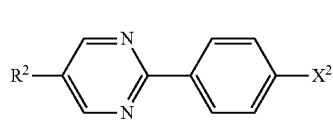
(5-10)
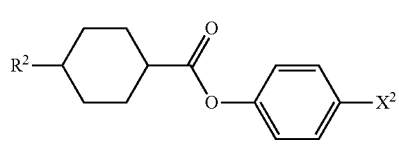
(5-11)
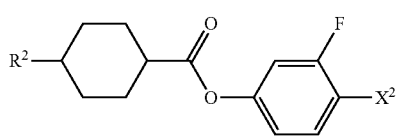
(5-12)
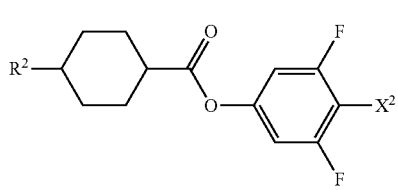
(5-13)
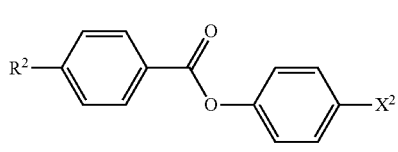
(5-14)
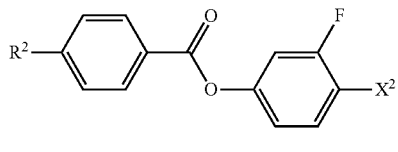
(5-15)
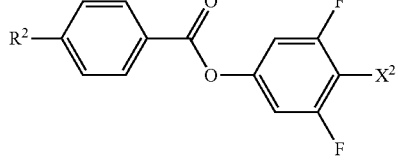
(5-16)
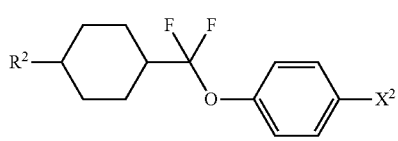
(5-17)
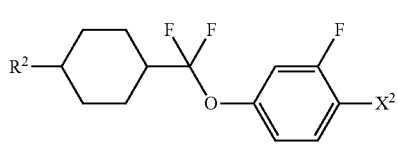
(5-18)
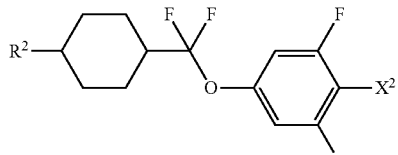
(5-19)
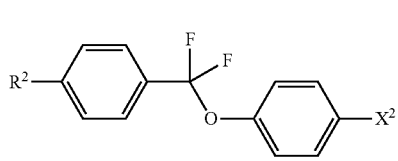
(5-20)
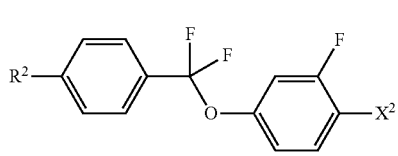

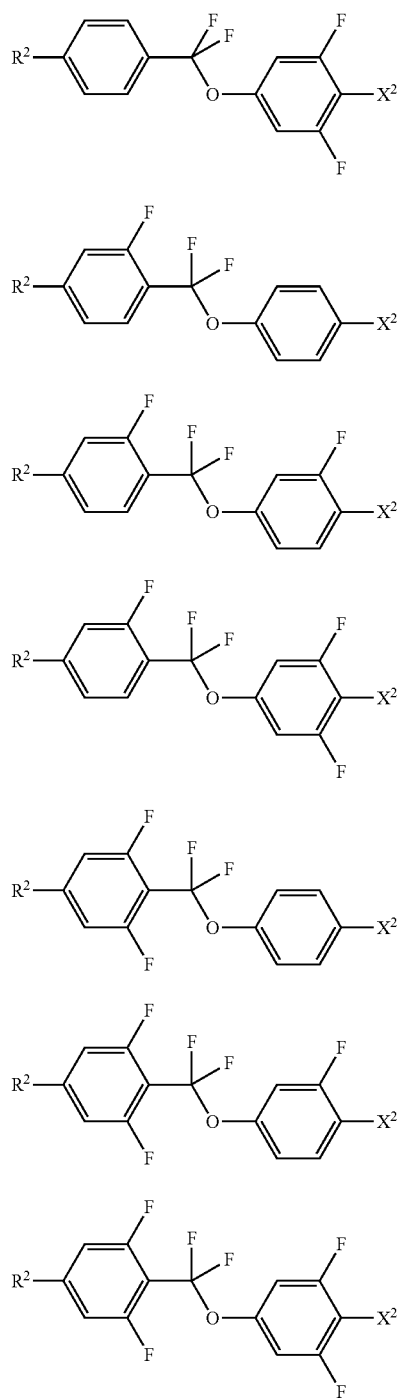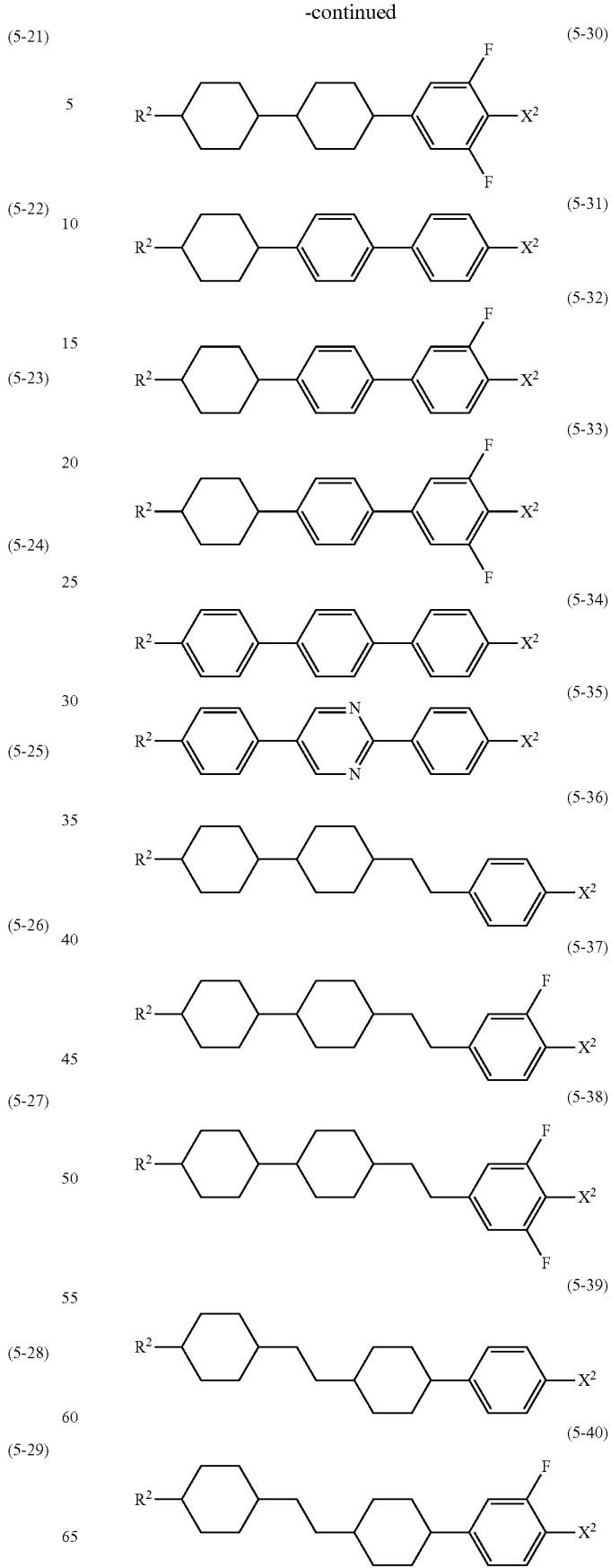

(5-41)
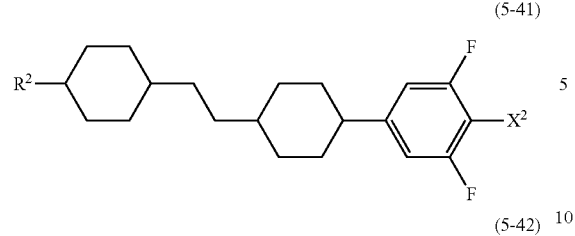
(5-42)
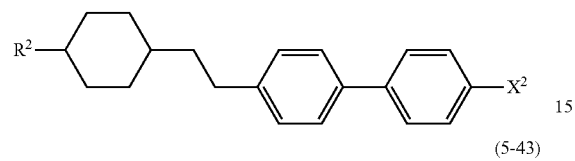
(5-43)
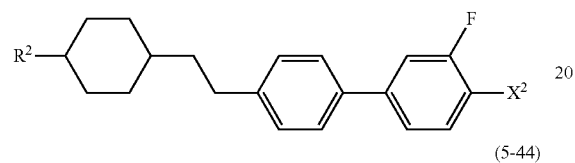
(5-44)
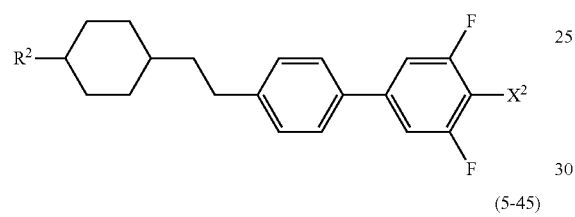
(5-45)
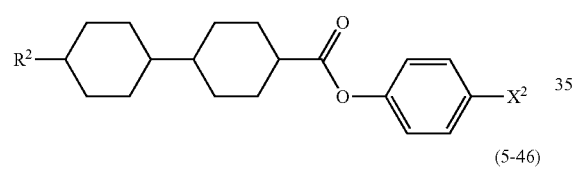
(5-46)
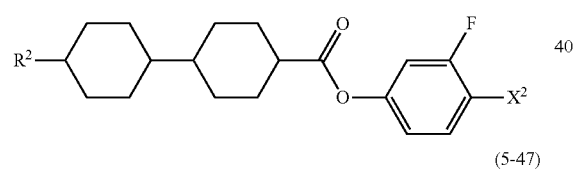
(5-47)
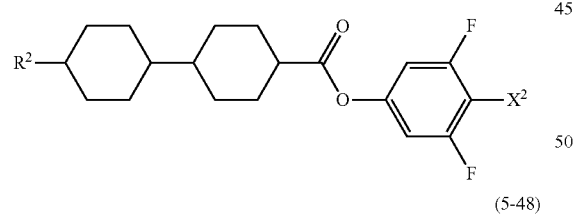
(5-48)
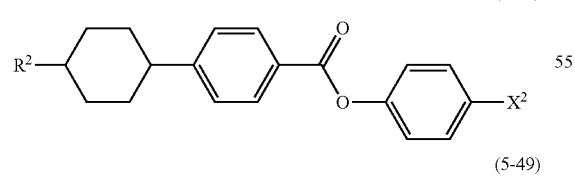
(5-49)
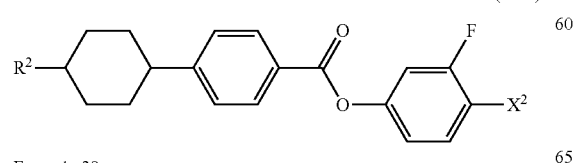
Formula 28
(5-50)
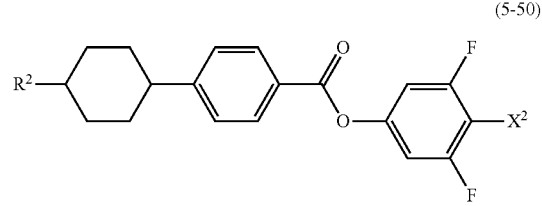
(5-51)
(5-52)
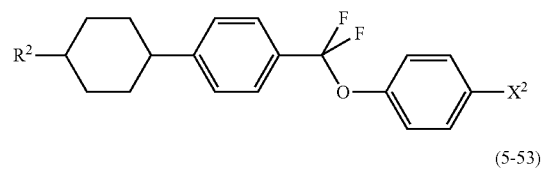
(5-53)
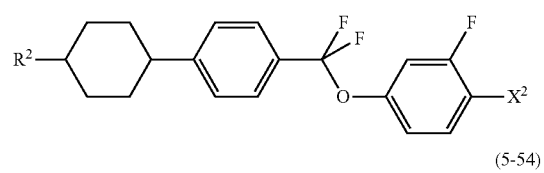
(5-54)
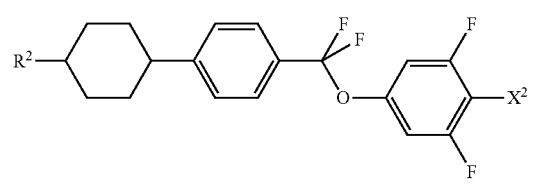
(5-55)
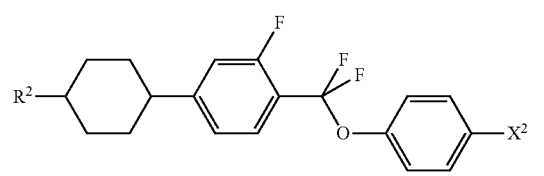
(5-56)
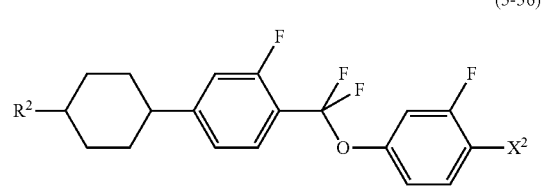
(5-57)
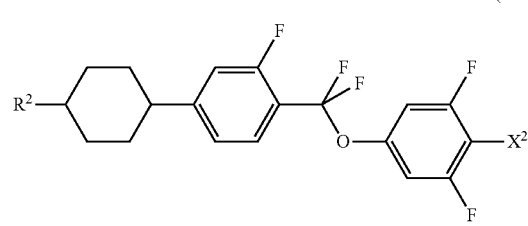

(5-58)
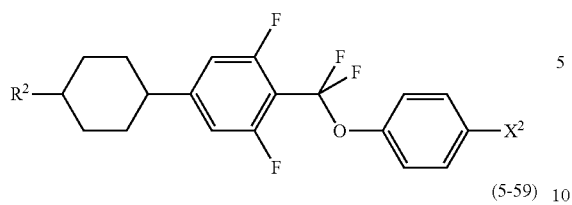
(5-59)
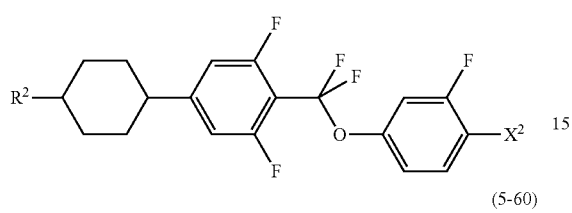
(5-60)
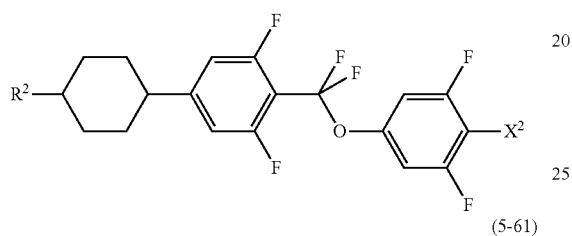
(5-61)
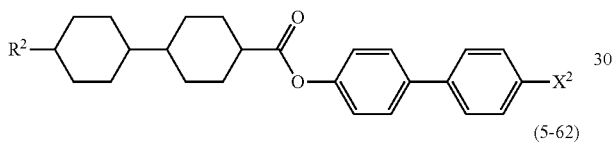
(5-62)
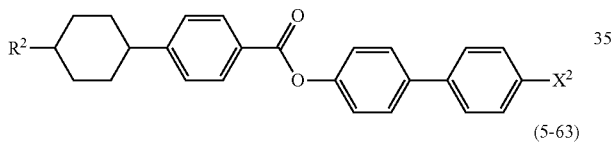
(5-63)
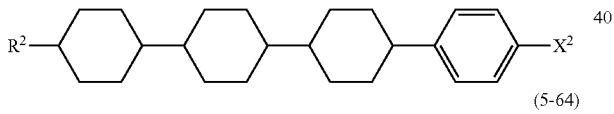
(5-64)
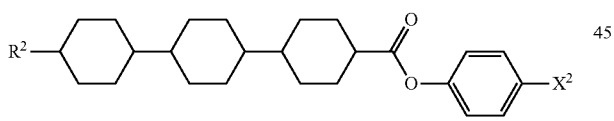
wherein, in the formulas, $R^2$ and $X^2$ are defined in a manner identical with the definitions of $R^2$ and $X^2$ in formula (5).
Among types of component D, suitable examples of compounds represented by formulas (6) to (11) include compounds represented by formulas (6-1) to (6-6), formulas (7-1) to (7-15), formula (8-1), formulas (9-1) to (9-3), formulas (10-1) to (10-11) and formulas (11-1) to (11-10), respectively.
Formula 29
(6-1)
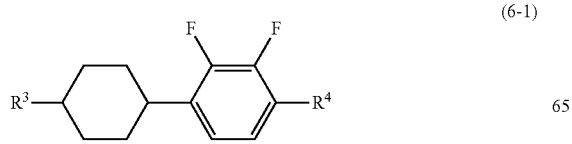
(6-2)
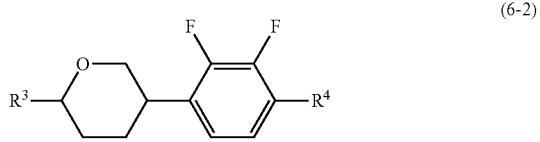
(6-3)
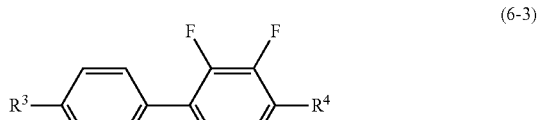
(6-4)
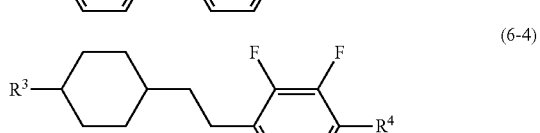
(6-5)
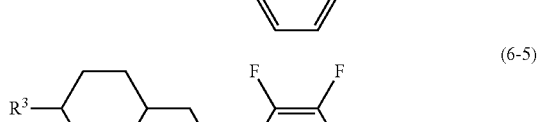
(6-6)
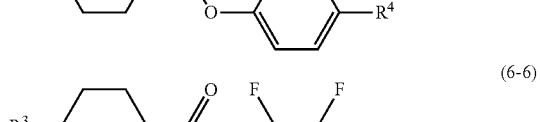
(7-1)
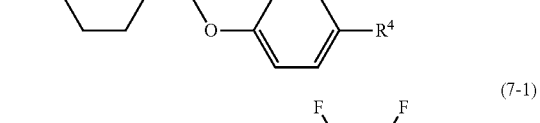
(7-2)
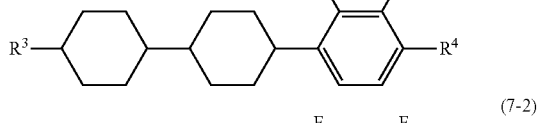
(7-3)
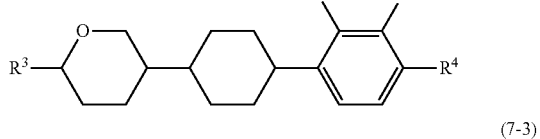
(7-4)
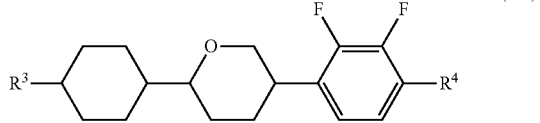
(7-5)
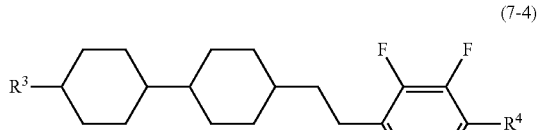
(7-6)
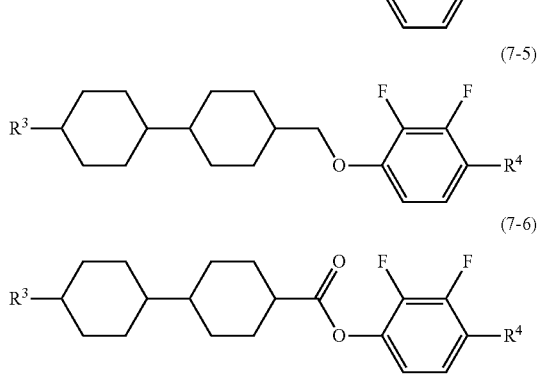

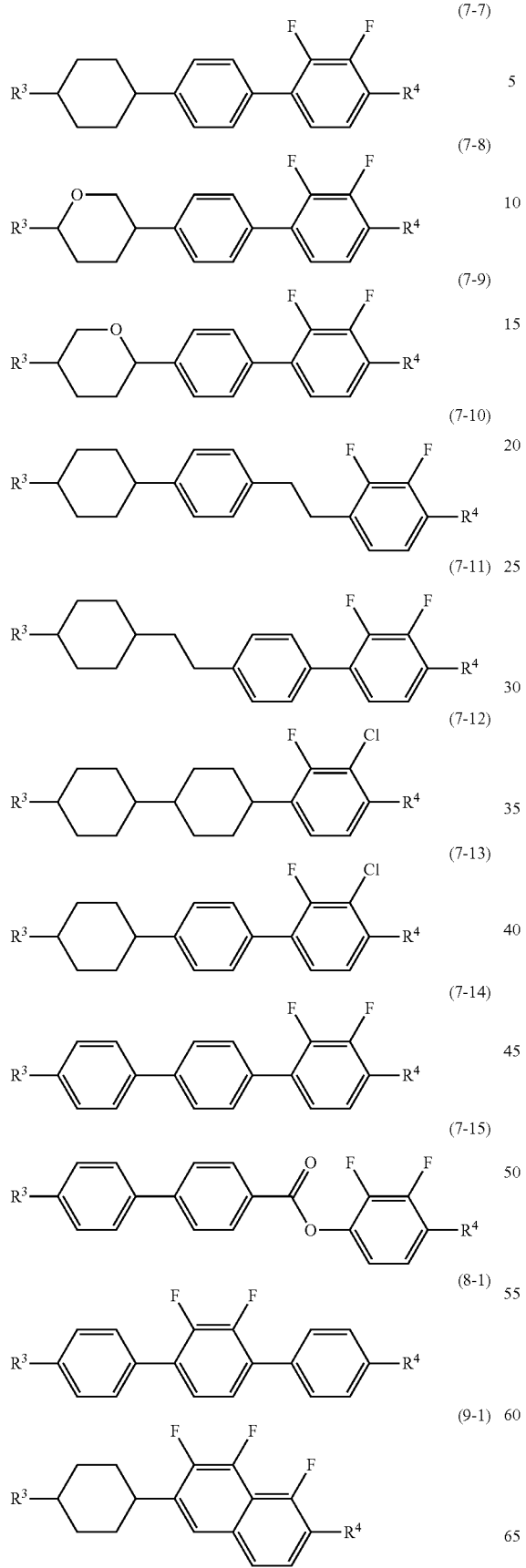
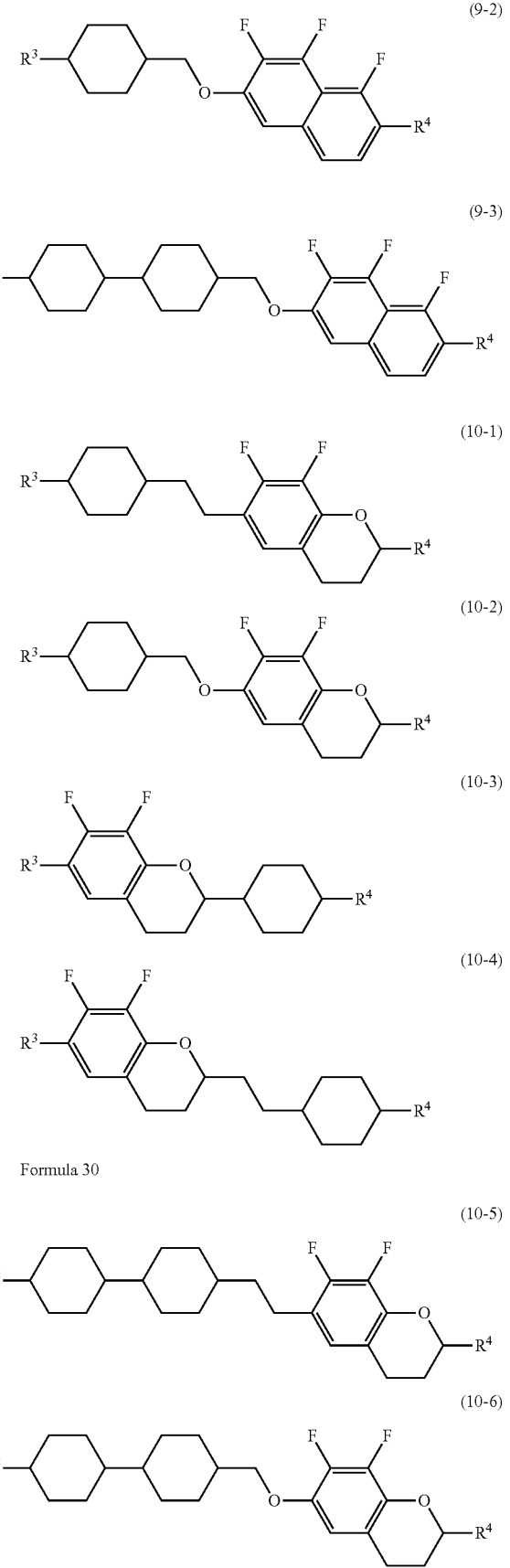
Formula 30

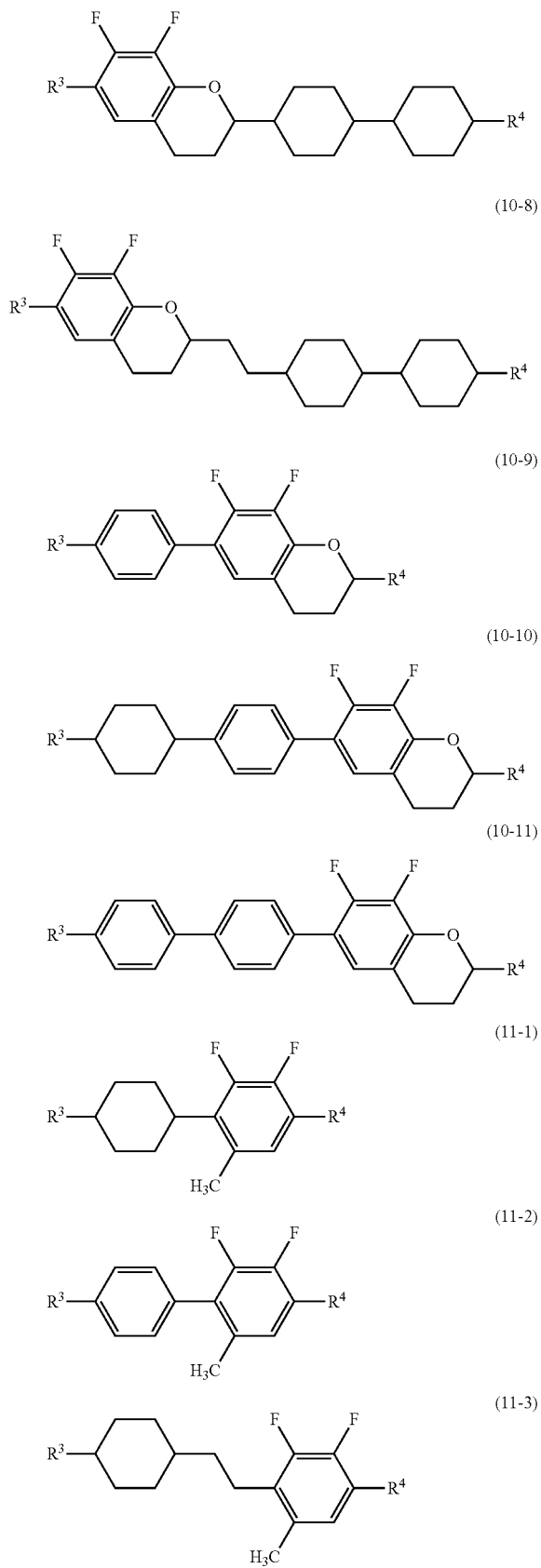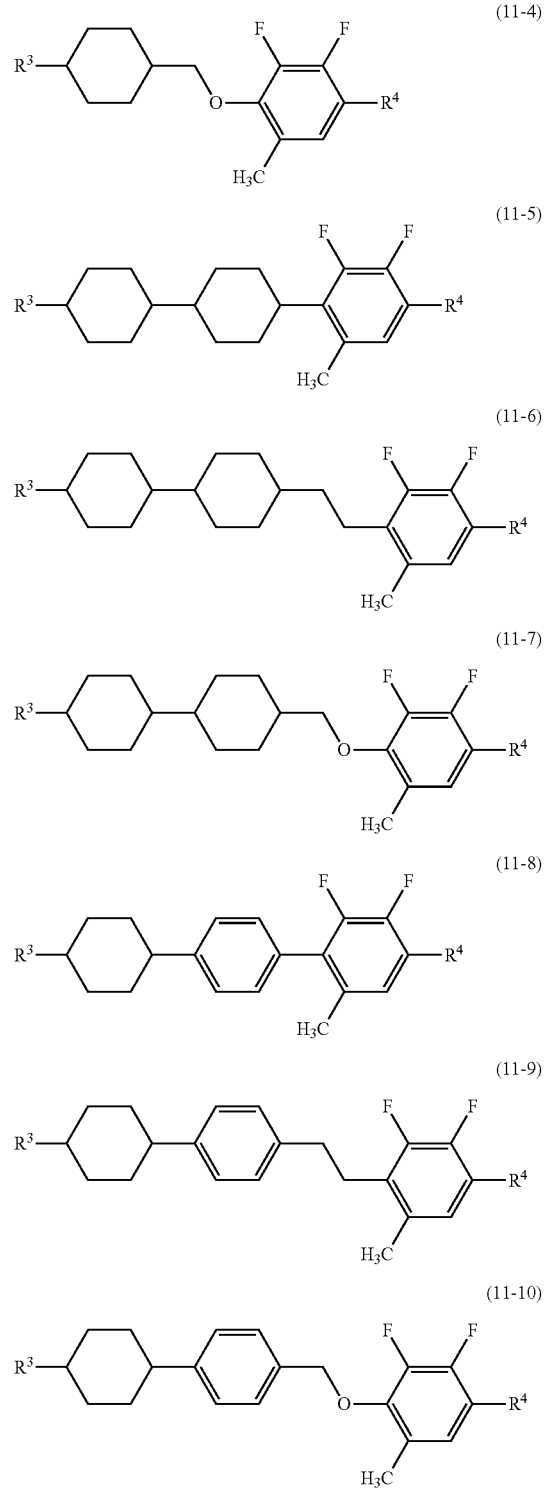
wherein, in the formulas, $R^3$ and $R^4$ are defined in a manner identical with the definitions of $R^3$ and $R^4$ in formulas (6) to (11).
Among types of component E, suitable examples of compounds represented by formulas (12) to (14) include compounds represented by formulas (12-1) to (12-11), formulas (13-1) to (13-19) and formulas (14-1) to (14-6), respectively.

Formula 31
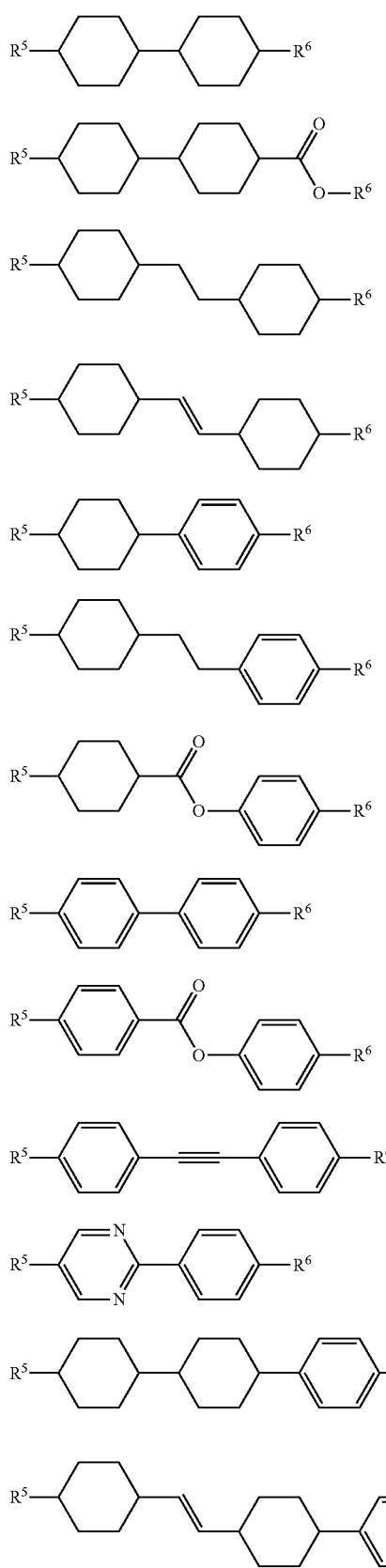
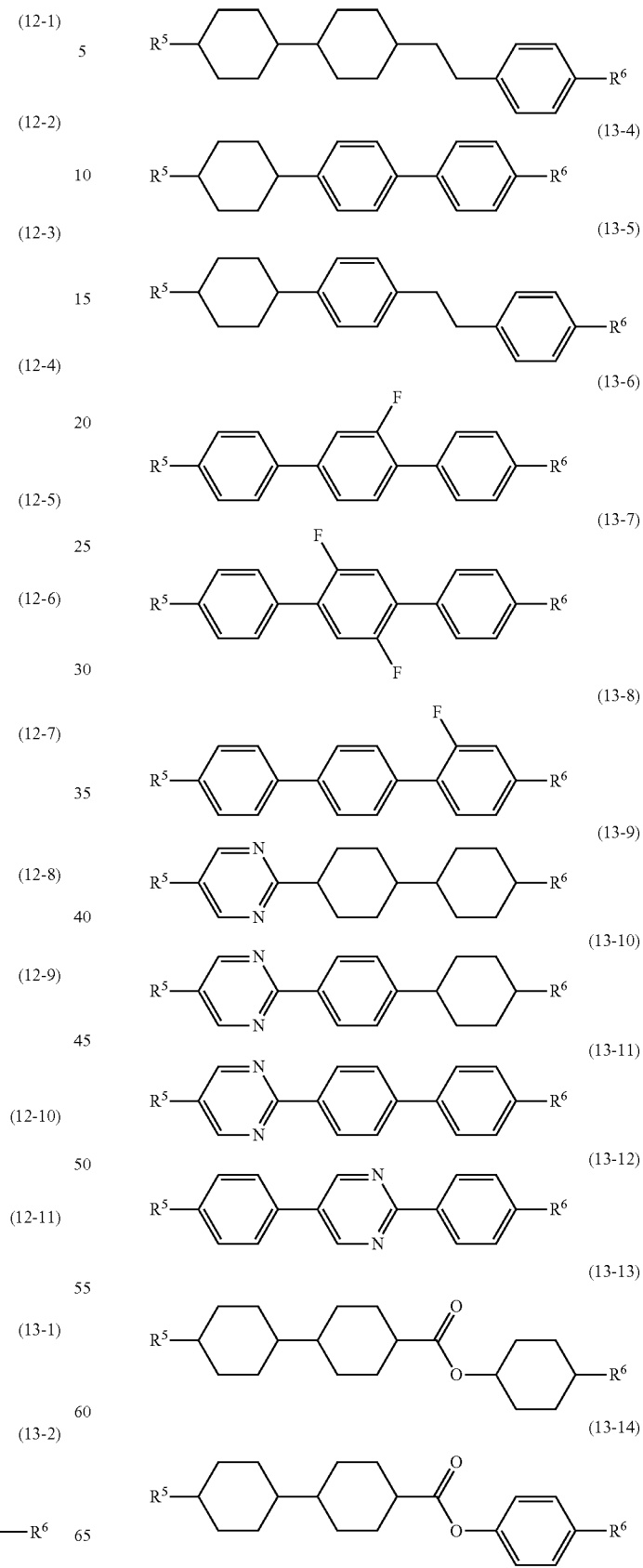

(13-15)
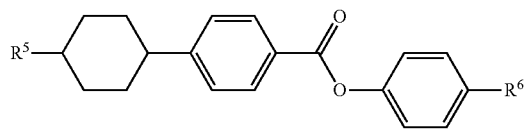

(13-16)
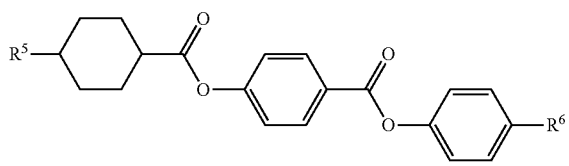

(13-17)
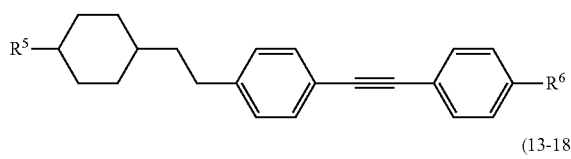

(13-18)
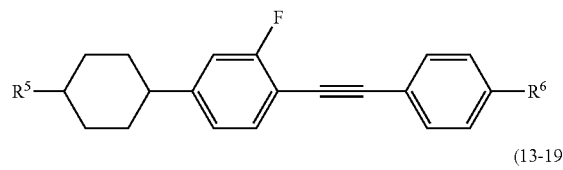

(13-19)
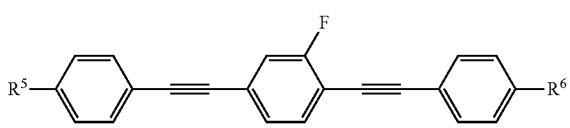

Formula 32

(14-1)
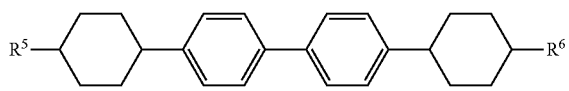

(14-2)
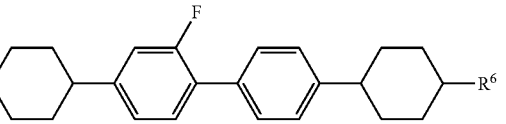

(14-3)
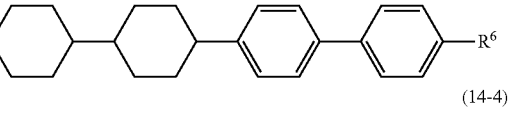

(14-4)
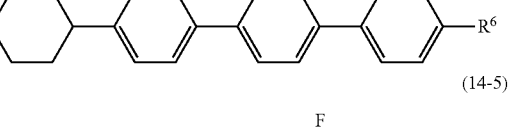

(14-5)
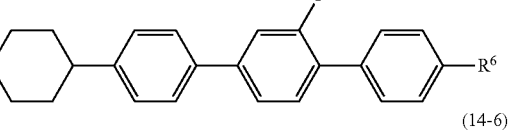

(14-6)
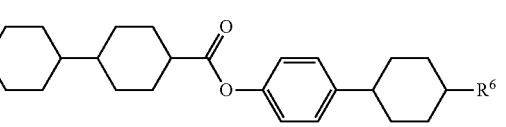

wherein, in the formulas, $R^5$ and $R^6$ are defined in a manner identical with the definitions of $R^5$ and $R^6$ in formulas (12) to (14).

Optically Active Compound

The liquid crystal composition of the invention may contain one optically active compound, or two or more optically active compounds. Specific examples of the optically active compounds include a publicly known chiral dopant. The chiral dopant is effective in inducing a helical structure of liquid crystals to adjust a required twist angle, and preventing an inverted twist. Specific examples of the chiral dopants include optically active compounds represented by formulas (Op-1) to (Op-13).

Formula 33

(Op-1)
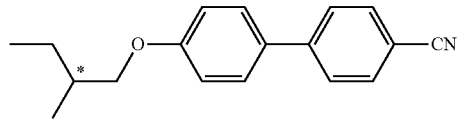

(Op-2)
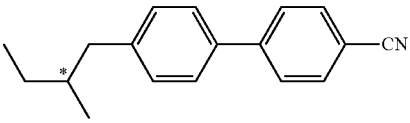

(Op-3)
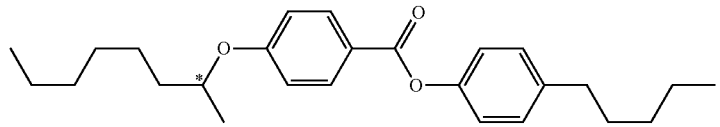

(Op-4)
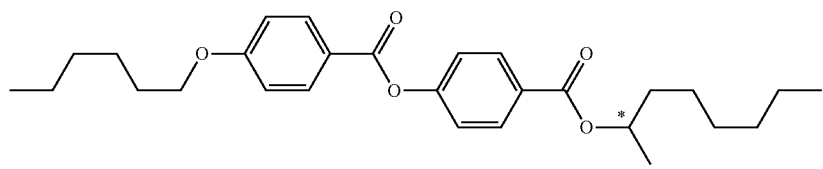

-continued
(Op-5)
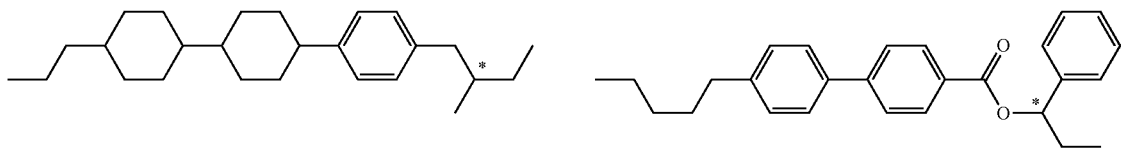
(Op-6)
(Op-7)
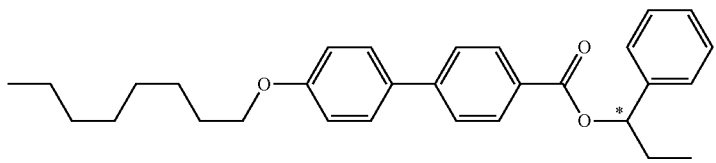
(Op-8)
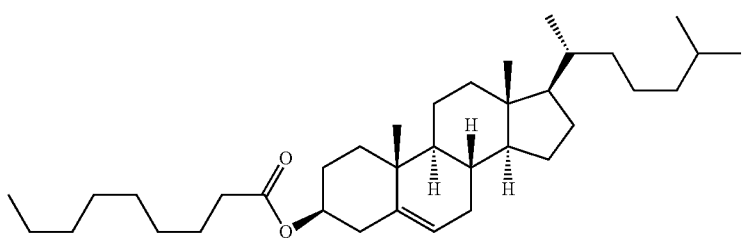
(Op-9)
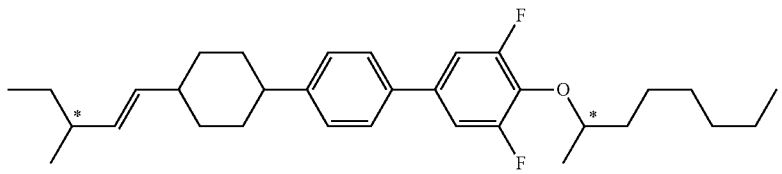
(Op-10)
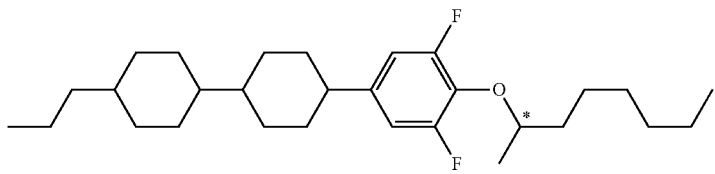
(Op-11)
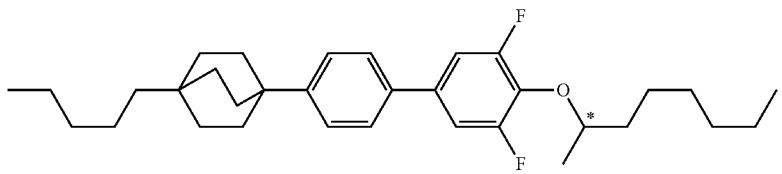
(Op-12)
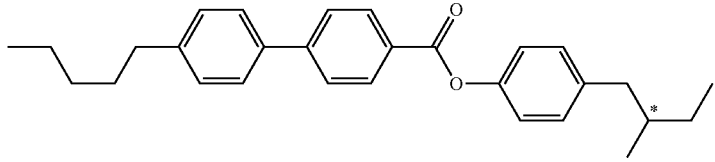
(Op-13)
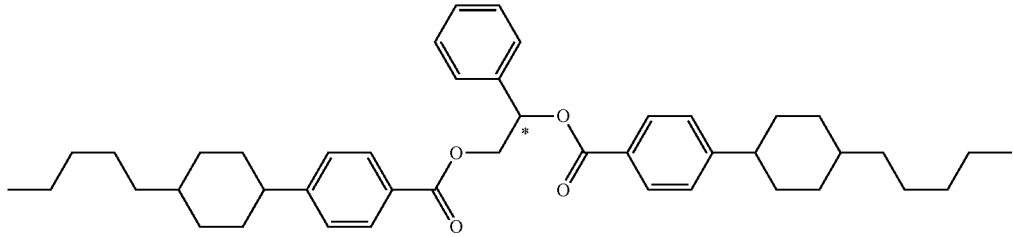

When the optically active compound is added to the liquid crystal composition of the invention, a helical pitch can be adjusted. The helical pitch is preferably adjusted to the range of approximately 40 to approximately 200 micrometers for a liquid crystal composition for TFT-TN and TN; in the range of approximately 6 to approximately 20 micrometers for a liquid crystal composition for STN; and in the range of approximately 1.5 to approximately 4 micrometers for a liquid crystal composition for BTN. Moreover, two or more optically active compounds may be added for the purpose of adjusting temperature dependence of the pitch.

Polymerizable Compound

The liquid crystal composition of the invention can also be used as a liquid crystal composition for PSA by adding one polymerizable compound, or two or more polymerizable compounds. Moreover, when adding the polymerizable compound, a polymerization initiator is preferably used. In the cases, content of the polymerizable compound is preferably in the range of approximately 0.1 to approximately 2% by mass based on the total mass of the liquid crystal composition.

Specific examples of the polymerizable compounds include a compound having a polymerizable group such as acrylate, methacrylate, vinyl, vinyloxy, propenyl ether, epoxy, vinyl ketone and oxetane. The polymerizable compound is preferably polymerized by irradiation with ultraviolet light in the presence of a suitable polymerization initiator such as a photopolymerization initiator.

Suitable conditions for polymerization, suitable types and suitable amounts of the polymerization initiator are known to those skilled in the art and described in each literature. For example, Irgacure 651 (registered tradename), Irgacure 184 (registered tradename) or Darocure 1173 (registered tradename) (all made by BASF), each being the photopolymerization initiator, are suitable for radical polymerization.

Any Other Component

The liquid crystal composition of the invention can also be used as a liquid crystal composition for a guest-host (GH) mode by adding a dye, such as a dichroic dye of a merocyanine type, a styryl type, an azo type, an azomethine type, an azoxy type, a quinophthalone type, an anthraquinone type and a tetrazine type.

Method for Preparing a Liquid Crystal Composition and Characteristics Thereof.

The liquid crystal composition of the invention can be prepared, for example, by mixing individual compounds when a compound constituting each component is liquid, or by mixing individual compounds and making the compounds liquid by heating and dissolution of the compounds, and then shaking the liquid when one compound or two or more compounds constituting each component are solid. Moreover, the liquid crystal composition of the invention can also be prepared by other publicly known methods.

When preparing the liquid crystal composition of the invention, each component can also be selected, for example, in consideration of the dielectric anisotropy of compound (1). The liquid crystal composition prepared by selecting each component has stability to heat, light and so forth, a low viscosity, a suitable dielectric anisotropy, a suitable optical anisotropy and a suitable elastic constant, and a low threshold voltage, and also a high maximum temperature of the nematic phase and a low minimum temperature of the nematic phase. A term "suitable" herein means that a suitable range of the dielectric anisotropy, the optical anisotropy and the elastic constant, for example, is appropriately determined depending on the operating mode of the liquid crystal display device including the liquid crystal composition of the invention.

In the liquid crystal composition of the invention, the maximum temperature of the nematic phase can be adjusted to be approximately 70° C. or higher, and the minimum temperature of the nematic phase to be approximately −20° C. or lower, and therefore the temperature range of the nematic phase is wide. Accordingly, the liquid crystal display device including the liquid crystal composition of the invention can be used in a wide temperature range.

In the liquid crystal composition of the invention, when the composition or the like is appropriately adjusted, the value of optical anisotropy (Δn) can be adjusted to an arbitrary range, for example, to the range of approximately 0.10 to approximately 0.13, or to the range of approximately 0.05 to approximately 0.18.

In the liquid crystal composition of the invention, when the composition or the like is appropriately adjusted, the value of dielectric anisotropy (Δ∈) can be adjusted ordinarily to the range of approximately −5.0 to approximately −2.0, preferably, to the range of approximately −4.5 to approximately −2.5. The liquid crystal composition having the value of dielectric anisotropy in the range can be suitably used for a liquid crystal display device that is operated according to the VA mode, the IPS mode or the PSA mode.

In the liquid crystal composition of the invention, when the composition or the like is appropriately adjusted, the value of dielectric anisotropy (Δ∈) can be adjusted ordinarily to the range of approximately 1 to approximately 30, preferably, to the range of approximately 2 to approximately 25. The liquid crystal composition having the value of dielectric anisotropy in the range can be suitably used for a liquid crystal display device that is operated according to the TN mode, the STN mode, the IPS mode or the OCB mode.

In addition, methods for measuring the physical properties described above are as described in Examples.

Liquid Crystal Display Device

The liquid crystal display device of the invention includes the liquid crystal composition described above. The liquid crystal display device of the invention has a short response time, a small electric power consumption and a small driving voltage and a large contrast ratio, and can be used in a wide temperature range, and therefore can be used for a liquid crystal projector, a liquid crystal television or the like.

The liquid crystal composition of the invention can be applied not only to a liquid crystal display device that has the operating mode such as the PC mode, the TN mode, the STN mode, the OCB mode, the VA mode, the IPS mode and the PSA mode, and is driven according to an active matrix (AM) mode; but also to a liquid crystal display device that has the operating mode such as the PC mode, the TN mode, the STN mode, the OCB mode, the VA mode and the IPS mode, and is driven according to a passive matrix (PM) mode. The liquid crystal display device according to the AM mode and the PM mode can be applied to any liquid crystal display of a reflective type, a transmissive type, a transflective type or the like.

The liquid crystal composition of the invention can also be used for an electrically controlled birefringence (ECB) mode device, a dynamic scattering (DS) mode device using a liquid crystal composition into which a conducting agent is added, a nematic curvilinear aligned phase (NCAP) device prepared by microencapsulating the liquid crystal composition, and a polymer dispersed (PD) device prepared by forming a three-dimensional network polymer in the liquid crystal composition, for example, a polymer network (PN) device.

Among the devices, the liquid crystal composition of the invention has the characteristics described above, and therefore can be suitably used for a liquid crystal display device having the AM mode to be driven according to the operating mode such as the VA mode, the IPS mode or the PSA mode in which a liquid crystal composition having a negative value of dielectric anisotropy is used, in particular, can be suitably used for a liquid crystal display device having the AM mode to be driven according to the VA mode.

In the liquid crystal display device to be driven according to the TN mode, the VA mode or the like, a direction of an electric field is perpendicular to a direction of a liquid crystal layer. On the other hand, in the liquid crystal display device to be driven according to the IPS mode or the like, the direction of the electric field is parallel to the direction of the liquid crystal layer.

Moreover, a structure of the liquid crystal display device to be driven according to the VA mode is reported in K. Ohmuro, S. Kataoka, T. Sasaki and Y. Koike, SID'97 Digest of Technical Papers, 28, 845 (1997). A structure of the liquid crystal display device to be driven according to the IPS mode is reported in WO 91/10936 A (family: U.S. Pat. No. 5,576,867 B).

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Hereafter, the invention will be explained in more detail by way of Examples, but the invention is not limited by the Examples. Unless otherwise noted, "%" is expressed in terms of "% by mass."

$^1$H NMR Analysis

A liquid crystal compound obtained in Examples and so forth was identified by a spectrum obtained by means of $^1$H NMR analysis. As a measuring apparatus, DRX-500 (made by Bruker BioSpin Corporation) was used. A sample manufactured in Examples and so forth was dissolved in a deuterated solvent such as $CDCl_3$ in which the sample was soluble, and measurement was carried out under the conditions of room temperature, 500 MHz and 32 times of accumulation. In the explanation of nuclear magnetic resonance spectra, s, d, t, q, quin, sex, m and br stand for a singlet, a doublet, a triplet, a quartet, a quintet, a sextet, a multiplet and broad, respectively. Tetramethylsilane (TMS) was used for a reference material for a zero point of chemical shifts (δ values).

Measurement Sample

As a sample for determining values of physical properties of a liquid crystal compound obtained in Example and so forth, two methods were applied: namely, a case where the liquid crystal compound per se was used as the sample, and a case where the compound was mixed with base liquid crystals to be used as the sample.

In the latter case where the sample prepared by mixing the liquid crystal compound with the base liquid crystals was used, measurement was carried out according to the method described below. First, a sample was prepared by mixing 15% of liquid crystal compound obtained and 85% of base liquid crystals. However, when a smectic phase or crystals precipitated at 25° C. even when a mixing ratio of the liquid crystal compound to the base liquid crystals was as described above, a mixing ratio of the liquid crystal compound to the base liquid crystals (liquid crystal compound:base liquid crystals) was changed in the order of (10%:90%), (5%:95%) and (1%:99%), and a sample was prepared at a mixing ratio at which neither the smectic phase nor the crystals precipitated at 25° C. Extrapolated values were determined from measured values of the sample obtained, according to an extrapolation method represented by an extrapolation equation described below. The extrapolated values were described as the values of physical properties of the liquid crystal compound obtained.

(Extrapolated value)={100×(measured value of a sample)−(% by mass of base liquid crystals)× (measured value of the base liquid crystals)}/(% by mass of liquid crystal compound).     Equation 1

Base Liquid Crystals

As the base liquid crystals, when a liquid crystal compound having a positive value of dielectric anisotropy was used, base liquid crystals i was used, and when a liquid crystal compound having a negative value of dielectric anisotropy was used, base liquid crystals ii was used. Compositions of base liquid crystals i and base liquid crystals ii are as described below.

Base Liquid Crystals i:

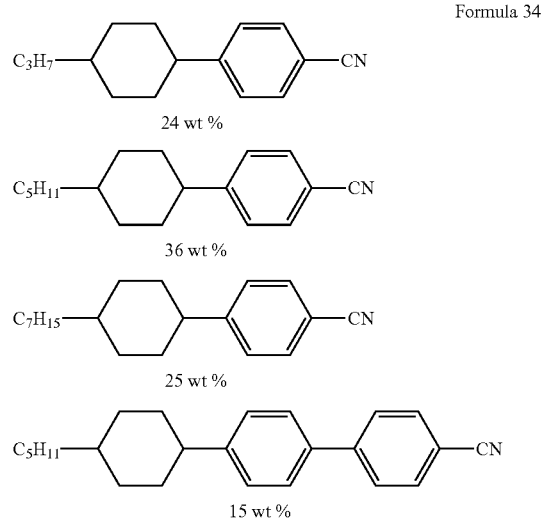

Formula 34

Physical properties of base liquid crystals i having a nematic phase (measuring methods were described below) were as described below: Isotropic temperature $(T_{NI})$=71.7° C., viscosity (η)=27.0 mPa·s, value of dielectric anisotropy (Δ∈)=11.0, value of optical anisotropy (Δn)=0.137.

Base Liquid Crystals ii:

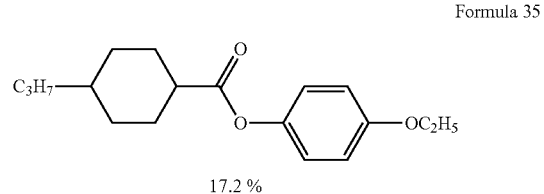

Formula 35

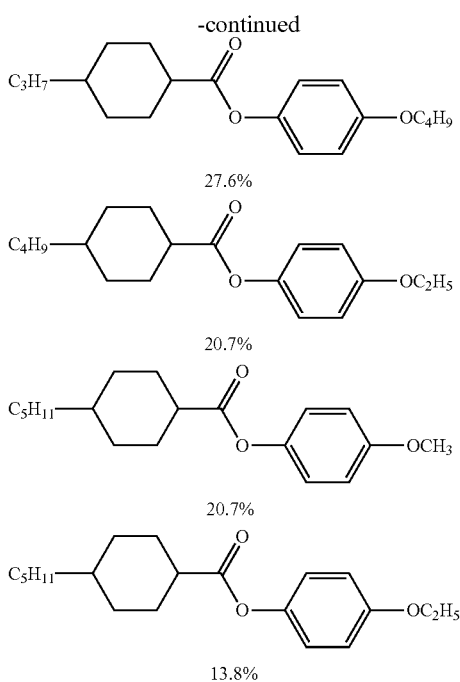

Physical properties of base liquid crystals ii having a nematic phase (measuring methods were described below.) were as described below: Isotropic temperature $(T_{NI})$=74.6° C., viscosity ($\eta$)=18.9 mPa·s, value of dielectric anisotropy ($\Delta\varepsilon$)=−1.3, value of optical anisotropy ($\Delta n$)=0.087.

Measuring Method

Values of physical properties of a liquid crystal compound and a liquid crystal composition obtained in Examples and so forth were determined according to the methods described below. Most of the measuring methods are applied as described in EIAJ ED-2521A of the Standard of Electronic Industries Association of Japan, or as modified thereon. Moreover, no TFT was attached to a TN device used for measurement.

Among measured values, in the case of values obtained using a liquid crystal compound per se as a sample, and values obtained using a liquid crystal composition per se as a sample, the values obtained were described as were. In the case of a sample formed by mixing a liquid crystal compound with base liquid crystals, values obtained according to the extrapolation method were described.

Phase Structure and Phase Transition Temperature (° C.)

A phase structure was specified and a phase transition temperature was measured by methods (1) and (2) as described below.

(1) A sample was placed on a hot plate of a melting point apparatus (FP-52 Hot Stage made by Mettler Toledo International Inc.) equipped with a polarizing microscope, and a state of phase and a transition thereof were observed with the polarizing microscope while heating the sample at a rate of 3° C. per minute, and a kind of the phase was specified.

(2) A sample was heated and then cooled at a rate of 3° C. per minute using a differential scanning calorimeter, DSC-7 System or Diamond DSC System, made by PerkinElmer, Inc. A starting point (on set) of an endothermic peak or an exothermic peak caused by a phase transition of the sample was determined by an extrapolation method, and thus a phase transition temperature was determined.

Hereinafter, the crystals were expressed as Cr, and when the crystals were further distinguishable, each of the crystals was expressed as $Cr_1$ or $Cr_2$. The smectic phase was expressed as Sm and a nematic phase as N. An isotropic liquid (isotropic) was expressed as Iso. When smectic B phase or smectic A phase was distinguishable between the smectic phases, the phases were expressed as SmB or SmA, respectively. As an expression of the phase transition temperature, for example, "Cr 50.0 N 100.0 Iso" shows that a phase transition temperature (CN) from the crystals to the nematic phase is 50.0° C., and a phase transition temperature (NI) from the nematic phase to the isotropic liquid is 100.0° C. A same rule applied to other expressions.

Maximum Temperature of a Nematic Phase ($T_{NI}$; ° C.)

A sample (a liquid crystal composition, or a mixture of a liquid crystal compound and base liquid crystals) was placed on a hot plate of a melting point apparatus (FP-82 Hot Stage made by Mettler Toledo International Inc.) equipped with a polarizing microscope, and was observed with the polarizing microscope while heating the sample at a rate of 1° C. per minute. Temperature when part of the sample changed from the nematic phase to the isotropic liquid was described as a maximum temperature of the nematic phase. As described above, a higher limit of the temperature range of the nematic phase may be occasionally abbreviated simply as "maximum temperature."

Minimum Temperature of a Nematic Phase ($T_c$; ° C.)

Samples each having a nematic phase were kept in freezers at 0° C., −10° C., −20° C., −30° C. and −40° C. for 10 days, and then liquid crystal phases were observed. For example, when a sample maintained the nematic phase at −20° C. and changed to crystals or a smectic phase at −30° C., $T_c$ was expressed as $T_c$≤−20° C. As described above, a lower limit of the temperature range of the nematic phase may be occasionally abbreviated as "minimum temperature."

Viscosity (Bulk Viscosity; $\eta$; Measured at 20° C.; mPa·s)

A cone-plate (E type) rotational viscometer was used for measurement of bulk viscosity ($\eta$).

Dielectric Anisotropy ($\Delta\varepsilon$; Measured at 25° C.)

A value of dielectric anisotropy was determined by a method as described below.

An ethanol (20 mL) solution of octadecyl triethoxysilane (0.16 mL) was applied to a well-washed glass substrate. After rotating the glass substrate with a spinner, the glass substrate was heated at 150° C. for 1 hour. A VA device in which a distance (cell gap) was 20 micrometers was assembled from two glass substrates.

In a similar manner, an alignment film of polyimide was formed on the glass substrate. After rubbing treatment was applied to the alignment film obtained on the glass substrate, a TN device in which a distance (cell gap) between two glass substrates was 9 micrometers and a twist angle was 80 degrees was assembled.

A sample (a liquid crystal composition, or a mixture of a liquid crystal compound and base liquid crystals) was put in the VA device obtained, a voltage of 0.5 V (1 kHz, sine waves) was applied to the device, and a dielectric constant ($\varepsilon_\parallel$) in the major axis direction of liquid crystal molecules was measured. Moreover, a sample (a liquid crystal composition, or a mixture of a liquid crystal compound and base liquid crystals)

was put in the TN device obtained, a voltage of 0.5 V (1 kHz, sine waves) was applied to the device, and a dielectric constant ($\in\perp$) in the minor axis direction of the liquid crystal molecules was measured. A value of dielectric anisotropy was calculated from an equation:

Δ∈=∈∥−∈⊥.

Optical Anisotropy (Δn, Measured at 25° C.)

Determination of a value of optical anisotropy was carried out by means of Abbe refractometer with a polarizing plate mounted on an ocular by using light at a wavelength of 589 nanometers at a temperature of 25° C. A surface of a main prism was rubbed in one direction, and then a sample (a liquid crystal composition, or a mixture of a liquid crystal compound and base liquid crystals) was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy (Δn) was calculated from an equation:

Δn=n∥−n⊥

Elastic Constant ($K_{11}$, $K_{33}$; Measured at 25° C.)

Elastic Constant Measurement System Model EC-1 (made by TOYO Corporation) was used for measurement of an elastic constant. A sample was put in a vertical alignment cell in which a distance (cell gap) between two glass substrates was 20 micrometers. A voltage from 20 V to 0 V was applied to the cell, and electrostatic capacity and applied voltage were measured. Measured values of the electrostatic capacity (C) and the applied voltage (V) were fitted to equation (2.98) and equation (2.101) on page 75 of "Liquid Crystal Device Handbook" (Ekisho Debaisu Handobukku in Japanese) (The Nikkan Kogyo Shimbun, Ltd.) and a value of elastic constant was obtained from equation (2.100).

Examples of Liquid Crystal Compounds

Examples and so forth of liquid crystal compounds will be shown below.

Example 1

Synthesis of trans-4-(2-(4-(trans-4-propylcyclohexyl)phenoxy)-2,2-difluoroethoxy)-2,3-difluoroethoxybenzene (compound (1-3-3-3))

Formula 36

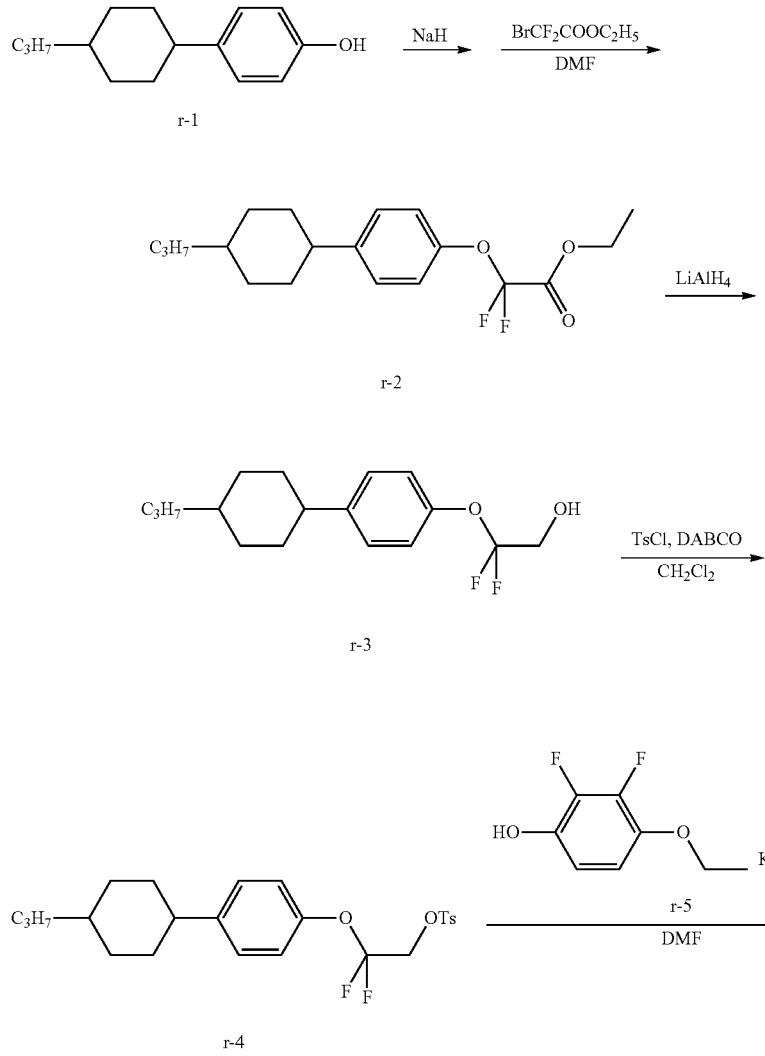

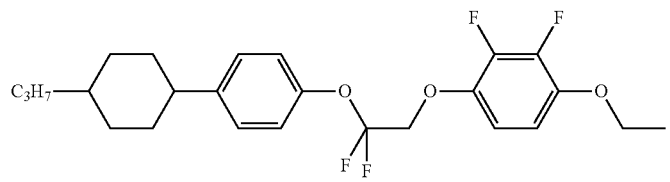

1-3-3-3

First Step

Under a nitrogen atmosphere, 15 g of 4-(4-propylcyclohexyl)phenol (compound (r-1)) was dissolved into 200 mL of DMF, 2.75 g of sodium hydride (60%) was added under ice-cooling, and the resultant mixture was stirred at 50° C. for 1 hour. Thereto, 13.9 g of ethyl bromodifluoroacetate dissolved in 50 mL of DMF was added, and the resultant mixture was stirred under heating reflux for 2 hours. A reaction mixture was poured into water, subjected to extraction with toluene, and extracted organic layers were combined and washed with saturated brine, and then dried over anhydrous magnesium sulfate. A solvent was evaporated under reduced pressure, the resultant residue was purified by silica gel column chromatography (eluate:heptane/ethyl acetate (=7/3 in a volume ratio)), and thus 18.4 g of ethyl 2-(4-(trans-4-propylcyclohexyl)phenoxy-2,2-difluoroacetate (compound (r-2)) was obtained.

Second Step

Under a nitrogen atmosphere, 6.0 g of compound (r-2) dissolved in 50 mL of THF was added dropwise under ice-cooling to 0.67 g of lithium aluminum hydride dispersed in 50 mL of tetrahydrofuran (THF), and the resultant mixture was stirred at room temperature for 3 hours. To a reaction mixture, 100 mL of toluene was added, and a saturated aqueous solution of sodium sulfate was further added until a gum-like precipitate was formed. An organic layer and a gum-like substance were separated by decantation, and the organic layer was dried over anhydrous magnesium sulfate. A solvent was evaporated, and thus 5.2 g of 2-(4-(trans-4-propylcyclohexyl)phenoxy-2,2-difluoroethanol (compound (r-3)) was obtained.

Third Step

Under a nitrogen atmosphere, 2.8 g of p-toluenesulfonyl chloride was added under ice-cooling to 4.0 g of compound (r-3) dissolved in 15 mL of dichloromethane, and subsequently 6.0 g of diazabicyclo[2.2.2]octane (DABCO) dissolved in 15 mL of dichloromethane was added, and the resultant mixture was stirred at room temperature overnight. Under ice-cooling, 6 M hydrochloric acid was added dropwise, the resultant mixture was subjected to extraction with dichloromethane, and extracted organic layers were combined and washed with saturated brine and 1 M hydrochloric acid, and then dried over anhydrous magnesium sulfate. A solvent was evaporated under reduced pressure, and the resultant residue was purified by fractionation on silica gel column chromatography (eluate: toluene), and thus 6.4 g of 2-(4-(trans-4-propylcyclohexyl)phenoxy-2,2-difluoroethyl 4-methylbenzenesulfonate (compound (r-4)) was obtained.

Fourth Step

Under a nitrogen atmosphere, 1.64 g of potassium carbonate and 0.38 g of tetrabutylammonium bromide (TBAB) were added to 2.1 g of 4-ethoxy-2,3-difluorophenol (compound (r-5)) dissolved in 50 mL of DMF, 4.5 g of compound (r-4) dissolved in 20 mL of DMF was added thereto, and the resultant mixture was stirred under heating reflux for 4 hours. Water was added dropwise to terminate a reaction, the resultant reaction mixture was subjected to extraction with toluene, and extracted organic layers were combined and washed with saturated brine, and then dried over anhydrous magnesium sulfate. A solvent was evaporated under reduced pressure, and the resultant residue was purified by fractionation by means of silica gel column chromatography (eluate:heptane/toluene (=1/1 in a volume ratio)), and further purified by recrystallization from heptane/Solmix (registered tradename) A-11 (=1/2 in a volume ratio), and thus 1.25 g of trans-4-(2-(4-(trans-4-propylcyclohexyl)phenoxy)-2,2-difluoroethoxy)-2,3-difluoroethoxybenzene (compound (1-3-3-3)) was obtained.

$^1$H-NMR (CDCl$_3$, δ (ppm)); 7.20 (d, 2H), 7.14 (d, 2H), 6.82 (td, 1H), 6.67 (td, 1H), 4.44 (t, 2H), 4.10 (q, 2H), 2.49 (tt, 1H), 1.92-1.88 (m, 4H), 1.48 (t, 3H), 1.46-1.22 (m, 7H), 1.11-1.05 (m, 2H), 0.95 (t, 3H).

As a transition temperature, an intrinsic value of compound (1-3-3-3) was described, and as a maximum temperature ($T_{NI}$), a value of dielectric anisotropy (Δ∈) and a value of optical anisotropy value (Δn), extrapolated values obtained by converting according to the extrapolation method measured values of a sample prepared by mixing compound (1-3-3-3) and base liquid crystals ii were described. Values of physical properties of compound (1-3-3-3) were as described below.

Transition temperature: Cr 66.4 (SmA 52.6) Iso. $T_{NI}$=47.9° C., Δ∈=−6.67, Δn=0.106.

Example 2

Synthesis of trans-4-(4-(2-(4-(trans-4-propylcyclohexyl)phenoxy)-2,2-difluoroethoxy)-2,3-difluorophenyl)-2,3-difluoroethoxybenzene (compound (1-5-4-6))

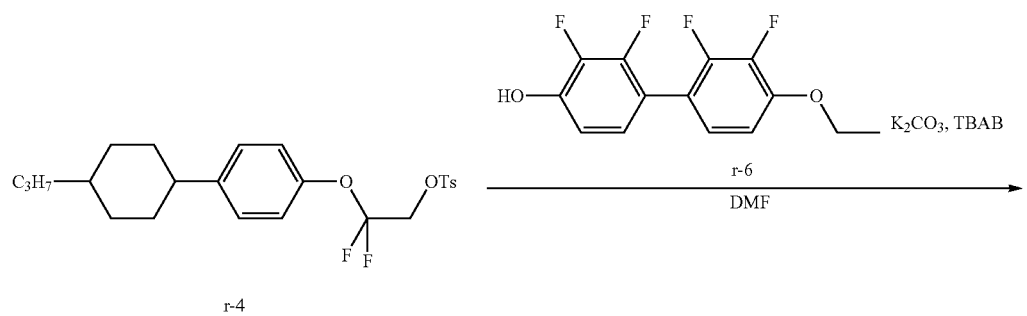

Formula 37

1-5-4-6

Under a nitrogen atmosphere, 1.4 g of potassium carbonate and 0.33 g of TBAB were added to 3.8 g of 4-(4-ethoxy-2,3-difluorophenyl)-2,3-difluorophenol (compound (r-6)) dissolved in 50 mL of DMF, 3.8 g of compound (r-4) dissolved in 20 mL of DMF was added thereto, and the resultant mixture was stirred under heating reflux for 10 hours. Water was added dropwise to terminate a reaction, the resultant reaction mixture was subjected to extraction with toluene, and extracted organic layers were combined and washed with saturated brine, and then dried over anhydrous magnesium sulfate. A solvent was evaporated under reduced pressure, and the resultant residue was purified by fractionation on silica gel column chromatography (eluate:heptane/toluene (=1/1 in a volume ratio)), and further purified by recrystallization from heptane/Solmix (registered tradename) A-11 (=1/1 in a volume ratio), and thus 2.06 g of trans-4-(4-(2-(4-(trans-4-propylcyclohexyl)phenoxy)-2,2-difluoroethoxy)-2,3-difluorophenyl)-2,3-difluoroethoxybenzene (compound (1-5-4-6)) was obtained.

$^1$H-NMR (CDCl$_3$, δ (ppm)); 7.22 (d, 2H), 7.16 (d, 2H), 7.10-7.03 (m, 2H), 6.95 (td, 1H), 6.83 (td, 1H), 4.55 (t, 2H), 4.20 (q, 2H), 2.49 (tt, 1H), 1.92-1.87 (m, 4H), 1.53 (t, 3H), 1.46-1.22 (m, 7H), 1.12-1.05 (m, 2H), 0.94 (t, 3H).

As a transition temperature, an intrinsic value of compound (1-5-4-6) was described, and as a maximum temperature ($T_{NI}$), a value of dielectric anisotropy (Δ∈) and a value of optical anisotropy value (Δn), extrapolated values obtained by converting according to the extrapolation method measured values of a sample prepared by mixing compound (1-5-4-6) and base liquid crystals ii were described. Values of physical properties of compound (1-5-4-6) were as described below.

Transition temperature: Cr 109.0 N 121.9 Iso. $T_{NI}$=114.6° C., Δ∈=−9.49, Δn=0.166.

Example 3

Synthesis of trans-4-(2-(4-(4-(trans-4-propylcyclohexyl)cyclohexyl)-2,6-difluorophenoxy)-difluoroethoxy)-3,4,5-trifluoro benzene (compound (1-4-2-2))

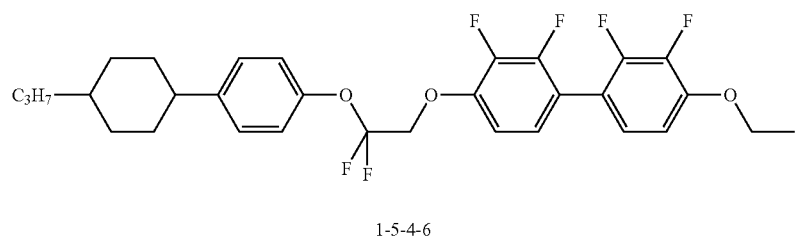

Formula 38

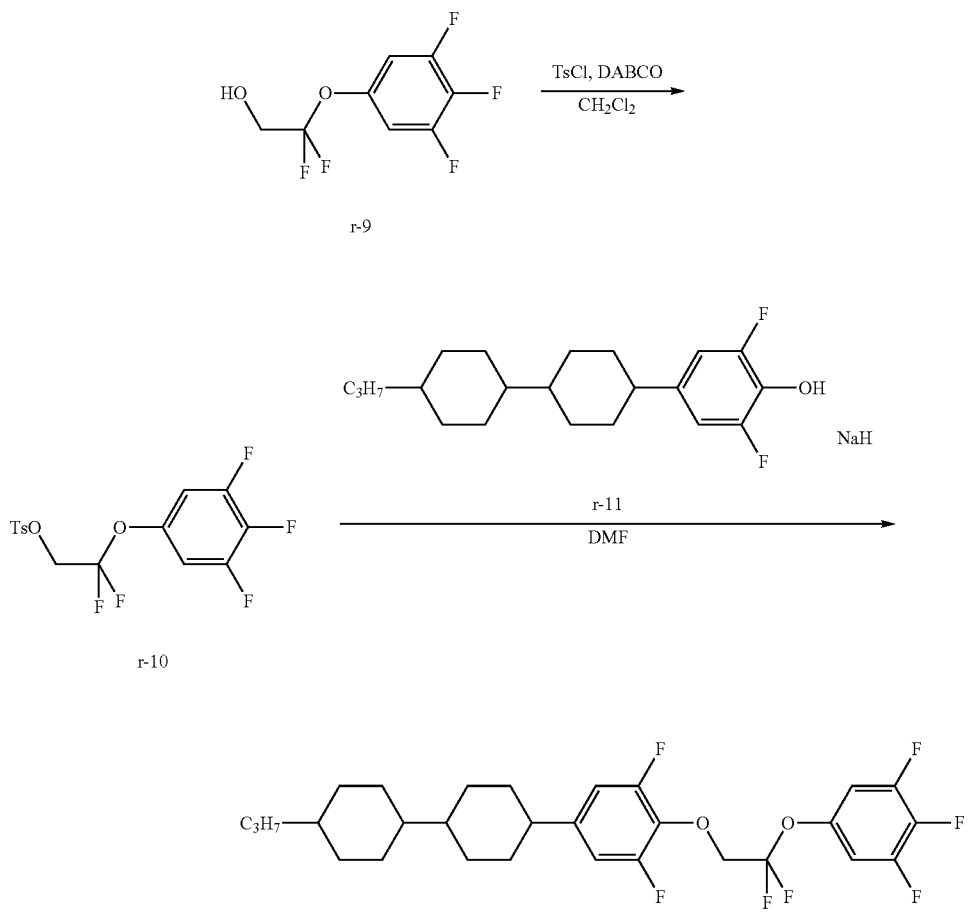

First Step

Under a nitrogen atmosphere, 17 g of potassium carbonate and 4.0 g of TBAB were added to 18 g of 3,4,5-trifluorophenol (r-7) dissolved in 200 mL of DMF, 25.0 g of ethyl bromodifluoroacetate dissolved in 50 mL of DMF was added thereto, and the resultant mixture was stirred at 90° C. for 3 hours. A reaction mixture was poured into water, subjected to extraction with diethyl ether, and extracted organic layers were combined and washed with saturated brine, and then dried over anhydrous magnesium sulfate. A solvent was evaporated under reduced pressure, and thus 22.8 g of ethyl 2-(3,4,5-trifluorophenoxy)-2,2-difluoroacetate (compound (r-8)) was obtained.

Second Step

Under a nitrogen atmosphere, 22.8 g of compound (r-8) dissolved in 100 mL of THF was added dropwise under ice-cooling to 3.21 g of lithium aluminum hydride dispersed in 150 mL of THF, and the resultant mixture was stirred at room temperature for 3 hours. To a reaction mixture, 200 mL of toluene was added, and a saturated aqueous solution of sodium sulfate was further added until a gum-like precipitate was formed. An organic layer and a gum-like substance were separated by means of decantation, and the organic layer was dried over anhydrous magnesium sulfate. A solvent is evaporated, and thus 14.6 g of 2-(3,4,5-trifluorophenoxy)-2,2-difluoroethanol (compound (r-9)) was obtained.

Third Step

Under a nitrogen atmosphere, 13.4 g of p-toluenesulfonyl chloride was added under ice-cooling to 14.6 g of compound (r-9) dissolved in 100 mL of dichloromethane, and subsequently 28.7 g of DABCO dissolved in 100 mL of dichloromethane was added, and the resultant mixture was stirred at room temperature overnight. Under ice-cooling, 6 M hydrochloric acid was added dropwise, the resultant mixture was subjected to extraction with dichloromethane, and extracted organic layers were combined and washed with saturated brine and 1 M hydrochloric acid, and then dried over anhydrous magnesium sulfate. A solvent was evaporated under reduced pressure, and the resultant residue was purified by fractionation by means of silica gel column chromatography (eluate: toluene), and thus 11.0 g of 2-(3,4,5-trifluorophenoxy)-2,2-difluoroethyl 4-methylbenzenesulfonate (compound (r-10)) was obtained.

Fourth Step

Under a nitrogen atmosphere, 0.43 g of sodium hydride (60%) was added to 3.0 g of 4-(4-(4-propylcyclohexyl)cyclohexyl)-2,6-difluorophenol (compound (r-11)) dissolved in 50 mL of DMF, and the resultant mixture was stirred at 50° C. for 1 hour. Thereto, 4.09 g of compound (r-10) dissolved in 20 mL of DMF was added, and the resultant mixture was stirred under heating reflux for 6 hours. Water was added dropwise to terminate a reaction, the resultant reaction mixture was subjected to extraction with toluene, and extracted organic layers were combined and washed with saturated brine, and then dried over anhydrous magnesium sulfate. A solvent was evaporated under reduced pressure, and the resultant residue was purified by fractionation on silica gel column chromatography (eluate:heptane/toluene (=4/1 in a volume ratio)), and further purified by recrystallization from heptane/Solmix (registered tradename) A-11 (=1/3 in a volume ratio), and thus 0.72 g of trans-4-(2-(4-(4-(trans-4-propylcyclohexyl)cyclohexyl)-2,6-difluorophenoxy)-difluoroethoxy)-3,4,5-trifluorobenzene (compound (1-4-2-2)) was obtained.

$^1$H-NMR (CDCl$_3$, δ (ppm)); 6.90 (dd, 2H), 6.77 (dd, 2H), 4.44 (t, 2H), 2.38 (tt, 1H), 1.90-1.71 (m, 8H), 1.37-1.27 (m, 4H), 1.15-0.95 (m, 9H), 0.86 (q, 2H), 0.85 (t, 3H).

As a transition temperature, an intrinsic value of compound (1-4-2-2) was described, and as a maximum temperature ($T_{NI}$), a value of dielectric anisotropy (Δ∈) and a value of optical anisotropy value (Δn), extrapolated values obtained by converting according to the extrapolation method measured values of a sample prepared by mixing compound (1-4-2-2) and base liquid crystals i were described. Values of physical properties of compound (1-4-2-2) were as described below.

Transition temperature: Cr$_1$ 59.1 Cr$_2$ 69.5 N 118.8 Iso. $T_{NI}$=91.0° C., Δ∈=16.8, Δn=0.097.

Example 4

Synthesis of trans-4-(2-(4-(4-(trans-4-propylcyclohexyl)phenyl)-2-fluorophenoxy)-difluoroethoxy)-3,4,5-trifluorobenzene (compound (1-4-3-2))

Formula 39

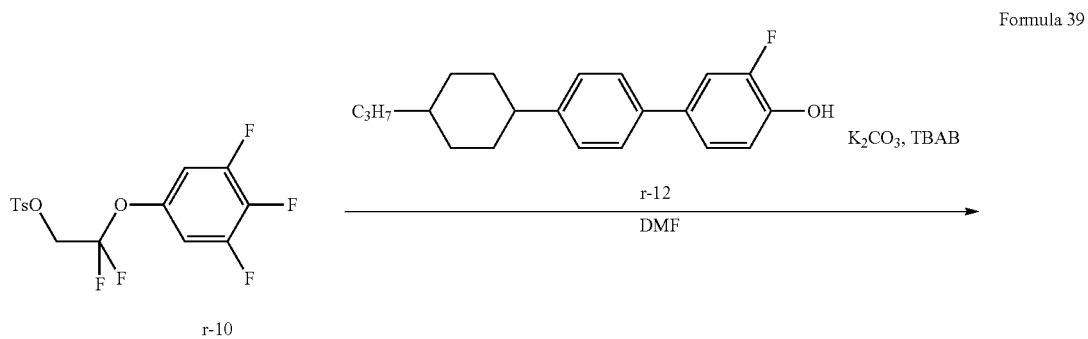

r-10

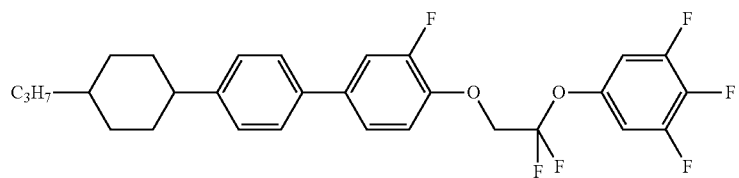

1-4-3-2

Under a nitrogen atmosphere, 1.6 g of potassium carbonate and 0.74 g of TBAB were added to 3.0 g of 4-(4-(4-propylcyclohexyl)phenyl)-2-fluorophenol (compound (r-12)) dissolved in 50 mL of DMF, 3.67 g of compound (r-10) dissolved in 30 mL of DMF was further added thereto, and the resultant mixture was stirred under heating reflux for 4 hours. Water was added dropwise to terminate a reaction, the resultant reaction mixture was subjected to extraction with toluene, and extracted organic layers were combined and washed with saturated brine, and then dried over anhydrous magnesium sulfate. A solvent was evaporated under reduced pressure, and the resultant residue was purified by fractionation on silica gel column chromatography (eluate:heptane/toluene (=7/3 in a volume ratio)), and further purified by recrystallization from heptane/Solmix (registered tradename) A-11 (=1/2 in a volume ratio), and thus 0.88 g of (trans-4-(2-(4-(4-(trans-4-propylcyclohexyl)phenyl)-2-fluorophenoxy)-difluoroethoxy)-3,4,5-trifluorobenzene (compound (1-4-3-2)) was obtained.

$^1$H-NMR (CDCl$_3$, δ (ppm)); 7.45 (d, 2H), 7.34 (dd, 1H), 7.28 (d, 2H), 7.30-7.27 (m, 1H), 7.10 (t, 1H), 6.91 (dd, 2H), 4.49 (t, 2H), 2.50 (tt, 1H), 1.93-1.86 (m, 4H), 1.52-1.44 (m, 2H), 1.38-1.28 (m, 3H), 1.24-1.20 (m, 2H), 1.10-1.02 (m, 2H), 0.91 (t, 3H).

As a transition temperature, an intrinsic value of compound (1-4-3-2) was described, and as a maximum temperature ($T_{NI}$), a value of dielectric anisotropy ($\Delta\epsilon$) and a value of optical anisotropy value ($\Delta n$), extrapolated values obtained by converting according to the extrapolation method measured values of a sample prepared by mixing compound (1-4-3-2) and base liquid crystals i were described. Values of physical properties of compound (1-4-3-2) were as described below.

Transition temperature: $Cr_1$ 32.4 $Cr_2$ 58.7 SmB 64.9 SmA 89.9 N 131.8 Iso. $T_{NI}$=108.4° C., $\Delta\epsilon$=13.5, $\Delta n$=0.144.

Example 5

Synthesis of (2-(4-(4-pentylphenyl)-2-fluorophenyloxy)-1,1-difluoroethoxy-4-(3,4,5-trifluorophenyl)-3-fluorobenzene (compound (1-5-6-1))

First Step

Under a nitrogen atmosphere, 1.97 g of sodium hydride (60 wt %) was added to 11.93 g of 4-(3,4,5-trifluorophenyl)-3-fluorophenol (r-12) dissolved in 100 mL of DMF, and the resultant mixture was stirred at room temperature for 1 hour. Thereto, 10 g of ethyl bromodifluoroacetate dissolved in 50 mL of DMF was added, and the resultant mixture was stirred at 60° C. for 2 hours. A reaction mixture was poured into water, subjected to extraction with diethyl ether, and extracted organic layers were combined and washed with saturated brine, and then dried over anhydrous magnesium sulfate. A solvent was evaporated under reduced pressure, and the resultant residue was purified by fractionation on silica gel column chromatography (eluate:hexane/toluene (=1/1 in a volume ratio)), and thus 9.2 g of ethyl 2-(4-(3,4,5-trifluorophenyl)-3-fluorophenyloxy)-2,2-difluoroacetate (compound (r-13)) was obtained.

Second Step

Under a nitrogen atmosphere, 9.2 g of compound (r-13) dissolved in 40 mL of THF was added dropwise under ice-cooling to 0.96 g of lithium aluminum hydride dispersed in 50

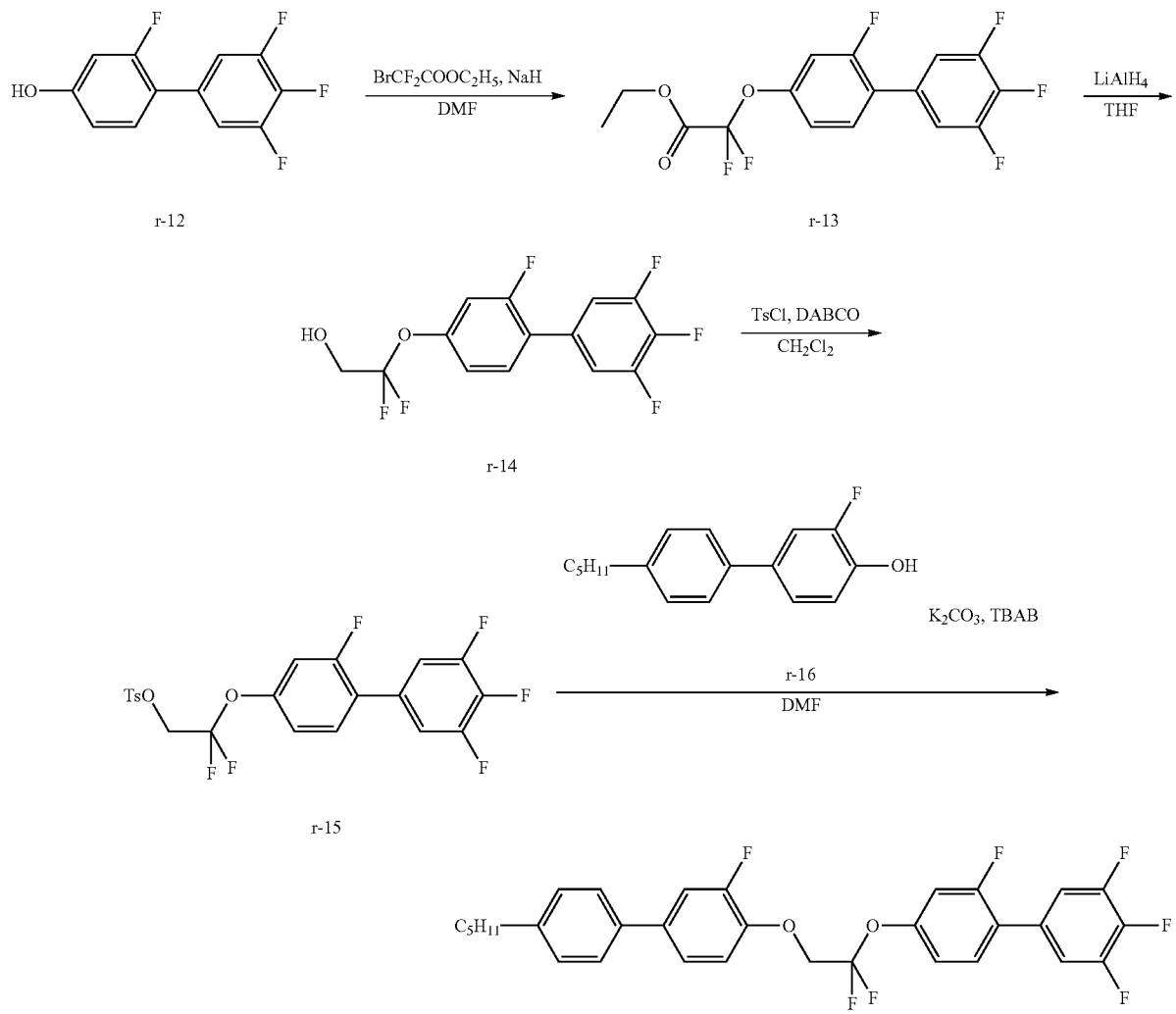

Formula 40 mL of THF, and the resultant mixture was stirred at room temperature for 3 hours. To a reaction mixture, 70 mL of toluene was added, and a saturated aqueous solution of sodium sulfate was further added until a gum-like precipitate was formed. An organic layer and a gum-like substance were separated by decantation, and the organic layer was dried over anhydrous magnesium sulfate. A solvent is evaporated, and thus 7.08 g of 2-(4-(3,4,5-trifluorophenyl)-3-fluorophenyloxy)-2,2-difluoroethanol (compound (r-14)) was obtained.

Third Step

Under a nitrogen atmosphere, 4.19 g of p-toluenesulfonyl chloride was added under ice-cooling to 7.08 g of compound (r-14) dissolved in 50 mL of dichloromethane, and subsequently 9.86 g of DABCO dissolved in 50 mL of dichloromethane was added, and the resultant mixture was stirred at room temperature overnight. Under ice-cooling, 6 M hydrochloric acid was added dropwise, the resultant mixture was subjected to extraction with dichloromethane, and extracted organic layers were combined and washed with saturated brine and 1 M hydrochloric acid, and then dried over anhydrous magnesium sulfate. A solvent was evaporated under reduced pressure, and the resultant residue was purified by fractionation on silica gel column chromatography (eluate: toluene), and thus 11.0 g of 2-(4-(3,4,5-trifluorophenyl)-3-fluorophenyloxy)-2,2-difluoroethyl 4-methylbenzenesulfonate (compound (r-15)) was obtained.

Fourth Step

Under a nitrogen atmosphere, 1.16 g of potassium carbonate and 0.27 g of TBAB were added to 3.0 g of 4-(4-pentylphenyl)-2-fluorophenol (compound (r-16)) dissolved in 25 mL of DMF, 3.33 g of compound (r-15) was added to the resultant suspension, and the resultant mixture was stirred under heating reflux for 6 hours. Water was added dropwise to terminate a reaction, the resultant reaction mixture was subjected to extraction with toluene, and extracted organic layers were combined and washed with saturated brine, and then dried over anhydrous magnesium sulfate. A solvent was evaporated under reduced pressure, and the resultant residue was purified by fractionation on silica gel column chromatography (eluate:heptane/toluene (=7/3 in a volume ratio)), and further purified by recrystallization from heptane/Solmix (registered tradename) A-11 (=1/3 in a volume ratio), and thus 0.85 g of (2-(4-(4-pentylphenyl)-2-fluorophenyloxy)1,1-difluoroethoxy)-4-(3,4,5-trifluorophenyl)-3-fluorobenzene (compound (1-5-6-1)) was obtained.

$^1$H-NMR (CDCl$_3$, δ (ppm)); 7.44 (dd, 2H), 7.36 (dd, 1H), 7.34 (t, 1H), 7.30 (d, 1H), 7.25 (dd, 2H), 7.16-7.08 (m, 5H), 4.53 (t, 2H), 2.64 (t, 2H), 1.64 (quin, 2H), 1.37-1.33 (m, 4H), 0.90 (t, 3H).

As a transition temperature, an intrinsic value of compound (1-5-6-1) was described, and as a maximum temperature ($T_{NI}$), a value of dielectric anisotropy (Δ∈) and a value of optical anisotropy value (Δn), extrapolated values obtained by converting according to the extrapolation method measured values of a sample prepared by mixing compound (1-5-6-1) and base liquid crystals i were described. Values of physical properties of compound (1-5-6-1) were as described below.

Transition temperature: Cr 76.5 Iso. $T_{NI}$=52.4° C., Δ∈=21.8, Δn=0.164.

Example 6

Synthesis of (2-(4-(trans-4-propylcyclohexyl)-2-fluoro phenyloxy)-1,1-difluoroethoxy)-4-(3,4,5-trifluorophenyl)-3-fluorobenzene (compound (1-5-5-1))

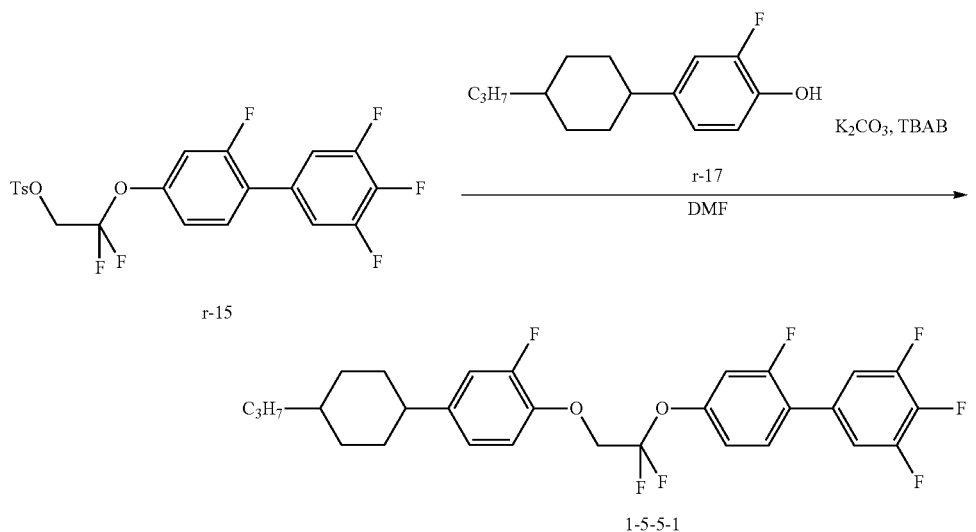

Formula 41

Under a nitrogen atmosphere, 1.16 g of potassium carbonate and 0.27 g of TBAB were added to 3.0 g of 4-(4-propylcyclohexyl-2-fluorophenol) (compound (r-17)) dissolved in 50 mL of DMF, 3.33 g of compound (r-15) dissolved in 25 mL of DMF was further added thereto, and the resultant mixture was stirred under heating reflux for 6 hours. A reaction mixture was poured into water to terminate a reaction, the resultant reaction mixture was subjected to extraction with toluene, and extracted organic layers were combined and washed with saturated brine, and then dried over anhydrous magnesium sulfate. A solvent was evaporated under reduced pressure, and the resultant residue was purified by fractionation on silica gel column chromatography (eluate:heptane/toluene (=9/1 in a volume ratio), and further purified by recrystallization from Solmix (registered tradename) A-11, and thus 0.40 g of (2-(4-(trans-4-propylcyclohexyl)-2-fluorophenyloxy)-1,1-difluoro ethoxy)-4-(3,4,5-trifluorophenyl)-3-fluorobenzene (compound (1-5-5-1)) was obtained.

$^1$H-NMR (CDCl$_3$, δ (ppm)); 7.36 (t, 1H), 7.17-7.07 (m, 4H), 7.00 (t, 1H), 6.98 (dd, 1H), 6.92 (dd, 1H), 4.47 (t, 2H), 2.42 (tt, 1H), 1.88-1.86 (m, 4H), 1.40-1.18 (m, 7H), 1.05-1.02 (m, 2H), 0.90 (t, 3H).

As a transition temperature, an intrinsic value of compound (1-5-5-1) was described, and as a maximum temperature ($T_{NI}$), a value of dielectric anisotropy (Δ∈) and a value of optical anisotropy value (Δn), extrapolated values obtained by converting according to the extrapolation method measured values of a sample prepared by mixing compound (1-5-5-1) and base liquid crystals i were described. Values of physical properties of compound (1-5-5-1) were as described below.

Transition temperature: Cr 71.7 (N 45.0) Iso. $T_{NI}$=46.4° C., Δ∈=19.4, Δn=0.117.

Comparative Example 1

Trans-4-(3-(4-(trans-4-propylcyclohexyl)phenoxy)-3,3-difluoropropyl)-2,3-difluoroethoxybenzene (Ex-1) being compound 201 disclosed in JP 2003-2858 A was prepared. Compound (Ex-1) has a structure similar to the structure of compound (1-3-3-3) prepared in Example 1, and an object is to compare values of dielectric anisotropy (Δ∈) between the compounds.

Formula 42

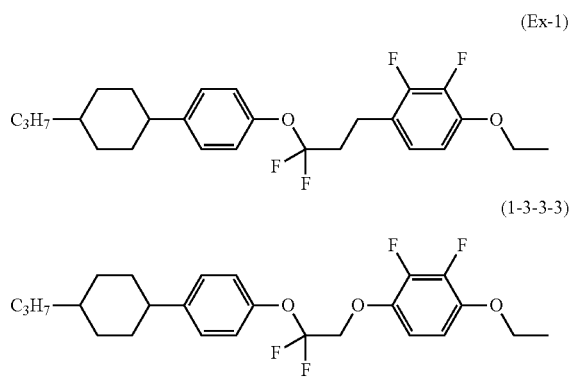

Chemical shifts δ (ppm) by means of $^1$H NMR analysis were as described below, and the compound obtained was identified to be trans-4-(3-(4-(trans-4-propylcyclohexyl)phenoxy)-3,3-difluoropropyl)-2,3-difluoroethoxybenzene (Ex-1).

$^1$H-NMR (CDCl$_3$, δ (ppm)); 7.17-7.07 (m, 4H), 6.87 (td, 1H), 6.67 (td, 1H), 4.10 (q, 2H), 2.94 (t, 2H), 2.48-2.38 (m, 3H), 1.86 (dd, 4H), 1.44 (t, 3H), 1.41-1.18 (m, 7H), 1.07-0.97 (m, 2H), 0.90 (t, 3H).

As a transition temperature, an intrinsic value of compound (Ex-1) was described below.

Transition temperature: Cr 51.2 N 98.1 Iso.

As a value of dielectric anisotropy (Δ∈) of compound (Ex-1), an extrapolated value obtained by converting according to the extrapolation method a measured value of a sample prepared by mixing compound (Ex-1) and base liquid crystals ii was described. Thus, Δ∈ of compound (Ex-1) was −4.88.

On the other hand, Δ∈ of compound (1-3-3-3) was −6.67. Accordingly, compound (1-3-3-3) has a larger negative value of dielectric anisotropy (Δ∈) than compound (Ex-1) has, and the findings show that compound (1-3-3-3) is useful as the liquid crystal compound.

Exemplification of Liquid Crystal Compounds

According to a method similar to the synthesis methods described in Examples 1 to 6, compounds as shown below can be prepared: compounds (1-1-1-1) to (1-1-1-24), (1-1-2-1) to (1-1-2-24), (1-2-1-1) to (1-2-1-24), (1-2-2-1) to (1-2-2-24), (1-2-3-1) to (1-2-3-24), (1-3-1-1) to (1-3-1-12), (1-3-2-1) to (1-3-2-24), (1-3-3-1) to (1-3-3-12), (1-3-4-1) to (1-3-4-24), (1-4-1-1) to (1-4-1-12), (1-4-2-1) to (1-4-2-12), (1-4-3-1) to (1-4-3-12), (1-4-4-1) to (1-4-4-12), (1-5-1-1) to (1-5-1-12), (1-5-2-1) to (1-5-2-12), (1-5-3-1) to (1-5-3-12), (1-5-4-1) to (1-5-4-12), (1-5-5-1) to (1-5-5-12), (1-5-6-1) to (1-5-6-12), (1-6-1-1) to (1-6-1-12), (1-6-2-1) to (1-6-2-12), (1-6-3-1) to (1-6-3-12), (1-6-4-1) to (1-6-4-12), (1-6-5-1) to (1-6-5-12) and (1-6-6-1) to (1-6-6-12). In addition, the liquid-crystal compounds prepared in Examples 1 to 6 are also exemplified.

Formula 43

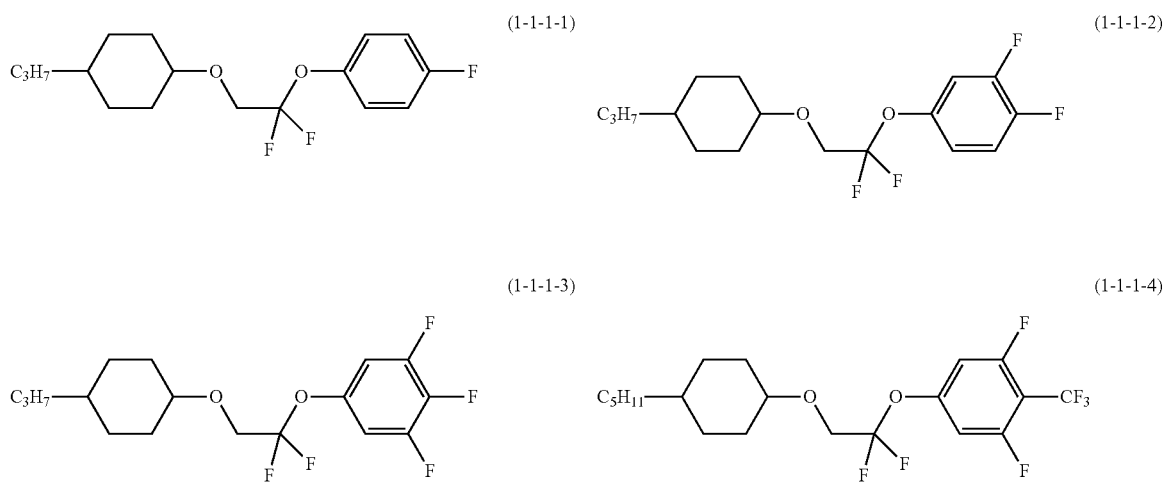

(1-1-1-5)
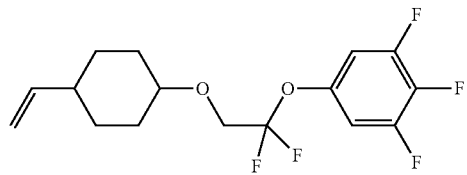
(1-1-1-6)
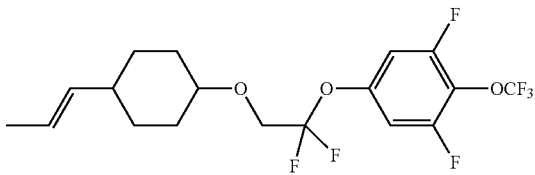
(1-1-1-7)
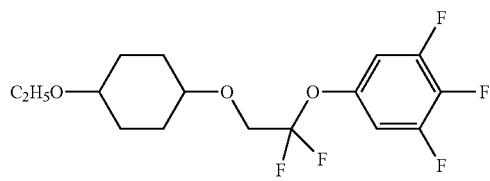
(1-1-1-8)
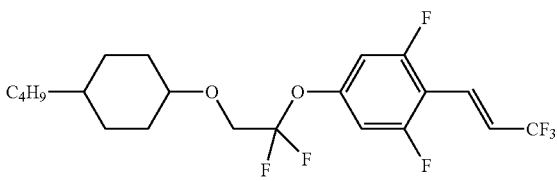
(1-1-1-9)
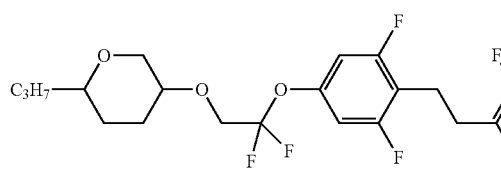
(1-1-1-10)
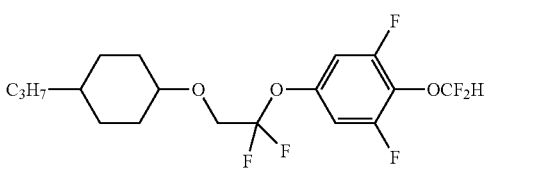
(1-1-1-11)
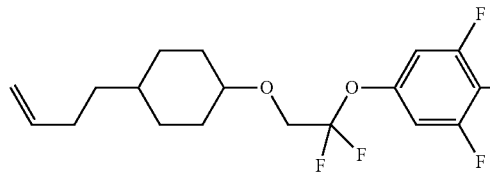
(1-1-1-12)
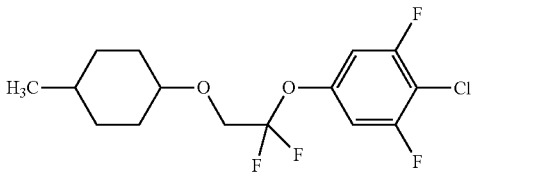
(1-1-1-13)
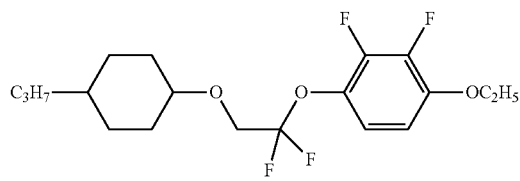
(1-1-1-14)
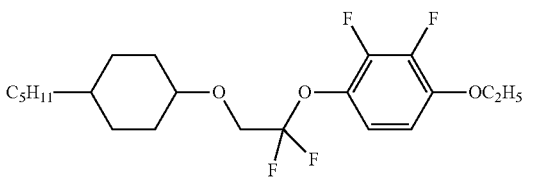
(1-1-1-15)
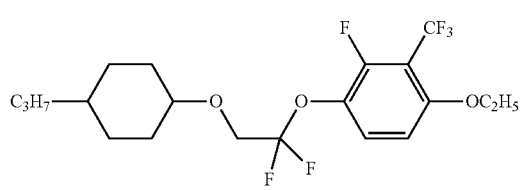
(1-1-1-16)
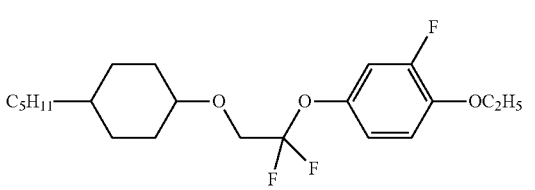
(1-1-1-17)
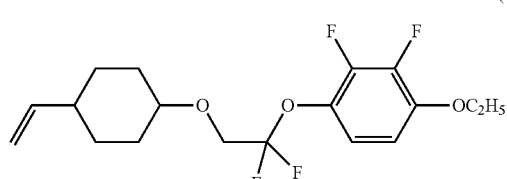
(1-1-1-18)
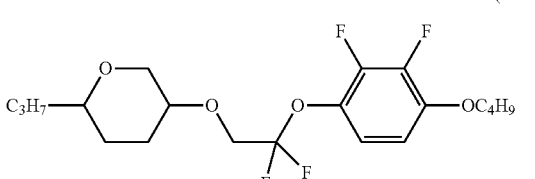
(1-1-1-19)
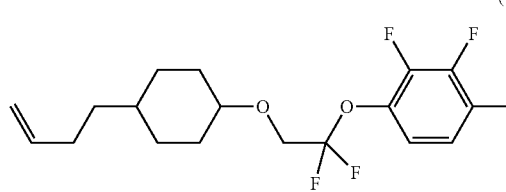
(1-1-1-20)
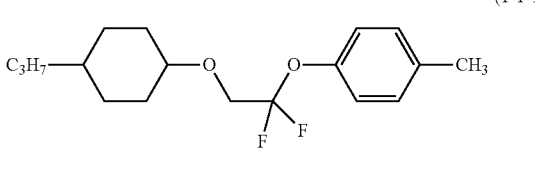

-continued
(1-1-1-21)
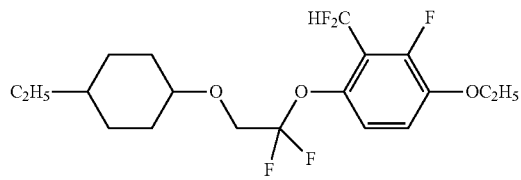
(1-1-1-22)
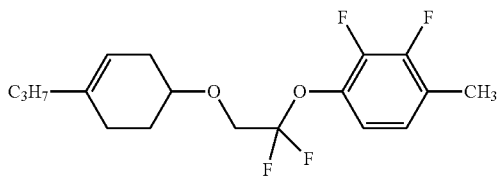
(1-1-1-23)
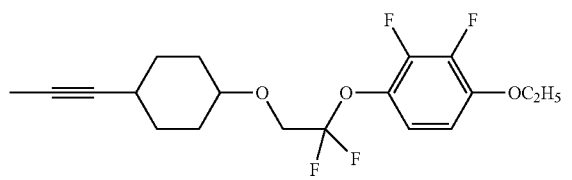
(1-1-1-24)
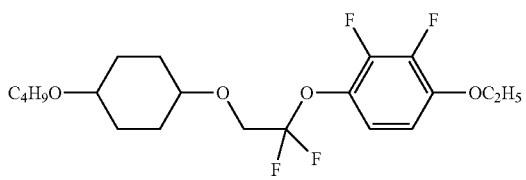
Formula 44
(1-1-2-1)
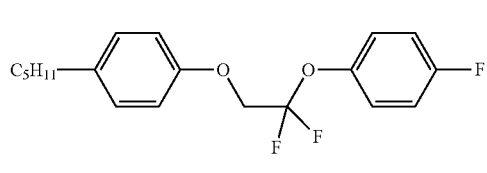
(1-1-2-2)
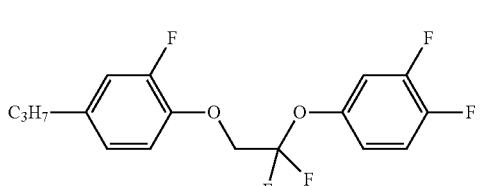
(1-1-2-3)
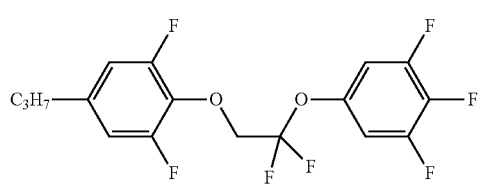
(1-1-2-4)
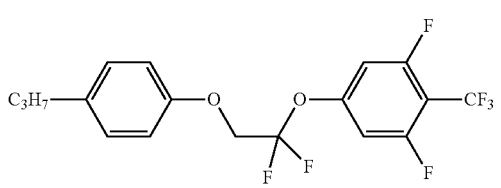
(1-1-2-5)
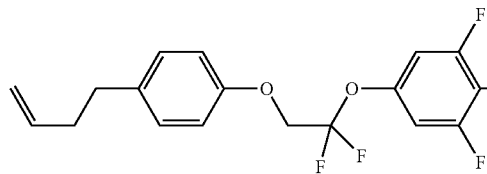
(1-1-2-6)
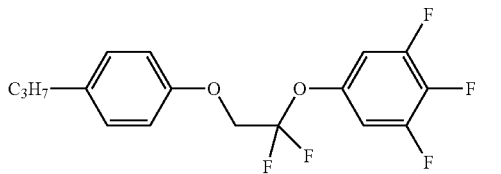
(1-1-2-7)
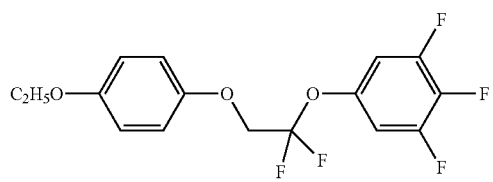
(1-1-2-8)
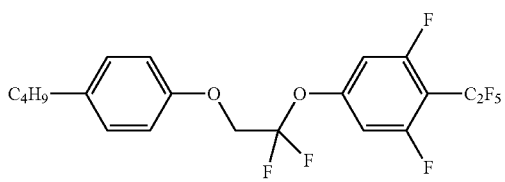
(1-1-2-9)
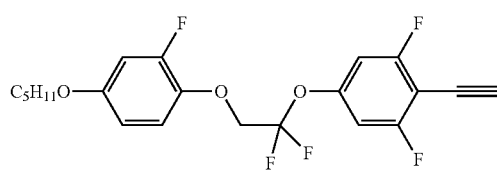
(1-1-2-10)
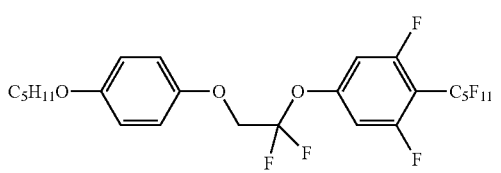
(1-1-2-11)
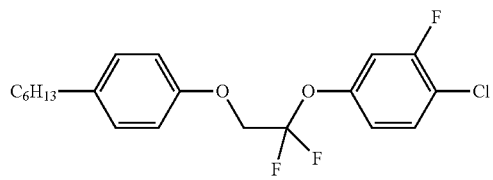
(1-1-2-12)
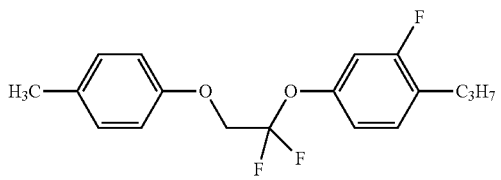

-continued
(1-1-2-13)
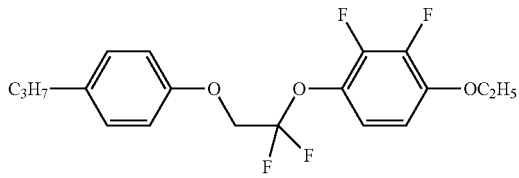
(1-1-2-14)
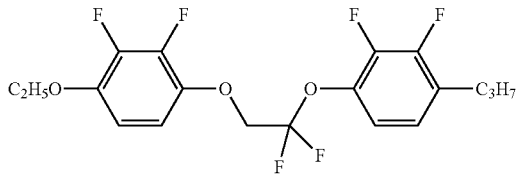
(1-1-2-15)
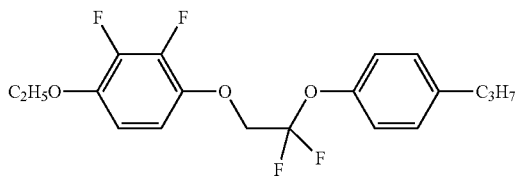
(1-1-2-16)
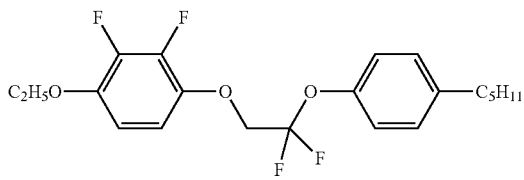
(1-1-2-17)
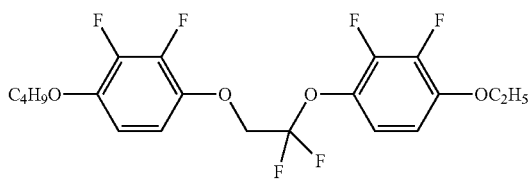
(1-1-2-18)
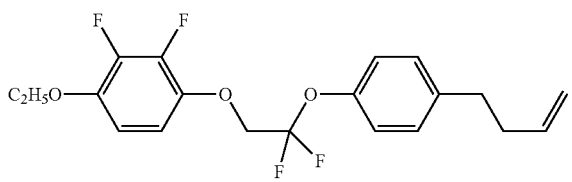
(1-1-2-19)
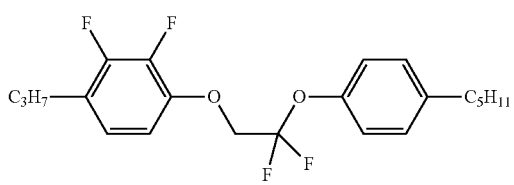
(1-1-2-20)
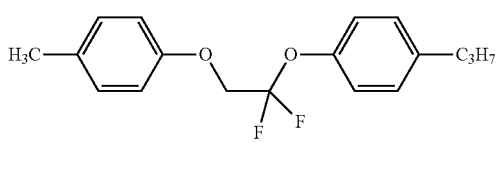
(1-1-2-21)
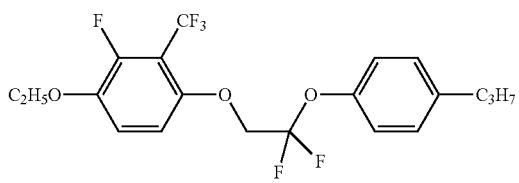
(1-1-2-22)
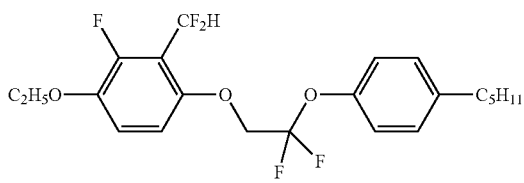
(1-1-2-23)
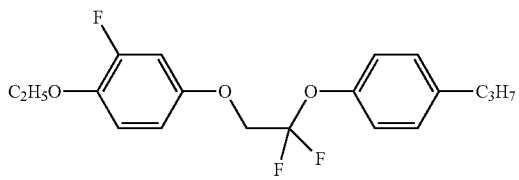
(1-1-2-24)
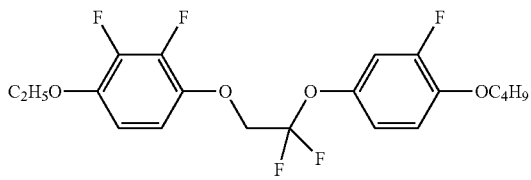
Formula 45
(1-2-1-1)
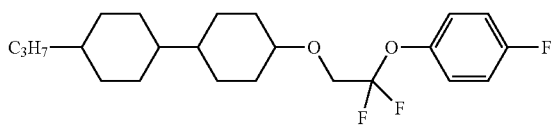
(1-2-1-2)
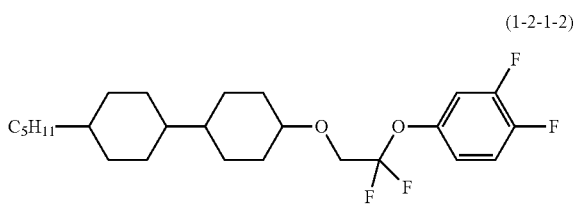
(1-2-1-3)
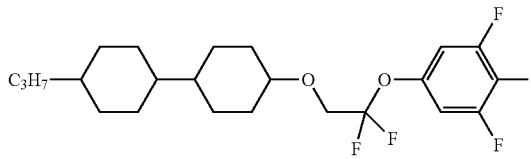
(1-2-1-4)
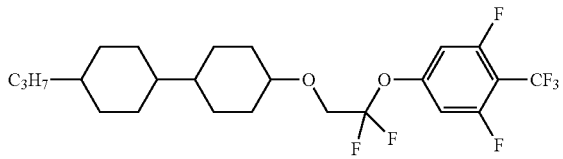

-continued
(1-2-1-5)
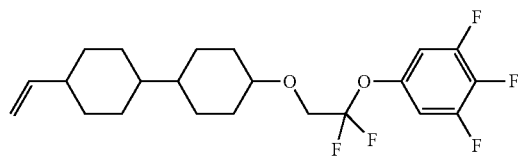
(1-2-1-6)
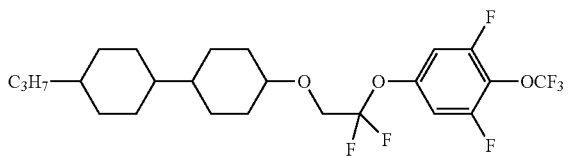
(1-2-1-7)
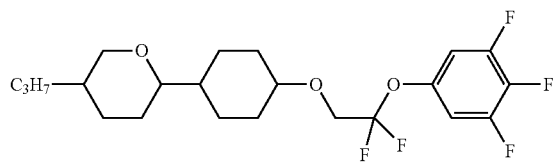
(1-2-1-8)
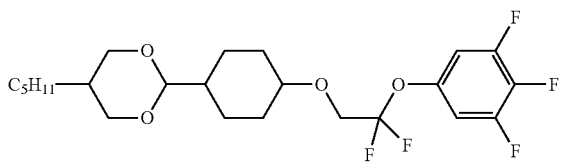
(1-2-1-9)
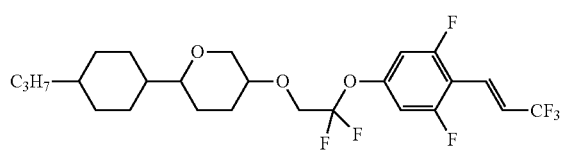
(1-2-1-10)
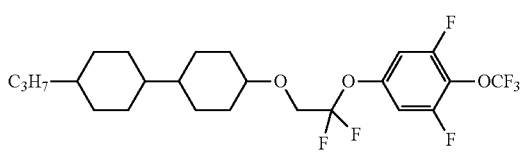
(1-2-1-11)
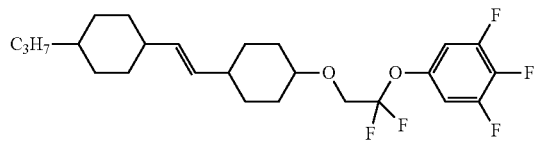
(1-2-1-12)
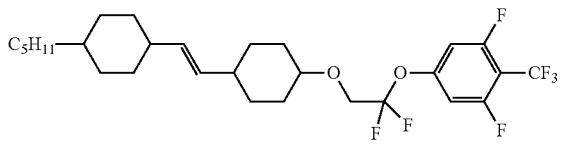
Formula 46
(1-2-1-13)
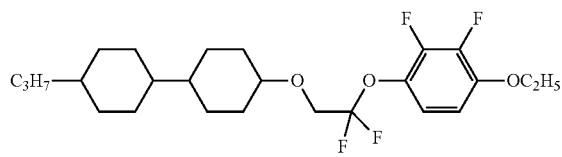
(1-2-1-14)
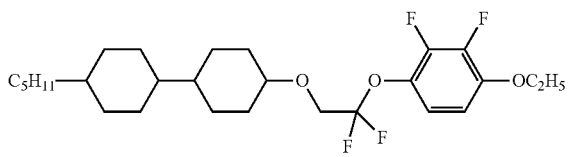
(1-2-1-15)
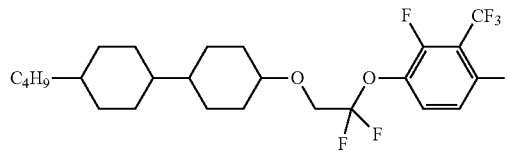
(1-2-1-16)
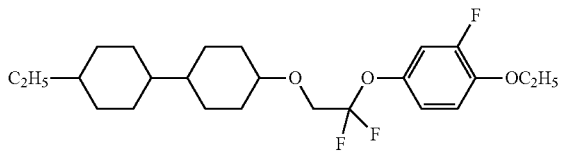
(1-2-1-17)
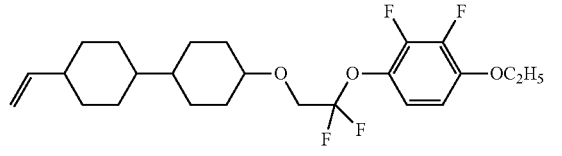
(1-2-1-18)
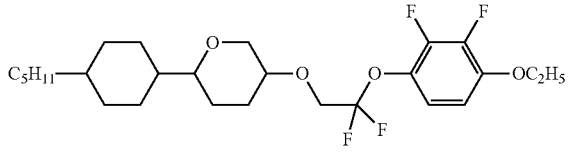
(1-2-1-19)
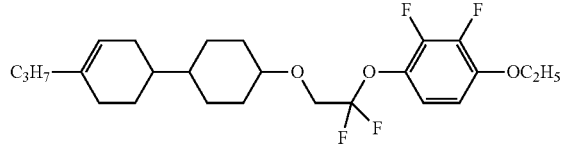
(1-2-1-20)
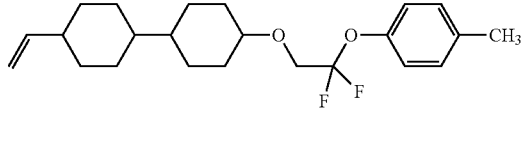

-continued
(1-2-1-21)
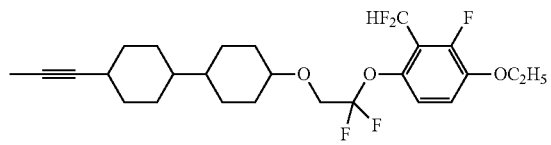
(1-2-1-22)
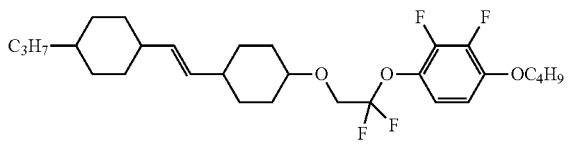
(1-2-1-23)
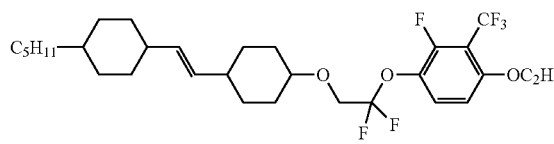
(1-2-1-24)
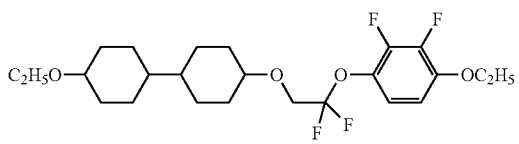
Formula 47
(1-2-2-1)
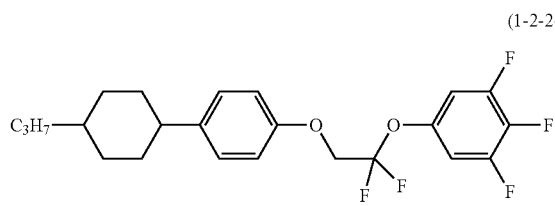
(1-2-2-2)
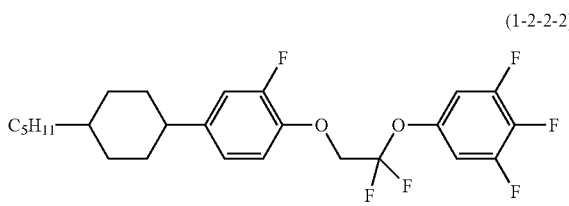
(1-2-2-3)
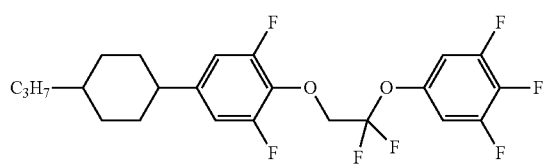
(1-2-2-4)
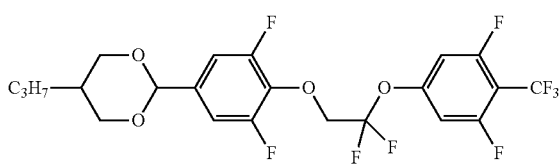
(1-2-2-5)
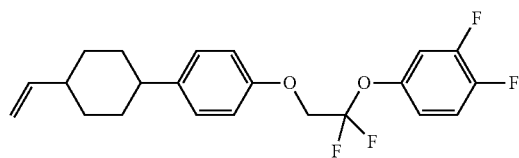
(1-2-2-6)
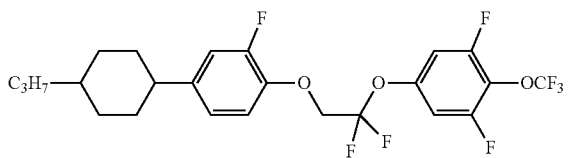
(1-2-2-7)
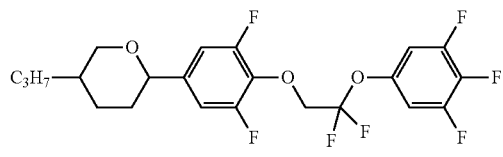
(1-2-2-8)
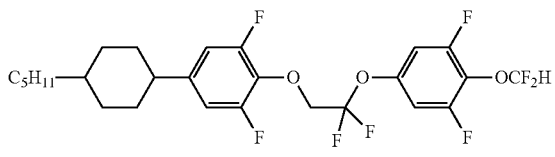
(1-2-2-9)
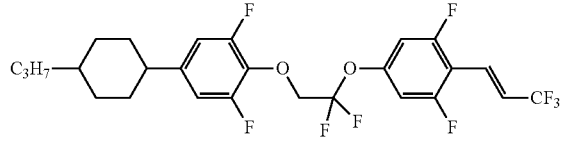
(1-2-2-10)
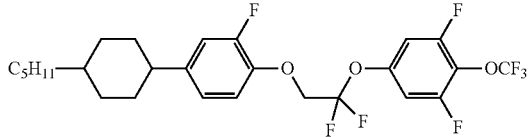
(1-2-2-11)
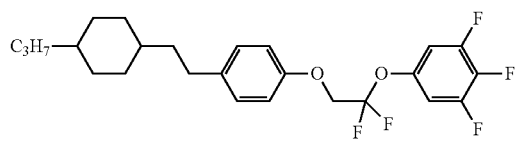
(1-2-2-12)
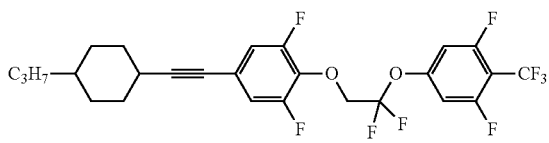

Formula 48
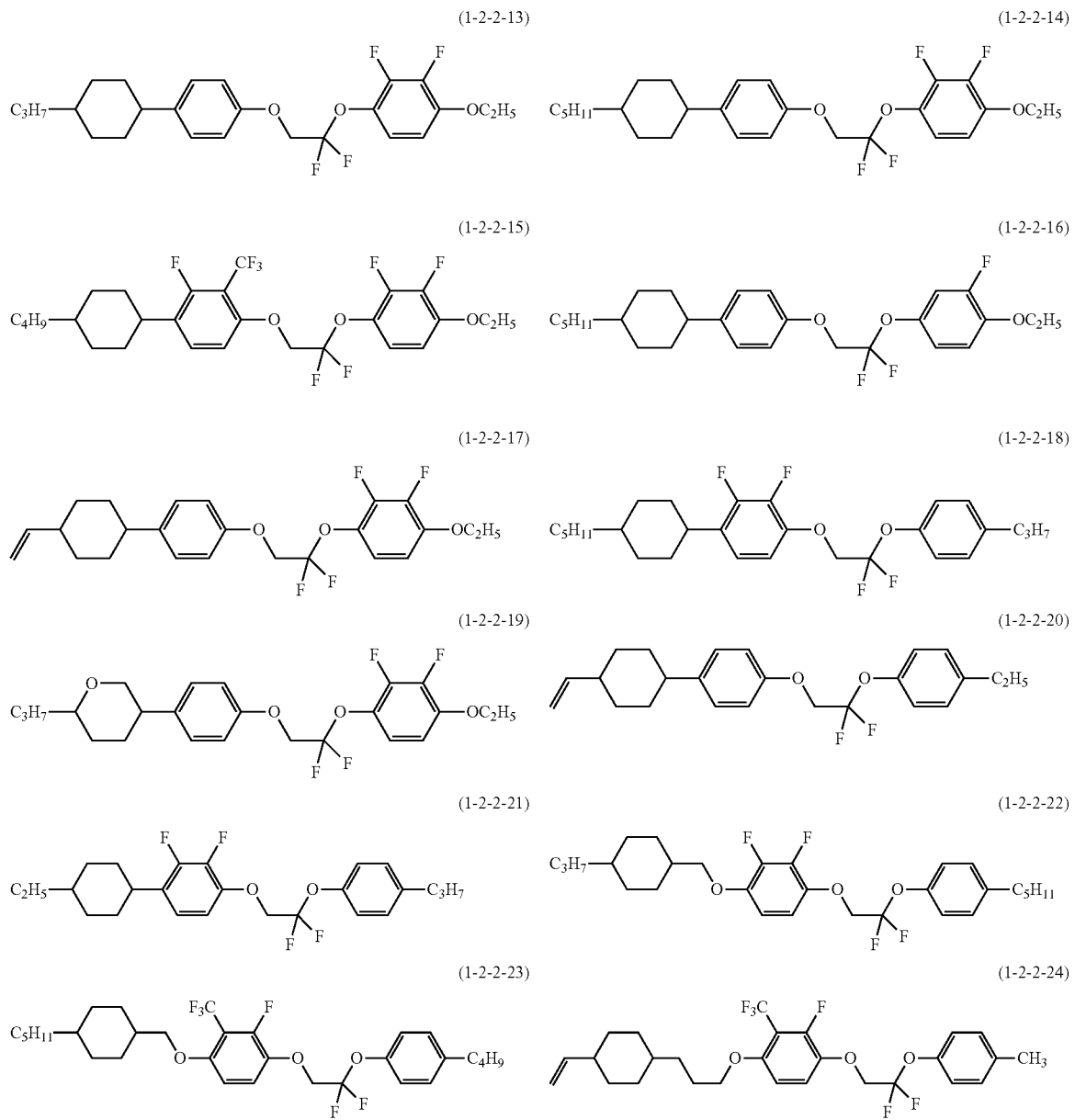
Formula 49
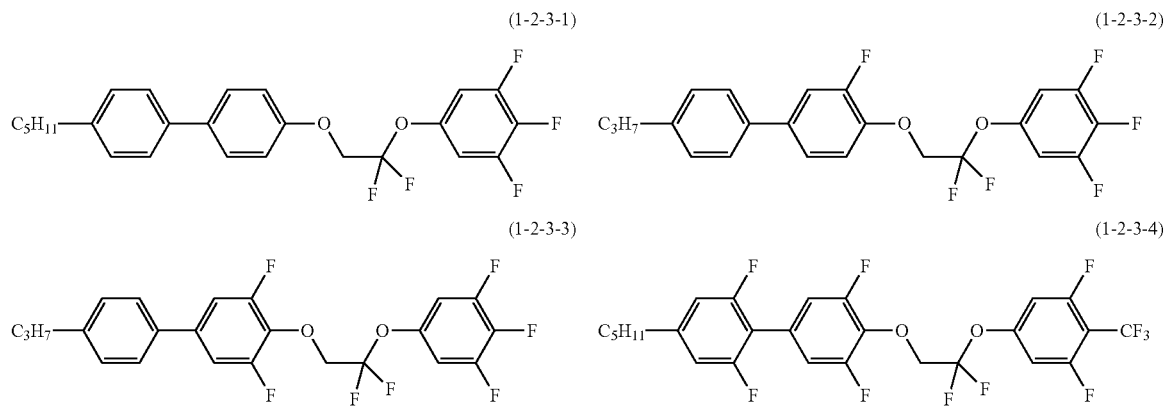

-continued
(1-2-3-5)
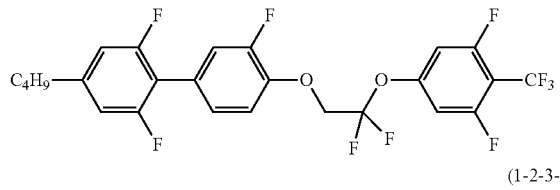
(1-2-3-6)
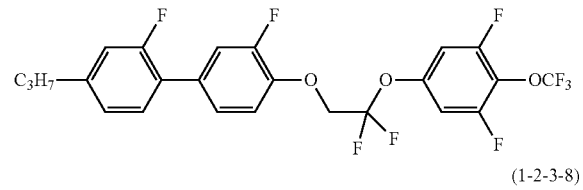
(1-2-3-7)
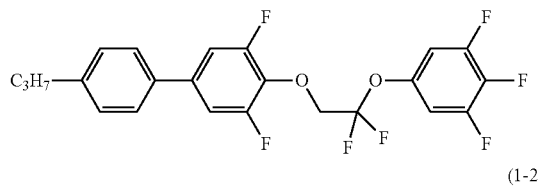
(1-2-3-8)
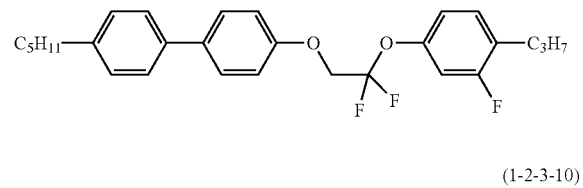
(1-2-3-9)
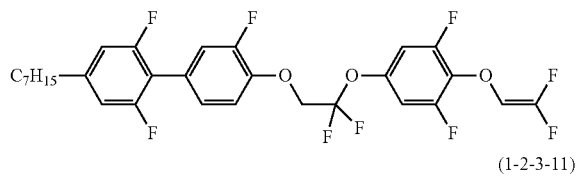
(1-2-3-10)
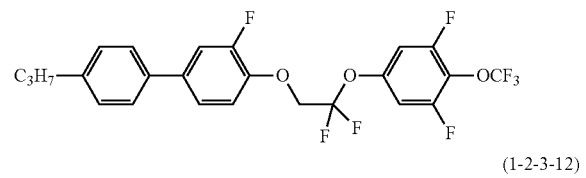
(1-2-3-11)
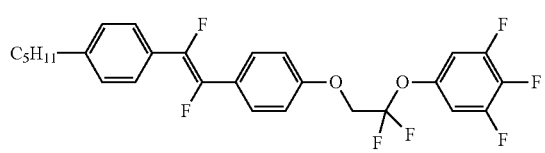
(1-2-3-12)
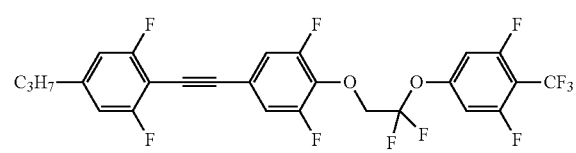
Formula 50
(1-2-3-13)
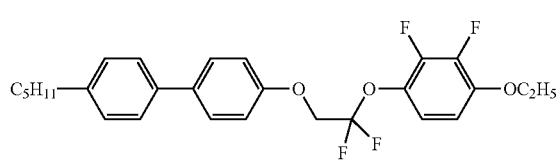
(1-2-3-14)
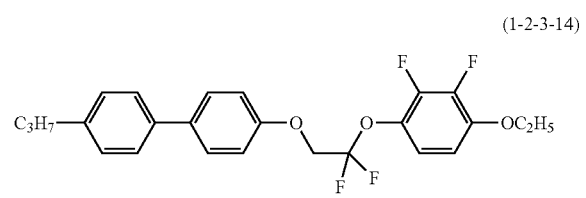
(1-2-3-15)
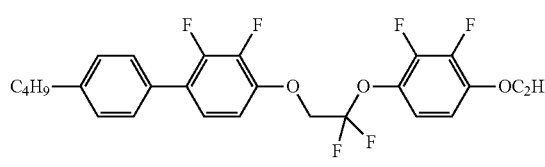
(1-2-3-16)
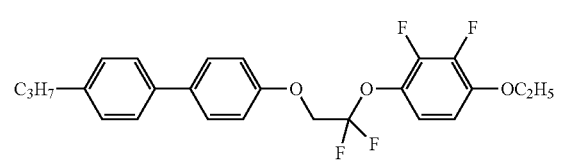
(1-2-3-17)
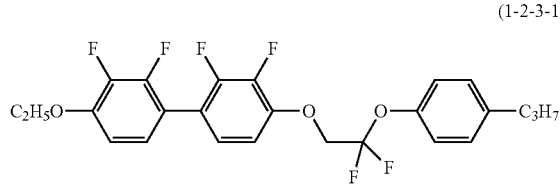
(1-2-3-18)
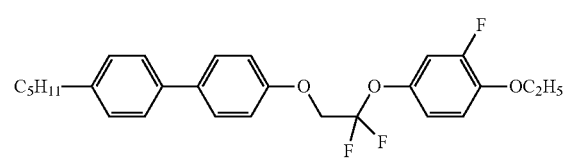
(1-2-3-19)
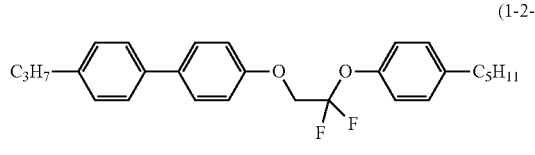
(1-2-3-20)
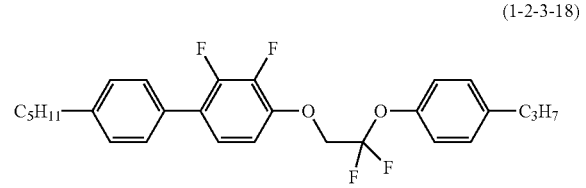
(1-2-3-21)
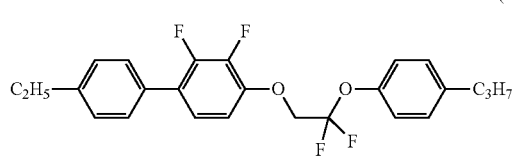
(1-2-3-22)
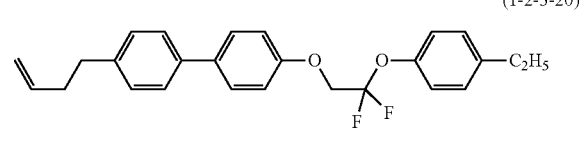
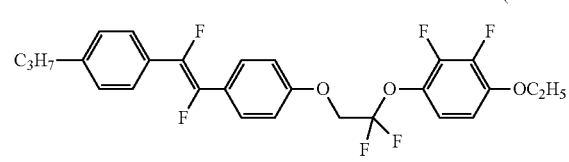

-continued
(1-2-3-23)
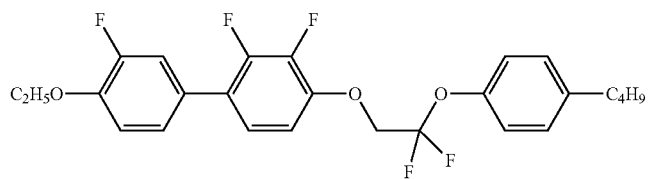
(1-2-3-24)
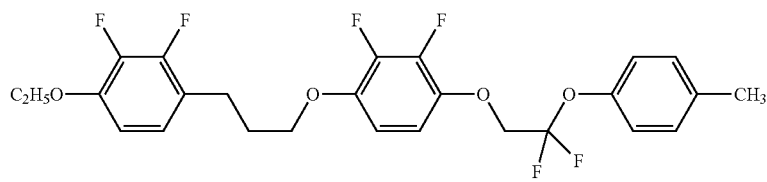
Formula 51
(1-3-1-1)
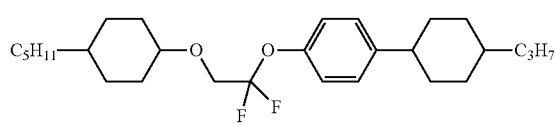
(1-3-1-2)
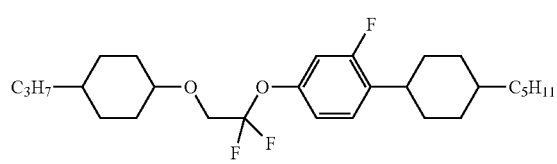
(1-3-1-3)
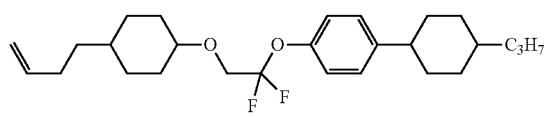
(1-3-1-4)
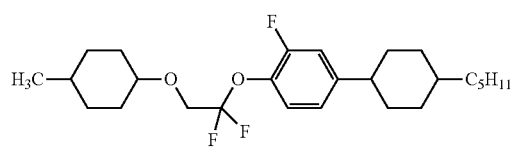
(1-3-1-5)
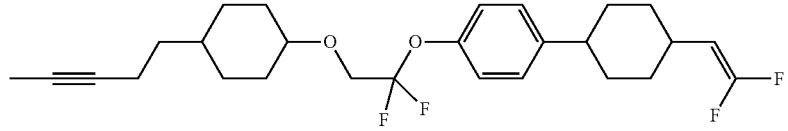
(1-3-1-6)
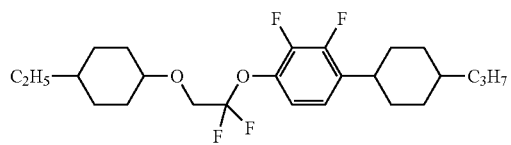
(1-3-1-7)
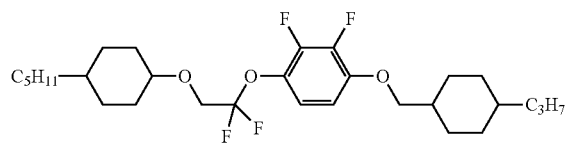
(1-3-1-8)
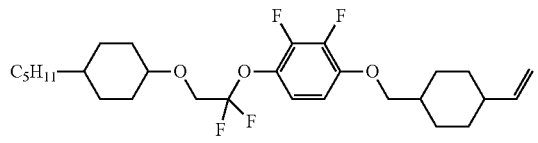
(1-3-1-9)
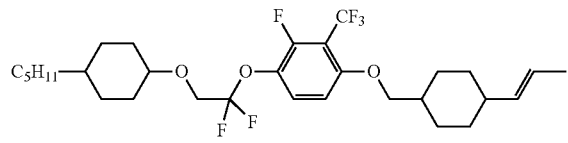
(1-3-1-10)
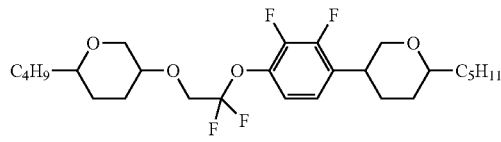
(1-3-1-11)
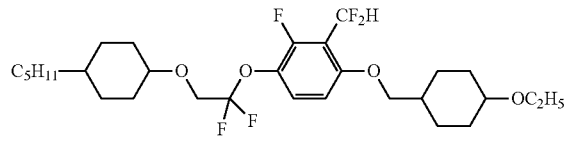
(1-3-1-12)
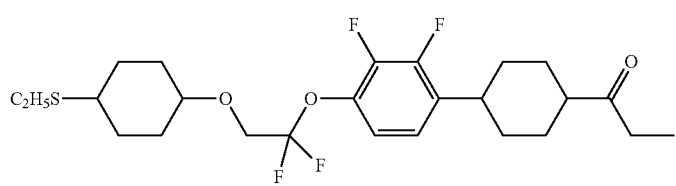

Formula 52
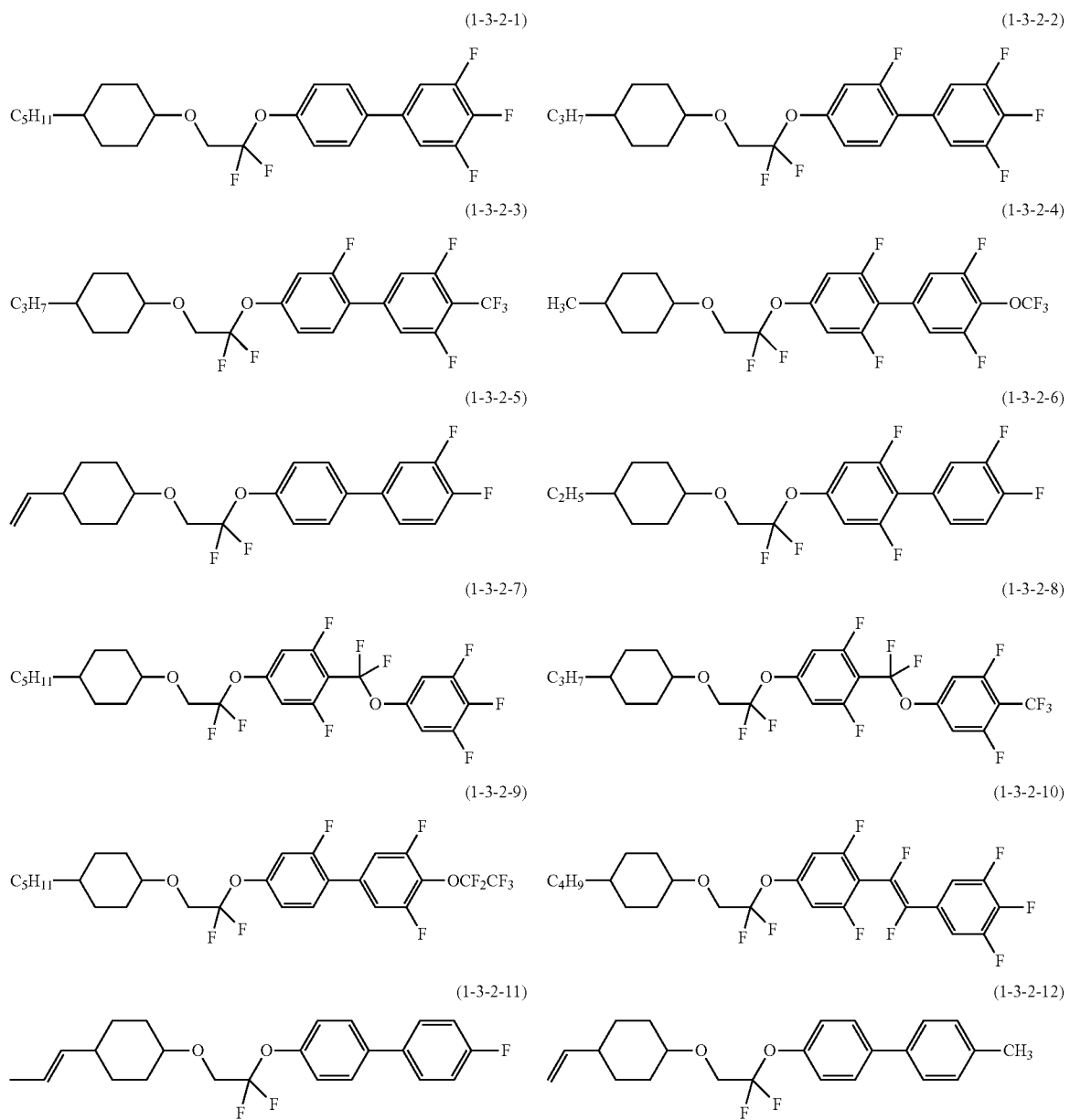
Formula 53
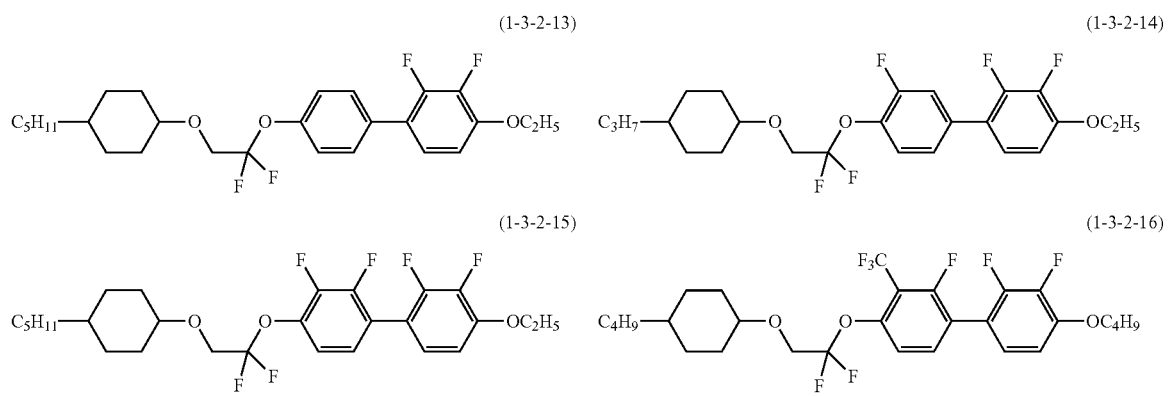

-continued
(1-3-2-17)
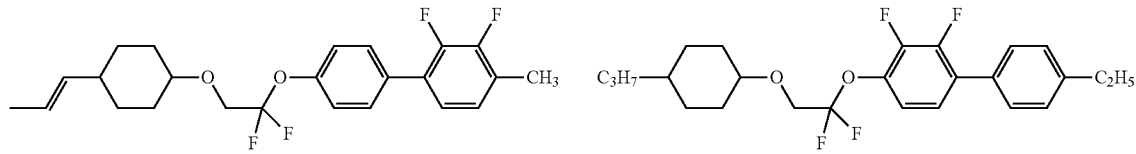
(1-3-2-18)
(1-3-2-19)
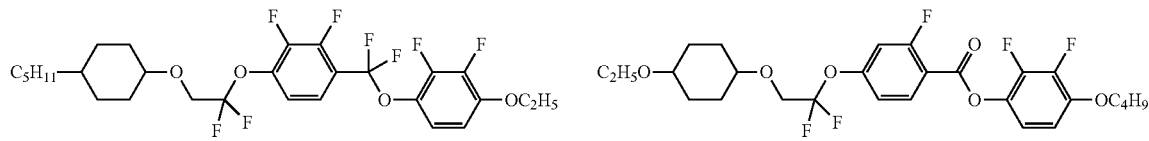
(1-3-2-20)
(1-3-2-21)
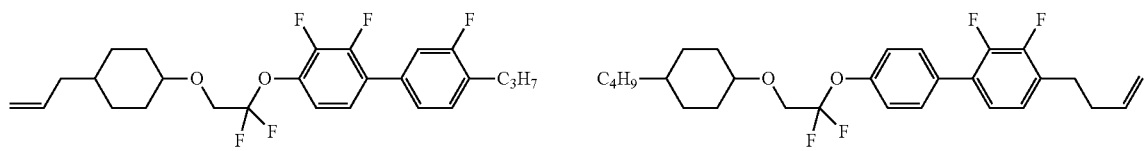
(1-3-2-22)
(1-3-2-23)
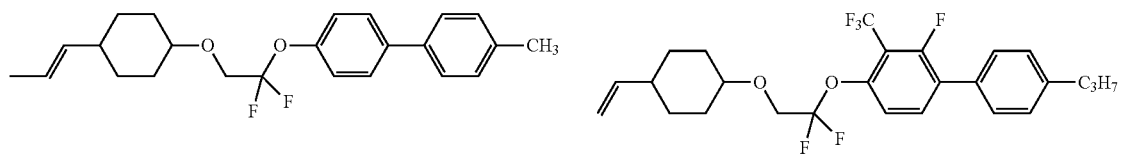
(1-3-2-24)
Formula 54
(1-3-3-1)
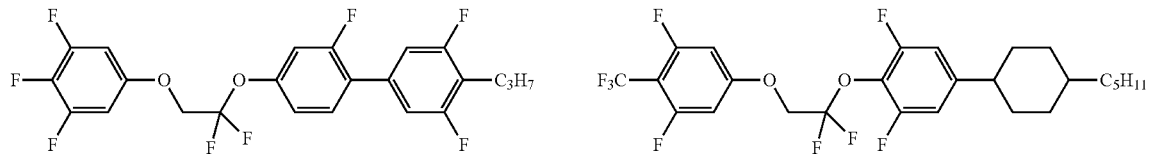
(1-3-3-2)
(1-3-3-3)
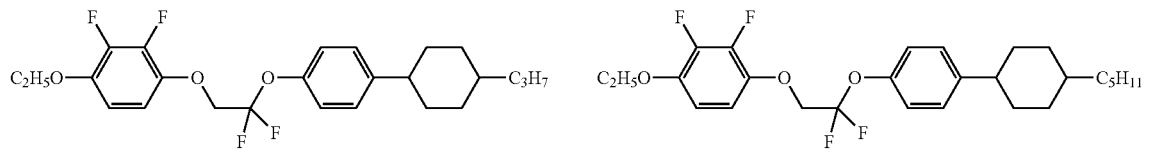
(1-3-3-4)
Cr 66.4 (SmA 52.6) Iso (° C.)
T$_{NI}$: 47.9° C. Δε : −6.67 Δn: 0.106
(1-3-3-5)
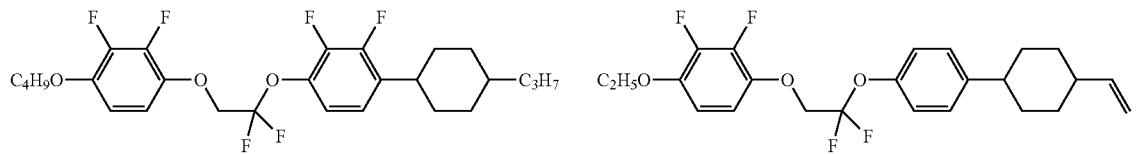
(1-3-3-6)
(1-3-3-7)
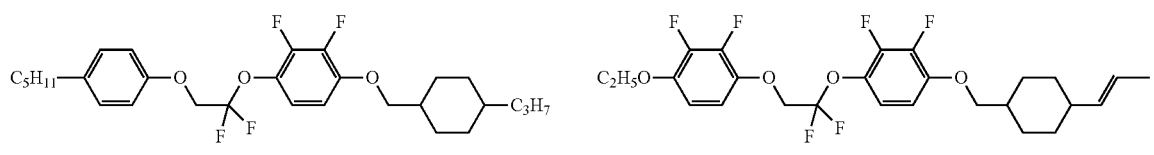
(1-3-3-8)

-continued
(1-3-3-9)
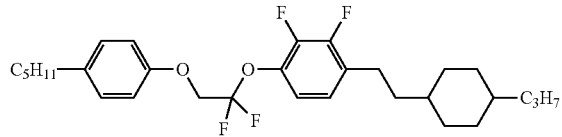
(1-3-3-10)
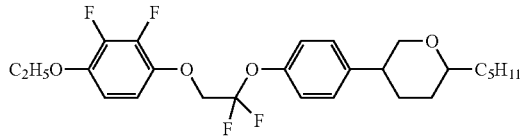
(1-3-3-11)
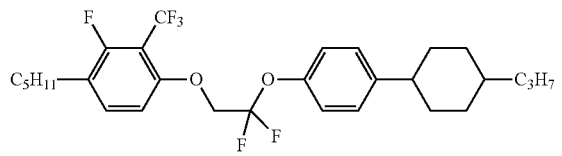
(1-3-3-12)
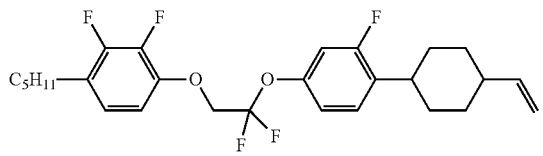
Formula 55
(1-3-4-1)
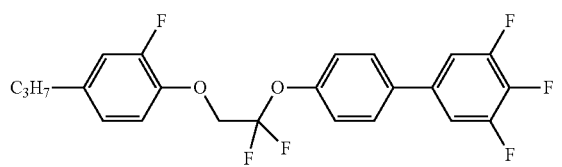
(1-3-4-2)
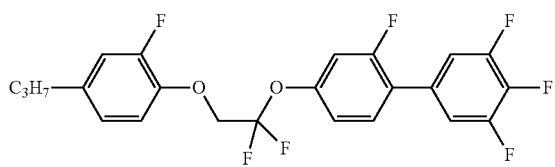
(1-3-4-3)
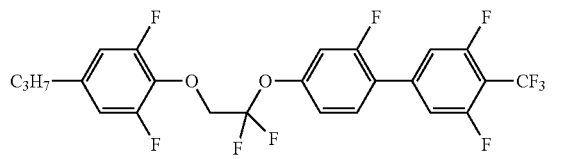
(1-3-4-4)
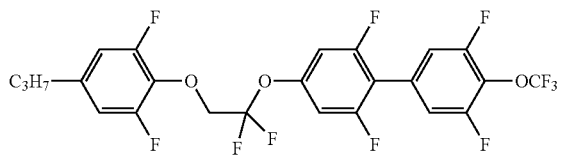
(1-3-4-5)
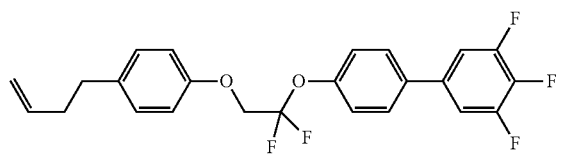
(1-3-4-6)
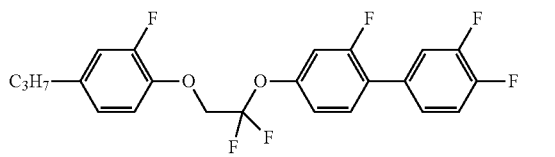
(1-3-4-7)
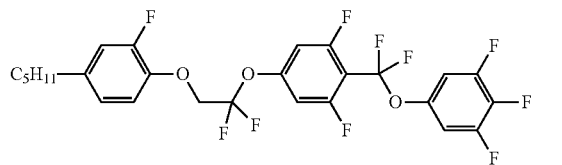
(1-3-4-8)
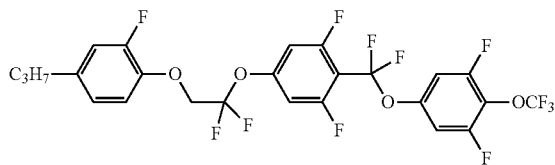
(1-3-4-9)
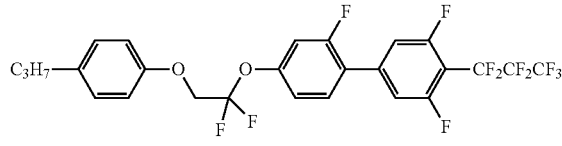
(1-3-4-10)
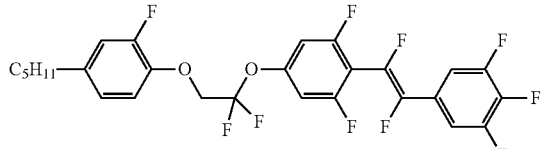
(1-3-4-11)
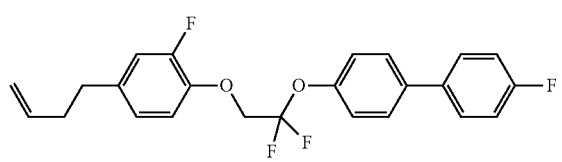
(1-3-4-12)
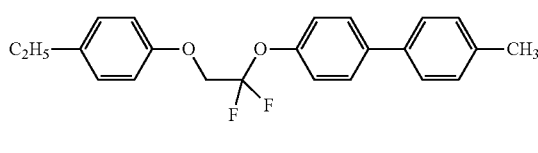

-continued
Formula 56
(1-3-4-13)
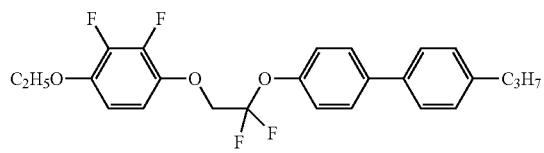
(1-3-4-14)
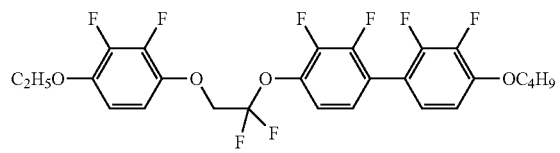
(1-3-4-15)
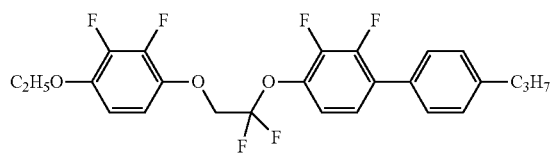
(1-3-4-16)
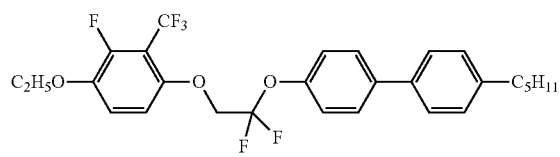
(1-3-4-17)
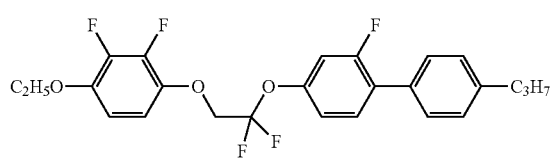
(1-3-4-18)
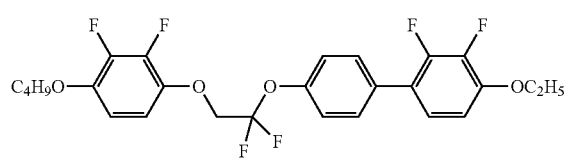
(1-3-4-19)
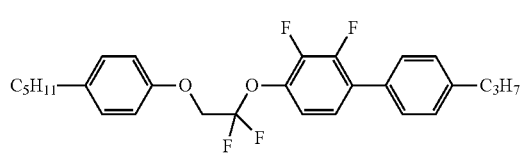
(1-3-4-20)
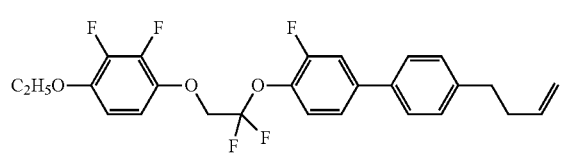
(1-3-4-21)
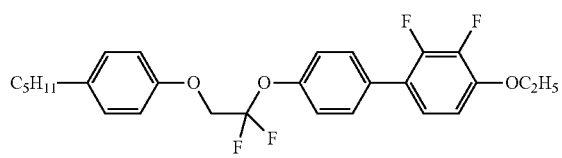
(1-3-4-22)
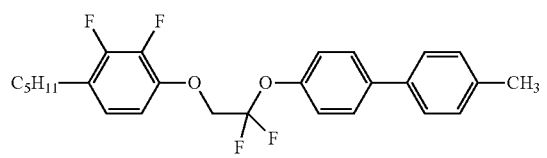
(1-3-4-23)
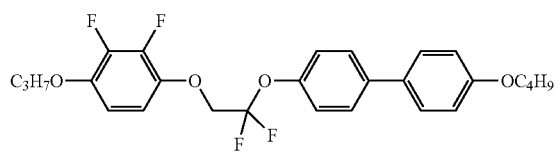
(1-3-4-24)
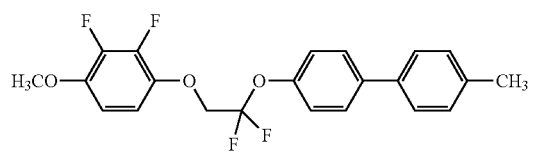
Formula 57
(1-4-1-1)
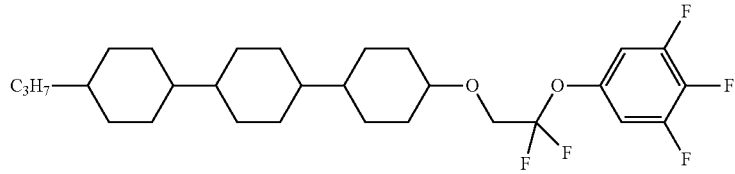
(1-4-1-2)
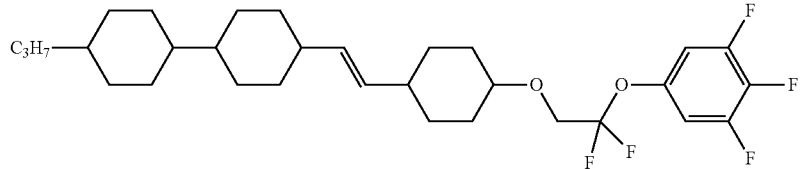

(1-4-1-3)
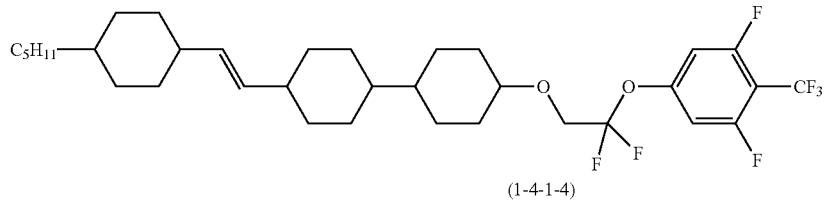
(1-4-1-4)
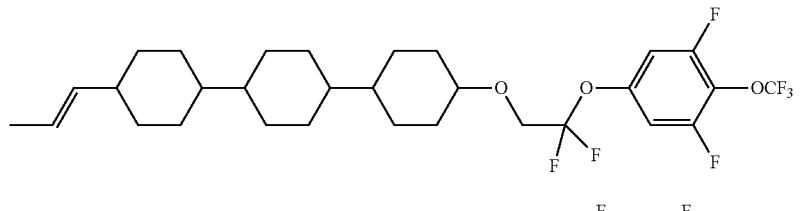
(1-4-1-5)
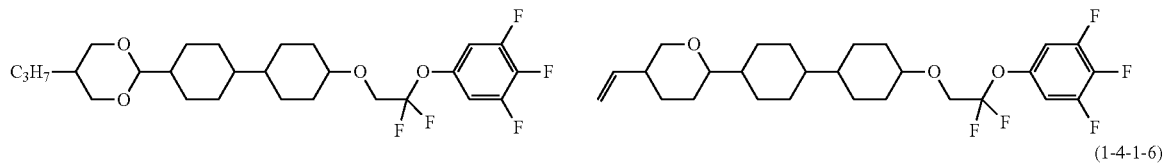
(1-4-1-6)
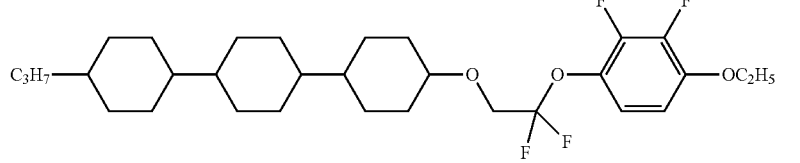
(1-4-1-7)
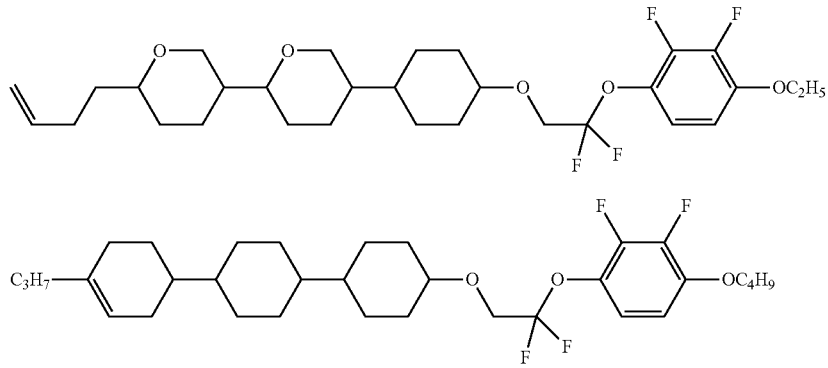
(1-4-1-8)
(1-4-1-9)
(1-4-1-10)
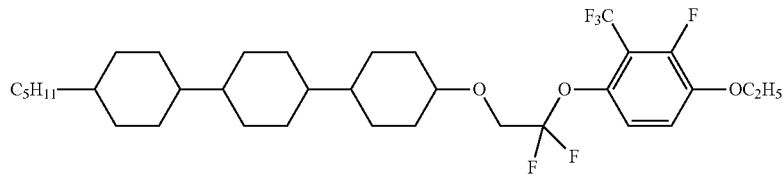
(1-4-1-11)
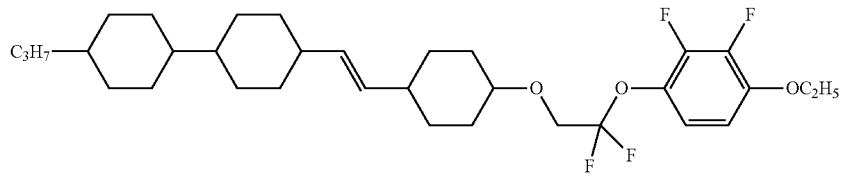
(1-4-1-12)
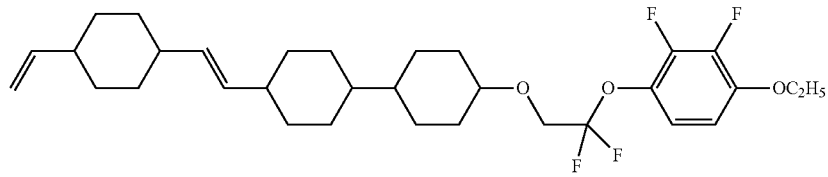

-continued
Formula 58
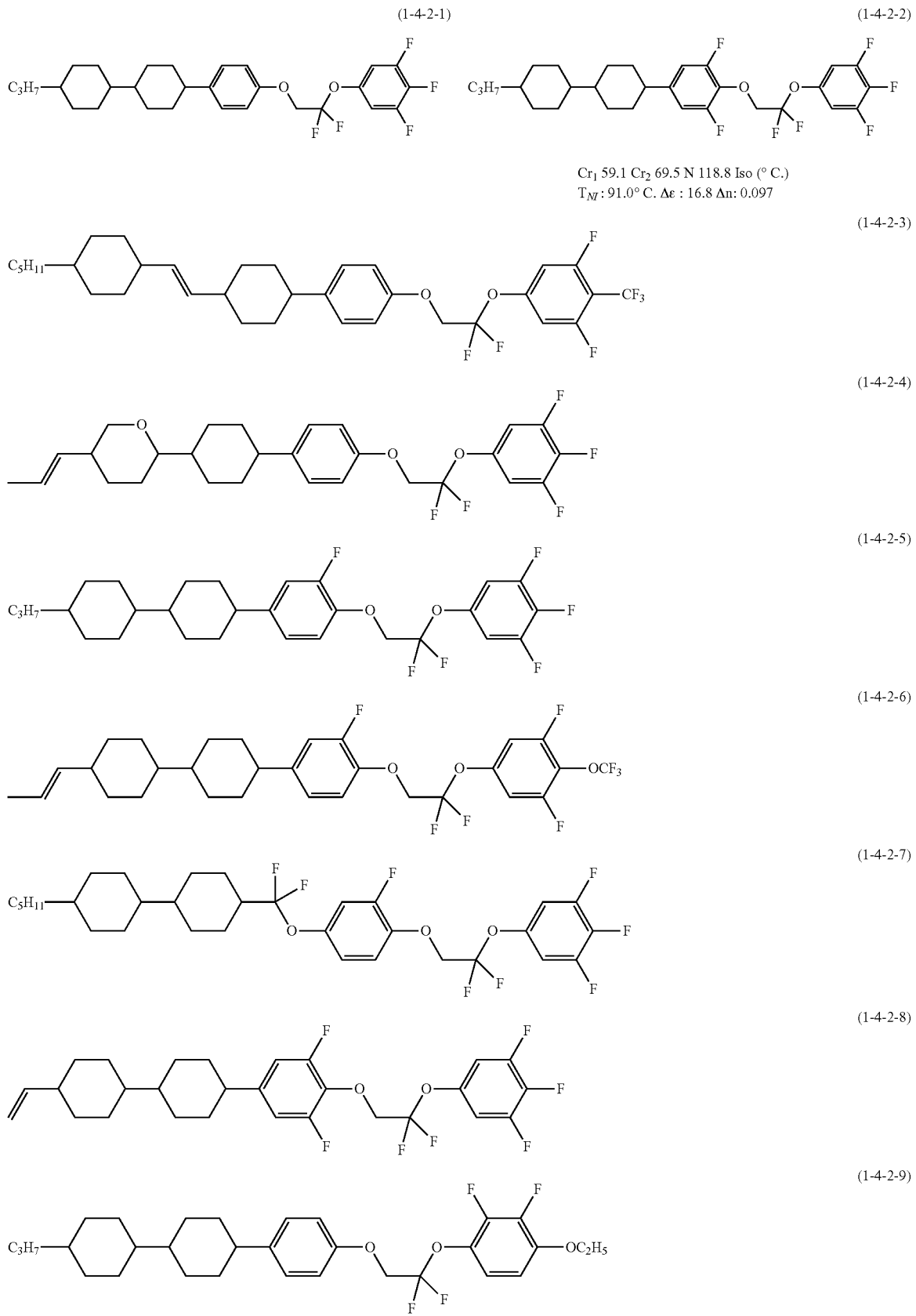

-continued
(1-4-2-10)
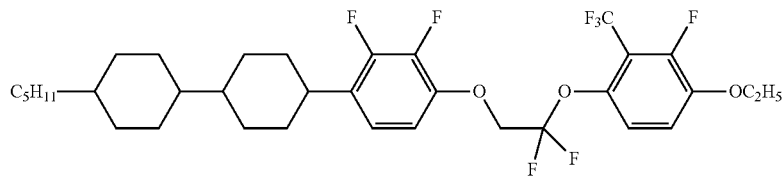
(1-4-2-11)
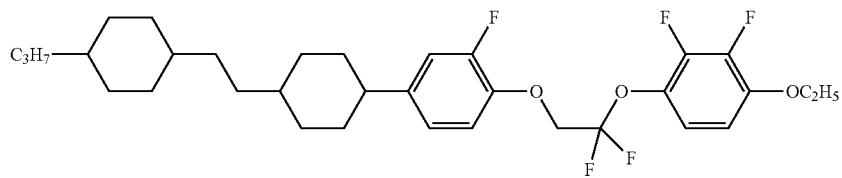
(1-4-2-12)
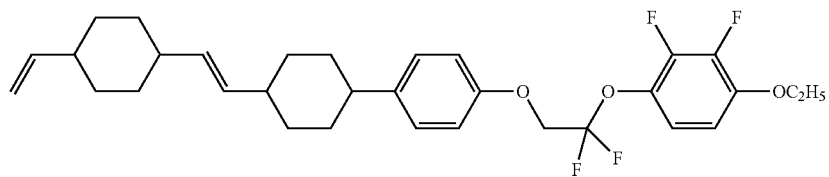
Formula 59
(1-4-3-1) (1-4-3-2)
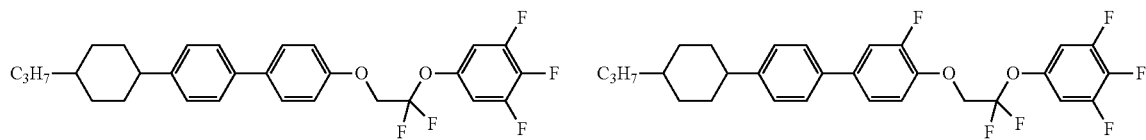
Cr₁ 32.4 Cr₂ 58.7 SmB 64.9 SmA 89.9 N 131.8 Iso (° C.)
$T_{NI}$: 108.4° C. Δε : 13.5 Δn: 0.144
(1-4-3-3) (1-4-3-4)
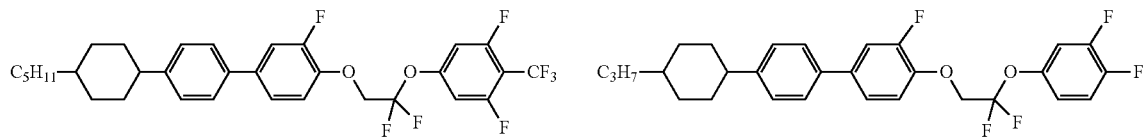
(1-4-3-5)
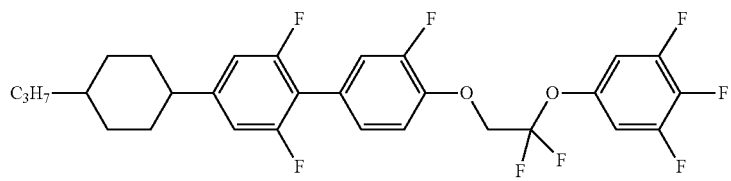
(1-4-3-6)
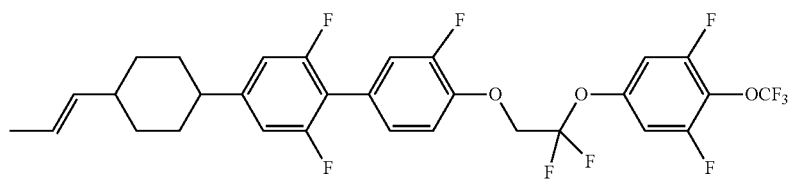
(1-4-3-7)
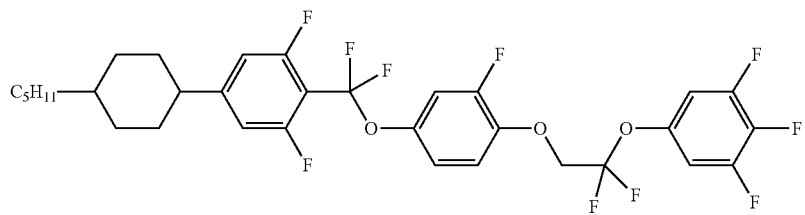

-continued
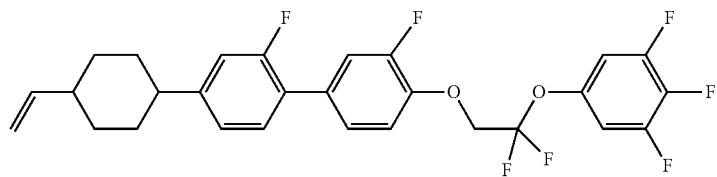 (1-4-3-8)
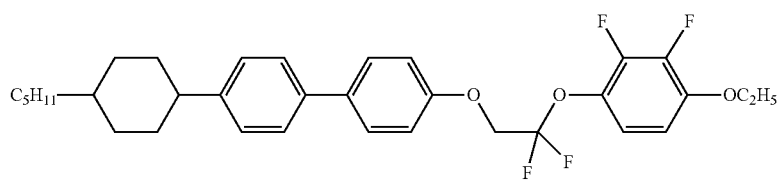 (1-4-3-9)
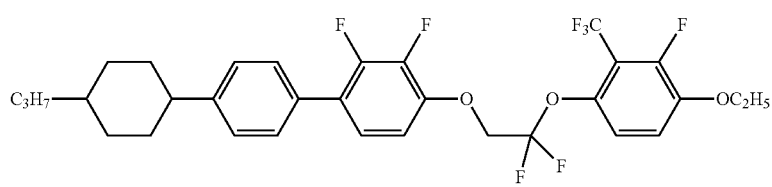 (1-4-3-10)
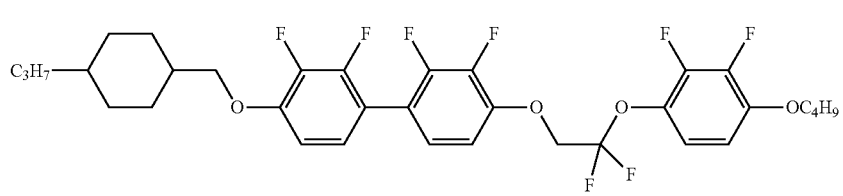 (1-4-3-11)
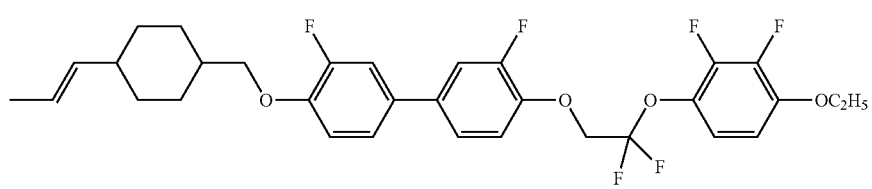 (1-4-3-12)
Formula 60
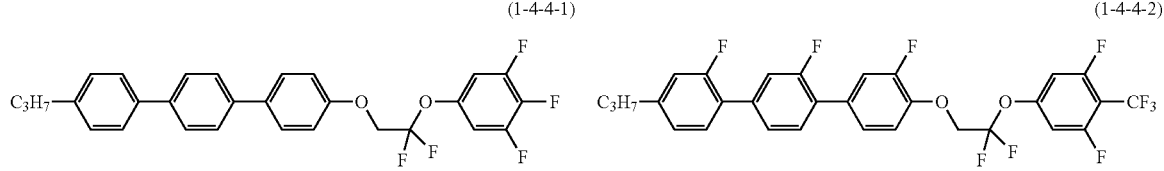
(1-4-4-1) (1-4-4-2)
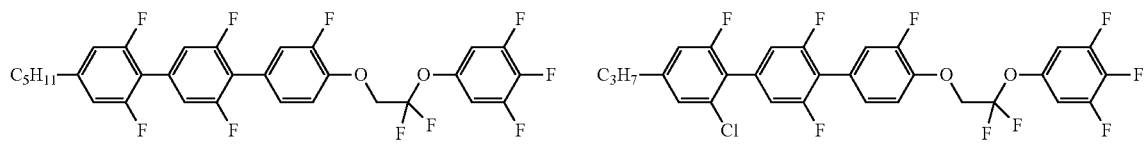
(1-4-4-3) (1-4-4-4)
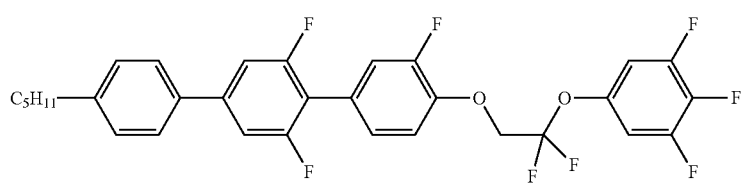 (1-4-4-5)

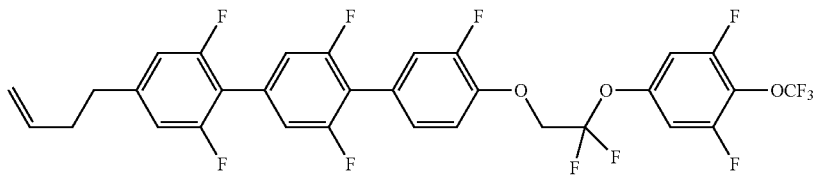
(1-4-4-6)
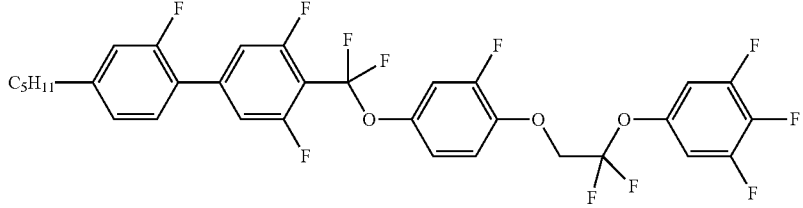
(1-4-4-7)
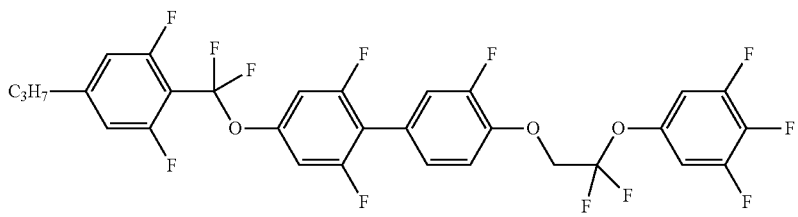
(1-4-4-8)
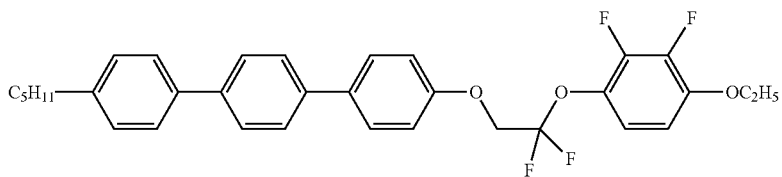
(1-4-4-9)
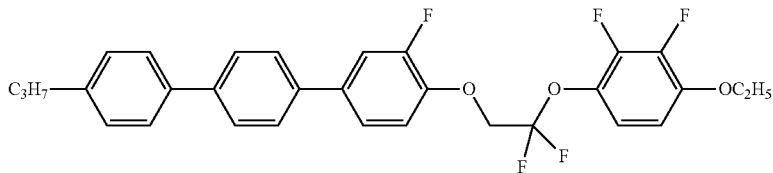
(1-4-4-10)
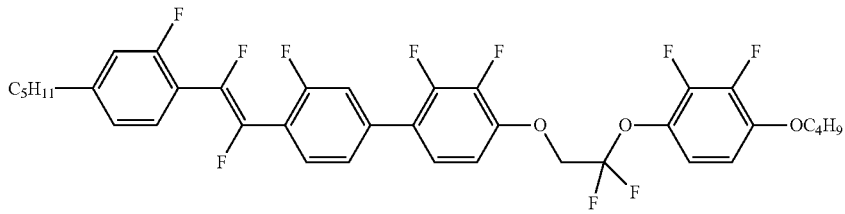
(1-4-4-11)
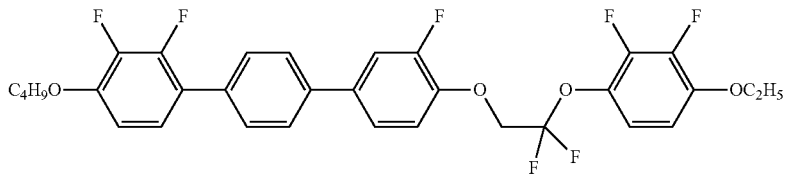
(1-4-4-12)
Formula 61
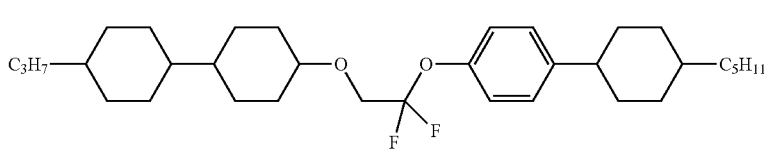
(1-5-1-1)

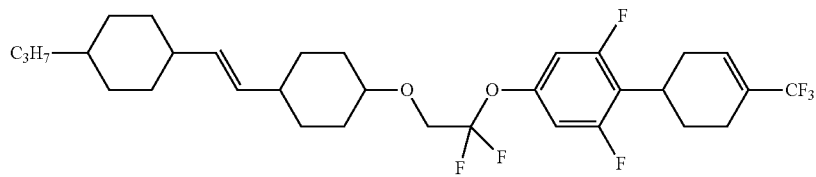
(1-5-1-2)
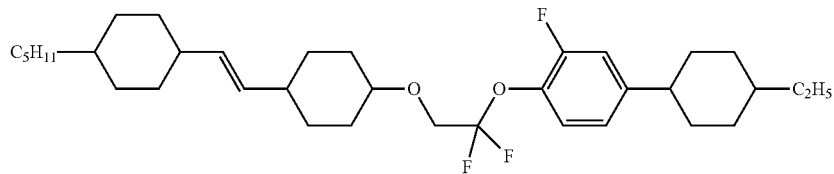
(1-5-1-3)
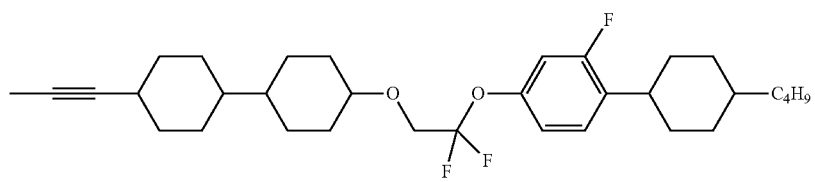
(1-5-1-4)
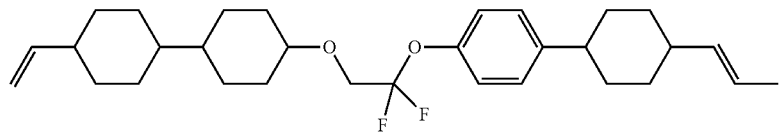
(1-5-1-5)
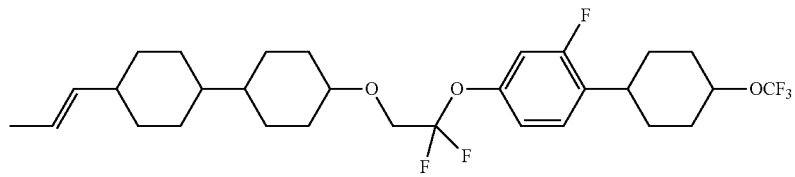
(1-5-1-6)
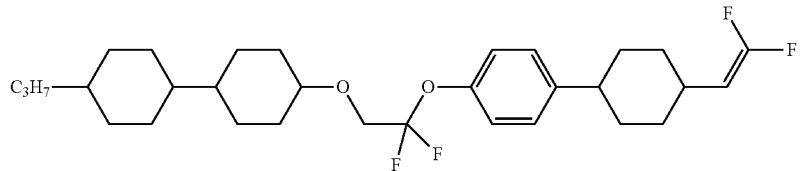
(1-5-1-7)
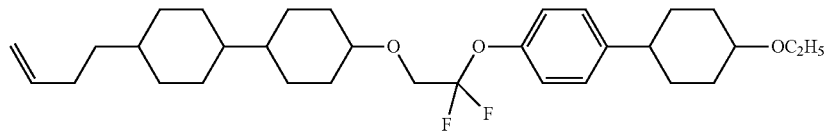
(1-5-1-8)
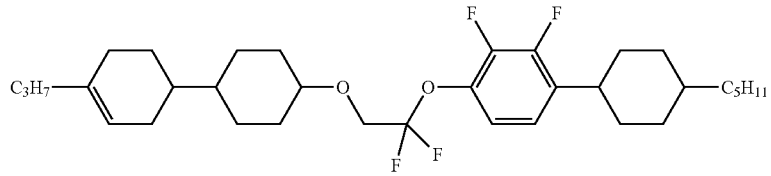
(1-5-1-9)
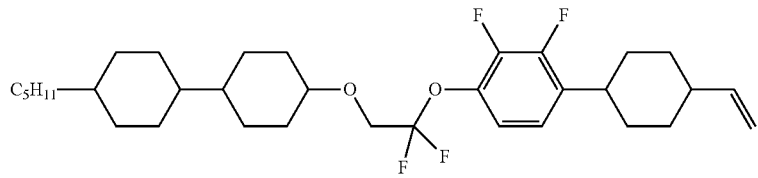
(1-5-1-10)

-continued
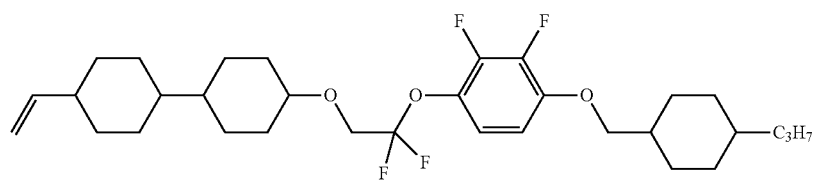
(1-5-1-11)
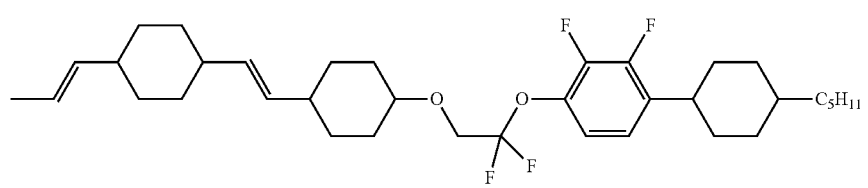
(1-5-1-12)
Formula 62
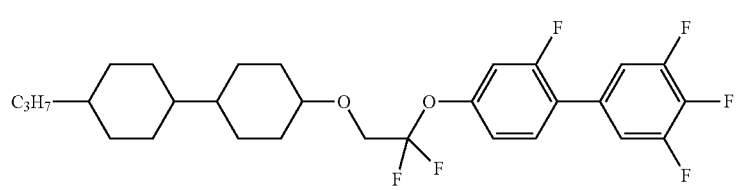
(1-5-2-1)
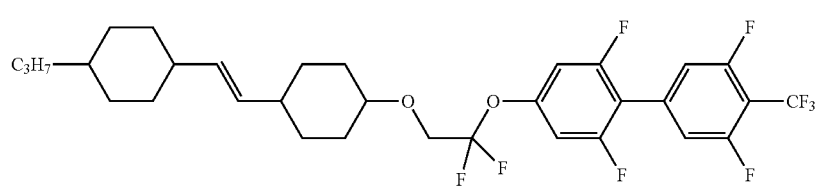
(1-5-2-2)
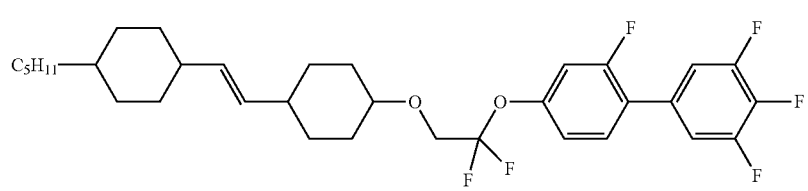
(1-5-2-3)
(1-5-2-4)          (1-5-2-5)
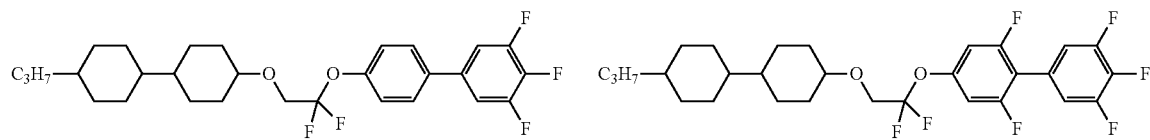
(1-5-2-6)          (1-5-2-7)
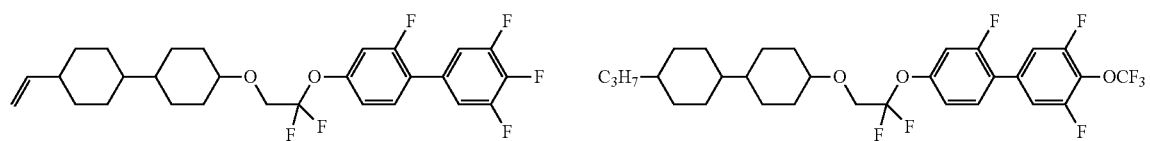
(1-5-2-8)
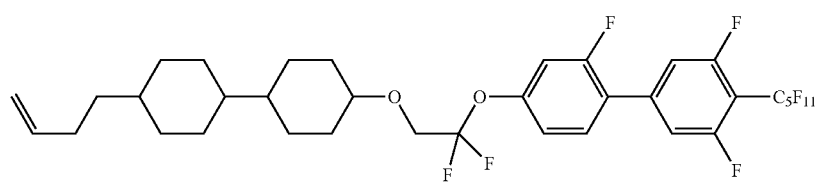

-continued
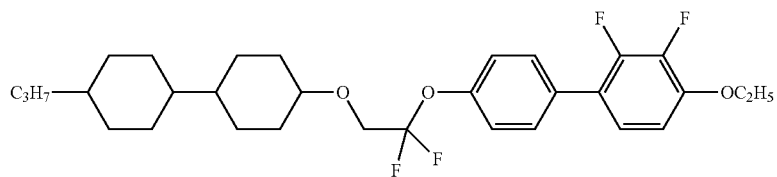
(1-5-2-9)
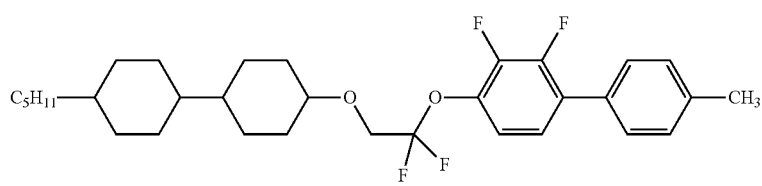
(1-5-2-10)
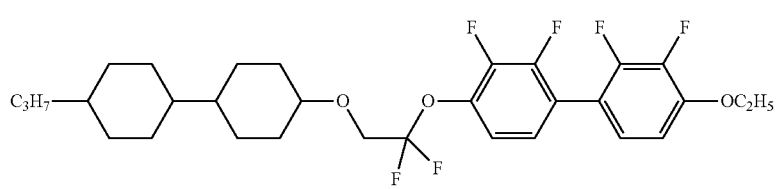
(1-5-2-11)
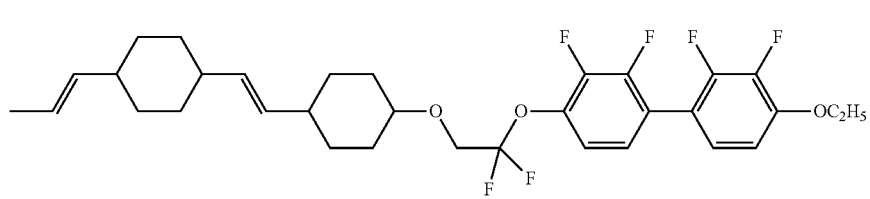
(1-5-2-12)
Formula 63
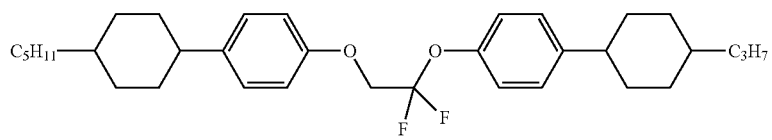
(1-5-3-1)
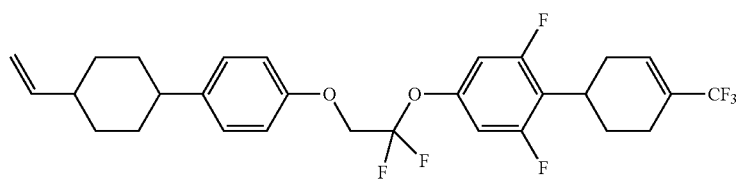
(1-5-3-2)
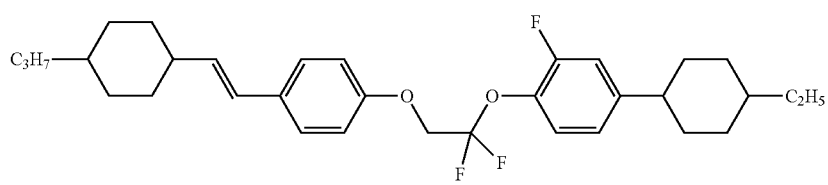
(1-5-3-3)
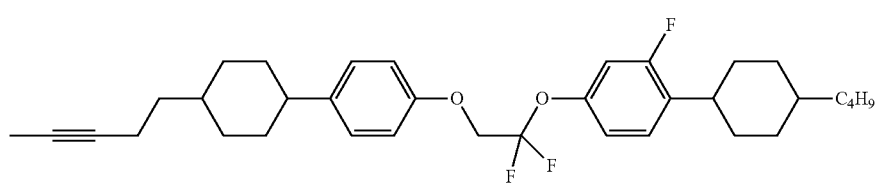
(1-5-3-4)

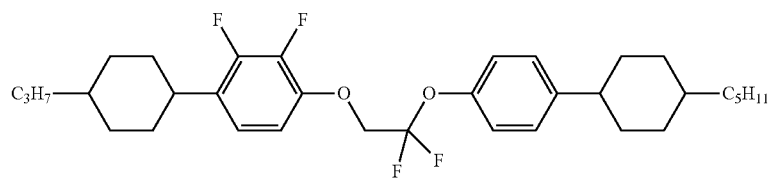
(1-5-3-5)
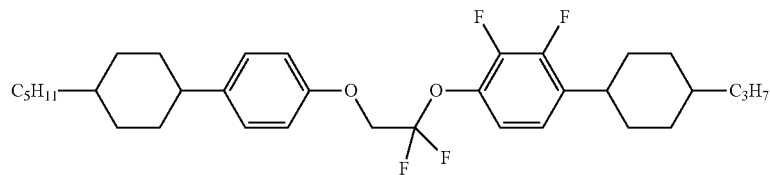
(1-5-3-6)
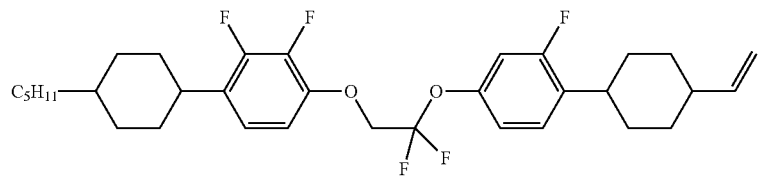
(1-5-3-7)
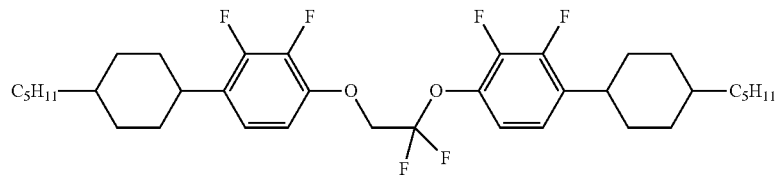
(1-5-3-8)
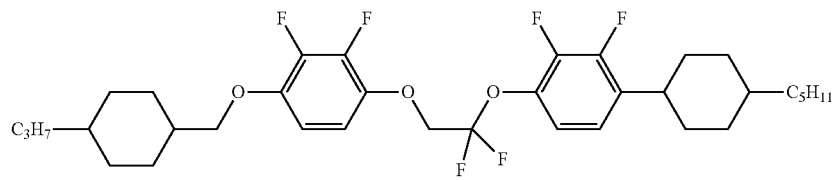
(1-5-3-9)
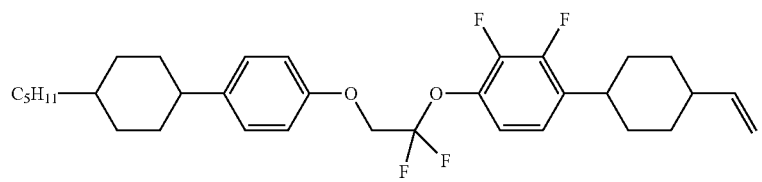
(1-5-3-10)
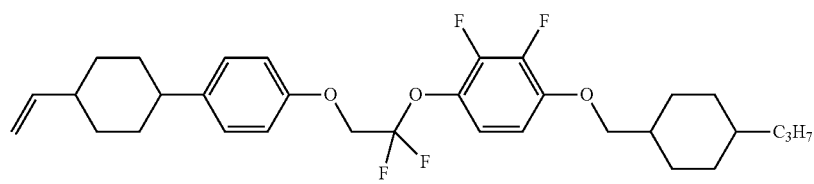
(1-5-3-11)
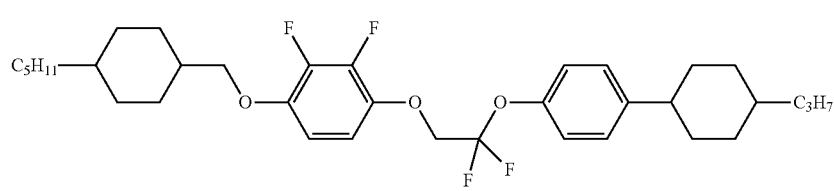
(1-5-3-12)

Formula 64
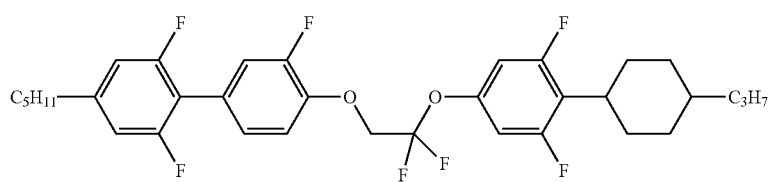 (1-5-4-1)
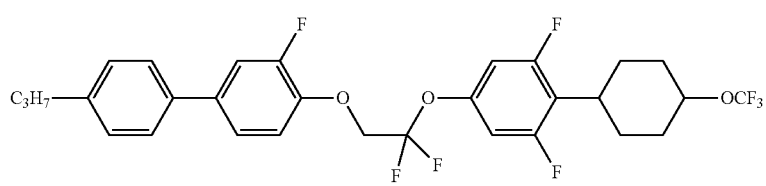 (1-5-4-2)
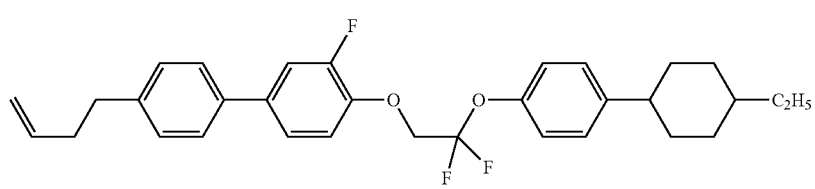 (1-5-4-3)
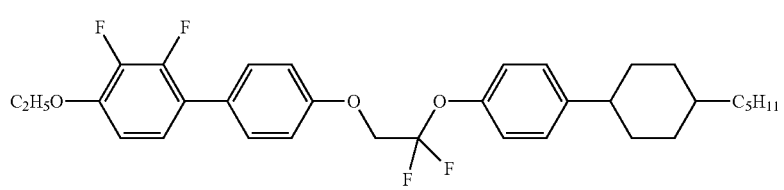 (1-5-4-4)
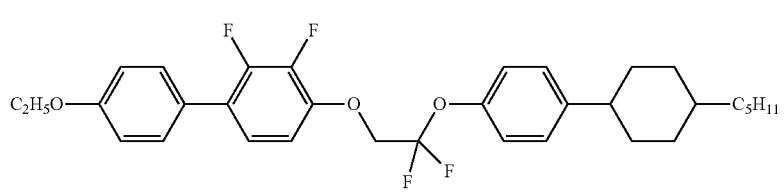 (1-5-4-5)
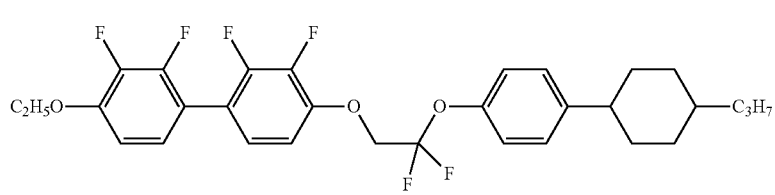 (1-5-4-6)
Cr 109.0 N 121.9 IsO (° C.)
$T_{NI}$: 114.6 ° C. Δε: -9.49 Δn : 0.166
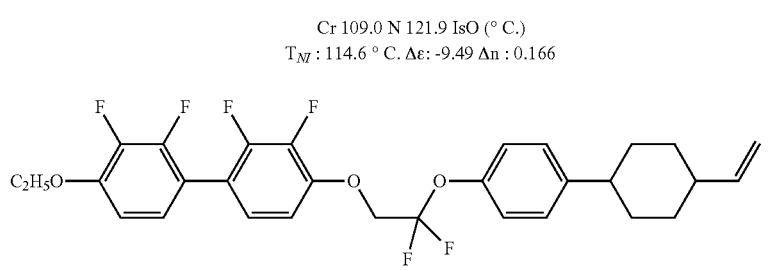 (1-5-4-7)
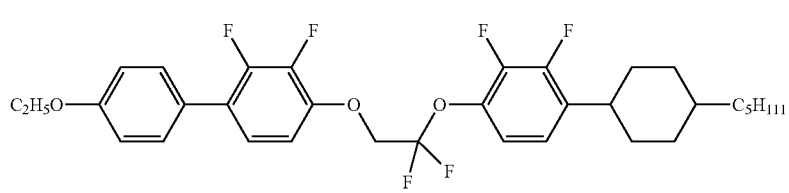 (1-5-5-8)

(1-5-4-9)
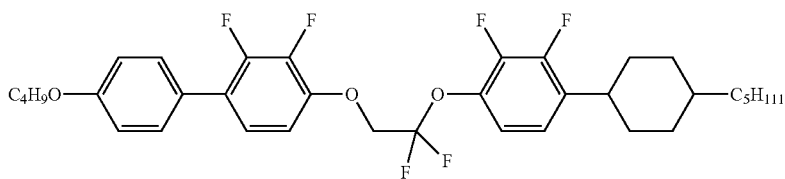
(1-5-4-10)
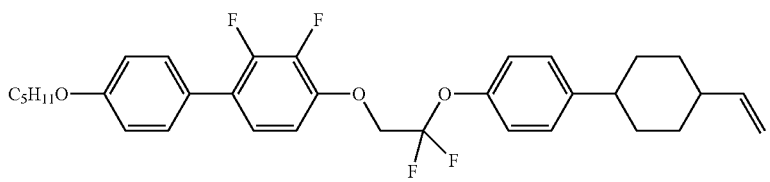
(1-5-4-11)
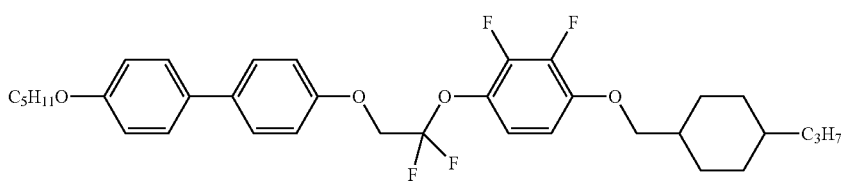
(1-5-4-12)
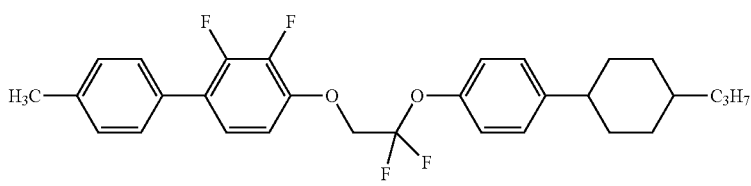
Formula 65
(1-5-5-1)
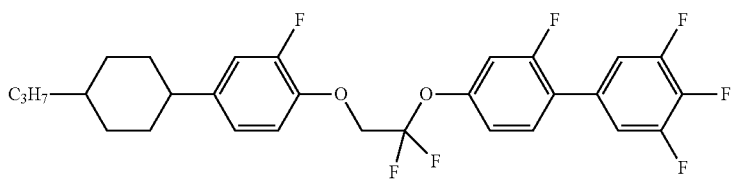
Cr 71.7 (N 45.0) IsO (° C.)
$T_{NI}$ : 46.4° C. Δε: 19.4 Δn : 0.117
(1-5-5-2)
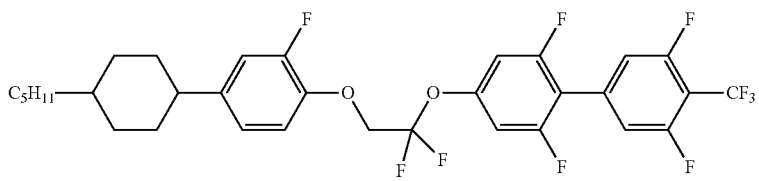
(1-5-5-3)
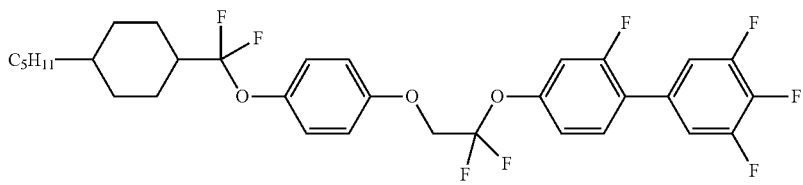
(1-5-5-4)    (1-5-5-5)
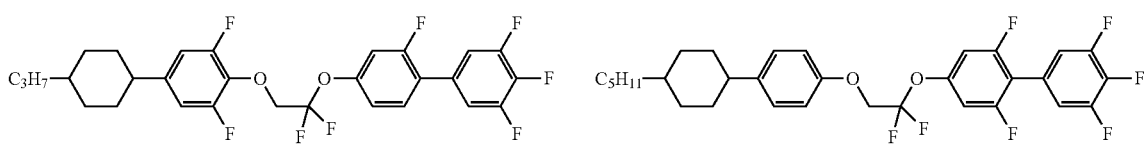

-continued
(1-5-5-6)
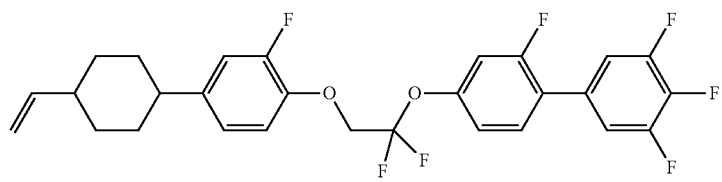
(1-5-5-7)
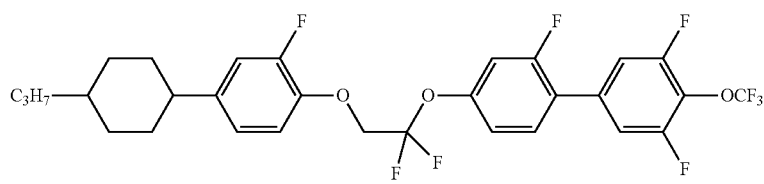
(1-5-5-8)
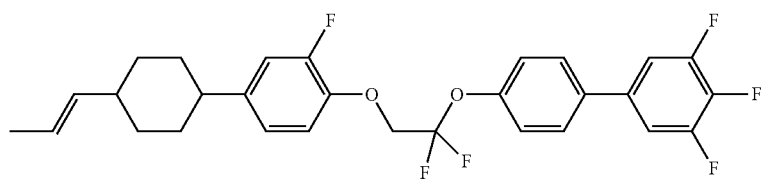
(1-5-5-9)
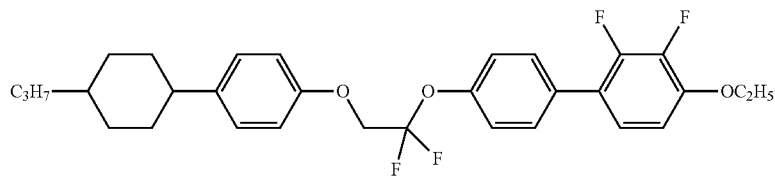
(1-5-5-10)
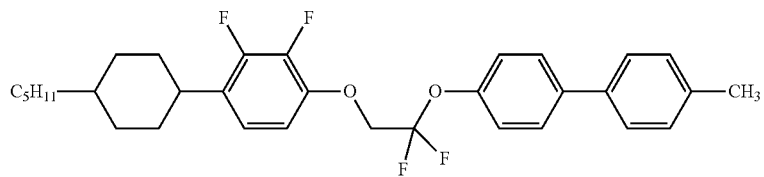
(1-5-5-11)
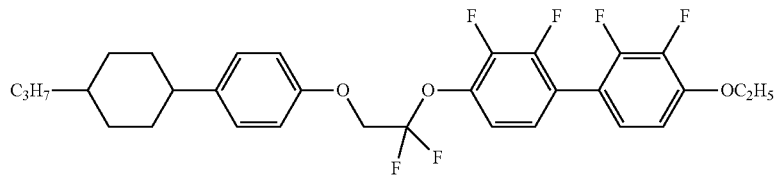
(1-5-5-12)
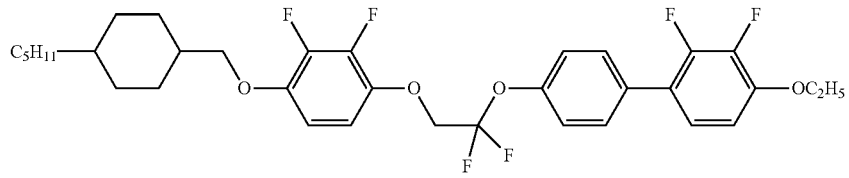
Formula 66
(1-5-6-1)
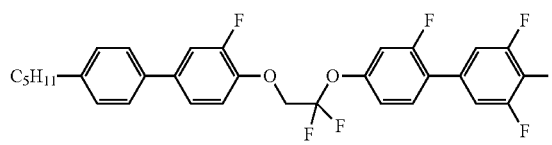
(1-5-6-2)
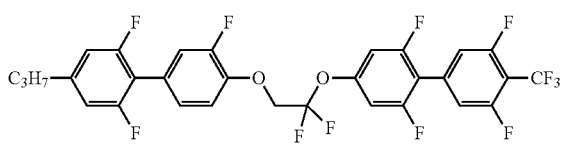
Cr 76.5 IsO (° C.)
$T_{NI}$: 52.4° C. Δε: 21.8 Δn : 0.164

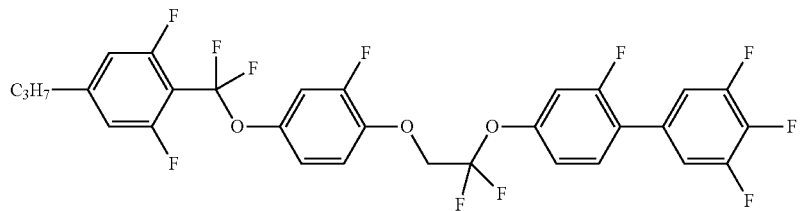
(1-5-6-3)
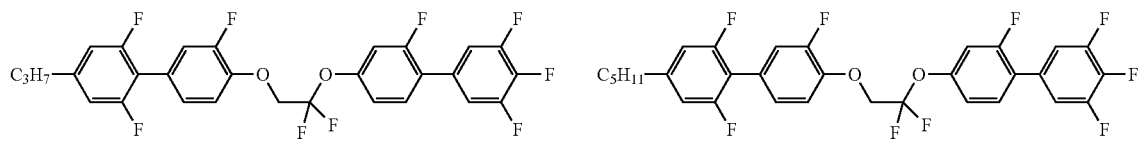
(1-5-6-4)                                   (1-5-6-5)
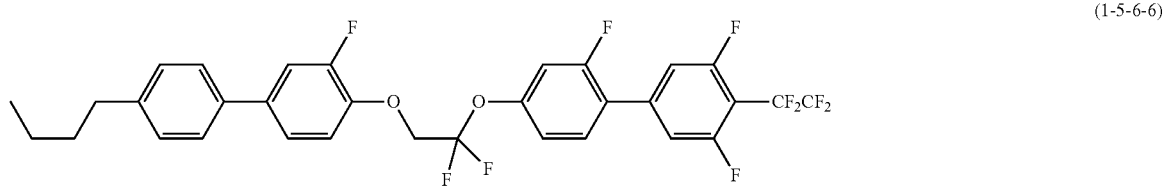
(1-5-6-6)
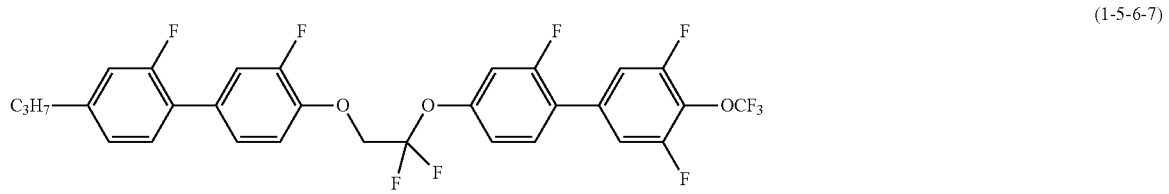
(1-5-6-7)
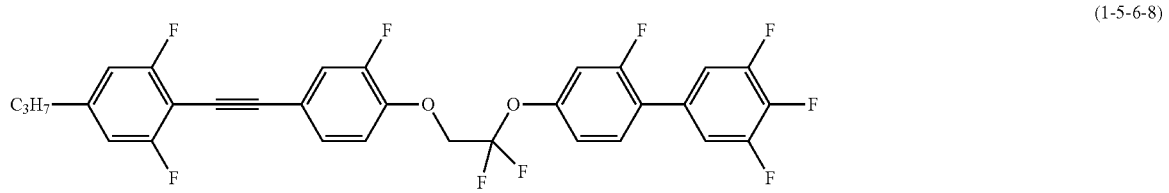
(1-5-6-8)
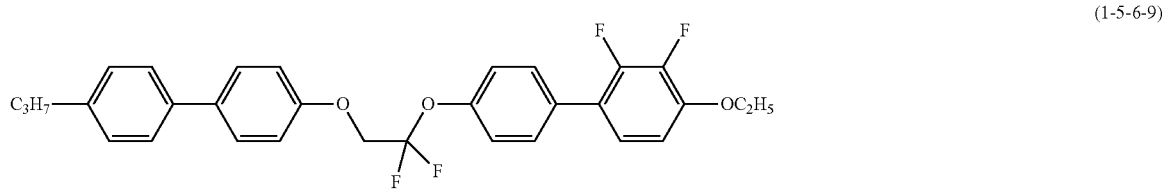
(1-5-6-9)
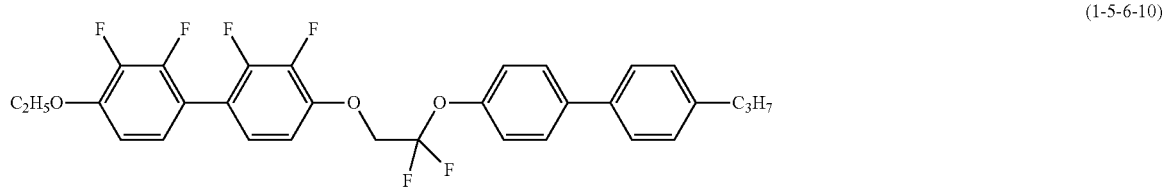
(1-5-6-10)
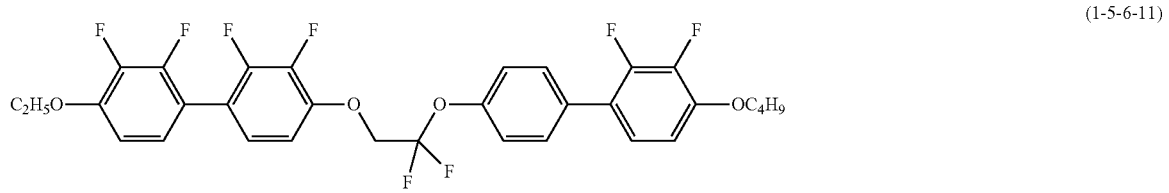
(1-5-6-11)

-continued
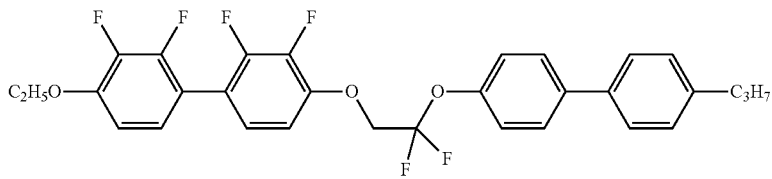
(1-5-6-12)
Formula 67
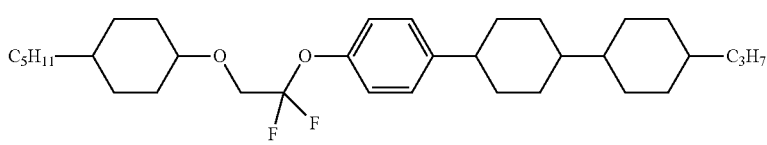
(1-6-1-1)
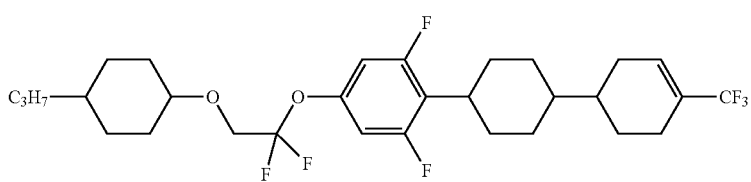
(1-6-1-2)
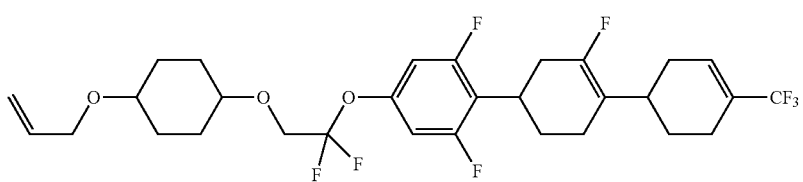
(1-6-1-3)
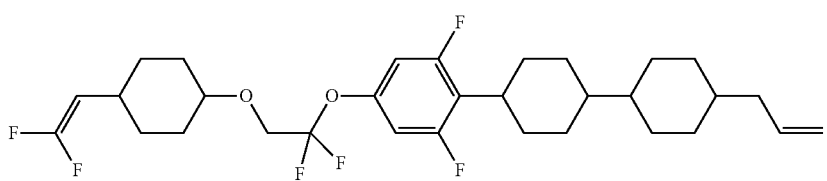
(1-6-1-4)
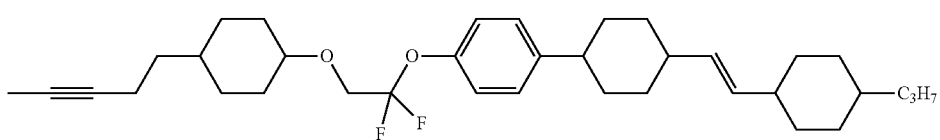
(1-6-1-5)
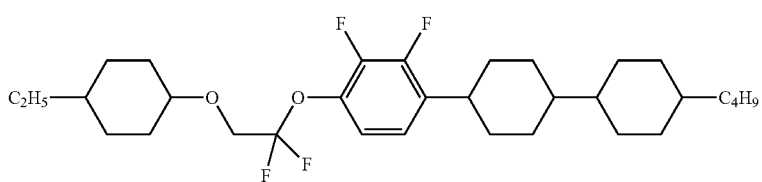
(1-6-1-6)
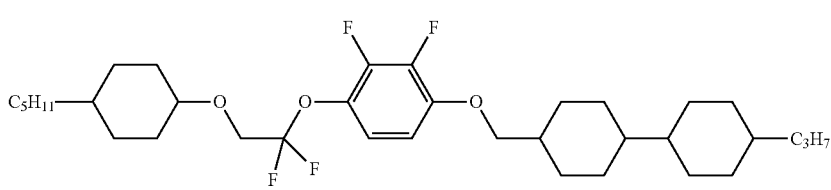
(1-6-1-7)
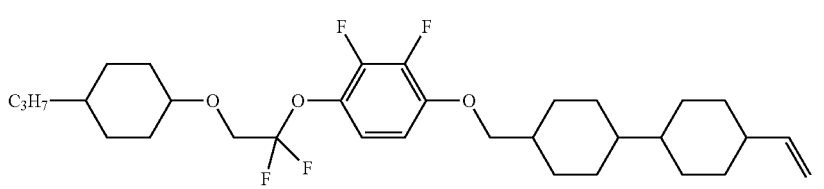
(1-6-1-8)

-continued
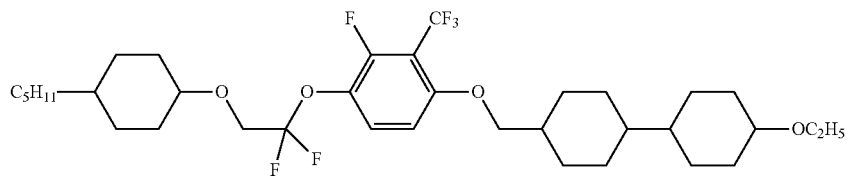
(1-6-1-9)
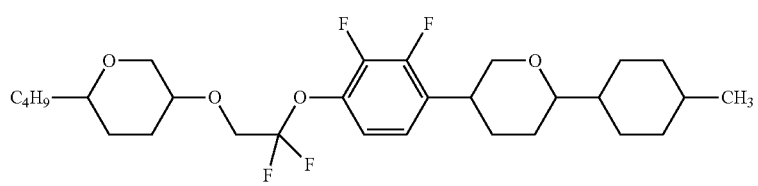
(1-6-1-10)
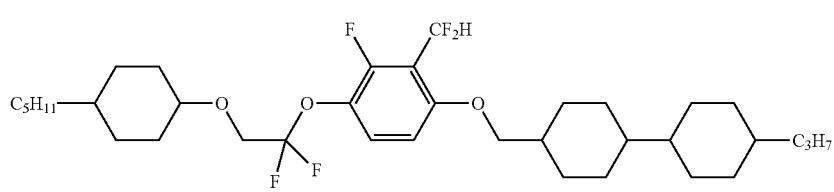
(1-6-1-11)
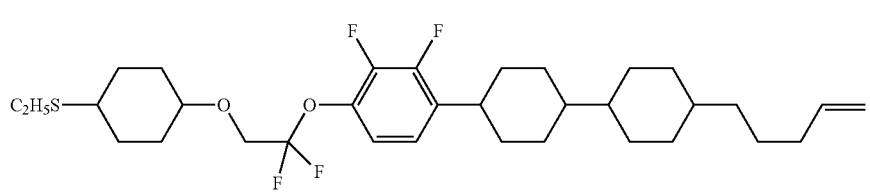
(1-6-1-12)
Formula 68
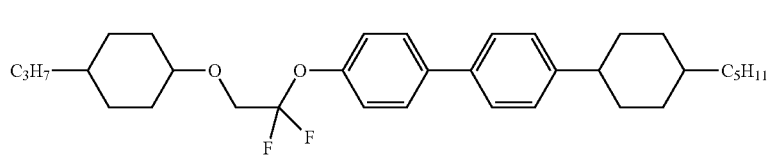
(1-6-2-1)
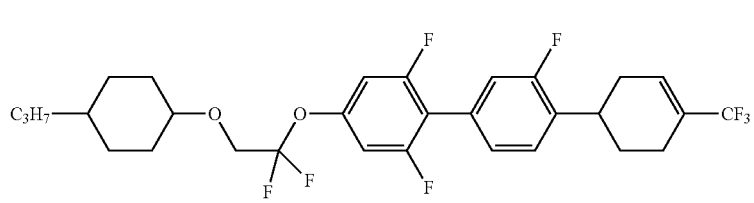
(1-6-2-2)
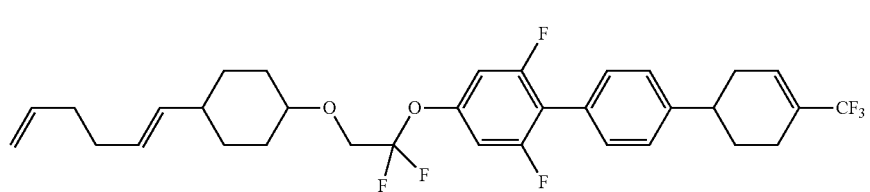
(1-6-2-3)
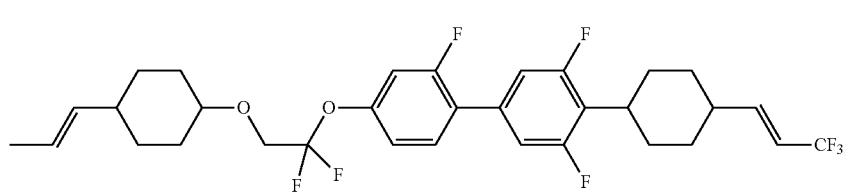
(1-6-2-4)

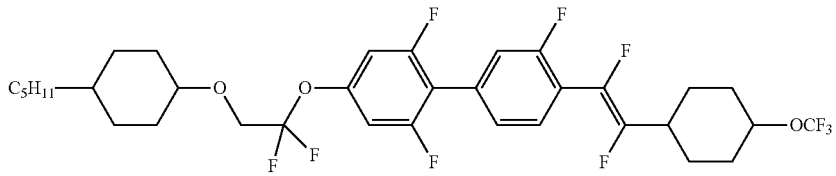
(1-6-2-5)
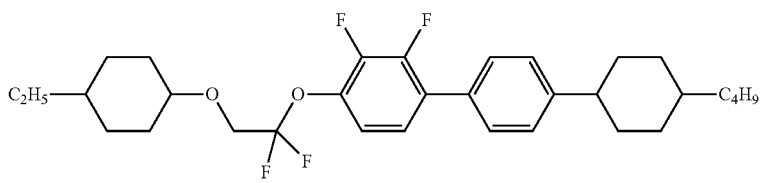
(1-6-2-6)
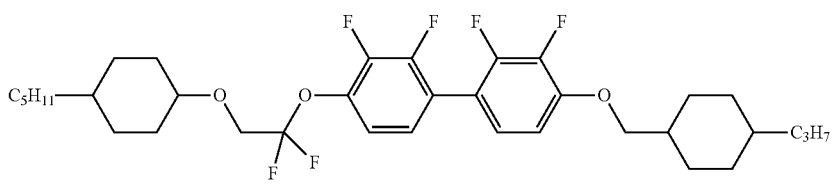
(1-6-2-7)
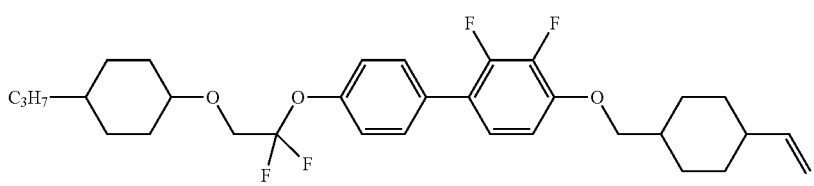
(1-6-2-8)
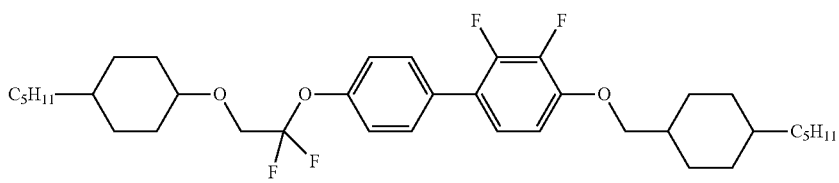
(1-6-2-9)
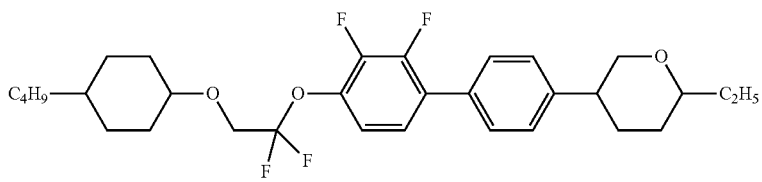
(1-6-2-10)
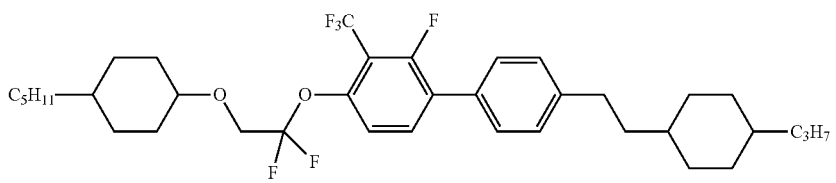
(1-6-2-11)
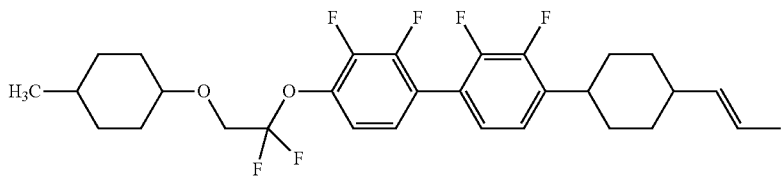
(1-6-2-12)

Formula 69
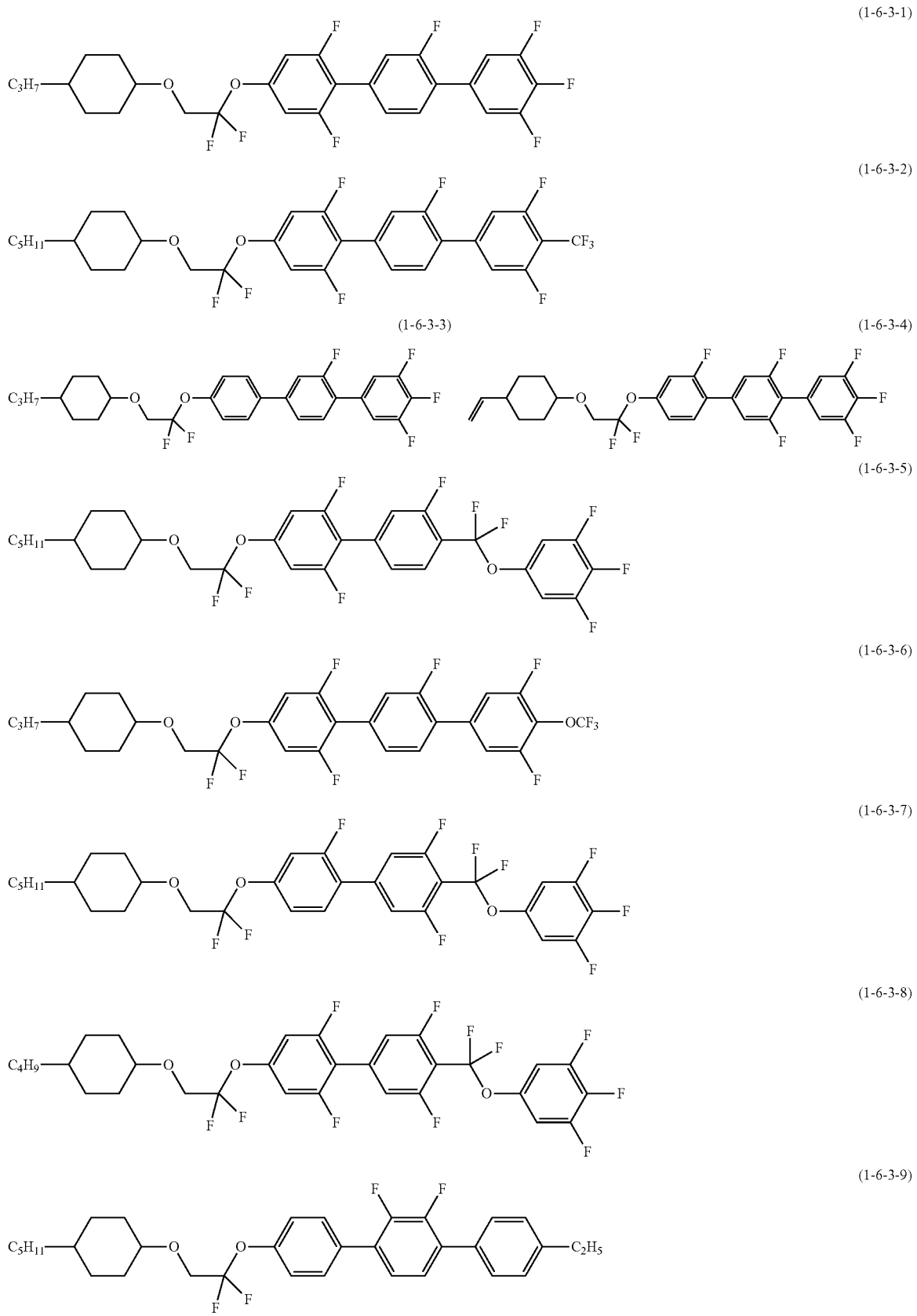

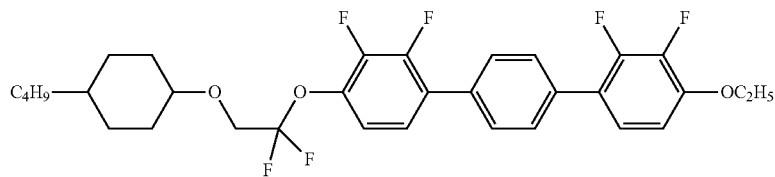
(1-6-3-10)
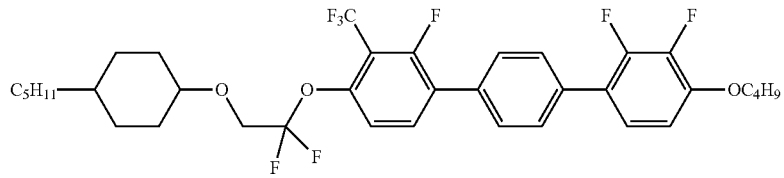
(1-6-3-11)
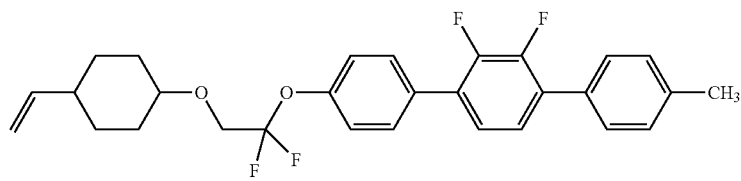
(1-6-3-12)
Formula 70
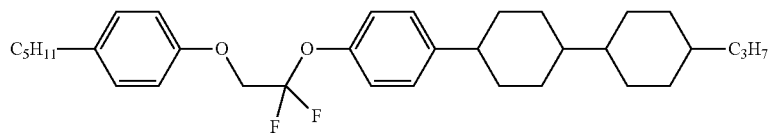
(1-6-4-1)
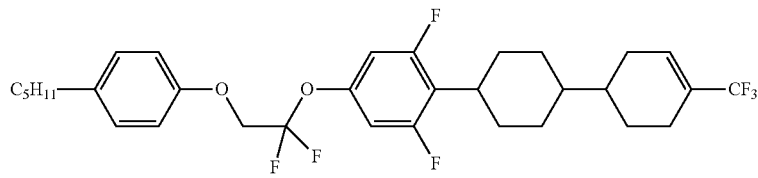
(1-6-4-2)
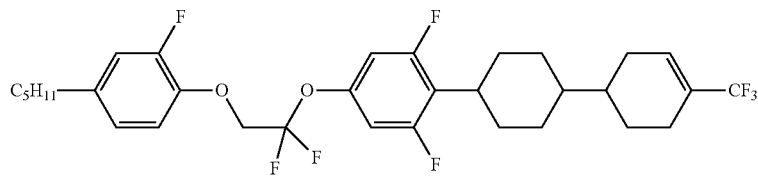
(1-6-4-3)
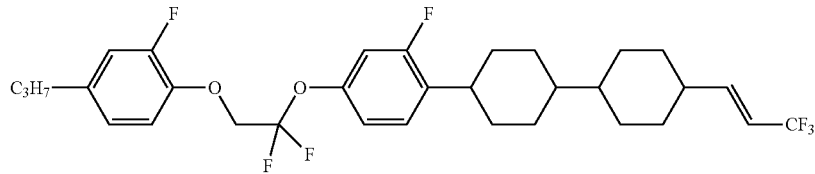
(1-6-4-4)
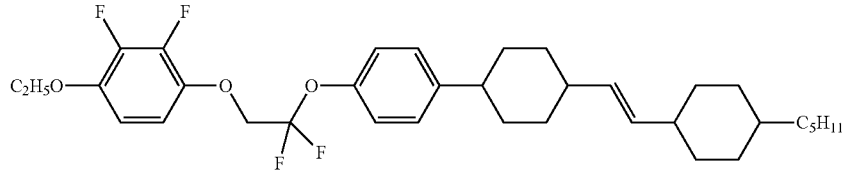
(1-6-4-5)

-continued
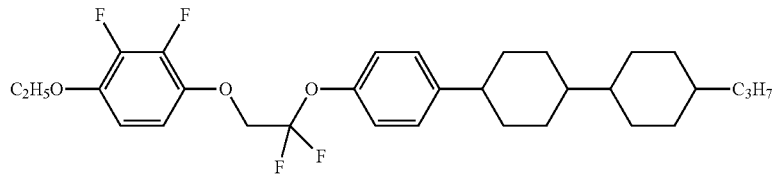
(1-6-4-6)
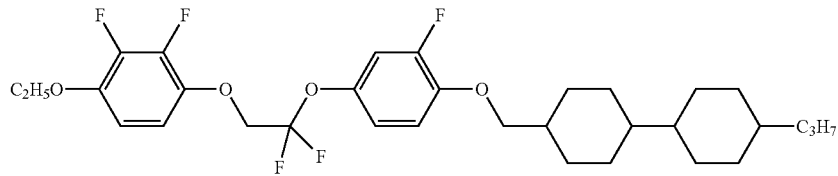
(1-6-4-7)
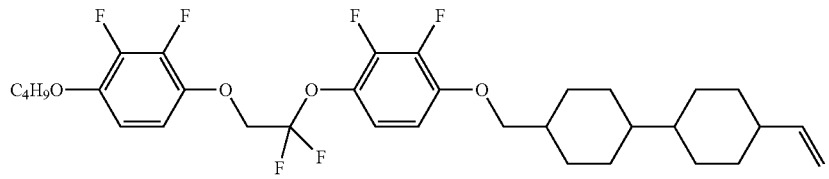
(1-6-4-8)
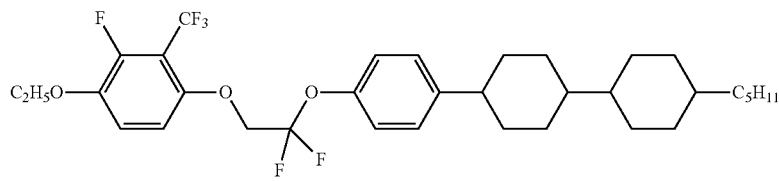
(1-6-4-9)
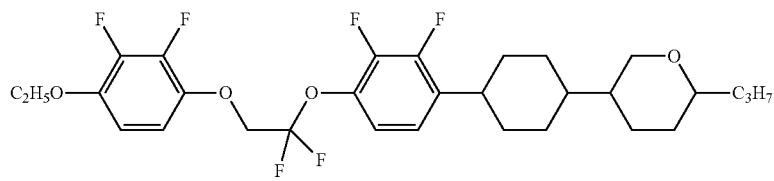
(1-6-4-10)
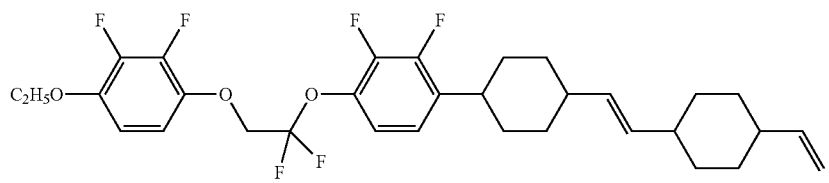
(1-6-4-11)
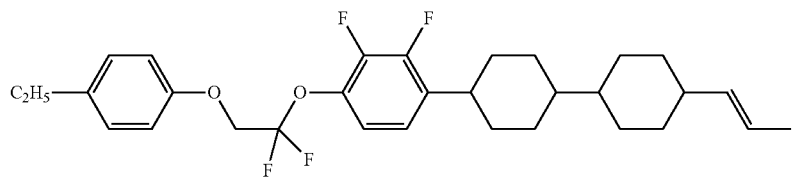
(1-6-4-12)
Formula 71
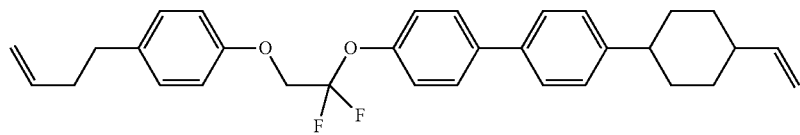
(1-6-5-1)

-continued
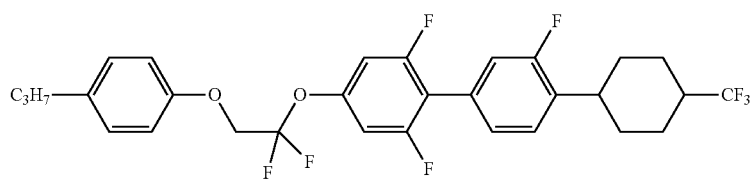
(1-6-5-2)
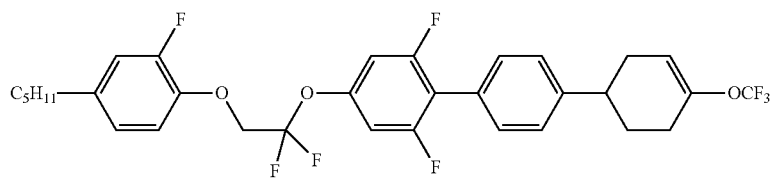
(1-6-5-3)
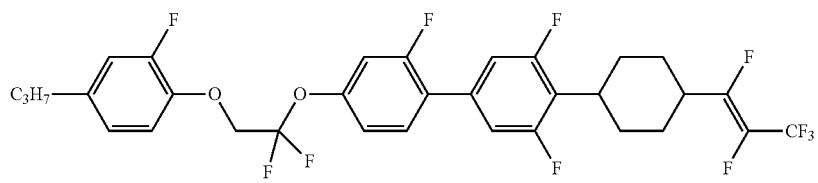
(1-6-5-4)
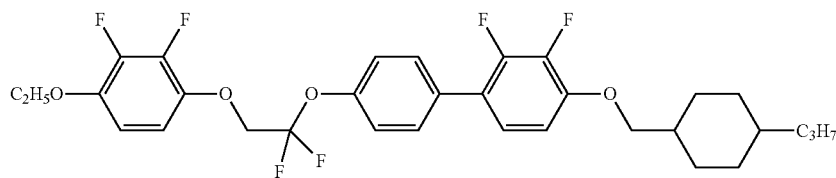
(1-6-5-5)
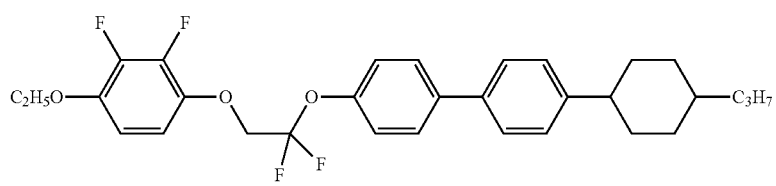
(1-6-5-6)
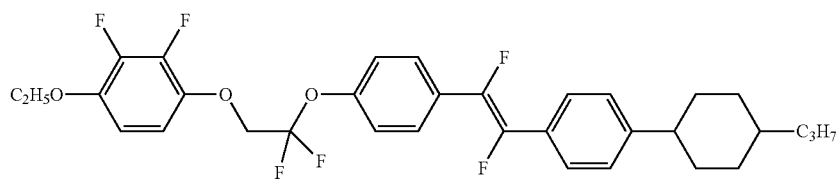
(1-6-5-7)
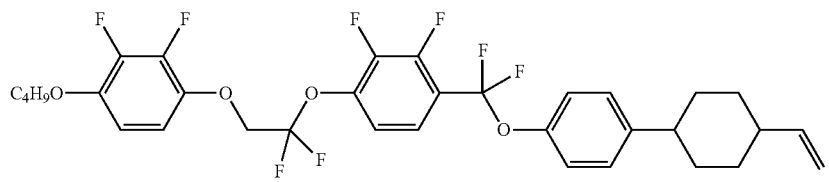
(1-6-5-8)
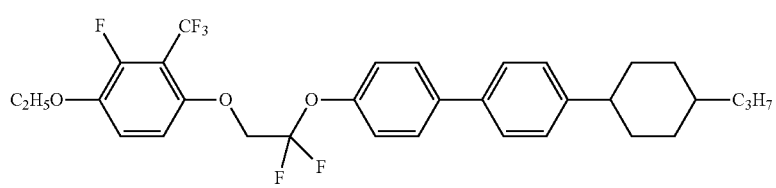
(1-6-5-9)

-continued
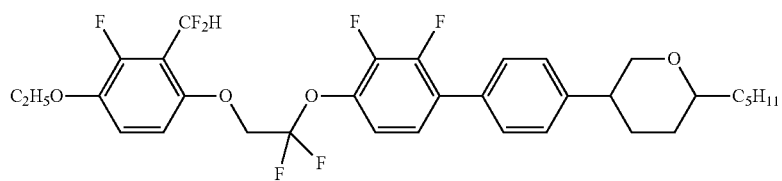
(1-6-5-10)
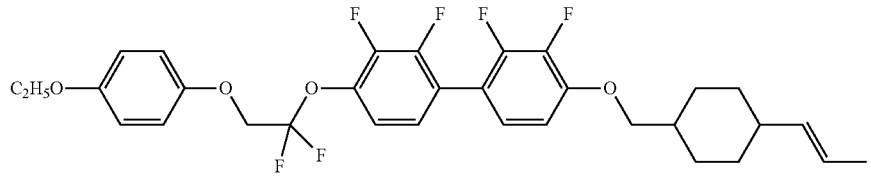
(1-6-5-11)
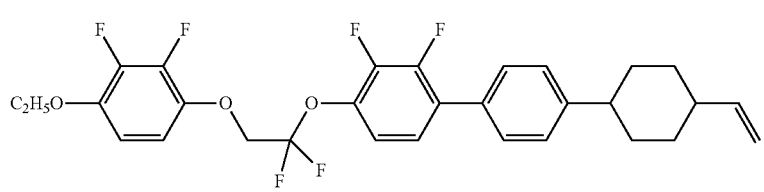
(1-6-5-12)
Formula 72
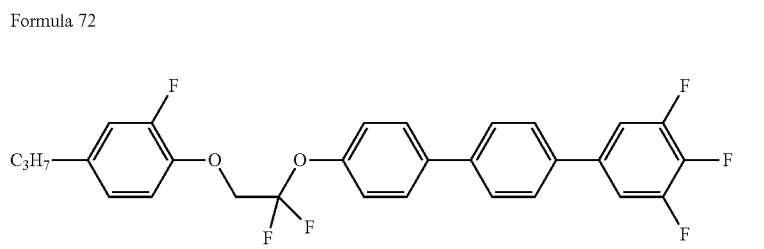
(1-6-6-1)
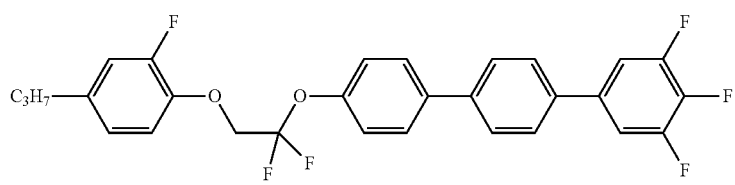
(1-6-6-2)
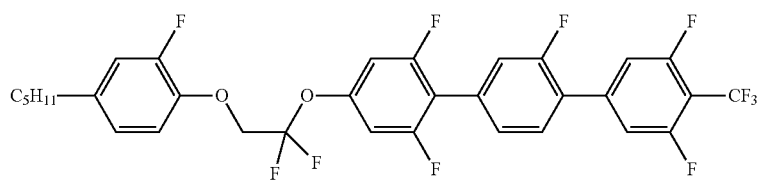
(1-6-6-3)
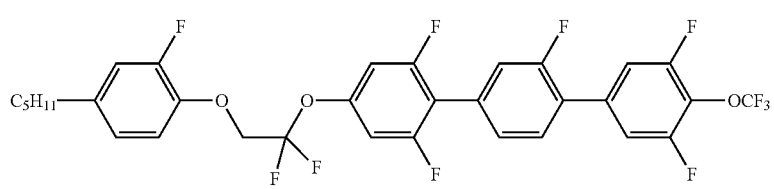
(1-6-6-4)
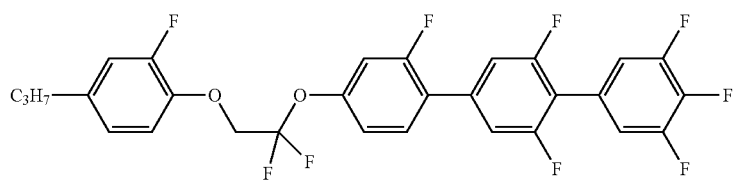
(1-6-6-5)
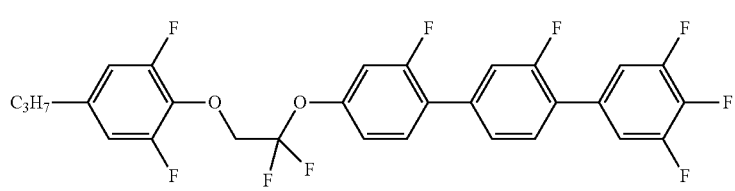

-continued

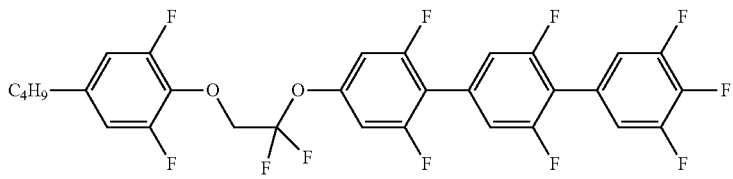
(1-6-6-6)

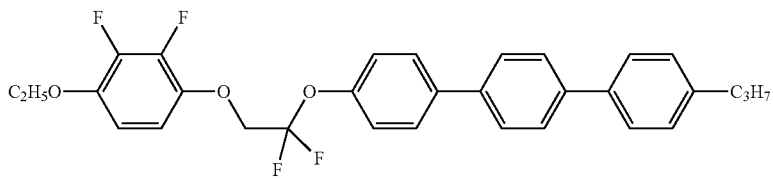
(1-6-6-7)

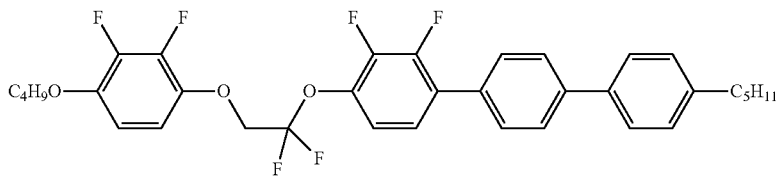
(1-6-6-8)

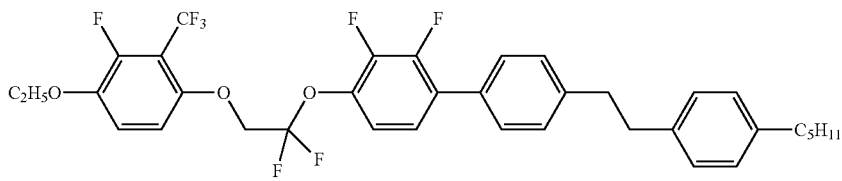
(1-6-6-9)

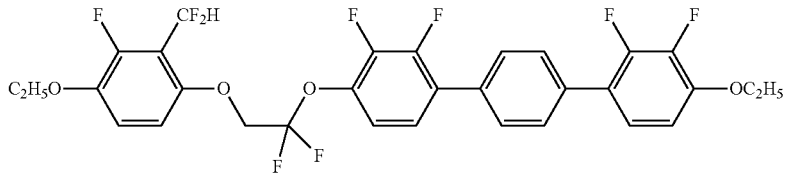
(1-6-6-10)

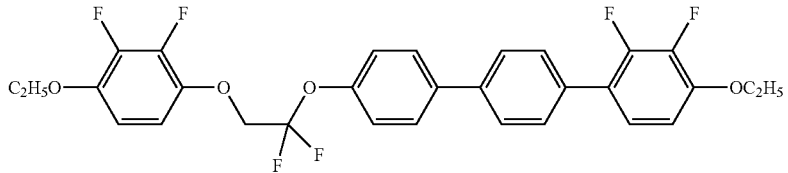
(1-6-6-11)

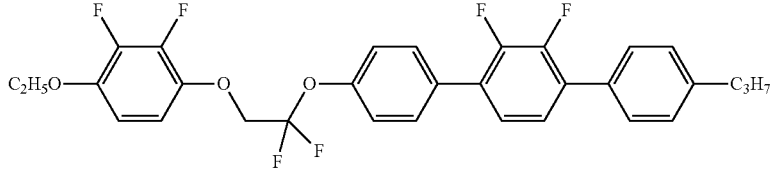
(1-6-6-12)

Examples of Liquid Crystal Compositions

Examples and so forth of liquid crystal compositions are shown below.

A method for description of each compound being a component of the liquid crystal composition using symbols is shown in Table 1. In Table 1, a configuration of 1,4-cyclohexylene is trans. Unless otherwise noted, a ratio (percentage) of each compound is expressed in terms of percentage by mass (% by mass) based on the total mass of the liquid crystal composition.

In addition, the number described in a part of the liquid crystal compound used in each Example corresponds to the compound number of components A to E described above. When a symbol "-" is simply described without describing the number of compound, the compound means any other compound that does not correspond to the components.

TABLE 1

Table Method for Description of Compounds using Symbols
R—(A$_1$)—Z$_1$—...—Z$_n$—(A$_n$)—R'

| 1) Left-terminal Group R— | Symbol |
|---|---|
| C$_n$H$_{2n+1}$— | n- |
| C$_n$H$_{2n+1}$O— | nO— |
| C$_m$H$_{2m+1}$OC$_n$H$_{2n}$— | mOn— |
| CH$_2$=CH— | V— |
| C$_n$H$_{2n+1}$—CH=CH— | nV— |
| CH$_2$=CH—C$_n$H$_{2n}$— | Vn— |
| C$_m$H$_{2m+1}$—CH=CH—C$_n$H$_{2n}$— | mVn— |
| CF$_2$=CH— | VFF— |
| CF$_2$=CH—C$_n$H$_{2n}$— | VFFn— |

| 2). Right-terminal Group —R' | Symbol |
|---|---|
| —C$_n$H$_{2n+1}$ | -n |
| —OC$_n$H$_{2n+1}$ | —On |
| —COOCH$_3$ | —EMe |
| —CH=CH$_2$ | —V |
| —CH=CH—C$_n$H$_{2n+1}$ | —Vn |
| —C$_n$H$_{2n}$—CH=CH$_2$ | —nV |
| —C$_m$H$_{2m}$—CH=CH—C$_n$H$_{2n+1}$ | —mVn |
| —CH=CF$_2$ | —VFF |
| —F | —F |
| —Cl | —CL |
| —OCF$_3$ | —OCF3 |
| —OCHF$_2$ | —OCHF2 |
| —CF$_3$ | —CF3 |

| 3). Bonding Group —Z$_n$— | Symbol |
|---|---|
| —C$_n$H$_{2n}$— | n |
| —COO— | E |
| —CH=CH— | V |
| —CH$_2$O— | 1O |
| —OCH$_2$— | O1 |
| —CF$_2$O— | X |
| —OCF$_2$— | x |
| —C≡C— | T |

| 4) Ring Structure —A$_n$— | Symbol |
|---|---|
|  | H |
|  | B |
| 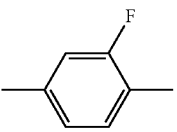 | B(F) |
| 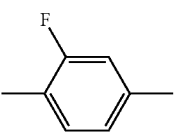 | B(2F) |

TABLE 1-continued

Table Method for Description of Compounds using Symbols
R—(A$_1$)—Z$_1$—...—Z$_n$—(A$_n$)—R'

| | |
|---|---|
| 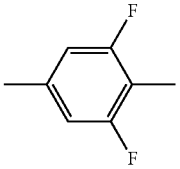 | B(F,F) |
| 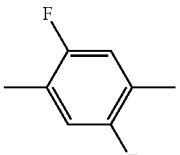 | B(2F,5F) |
| 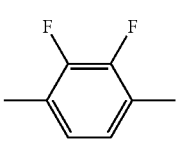 | B(2F,3F) |
| 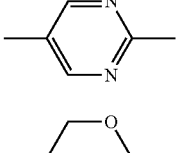 | Py |
| 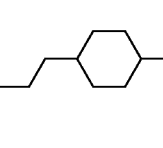 | G |

5). Examples of Description

Example 1 3-HBx1OB(2F,3F)—O2

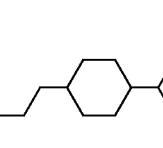

Example 2 3-HHB(F)O1XB(F,F)—F

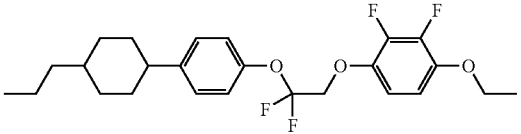 [SMILES: CCCC1CCC(c2ccc(OC(F)(F)COc3ccc(OCC)c(F)c3F)cc2)CC1]

Example 3 3-HH-4

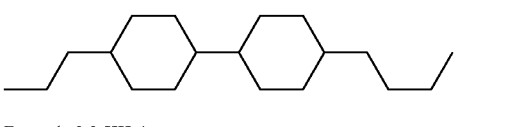

Example 4 3-HBB(F,F)—F

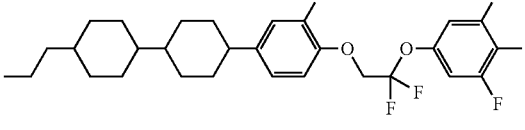

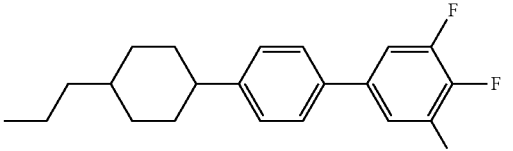

Example 7

A composition of a liquid crystal composition in Example 7 was as described below.

| | | |
|---|---|---|
| 3-HBx1OB(2F,3F)-O2 | (1-3-3-3) | 3% |
| 3-HBx1OB(2F,3F)B(2F,3F)-O2 | (1-5-4-6) | 3% |
| 3-HB-O1 | (12-5) | 15% |
| 3-HH-4 | (12-1) | 5% |
| 3-HB(2F,3F)-O2 | (6-1) | 10% |
| 5-HB(2F,3F)-O2 | (6-1) | 10% |
| 2-HHB(2F,3F)-1 | (7-1) | 12% |
| 3-HHB(2F,3F)-1 | (7-1) | 12% |
| 3-HHB(2F,3F)-O2 | (7-1) | 13% |
| 5-HHB(2F,3F)-O2 | (7-1) | 11% |
| 3-HHB-1 | (13-1) | 6% |

Values of physical properties of the liquid crystal composition were as described below.

$T_{NI}$=87.7° C., $\Delta\varepsilon$=−3.6, $\Delta n$=0.093, $\eta$=39.0 mPa·s.

Example 8

A composition of a liquid crystal composition in Example 8 was as described below.

| | | |
|---|---|---|
| 3-HHB(F,F)O1XB(F,F)-F | (1-4-2-2) | 6% |
| 3-HBB(F)O1XB(F,F)-F | (1-4-3-2) | 5% |
| 3-HHB(F,F)-F | (3-3) | 9% |
| 3-H2HB(F,F)-F | (3-15) | 8% |
| 4-H2HB(F,F)-F | (3-15) | 8% |
| 5-H2HB(F,F)-F | (3-15) | 8% |
| 3-HBB(F,F)-F | (3-24) | 16% |
| 5-HBB(F,F)-F | (3-24) | 15% |
| 3-H2BB(F,F)-F | (3-27) | 10% |
| 5-HHBB(F,F)-F | (4-6) | 3% |
| 5-HHEBB-F | (4-17) | 2% |
| 3-HH2BB(F,F)-F | (4-15) | 2% |
| 1O1-HBBH-4 | (14-1) | 4% |
| 1O1-HBBH-5 | (14-1) | 4% |

Values of physical properties of the liquid crystal composition were as described below.

$T_{NI}$=101.5° C., $\Delta\varepsilon$=9.4, $\Delta n$=0.116,
Vth=1.79 V, $\eta$=38.3 mPa·s.

In addition, a pitch when 0.25 part by mass of optically active compound (Op-5) (the compound was exemplified in the description of embodiments) was added to 100 parts by mass of the liquid crystal composition in Example 8 was 61.4 micrometers.

Use Examples of Liquid Crystal Compositions

Specific use examples of composition formulations of liquid crystal compositions are shown below.

Use Example 1

| | | |
|---|---|---|
| 3-HBx1OB(2F,3F)B(2F,3F)-O2 | (1-5-4-6) | 4% |
| 3-BBBx1OB(2F,3F)-O2 | (1-6-6-7) | 4% |
| 3-HB-O1 | (12-5) | 15% |
| 3-HH-4 | (12-1) | 5% |
| 3-HB(2F,3F)-O2 | (6-1) | 12% |
| 5-HB(2F,3F)-O2 | (6-1) | 10% |
| 2-HHB(2F,3F)-1 | (7-1) | 10% |
| 3-HHB(2F,3F)-1 | (7-1) | 10% |
| 3-HHB(2F,3F)-O2 | (7-1) | 13% |
| 5-HHB(2F,3F)-O2 | (7-1) | 12% |
| 6-HEB(2F,3F)-O2 | (6-6) | 5% |

Use Example 2

| | | |
|---|---|---|
| 3-BBBx1OB(2F,3F)-O2 | (1-6-6-7) | 4% |
| 3-HBBx1OB(2F,3F)-O2 | (1-6-5-6) | 4% |
| 3-HB-O1 | (12-5) | 15% |
| 3-HH-4 | (12-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 10% |
| 3-HHB(2F,3F)-O2 | (7-1) | 7% |
| 5-HHB(2F,3F)-O2 | (7-1) | 13% |
| 3-HHB-1 | (13-1) | 6% |

Use Example 3

| | | |
|---|---|---|
| 3-HBx1OB(2F,3F)-O2 | (1-3-3-3) | 3% |
| 3-HBBx1OB(2F,3F)-O2 | (1-6-5-6) | 3% |
| 3-HB-O1 | (12-5) | 15% |
| 3-HH-4 | (12-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 10% |
| 3-HHB(2F,3F)-1 | (7-1) | 12% |
| 3-HHB(2F,3F)-O2 | (7-1) | 9% |
| 5-HHB(2F,3F)-O2 | (7-1) | 13% |
| 6-HEB(2F,3F)-O2 | (6-6) | 6% |

Use Example 4

| | | |
|---|---|---|
| 3-HHB(F,F)O1XB(F,F)-F | (1-4-2-2) | 5% |
| 5-HBB(F)O1XB(F,F)-CF3 | (1-4-3-3) | 5% |
| 5-HB-CL | (2-2) | 16% |
| 3-HH-4 | (12-1) | 12% |
| 3-HH-5 | (12-1) | 4% |
| 3-HHB-F | (3-1) | 4% |
| 3-HHB-CL | (3-1) | 3% |
| 4-HHB-CL | (3-1) | 4% |
| 3-HHB(F)-F | (3-2) | 10% |
| 5-HHB(F)-F | (3-2) | 8% |
| 7-HHB(F)-F | (3-2) | 8% |
| 5-HBB(F)-F | (3-23) | 4% |
| 1O1-HBBH-5 | (14-1) | 3% |
| 3-HHBB(F,F)-F | (4-6) | 2% |
| 4-HHBB(F,F)-F | (4-6) | 3% |
| 5-HHBB(F,F)-F | (4-6) | 3% |
| 3-HH2BB(F,F)-F | (4-15) | 3% |
| 4-HH2BB(F,F)-F | (4-15) | 3% |

Use Example 5

| | | |
|---|---|---|
| 3-HBB(F)O1XB(F,F)-F | (1-4-3-2) | 5% |
| 3-B(F,F)B(F)O1XB(F)B(F,F)-F | (1-5-6-4) | 5% |
| 5-HB-F | (2-2) | 12% |
| 6-HB-F | (2-2) | 9% |
| 7-HB-F | (2-2) | 7% |
| 2-HHB-OCF3 | (3-1) | 7% |
| 3-HHB-OCF3 | (3-1) | 7% |
| 4-HHB-OCF3 | (3-1) | 7% |
| 5-HHB-OCF3 | (3-1) | 5% |
| 3-HH2B-OCF3 | (3-4) | 4% |
| 3-HHB(F,F)-OCHF2 | (3-3) | 4% |
| 3-HHB(F,F)-OCF3 | (3-3) | 5% |
| 3-HH2B(F)-F | (3-5) | 3% |

-continued

| | | |
|---|---|---|
| 3-HBB(F)-F | (3-23) | 7% |
| 5-HBB(F)-F | (3-23) | 7% |
| 5-HBBH-3 | (14-1) | 3% |
| 3-HB(F)BH-3 | (14-2) | 3% |

Use Example 6

| | | |
|---|---|---|
| 5-HBB(F)O1XB(F,F)-CF3 | (1-4-3-3) | 4% |
| 3-B(F,F)B(F)O1XB(F)B(F,F)-F | (1-5-6-4) | 4% |
| 5-HB-CL | (2-2) | 8% |
| 3-HH-4 | (12-1) | 8% |
| 3-HHB-1 | (13-1) | 2% |
| 3-HHB(F,F)-F | (3-3) | 8% |
| 3-HBB(F,F)-F | (3-24) | 20% |
| 5-HBB(F,F)-F | (3-24) | 15% |
| 3-HHEB(F,F)-F | (3-12) | 8% |
| 4-HHEB(F,F)-F | (3-12) | 3% |
| 5-HHEB(F,F)-F | (3-12) | 3% |
| 2-HBEB(F,F)-F | (3-39) | 3% |
| 3-HBEB(F,F)-F | (3-39) | 5% |
| 5-HBEB(F,F)-F | (3-39) | 3% |
| 3-HHBB(F,F)-F | (4-6) | 6% |

Use Example 7

| | | |
|---|---|---|
| 3-HBB(F)O1XB(F,F)-F | (1-4-3-2) | 5% |
| 3-HHB(F)O1XB(F,F)-F | (1-4-2-5) | 5% |
| 3-HB-CL | (2-2) | 3% |
| 5-HB-CL | (2-2) | 4% |
| 3-HHB-OCF3 | (3-1) | 5% |
| 3-H2HB-OCF3 | (3-13) | 5% |
| 5-H4HB-OCF3 | (3-19) | 15% |
| V-HHB(F)-F | (3-2) | 5% |
| 3-HHB(F)-F | (3-2) | 5% |
| 5-HHB(F)-F | (3-2) | 5% |
| 3-H4HB(F,F)-CF3 | (3-21) | 8% |
| 5-H4HB(F,F)-CF3 | (3-21) | 10% |
| 5-H2HB(F,F)-F | (3-15) | 5% |
| 5-H4HB(F,F)-F | (3-21) | 5% |
| 2-H2BB(F)-F | (3-26) | 5% |
| 3-H2BB(F)-F | (3-26) | 5% |
| 3-HBEB(F,F)-F | (3-39) | 5% |

Use Example 8

| | | |
|---|---|---|
| 3-HHB(F)O1XB(F,F)-F | (1-4-2-5) | 5% |
| 3-HBB(F)O1XB(F)-F | (1-4-3-4) | 5% |
| 5-HB-CL | (2-2) | 7% |
| 7-HB(F,F)-F | (2-4) | 3% |
| 3-HH-4 | (12-1) | 10% |
| 3-HH-5 | (12-1) | 5% |
| 3-HB-O2 | (12-5) | 15% |
| 3-HHB-1 | (13-1) | 8% |
| 3-HHB-O1 | (13-1) | 5% |
| 2-HHB(F)-F | (3-2) | 7% |
| 3-HHB(F)-F | (3-2) | 7% |
| 5-HHB(F)-F | (3-2) | 7% |
| 3-HHB(F,F)-F | (3-3) | 6% |
| 3-H2HB(F,F)-F | (3-15) | 5% |
| 4-H2HB(F,F)-F | (3-15) | 5% |

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A compound of the invention includes a liquid crystal compound showing a large absolute value of dielectric anisotropy ($|\Delta\epsilon|$), and the invention can provide a liquid crystal composition allowing low voltage driving according to various kinds of display modes, when the compound is contained in the liquid crystal composition, and a liquid crystal display device using the composition.

What is claimed is:

1. A compound represented by formula (1):

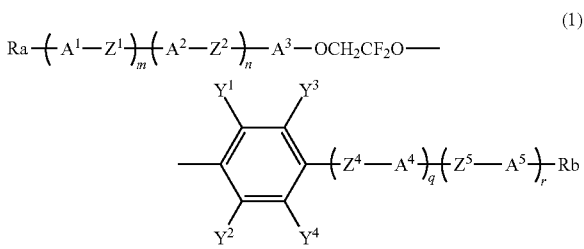

wherein, in formula (1),

Ra and Rb are each independently fluorine, chlorine or alkyl having 1 to 10 carbons, and in the alkyl, at least one of —$CH_2$— may be replaced by —O—, —S—, —CO— or —$SiH_2$—, at least one of —$(CH_2)_2$— may be replaced by —CH=CH— or —C≡C—, and at least one of hydrogen may be replaced by fluorine, however, Ra and Rb are not identical;

$A^1$, $A^2$, $A^3$, $A^4$ and $A^5$ are each independently 1,4-cyclohexylene, 1,4-phenylene, cyclohexene-1,4-diyl, decahydronaphthalene-2,6-diyl, 1,2,3,4-tetrahydronaphthalene-2,6-diyl or naphthalene-2,6-diyl, and in the groups, one of —$CH_2$— may be replaced by —O—, —S—, —CO— or —$SiH_2$—, at least one of —$(CH_2)_2$— may be replaced by —CH=CH—, and at least one of hydrogen may be replaced by fluorine, chlorine, —$CF_3$, —$CHF_2$, —$CH_2F$, —$OCF_3$, —$OCHF_2$ or —$OCH_2F$;

$Z^1$, $Z^2$, $Z^4$ and $Z^5$ are each independently a single bond or alkylene having 1 to 4 carbons, and in the alkylene, at least one of —$CH_2$— may be replaced by —O—, —S—, —CO— or —$SiH_2$—, at least one of —$(CH_2)_2$— may be replaced by —CH=CH— or —C≡C—, and at least one of hydrogen may be replaced by fluorine;

$Y^1$, $Y^2$, $Y^3$ and $Y^4$ are each independently hydrogen, fluorine, chlorine, —$CF_3$ or —$CHF_2$; and m, n, q and r are each independently 0, 1 or 2, and a sum of m, n, q and r is 0, 1, 2, 3 or 4.

2. The compound according to claim 1, wherein, in formula (1), a sum of m, n, q and r is 0, 1, 2 or 3.

3. The compound according to claim 1, represented by any one of formulas (1-1) to (1-10):

(1-1) 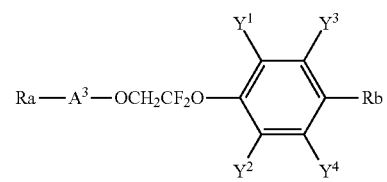

(1-2) 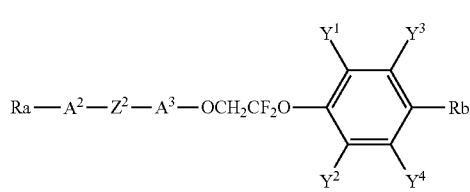

(1-3) 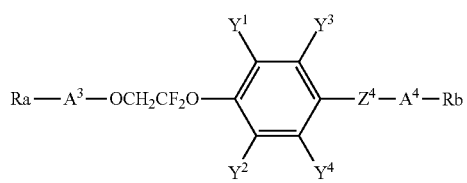

(1-4) 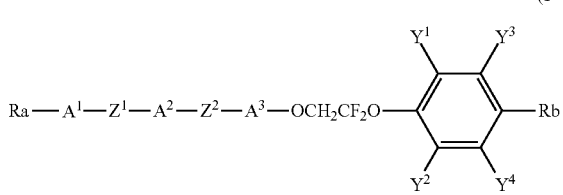

(1-5) 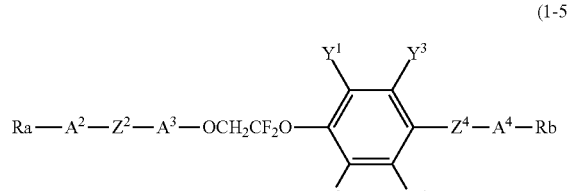

(1-6) 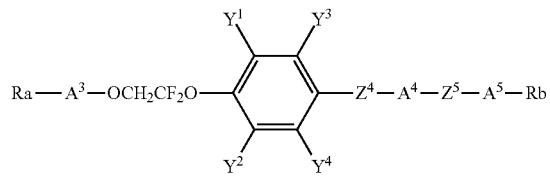

(1-7) 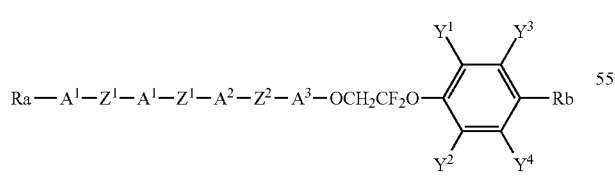

(1-8) 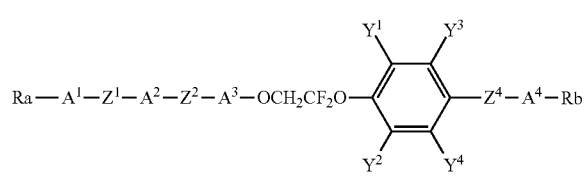

-continued (1-9) 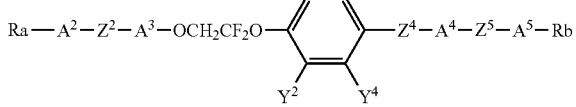

(1-10) 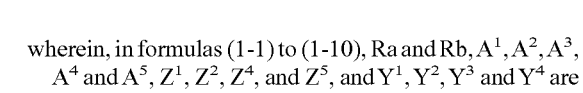

wherein, in formulas (1-1) to (1-10), Ra and Rb, $A^1, A^2, A^3$, $A^4$ and $A^5$, $Z^1, Z^2, Z^4$, and $Z^5$, and $Y^1, Y^2, Y^3$ and $Y^4$ are defined in a manner identical with the definitions of the identical symbols in formula (1), respectively.

4. The compound according to claim 3, wherein, in formulas (1-1) to (1-10),

Ra and Rb are each independently fluorine, alkyl having 1 to 10 carbons, alkenyl having 2 to 10 carbons, alkoxy having 1 to 9 carbons, alkoxyalkyl having 2 to 9 carbons, alkenyloxy having 3 to 9 carbons, polyfluoroalkyl having 1 to 10 carbons, polyfluoroalkoxy having 1 to 9 carbons, and polyfluoroalkenyl having 2 to 10 carbons;

$A^1, A^2, A^3, A^4$ and $A^5$ are each independently 1,4-cyclohexylene, 1,4-phenylene, 2-fluoro-1,4-phenylene, 2,3-difluoro-1,4-phenylene, 3,5-difluoro-1,4-phenylene, 2,5-difluoro-1,4-phenylene, cyclohexene-1,4-diyl, decahydronaphthalene-2,6-diyl, 1,2,3,4-tetrahydronaphthalene-2,6-diyl or naphthalene-2,6-diyl;

$Z^1, Z^2, Z^4$ and $Z^5$ are each independently a single bond, —(CH$_2$)$_2$—, —(CH$_2$)$_4$—, —COO—, —OCO—, —CH$_2$O—, —OCH$_2$—, —CF$_2$O—, —OCF$_2$—, —CH=CH—, —CF=CF—, —C≡C—, —CH$_2$CO—, —COCH$_2$—, —CH$_2$SiH$_2$—, —SiH$_2$CH$_2$—, —(CH$_2$)$_2$COO—, —OCO(CH$_2$)$_2$—, —(CH$_2$)$_2$CF$_2$O—, —OCF$_2$(CH$_2$)$_2$—, —(CH$_2$)$_3$O— or —O(CH$_2$)$_3$—.

5. The compound according to claim 3, represented by any one of formulas (1-1) to (1-6), wherein, in the formulas, Ra and Rb are each independently fluorine, alkyl having 1 to 10 carbons, alkenyl having 2 to 10 carbons, alkoxy having 1 to 9 carbons, alkoxyalkyl having 2 to 9 carbons, alkenyloxy having 3 to 9 carbons, polyfluoroalkyl having 1 to 10 carbons, polyfluoroalkoxy having 1 to 9 carbons or polyfluoroalkenyl having 2 to 10 carbons;

$A^1, A^2, A^3, A^4$ and $A^5$ are each independently 1,4-cyclohexylene, 1,4-phenylene, 2-fluoro-1,4-phenylene, 2,3-difluoro-1,4-phenylene, 3,5-difluoro-1,4-phenylene or cyclohexene-1,4-diyl;

$Z^1, Z^2, Z^4$ and $Z^5$ are each independently a single bond, —(CH$_2$)$_2$—, —(CH$_2$)$_4$—, —CH$_2$O—, —OCH$_2$—, —CF$_2$O—, —OCF$_2$—, —CH=CH—, —CF=CF—, —C≡C—, —(CH$_2$)$_2$CF$_2$O—, —OCF$_2$(CH$_2$)$_2$—, —(CH$_2$)$_3$O— or —O(CH$_2$)$_3$—; and $Y^1, Y^2, Y^3$ and $Y^4$ are each independently hydrogen or fluorine.

6. The compound according to claim 3, represented by any one of formulas (1-1) to (1-6), wherein, in the formulas, Ra and Rb are each independently fluorine, alkyl having 1 to 10 carbons, alkenyl having 2 to 10 carbons, alkoxy having 1 to 9 carbons, alkoxyalkyl having 2 to 9 carbons, alkenyloxy having 3 to 9 carbons, polyfluoroalkyl having 1 to 10 carbons, polyfluoroalkoxy having 1 to 9 carbons or polyfluoroalkenyl having 2 to 10 carbons;
$A^1$, $A^2$, $A^3$, $A^4$ and $A^5$ are each independently 1,4-cyclohexylene, 1,4-phenylene, 2-fluoro-1,4-phenylene, 3,5-difluoro-1,4-phenylene or cyclohexene-1,4-diyl;
$Z^1$, $Z^2$, $Z^4$ and $Z^5$ are each independently a single bond, —(CH$_2$)$_2$—, —CF$_2$O—, —OCF$_2$—, —CH=CH—, —CF=CF— or —C≡C—; and
both $Y^1$ and $Y^2$ are hydrogen.

7. The compound according to claim 3, represented by any one of formulas (1-1) to (1-6), wherein, in the formulas,
Ra and Rb are each independently fluorine, alkyl having 1 to 10 carbons, alkenyl having 2 to 10 carbons, alkoxy having 1 to 9 carbons, alkoxyalkyl having 2 to 9 carbons, alkenyloxy having 3 to 9 carbons, polyfluoroalkyl having 1 to 10 carbons, polyfluoroalkoxy having 1 to 9 carbons or polyfluoroalkenyl having 2 to 10 carbons;
$A^1$, $A^2$, $A^3$, $A^4$ and $A^5$ are each independently 1,4-cyclohexylene, 1,4-phenylene, 2-fluoro-1,4-phenylene, 2,3-difluoro-1,4-phenylene or cyclohexene-1,4-diyl;
$Z^1$, $Z^2$, $Z^4$ and $Z^5$ are each independently a single bond, —(CH$_2$)$_2$—, —CH$_2$O—, —OCH$_2$—, —CF$_2$O—, —OCF$_2$—, —CH=CH—, —CF=CF— or —C≡C—; and
both $Y^2$ and $Y^4$ are hydrogen.

8. The compound according to claim 3, represented by a formula selected from formulas (1-1-1) to (1-1-2), formulas (1-2-1) to (1-2-3), formulas (1-3-1) to (1-3-4), formulas (1-4-1) to (1-4-4), formulas (1-5-1) to (1-5-6) and formulas (1-6-1) to (1-6-6):

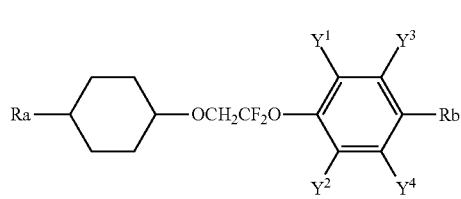

(1-1-1)

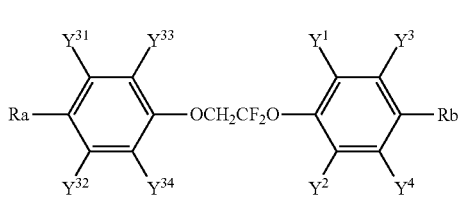

(1-1-2)

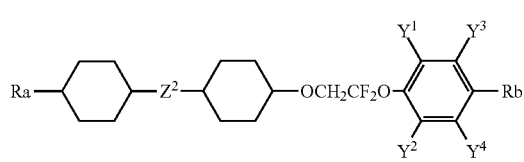

(1-2-1)

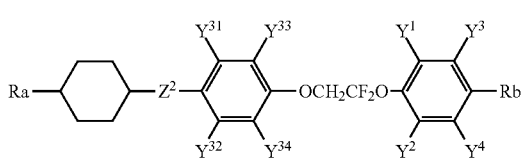

(1-2-2)

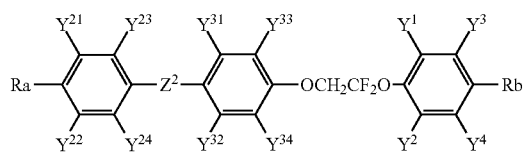

(1-2-3)

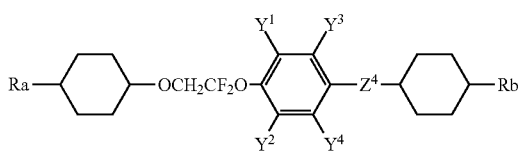

(1-3-1)

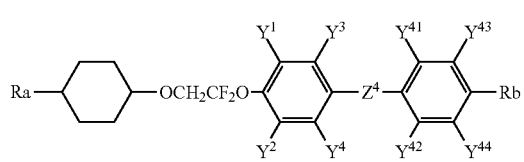

(1-3-2)

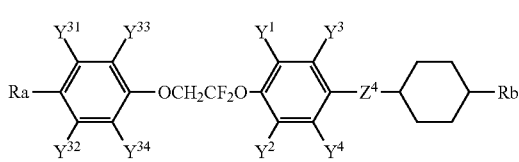

(1-3-3)

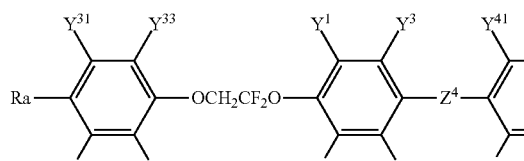

(1-3-4)

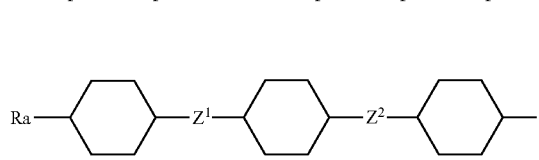

(1-4-1)

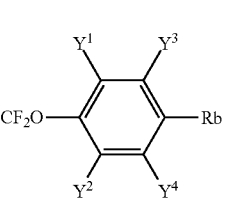

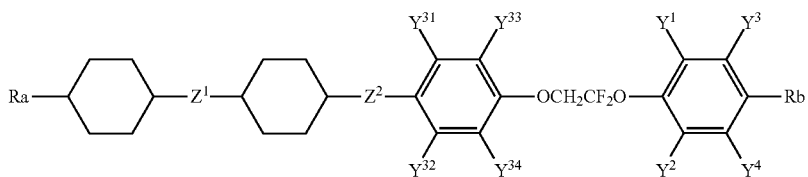
(1-4-2)
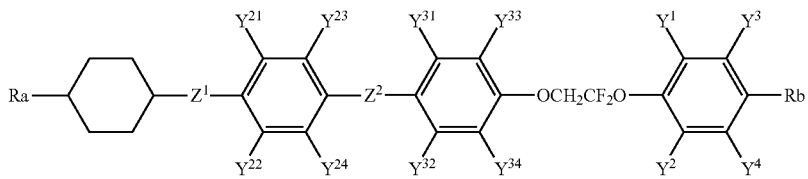
(1-4-3)
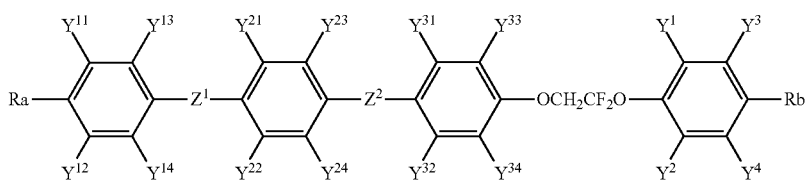
(1-4-4)
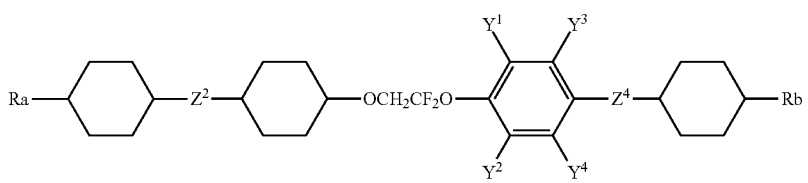
(1-5-1)
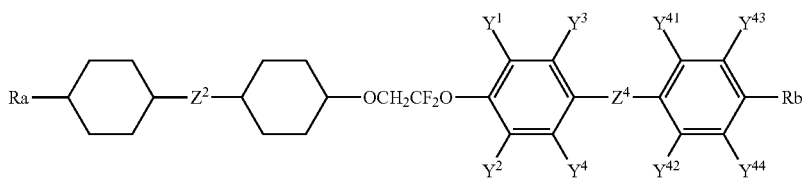
(1-5-2)
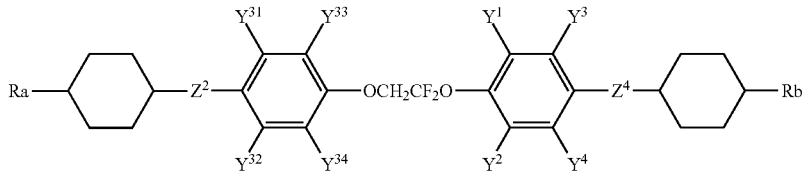
(1-5-3)
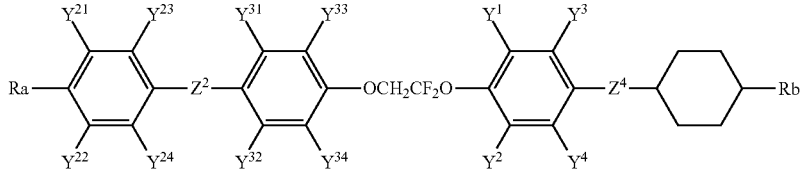
(1-5-4)
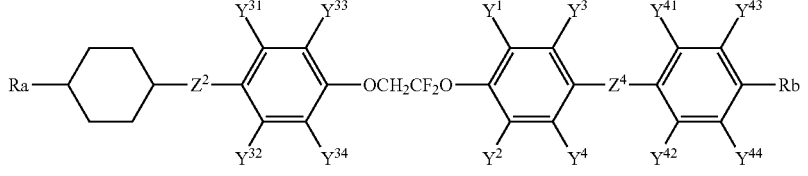
(1-5-5)

-continued

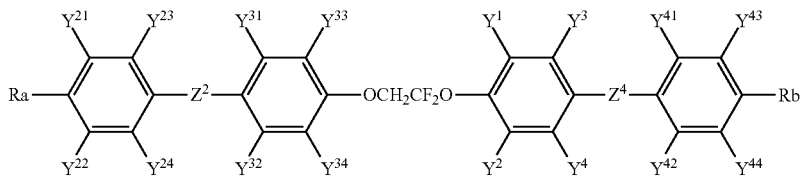
(1-5-6)

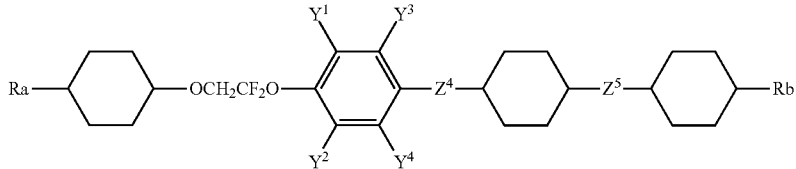
(1-6-1)

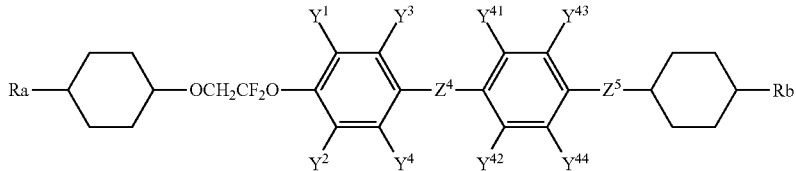
(1-6-2)

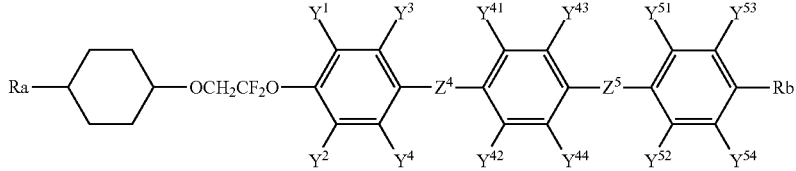
(1-6-3)

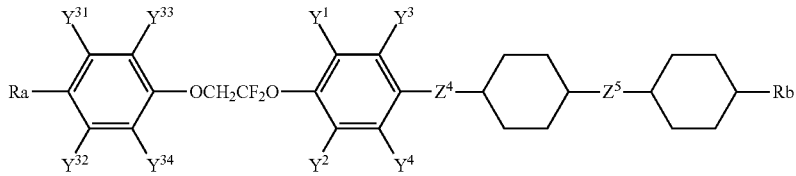
(1-6-4)

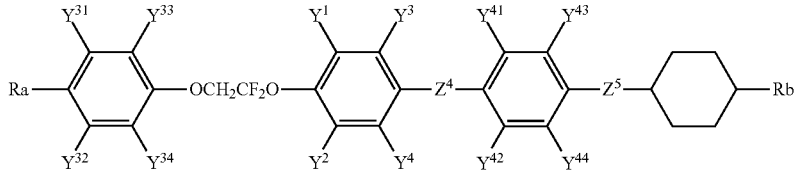
(1-6-5)

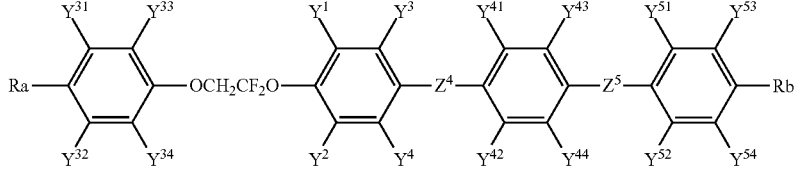
(1-6-6)

wherein, in formulas (1-1-1) to (1-1-2), formulas (1-2-1) to (1-2-3), formulas (1-3-1) to (1-3-4), formulas (1-4-1) to (1-4-4), formulas (1-5-1) to (1-5-6) and formulas (1-6-1) to (1-6-6), Ra and Rb are each independently fluorine, alkyl having 1 to 7 carbons, alkenyl having 2 to 7 carbons, alkoxy having 1 to 6 carbons, polyfluoroalkyl having 1 to 7 carbons or polyfluoroalkoxy having 1 to 6 carbons, however, Ra and Rb are not identical;

$Z^1$, $Z^2$, $Z^4$ and $Z^5$ are each independently a single bond, —$(CH_2)_2$—, —$CH_2O$—, —$OCH_2$—, —$CF_2O$—, —$OCF_2$— or —$CH=CH$—;

$Y^1$, $Y^2$, $Y^3$ and $Y^4$ are each independently hydrogen or fluorine; and $Y^{11}$ to $Y^{14}$, $Y^{21}$ to $Y^{24}$, $Y^{31}$ to $Y^{34}$, $Y^{41}$ to $Y^{44}$ and $Y^{51}$ to $Y^{54}$ are each independently hydrogen or fluorine.

9. The compound according to claim 8, wherein, in formulas (1-1-1) to (1-1-2), formulas (1-2-1) to (1-2-3), formulas (1-3-1) to (1-3-4), formulas (1-4-1) to (1-4-4), formulas (1-5-1) to (1-5-6) and formulas (1-6-1) to (1-6-6), Ra and Rb are each independently fluorine, alkyl having 1 to 7 carbons, alkenyl having 2 to 7 carbons, —$CF_3$ or —$OCF_3$; $Z^1$, $Z^2$, $Z^4$ and $Z^5$ are each independently a single bond, —$(CH_2)_2$—, —$CF_2O$—, —$OCF_2$— or —CH=CH—; both $Y^1$ and $Y^2$ are hydrogen; and $Y^{11}$, $Y^{12}$, $Y^{21}$, $Y^{22}$, $Y^{31}$, $Y^{32}$, $Y^{41}$, $Y^{42}$, $Y^{51}$ and $Y^{52}$ are hydrogen.

10. The compound according to claim 8, represented by any one of formulas (1-1-1) to (1-1-2), formulas (1-2-1) to (1-2-3), formula (1-3-2), formula (1-3-4), formulas (1-4-1) to (1-4-4), formula (1-5-2), formulas (1-5-5) to (1-5-6), formula (1-6-3) or formula (1-6-6), wherein, in the formulas, Ra is fluorine, alkyl having 1 to 5 carbons or alkenyl having 2 to 5 carbons; Rb is fluorine, —$CF_3$ or —$OCF_3$; $Z^1$, $Z^2$, $Z^4$ and $Z^5$ are each independently a single bond, —$CF_2O$—, —$OCF_2$— or —CH=CH—; both $Y^1$ and $Y^2$ are hydrogen; and $Y^{11}$, $Y^{12}$, $Y^{21}$, $Y^{22}$, $Y^{31}$, $Y^{32}$, $Y^{41}$, $Y^{42}$, $Y^{51}$ and $Y^{52}$ are hydrogen.

11. The compound according to claim 8, wherein, in formulas (1-1-1) to (1-1-2), formulas (1-2-1) to (1-2-3), formulas (1-3-1) to (1-3-4), formulas (1-4-1) to (1-4-4), formulas (1-5-1) to (1-5-6) and formulas (1-6-1) to (1-6-6), Ra and Rb are each independently alkyl having 1 to 7 carbons, alkenyl having 2 to 7 carbons or alkoxy having 1 to 6 carbons; $Z^1$, $Z^2$, $Z^4$, and $Z^5$ are each independently a single bond, —$(CH_2)_2$—, —$CH_2O$—, —$OCH_2$— or —CH=CH—; $Y^2$ and $Y^4$ are each independently hydrogen or fluorine; and $Y^{12}$, $Y^{14}$, $Y^{22}$, $Y^{24}$, $Y^{32}$, $Y^{34}$, $Y^{42}$, $Y^{44}$, $Y^{52}$ and $Y^{54}$ are hydrogen.

12. The compound according to claim 8, represented by any one of formula (1-1-2), formula (1-2-2), formula (1-2-3), formulas (1-3-3) to (1-3-4), formulas (1-4-2) to (1-4-4), formulas (1-5-3) to (1-5-6) or formulas (1-6-4) to (1-6-6), wherein, in the formulas, Ra and Rb are each independently alkyl having 1 to 5 carbons, alkenyl having 2 to 5 carbons or alkoxy having 1 to 4 carbons; $Z^1$, $Z^2$, $Z^4$ and $Z^5$ are each independently a single bond, —$(CH_2)_2$—, —$CH_2O$—, —$OCH_2$— or —CH=CH—; $Y^2$ and $Y^4$ are each independently hydrogen or fluorine; and $Y^{12}$, $Y^{14}$, $Y^{22}$, $Y^{24}$, $Y^{32}$, $Y^{34}$, $Y^{42}$, $Y^{44}$, $Y^{52}$ and $Y^{54}$ are hydrogen.

13. A liquid crystal composition containing the compound according to claim 1.

14. The liquid crystal composition according to claim 13, further containing at least one of compounds selected from compounds represented by formula (2), formula (3) and formula (4):

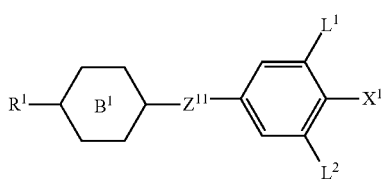
(2)

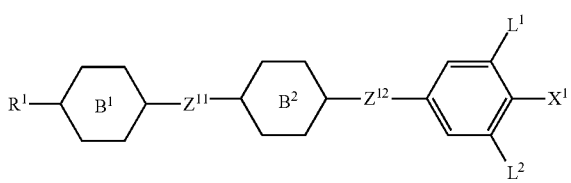
(3)

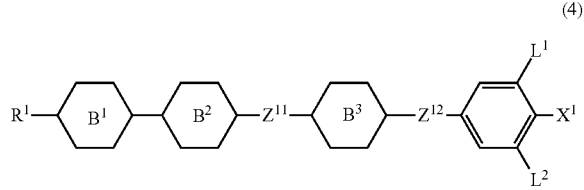
(4)

wherein, in formulas (2) to (4), $R^1$ is alkyl having 1 to 10 carbons or alkenyl having 2 to 10 carbons, and in the alkyl and the alkenyl, at least one of hydrogen may be replaced by fluorine, at least one of —$CH_2$— may be replaced by —O—;

$X^1$ is fluorine, chlorine, —$OCF_3$, —$OCHF_2$, —$CF_3$, —$CHF_2$, —$CH_2F$, —$OCF_2CHF_2$ or —$OCF_2CHFCF_3$;

ring $B^1$, ring $B^2$ and ring $B^3$ are each independently 1,4-cyclohexylene, 1,3-dioxane-2,5-diyl, pyrimidine-2,5-diyl, 1-tetrahydropyran-2,5-diyl, 1,4-phenylene, 2-fluoro-1,4-phenylene, 3-fluoro-1,4-phenylene or 3,5-difluoro-1,4-phenylene;

$Z^{11}$ and $Z^{12}$ are each independently —$(CH_2)_2$—, —$(CH_2)_4$—, —COO—, —$CF_2O$—, —$OCF_2$—, —CH=CH—, —C≡C—, —$CH_2O$— or a single bond; and $L^1$ and $L^2$ are each independently hydrogen or fluorine.

15. The liquid crystal composition according to claim 13, further containing a compound represented by formula (5):

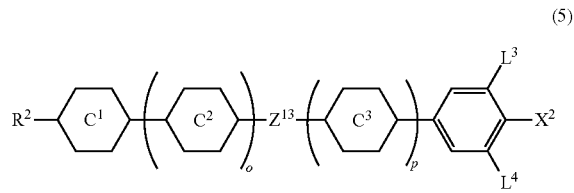
(5)

wherein, in formula (5), $R^2$ is alkyl having 1 to 10 carbons or alkenyl having 2 to 10 carbons, and in the alkyl and the alkenyl, at least one of hydrogen may be replaced by fluorine, and at least one of —$CH_2$— may be replaced by —O—;

$X^2$ is —C≡N or —C≡C—C≡N;

ring $C^1$, ring $C^2$ and ring $C^3$ are each independently 1,4-cyclohexylene, 1,4-phenylene, 1,3-dioxane-2,5-diyl, 1-tetrahydropyran-2,5-diyl or pyrimidine-2,5-diyl, and in the 1,4-phenylene, at least one of hydrogen may be replaced by fluorine;

$Z^{13}$ is —$(CH_2)_2$—, —COO—, —$CF_2O$—, —$OCF_2$—, —C≡C—, —$CH_2O$— or a single bond;

$L^3$ and $L^4$ are each independently hydrogen or fluorine; and o is 0, 1 or 2, p is 0 or 1, and a sum of o and p is 0, 1, 2 or 3.

16. The liquid crystal composition according to claim 13, further containing at least one of compounds selected from compounds represented by formula (6), formula (7), formula (8), formula (9), formula (10) and formula (11):

(6)
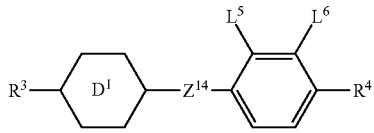

(7)
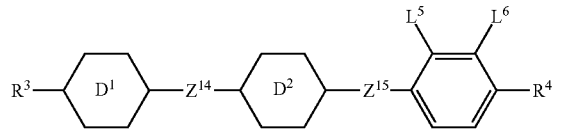

(8)
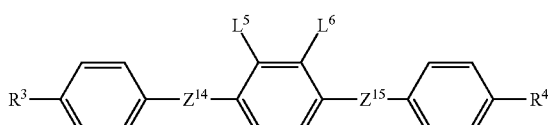

(9)
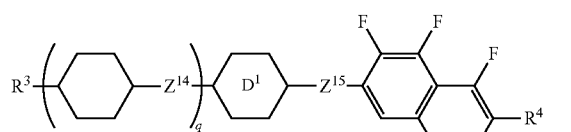

(10)
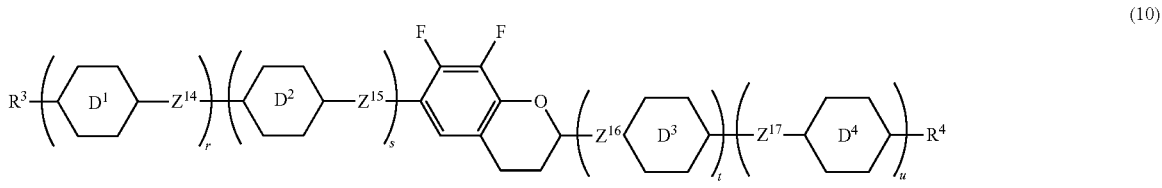

(11)
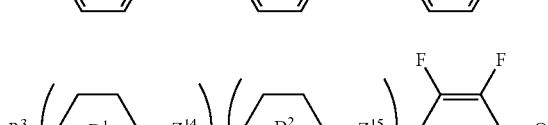

wherein, in formulas (6) to (11), $R^3$ and $R^4$ are each independently alkyl having 1 to 10 carbons or alkenyl having 2 to 10 carbons, in the alkyl and the alkenyl, at least one of hydrogen may be replaced by fluorine, and at least one of —CH$_2$— may be replaced by —O—;

ring $D^1$, ring $D^2$, ring $D^3$ and ring $D^4$ are each independently 1,4-cyclohexylene, 1,4-cyclohexenylene, 1,4-phenylene, 6-tetrahydropyran-2,5-diyl or decahydro-2,6-naphthalene, and in the 1,4-phenylene, at least one of hydrogen may be replaced by fluorine;

$Z^{14}$, $Z^{15}$, $Z^{16}$ and $Z^{17}$ are each independently —(CH$_2$)$_2$—, —COO—, —CH$_2$O—, —OCF$_2$—, —OCF$_2$(CH$_2$)$_2$— or a single bond;

$L^5$ and $L^6$ are each independently fluorine or chlorine; and q, r, s, t, u and v are each independently 0 or 1, and a sum of r, s, t and u is 1 or 2.

17. The liquid crystal composition according claim 13, further containing at least one of compounds selected from compounds represented by formula (12), formula (13) and formula (14):

(12)
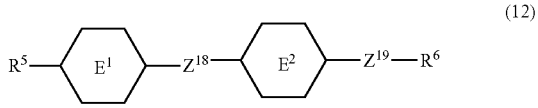

(13)
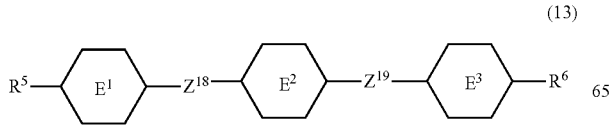

-continued

(14)
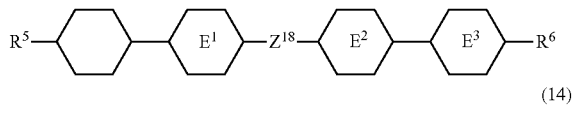

(14)
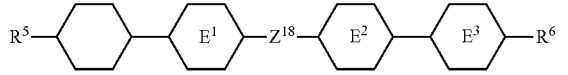

wherein, in formulas (12) to (14), $R^5$ and $R^6$ are each independently alkyl having 1 to 10 carbons or alkenyl having 2 to 10 carbons, and in the alkyl and the alkenyl, at least one of hydrogen may be replaced by fluorine, and at least one of —CH$_2$— may be replaced by —O—;

ring $E^1$, ring $E^2$ and ring $E^3$ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene;

$Z^{18}$ and $Z^{19}$ are each independently —C≡C—, —COO—, —(CH$_2$)$_2$—, —CH═CH— or a single bond.

18. The liquid crystal composition according to claim 14, further containing at least one compound selected from the group of compounds represented by formula (5):

(5)
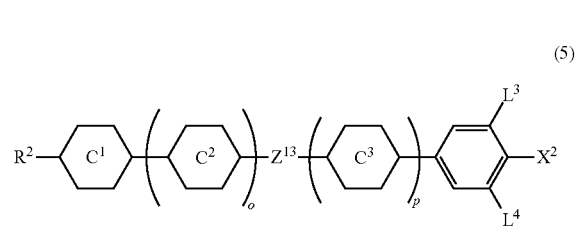

wherein, in formula (5),

R² is alkyl having 1 to 10 carbons or alkenyl having 2 to 10 carbons, and in the alkyl and the alkenyl, at least one of hydrogen may be replaced by fluorine, and at least one of —CH₂— may be replaced by —O—;

X² is —C≡N or —C≡C—C≡N;

ring C¹, ring C² and ring C³ are each independently 1,4-cyclohexylene, 1,4-phenylene, 1,3-dioxane-2,5-diyl, 1-tetrahydropyran-2,5-diyl or pyrimidine-2,5-diyl, and in the 1,4-phenylene, at least one of hydrogen may be replaced by fluorine;

Z¹³ is —(CH₂)₂—, —COO—, —CF₂O—, —OCF₂—, —C≡C—, —CH₂O— or a single bond;

L³ and L⁴ are each independently hydrogen or fluorine; and o is 0, 1 or 2, p is 0 or 1, and a sum of o and p is 0, 1, 2 or 3.

19. The liquid crystal composition according to claim 14, further containing at least one compound selected from the group of compounds represented by formulas (12), (13) and (14):

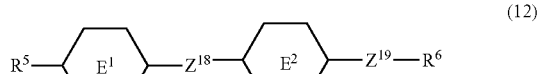

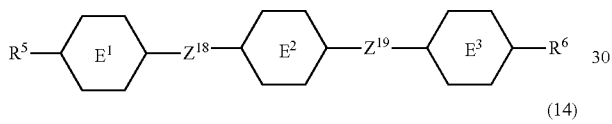

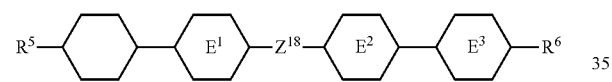

wherein, in formulas (12) to (14),

R⁵ and R⁶ are each independently alkyl having 1 to 10 carbons or alkenyl having 2 to 10 carbons, and in the alkyl and the alkenyl, at least one of hydrogen may be replaced by fluorine, and at least one of —CH₂— may be replaced by —O—;

ring E¹, ring E² and ring E³ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene;

Z¹⁸ and Z¹⁹ are each independently —C≡C—, —COO—, —(CH₂)₂—, —CH=CH— or a single bond.

20. The liquid crystal composition according to claim 15, further containing at least one compound selected from the group of compounds represented by formulas (12), (13) and (14):

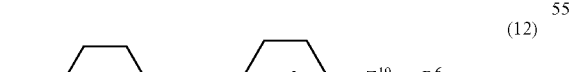

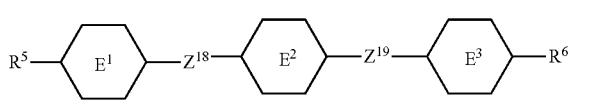

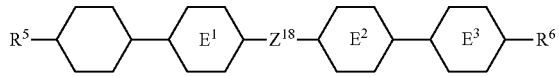

wherein, in formulas (12) to (14),

R⁵ and R⁶ are each independently alkyl having 1 to 10 carbons or alkenyl having 2 to 10 carbons, and in the alkyl and the alkenyl, at least one of hydrogen may be replaced by fluorine, and at least one of —CH₂— may be replaced by —O—;

ring E¹, ring E² and ring E³ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene;

Z¹⁸ and Z¹⁹ are each independently —C≡C—, —COO—, —(CH₂)₂—, —CH=CH— or a single bond.

21. The liquid crystal composition according to claim 16, further containing at least one compound selected from the group of compounds represented by formulas (12), (13) and (14):

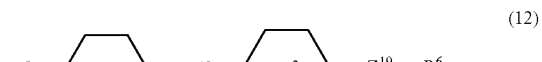

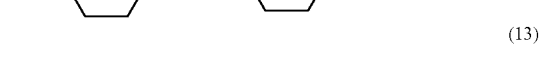

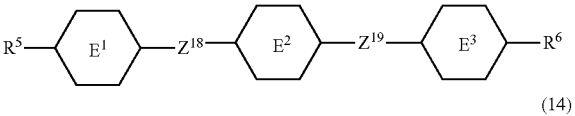

wherein, in formulas (12) to (14),

R⁵ and R⁶ are each independently alkyl having 1 to 10 carbons or alkenyl having 2 to 10 carbons, and in the alkyl and the alkenyl, at least one of hydrogen may be replaced by fluorine, and at least one of —CH₂— may be replaced by —O—;

ring E¹, ring E² and ring E³ are each independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene;

Z¹⁸ and Z¹⁹ are each independently —C≡C—, —COO—, —(CH₂)₂—, —CH=CH— or a single bond.

22. The liquid crystal composition according to claim 13, further containing at least one of compounds selected from an optically active compound and a polymerizable compound.

23. The liquid crystal composition according to claim 13, further containing at least one of compounds selected from an antioxidant and an ultraviolet light absorber.

24. A liquid crystal display device, comprising the liquid crystal composition according to claim 13.

* * * * *